United States Patent [19]

Watanabe et al.

[11] Patent Number: 5,340,968

[45] Date of Patent: Aug. 23, 1994

[54] INFORMATION STORAGE MEDIUM WITH ELECTRONIC AND VISUAL AREAS

[75] Inventors: Atsushi Watanabe, Toyokawa; Hitoshi Kamiya, Hekinan; Eiji Nakada, Kariya; Tomoaki Mizuno, Toyoake; Yoshiyuki Kago, Nishio; Tokutaro Murase, Obu; Yoshihiko Inukai, Nagoya, all of Japan

[73] Assignee: Nippondenso Company, Ltd., Kariya, Japan

[21] Appl. No.: 878,787

[22] Filed: May 5, 1992

[30] Foreign Application Priority Data

| May 7, 1991 | [JP] | Japan | 3-101532 |
| May 10, 1991 | [JP] | Japan | 3-105945 |
| May 17, 1991 | [JP] | Japan | 3-113149 |
| May 21, 1991 | [JP] | Japan | 3-116277 |
| May 23, 1991 | [JP] | Japan | 3-118718 |
| May 23, 1991 | [JP] | Japan | 3-118720 |
| May 24, 1991 | [JP] | Japan | 3-120373 |
| May 24, 1991 | [JP] | Japan | 3-120374 |
| May 29, 1991 | [JP] | Japan | 3-126246 |
| May 30, 1991 | [JP] | Japan | 3-127635 |
| May 30, 1991 | [JP] | Japan | 3-127636 |
| Jun. 6, 1991 | [JP] | Japan | 3-135004 |
| Jun. 6, 1991 | [JP] | Japan | 3-135005 |
| Jun. 14, 1991 | [JP] | Japan | 3-143357 |
| Nov. 25, 1991 | [JP] | Japan | 3-308921 |
| Dec. 12, 1991 | [JP] | Japan | 3-328958 |

[51] Int. Cl.⁵ ............................... G06K 5/00
[52] U.S. Cl. ............................... 235/380; 235/385; 342/51
[58] Field of Search ............... 235/380, 385; 342/44, 342/51; 340/551, 571, 572

[56] References Cited

U.S. PATENT DOCUMENTS

| 3,438,489 | 4/1969 | Cambornac et al. |
| 3,940,765 | 2/1976 | Grafinger et al. ............... 342/51 |
| 4,242,663 | 12/1980 | Slobodin ............... 342/44 |
| 4,525,713 | 6/1985 | Barletta et al. ............... 235/442 |
| 4,641,374 | 2/1987 | Oyama ............... 342/51 |
| 4,831,540 | 5/1989 | Hesser . |
| 5,030,807 | 7/1991 | Landt et al. ............... 342/44 |
| 5,055,659 | 10/1991 | Hendrick et al. ............... 342/44 |
| 5,144,314 | 9/1992 | Malmberg et al. ............... 342/51 |
| 5,151,684 | 9/1992 | Johnson ............... 340/551 |

FOREIGN PATENT DOCUMENTS

| 350235 | 1/1990 | European Pat. Off. . |
| 61-153954 | 7/1986 | Japan . |
| 61-203021 | 9/1986 | Japan . |
| 62-111821 | 5/1987 | Japan . |
| 2052592 | 2/1990 | Japan ............... H04Q 9/00 |
| 3051785 | 3/1991 | Japan ............... G01S 13/74 |
| WO8606303 | 11/1986 | PCT Int'l Appl. ............... G05B 19/12 |

OTHER PUBLICATIONS

McDonald et al., "The IC Card, The Smart Card That Will Lead Us Into The Future", GEC Review No. 3, 1987, Chelmsford, Essex GB, pp. 152–159.

Primary Examiner—Donald Hajec
Assistant Examiner—Adrian Young
Attorney, Agent, or Firm—Cushman, Darby & Cushman

[57] ABSTRACT

An electronic device intended for use as a tag to be attached to identify contents of the container to which it is attached. In particular, the present invention relates to an electronic tag which has a facility for storing delivery information and is equipped with a responding means for transmitting the delivery information stored therein in response to a query signal received from an interrogating apparatus. Codes, including items such as the names and addresses of the destination and the sender, and a sorting code are written into predetermined blanks of a delivery label, and into a memory. The memory responds to a query by transmitting the sorting information to allow automated sorting. The tag may be initiated only when torn, to extend battery shelf life.

31 Claims, 76 Drawing Sheets

552a-1   552a-2   552a-3

FIG. 94
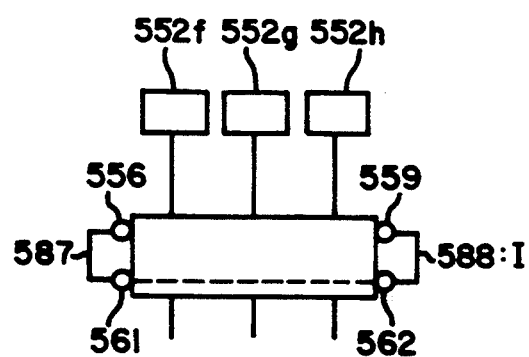
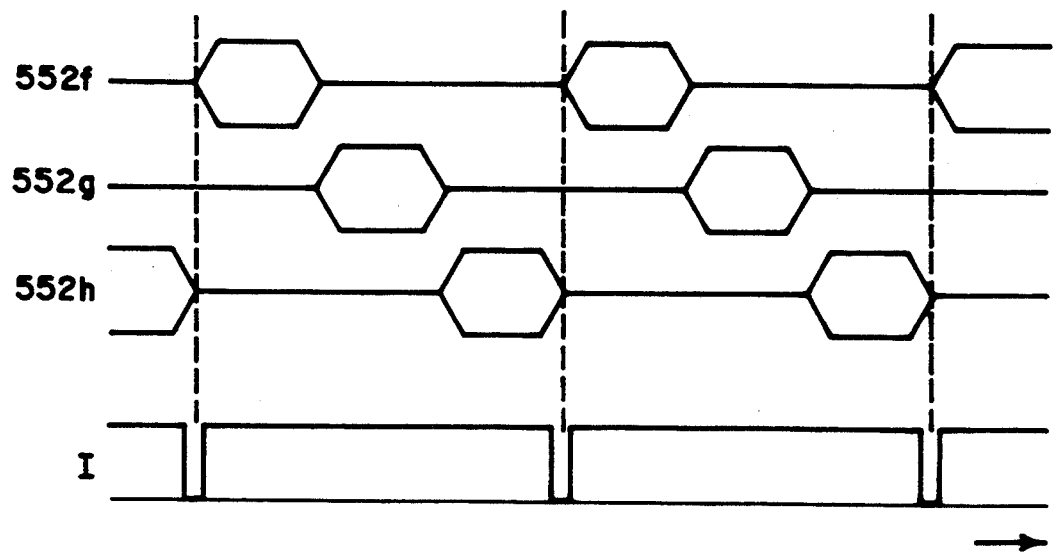

INFORMATION STORAGE MEDIUM WITH ELECTRONIC AND VISUAL AREAS

BACKGROUND OF THE INVENTION

1. Field of the Invention

The present invention relates to an electronic device intended for use as a tag to be attached to identify contents of the container to which it is attached. In particular, the present invention relates to an electronic tag which has a facility for storing delivery information and is equipped with a responding means for transmitting delivery information stored therein in response to a query signal received from an interrogating apparatus.

2. Description of the Prior Art

In a conventional distribution system such as the private mail delivery system, the customer (or the requestor) requests a request-receiving center, typically a parcel-handling agent, to deliver a packet to a specified destination, for example, a store. The request-receiving center enters necessary codes, including items such as the names and addresses of the destination and the sender, into predetermined blanks of a delivery label. In addition, a sorting number indicating a region where the destination is located, is also put in a space on the delivery label. The delivery label is then affixed to the packet. Subsequently, the packet with a delivery label affixed thereon is sent using a transport car, to a distribution center where a person in charge of distribution sorts the parcels by destination region based on their sorting numbers. Finally, the packet is delivered to the specified destination by a delivery car.

However, the distribution system described above has a drawback in that a parcel requested for delivery may be erroneously carried to a region which is entirely different from that of the intended destination due to a sorting error. Because the person in charge of distribution at the private parcel receiving center sorts packages by destination region manually, that is, by visually checking their sorting numbers. This makes human error inevitable.

Addressing the problem of the conventional labeling system described above, the present invention provides an electronic tag which, while fully utilizing the existing delivery system, allows parcels requested for delivery to be automatically sorted by destination region.

SUMMARY OF THE INVENTION

An electronic tag provided by the present invention includes an embedded responding circuit comprising an antenna, a modulation/demodulation circuit, a signal processor and a battery. Much like the conventional tag, the electronic tag still allows entry blanks thereon to be used with hand-written characters, numbers and other notations. The electronic tag provided by the present invention, however, also has a function for encoding the identification code of a parcel and delivery data such as the destination and sender of the parcel and storing the encoded information into the responding circuit. In addition, the electronic tag is also equipped with a facility which allows a bar code representing the identification of a parcel to be printed on an area close to the entry blanks. Furthermore, radio waves or optical signals can be exchanged between the embedded responding circuit and an interrogator, allowing the interrogator to utilize the electronic tag as a source of information for use in automatic sorting of parcels by retrieving the delivery data stored in the embedded responding circuit.

BRIEF DESCRIPTION OF THE DRAWINGS

These and other aspects of the invention will now be described in detail with reference to the accompanying drawings, wherein:

FIG. 8 is a flowchart showing a procedure for implementing the third technique shown in FIG. 7.

FIG. 94 shows a timing chart used for explaining the operation of the interrogator.

DESCRIPTION OF THE PREFERRED EMBODIMENTS

The present invention is described by referring to diagrams in which preferred embodiments are shogun as follows.

The prefered embodiments apply the present invention to delivery slips that are used in a parcel delivery system.

A. Overall Structure of Electronic Tag

A first embodiment of the overall structure of an electronic tag is described as follows.

Figure 1:
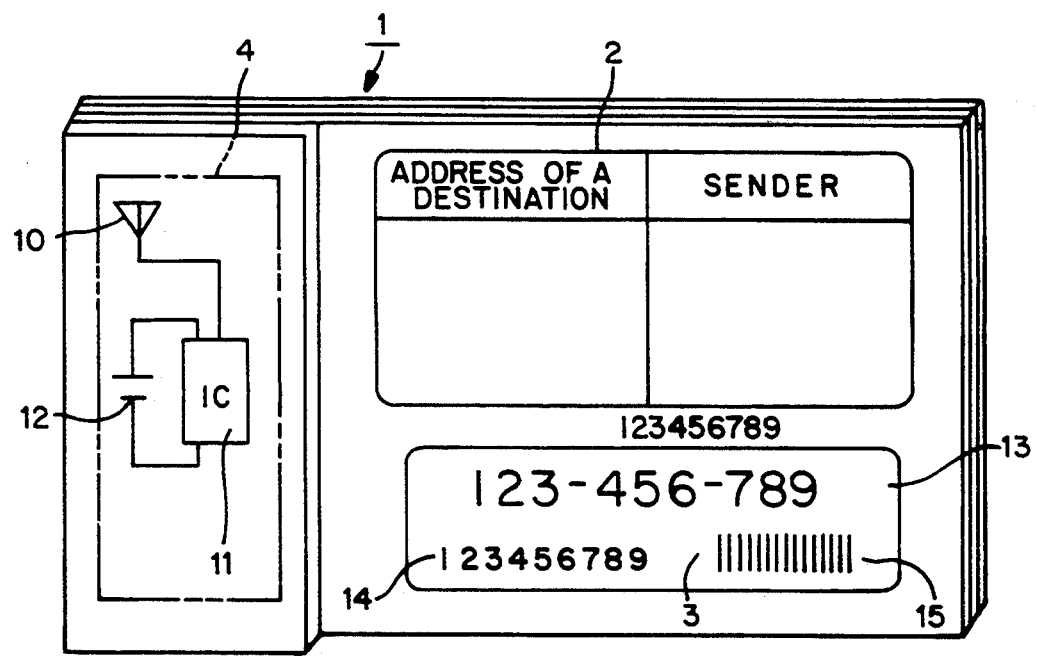
FIG. 1 is a simplified diagram showing a home-delivery slip on which information is to be written and an external view of a first embodiment implementing the overall structure of an electronic tag in accordance with the present invention.

An electronic tag 1 shown in FIG. 1 is a single entity including entry blanks to be filled with delivery information like the conventional delivery slip. It includes a delivery slip, a plurality of slip copies and a responding circuit for accomplishing electronic tag functions. The electronic tag 1 includes an entry blank 2 in which information is intended to be hand-written, an electronic responding circuit 4 and a code display 3.

The entry blank 2 is to be filled up by a sender (the person requesting parcel delivery), with hand-written delivery information such as the names and addresses of a destination and the sender. The hand-written entry blank 2 also allows for a sorting code for identifying a destination region and a fee which are to be written in by the parcel handling agent by hand.

Figure 3:
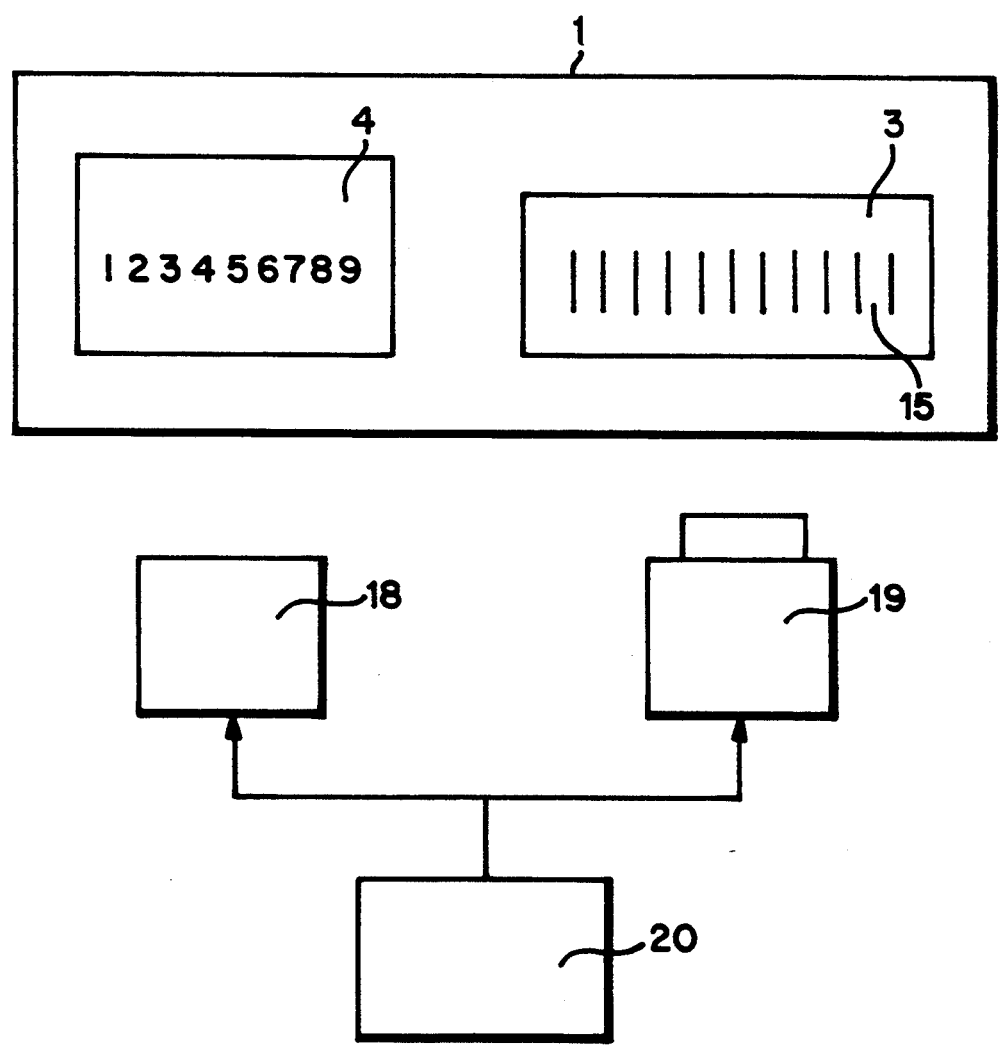
FIG. 3 is an explanatory diagram used for explaining a first technique for producing the home-delivery slip shown in FIG. 1.

The basic configuration of the responding circuit 4 comprises an antenna 10 for transmitting and receiving data, an integrated circuit (IC 11) for controlling circuits and storing delivery information and a battery 12 for supplying power to the IC 11. Data is received by IC 11 via a radio-wave technique using, for example, a writer 18 which is shown in FIG. 3 and to be described later.

Delivery data stored in the IC 11 comprises fixed data and variable data. The fixed data includes a slip serial number permanently associated with the slip, which serves as an identification code of a slip. A slip serial number is stored in the slip when the slip is manufactured. The variable data includes the sorting code and a telephone number which are entered by the sender when the parcel is taken to the parcel handling agent.

The code display 3 is a portion of the electronic tag 1 from which a slip serial number is read either optically or magnetically. A slip serial number can comprise a plurality of either popular OCR characters 13, MICR characters 14 and/or bar codes 15 either singiy or in any combination. These numbers and codes representing a slip serial number are associated with the slip in advance when the slip is manufactured.

Next, an electrical configuration of the responding circuit 4 is described with reference to FIG. 2.

Figure 2:
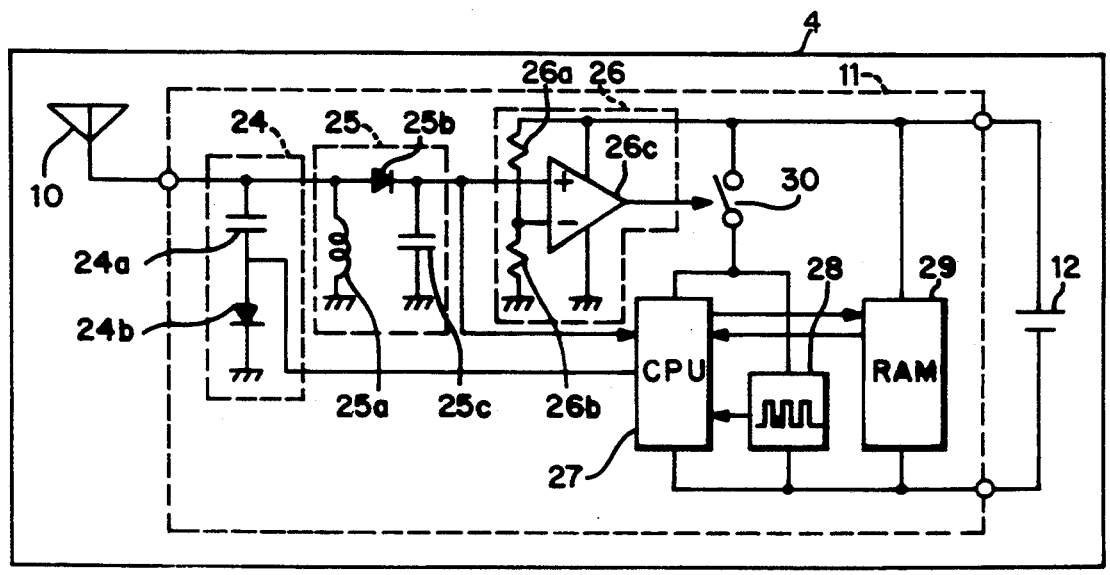
FIG. 2 is a circuit diagram showing an electrical configuration of a responding circuit which is embedded in the home-delivery slip shown in FIG. 1.

FIG. 2 shows the main component of the responding circuit is the IC 11 which is for example, an LSI device which comprises a modulator 24, a detector 25, a level comparator 26, a central processing unit (referred to hereafter as simply a CPU) 27, a clock generator 28 and a RAM unit 29. The wave detector 25 includes a rectifier 25b, a low-pass filter 25a and a smoothing capacitor 25c. The low-pass filter 25a serves as a path for the direct-current component. The modulator 24 is configured to comprise a condenser 24a and switching device 24b. The RAM unit 29 is used to store a program to be executed by the CPU 27 and other data received by the IC 11. The RAM unit 29 is backed up by the battery 12.

The level comparator 26 compares the level of a signal output by the detector 25 to a reference voltage in order to determine the presence of a query signal from an interrogator. The signal output by the detector 25 is supplied to the non-inverting pin of the comparator 26 and the reference voltage is fed to its inverting pin through a potentiometer comprising series-connected resistors 26a and 26b. The comparison result output by the comparator 26 is forwarded to a switch 30. When the switch 30 is closed, the battery 12 supplies power to the CPU 27 and the clock generator 28. When the switch 30 is opened, however, no power is supplied by the battery 12. That is to say, the battery 12 supplies power to the RAM unit 29 all the Lime, but power is supplied to the CPU 27 and the clock generator 28 only when the signal output by the level comparator 26 has the logical value '1' corresponding to a query signal being received.

Next, the principle of operation of the responding circuit 4 having the configuration described above will be explained.

A query signal transmitted by an interrogator is received by an antenna 10 shown in FIG. 2. The query signal is forwarded to the (IC 11). At that time, some of the power of the received query signal is delivered to the modulator 24 whereas the remaining power goes to the detector 25.

The detector 25 decodes information out of the received query signal, providing it to the CPU 27 and the level comparator 26.

When the level of the signal output by the detector 25 exceeds the reference voltage set by the resistors 26a and 26b of the potentiometer, the level comparator 26 produces an output indicative of a query signal from an interrogator has been received, outputting a '1' signal to the switch 30. As a result, the battery 12 supplies power to the CPU 27 and the clock generator 28, causing them to start the execution of their functions.

The CPU 27 which is activated by the level comparator 26 is driven by a clock signal generated by the clock generator 28. The CPU 27 inputs information obtained by the detector 25 and, if necessary, accesses the RAM unit 29 to read a variety of delivery information stored therein and write a variety of information to the RAM unit.

When sending a reply to the interrogator in response to the query signal, the CPU 27 outputs the delivery information read from the RAM unit 29 to the modulator 24 which modulates some of the power of the query signal delivered thereto in accordance with the delivery information. The modulator 24 then transmits the modulated signal to the antenna 10 as a response.

The manufacture and use of the home-delivery slip 1 which has a configuration described above will now be described.

Figure 4:
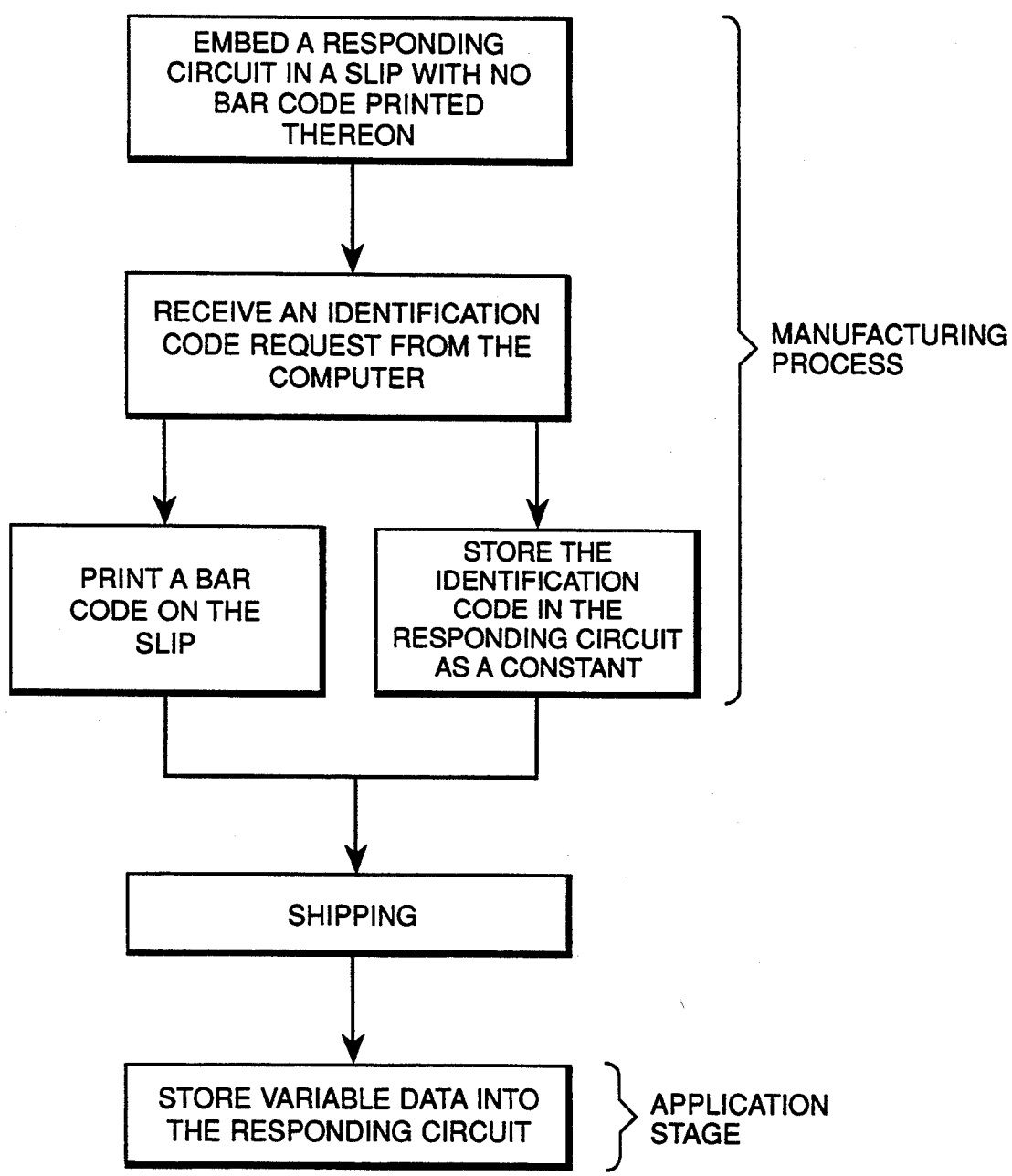
FIG. 4 is a flowchart showing a procedure for implementing the first technique shown in FIG. 3.

The description begins with a first manufacturing technique shown in FIG. 3 and 4. First, a responding circuit 4 is embedded into a home-delivery slip 1 with no bar code 15 printed thereon during the manufacture of the home-delivery slip. Then, a computer 20 outputs an intrinsic identification code corresponding to a slip serial number for identifying a each home-delivery slip to a writing machine 18 and a bar-code writer 19 as shown in FIG. 3. The writing machine 18 stores the identification code as fixed data into the RAM unit 29 in the responding circuit 4 whereas the bar-code writer 19 prints a bar code 15 corresponding to the identification code onto the code display 3. Note that, in addition or in place of the bar code 15, OCR characters 13 or MICR characters 14 may also be printed as well.

As such, during the manufacture of the slip, an identification code for identifying a home-delivery slip is put in the responding circuit 4 and code 15 is printed on it in advance before shipping. At a private parcel receiving center, a sorting code for identifying a destination region is transmitted via radio waves. Since the writing machine 18 used during the manufacture of the slip and the use of the slip at the private parcel receiving center has a similar configuration to an interrogator 504 shown in FIG. 79 to be described later, detailed description of the writing machine 18 is deferred until later herein.

The home-delivery slip 1 manufactured in such a way is used as follows.

First, the sender enters necessary items such as a destination into the hand-written entry blank 2 on the home-delivery slip 1. Next, at the private parcel receiving center, a sorting code, a fee, etc. are entered into the hand-written entry blank 2 on the home-delivery slip 1 and stored into the responding circuit 4 as variable data by using a dedicated writing machine 18.

Subsequently, the home-delivery slip 1 is affixed to a parcel 110 shown in FIG. 24 and its copy is given to the sender. Another copy is preserved as archival copy at the private parcel receiving center. The delivery person then routes it to a delivery center where delivery data such as the sorting number is read from the responding circuit of the home-delivery slip 1 affixed to the parcel. The delivery data is used for automatically sorting the parcel which is finally sent to its destination region for delivery to its recipient.

It should be noted that necessary slip copies are torn off from the electronic tag during the delivery process of the parcel 110 and preserved for later use. Each slip copy has delivery information such as a bar code on which ordinary slip processing can be based.

In the embodiment described above, a slip serial number serving as an identification code of a parcel is stored in the responding circuit 4 of a home-delivery slip 1. In addition, information such as a bar code which can be easily read by an external means is printed on the code display 3. Accordingly, delivery information can be obtained reliably during the delivery process of the parcel. As a result, loss of the parcel during the delivery process can be prevented. Moreover, the entire delivery process of the parcel, from receiving to distribution, can be administered using a computer, allowing the transportation status of the parcel to be monitored correctly.

The electronic tag also provides a slip serial number that serves as an identification code of a parcel and can be read either optically or magnetically. In its storage means, it also stores information which represents hand-written items entered in its entry blanks. With the slip serial number or the stored information or both, the slip processing can be carried out as usual, giving an advantage of further enhancing the efficiency of the process to identify a parcel. Even if, by any chance, the information stored in the storage means incorporated in the electrical circuitry of the electronic tag is destroyed, the parcels can be manually sorted using the hand-written information, holding down confusion occurring during the delivery to a minimum.

In this way, by using the electronic tag described above, parcels can be automatically sorted. Moreover, a conventional delivery system that has been operating so far can be utilized in the same way as usual.

Next, a second technique for manufacturing the home-delivery slip 1 having the configuration described above is explained by referring to FIG. 5 and 6. In the second manufacturing technique, a bar code 15 representing a serial number is printed before storing the serial number into the storage means.

Figure 5:
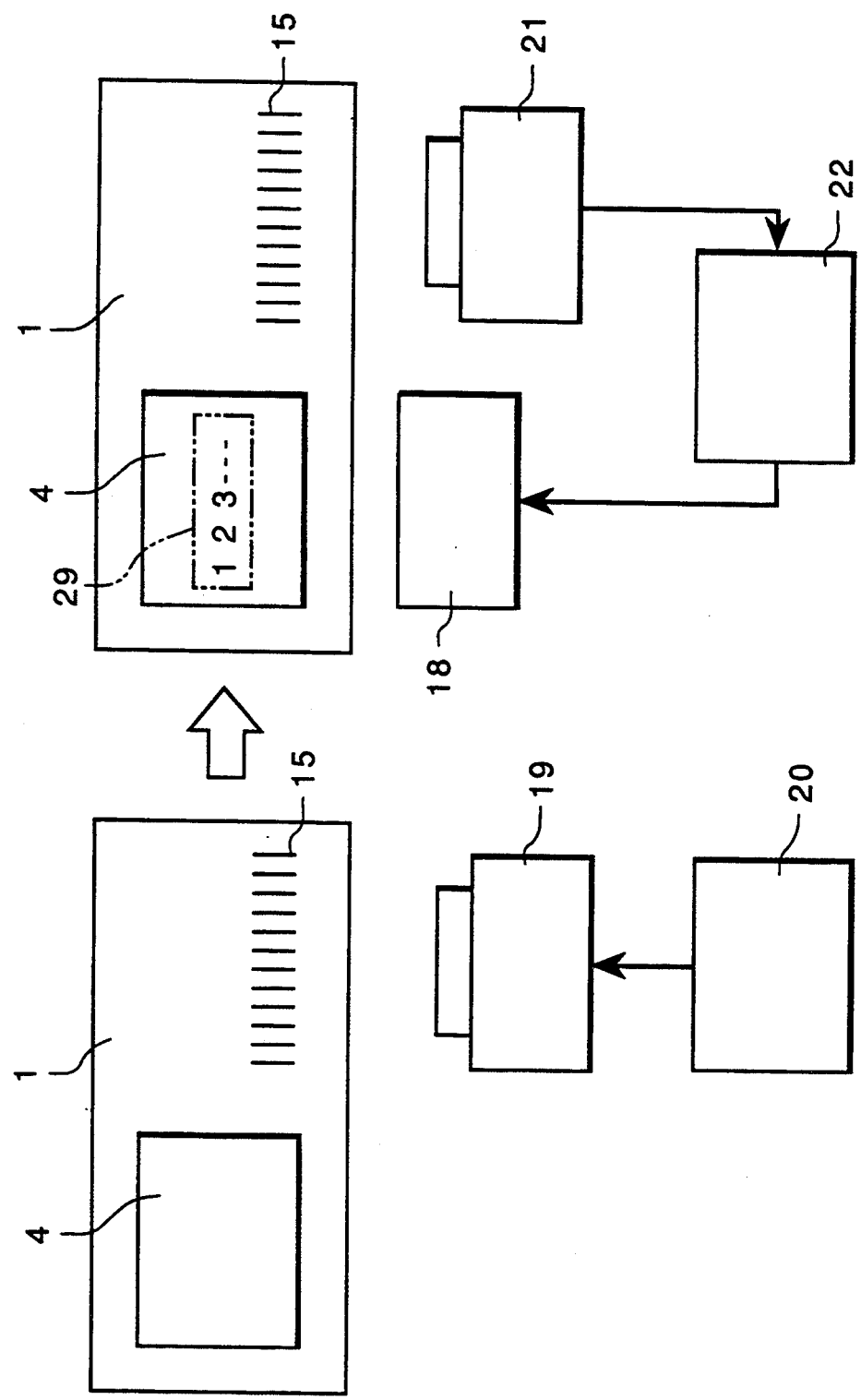
FIG. 5 is an explanatory diagram used for explaining a second technique for producing the home-delivery slip shown in FIG. 1.
Figure 6:
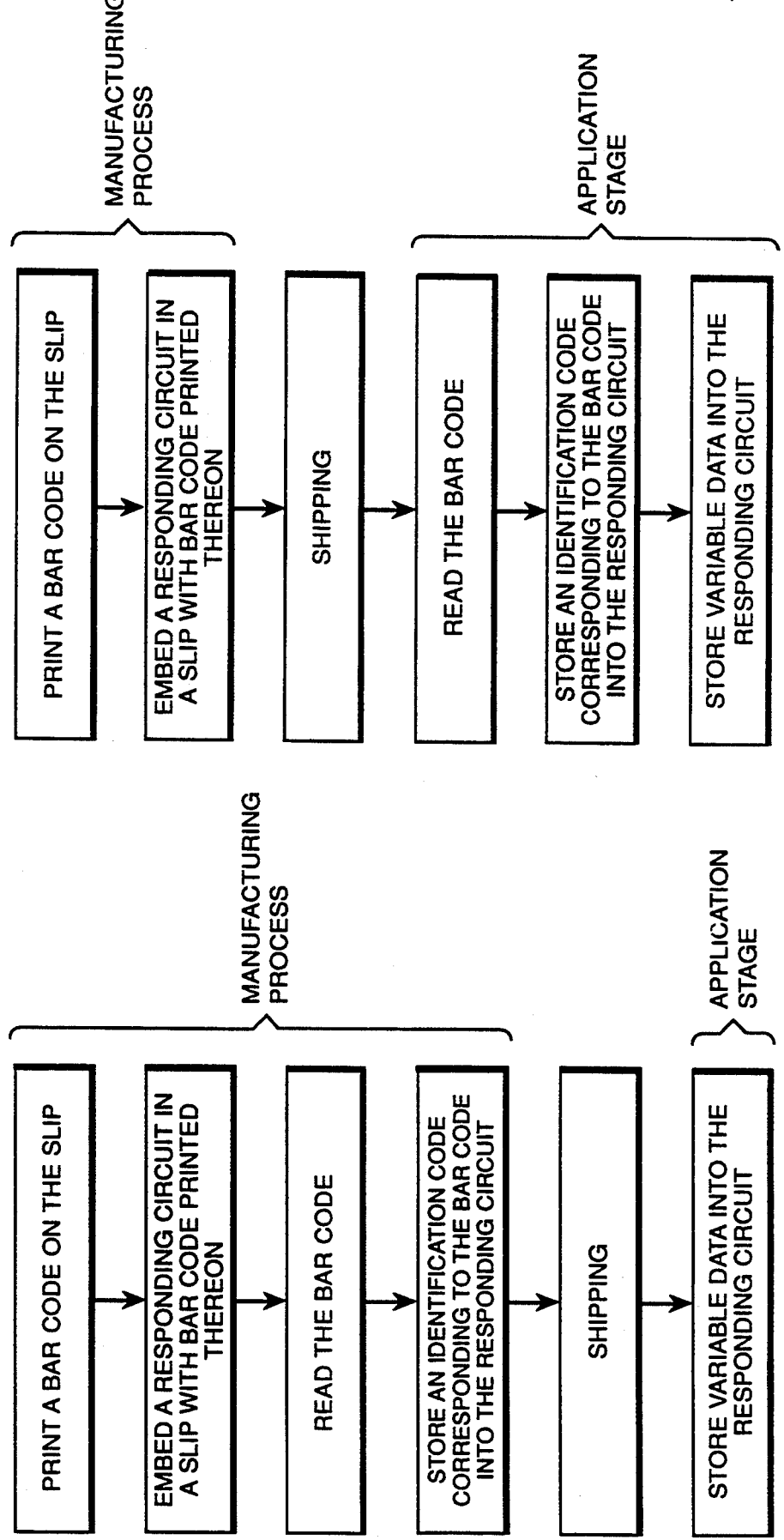
FIG. 6 is a flowchart showing a procedure for implementing the second technique shown in FIG. 5.

First, the computer 20 outputs a con, hand to drive the bar-code writer 19 as shown in FIG. 5. Bar-code writer 19 receives the command and prints a bar-code 15 representing an identification number onto the home-delivery slip 1 as shown in FIG. 5. Subsequently, responding circuit 4 is embedded into the home-delivery slip 1. Then, the bar code 15 printed on the home-delivery slip 1 is read using a bar-code reader 21 and converted into a corresponding identification code by the computer 22. Afterward, the computer 22 drives the writing machine 18. The writing machine 18 driven by the computer 22, to store the identification code into the RAM unit 29 of the responding circuit 4. Finally, the home-delivery slips 1 are shipped to, among other places, private parcel receiving centers.

As such, since the only operation required prior to storing an identification code into the responding circuit 4 is to print its corresponding bar code 15, there is much freedom in the manufacturing process. Another advantage is that the home-delivery slip 1 can be preserved for a long period of time at, for example, a factory or a warehouse with only a bar code 15 printed thereon, without requiring expensive components to be used until later.

Next, a third technique for manufacturing the home-delivery slip 1 described above is explained by referring to FIG. 7 and 8. In the third manufacturing technique, the bar code 15 is read at a different time from the previous techniques.

Figure 7:
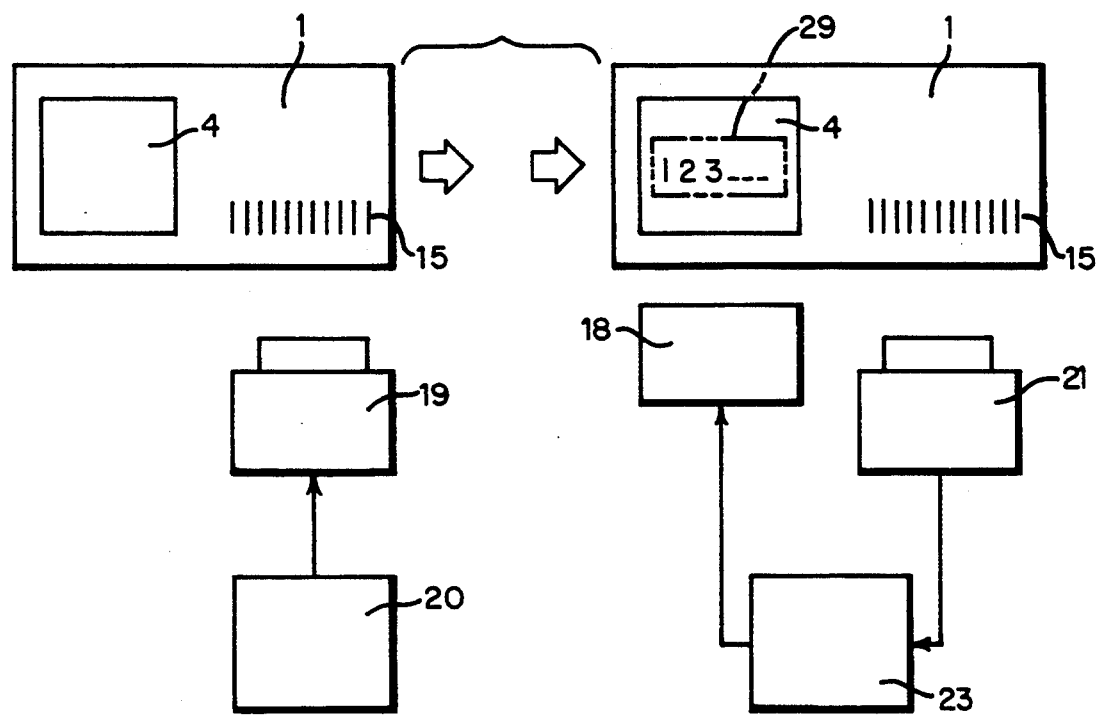
FIG. 7 explanatory diagram used for explaining a third technique for producing the home-delivery slip shown in FIG. 1.

To be more specific, in the case of the third manufacturing technique, at the time the home-delivery slip 1 is manufactured, the computer 20 drives the bar-code writer 19 by outputting a command thereto. The bar-code writer 19 prints a bar-code 15 representing an identification number in advance onto the the home-delivery slip 1 based on the command. Then, a responding circuit 4 is incorporated in each home-delivery slip 1 as shown in FIG. 7 before shipping the home-delivery slips 1 to, among other places, a private parcel receiving center.

At the stage of using the home-delivery slip 1 at the private parcel receiving center, the bar code 15 is read by using a bar-code reader 21 and converted into its corresponding identification number by a computer 20. The computer 20 then drives a writing machine 18 in order to store the identification code into the RAM unit 29 of the responding circuit 4 along with variable data such as a sorting code as shown in FIG. 7.

With the third manufacturing technique described above, a bar code 15 is merely printed onto the home-delivery slip 1 without storing its corresponding identification code into the RAM unit 29 of the responding circuit 4. No power at all is required, therefore, for preserving its corresponding identification code in the RAM unit 29. Not until the stage of using the home-delivery slip 1 is actually used at the private parcel receiving center is power required to retain information stored in the RAM unit 29. Therefore, the third manufacturing technique also has a big advantage in the sense that the home-delivery slip 1 can be preserved for a long period of time at the private parcel receiving center or a place like that.

It should be noted that delivery data can also be stored into the unit 29 by, among other methods, an electromagnetic-induction technique, an electromagnetic-coupling technique and a binary-coding technique in addition to the data writing method which uses radio waves.

Next, a second embodiment which implements the overall structure of the electronic tag is described. The second embodiment is flexible, and can be bent to match the shape of a parcel requested for delivery to which the electronic tag is to be affixed. In addition, the second embodiment has a structure that protects a responding circuit 44 of the electronic slip against physical shocks, loads and the like.

Figure 9:
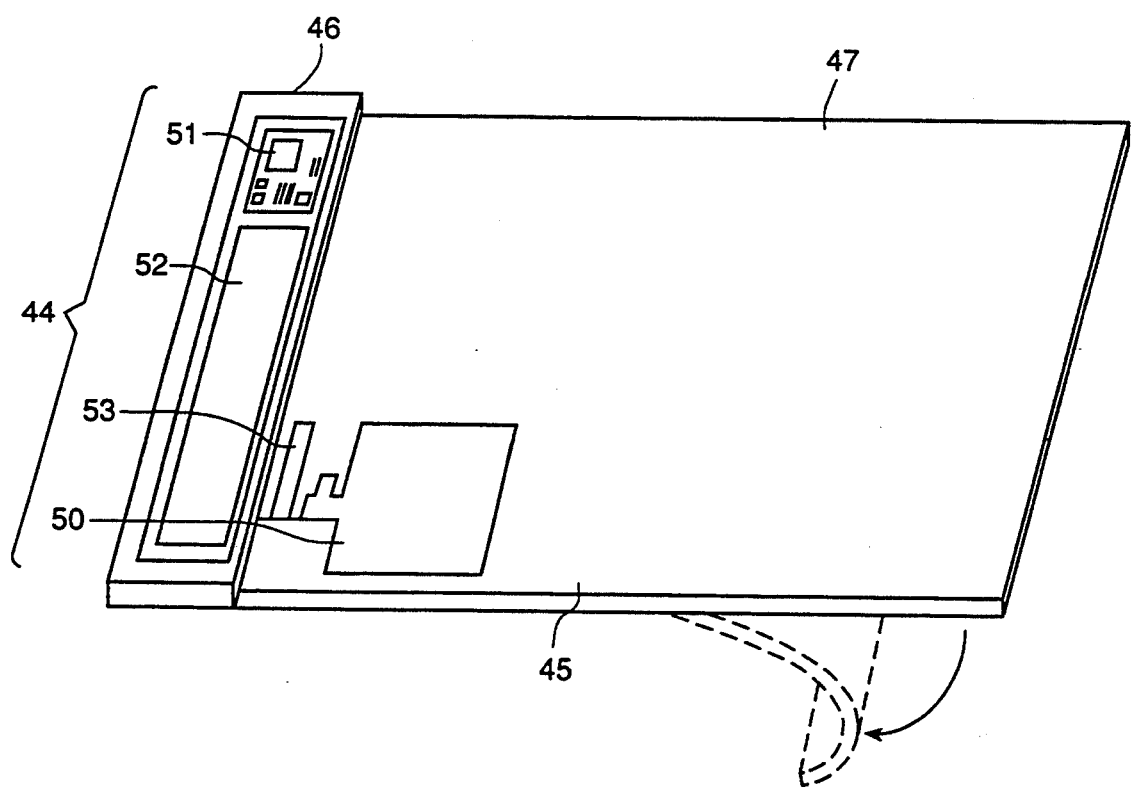
FIG. 9 is a diagram showing a perspective view of home-delivery-slip sheets of a second embodiment implementing the overall structure of an electronic tag for the home-delivery-slip sheets in accordance with the present invention.
Figure 10:
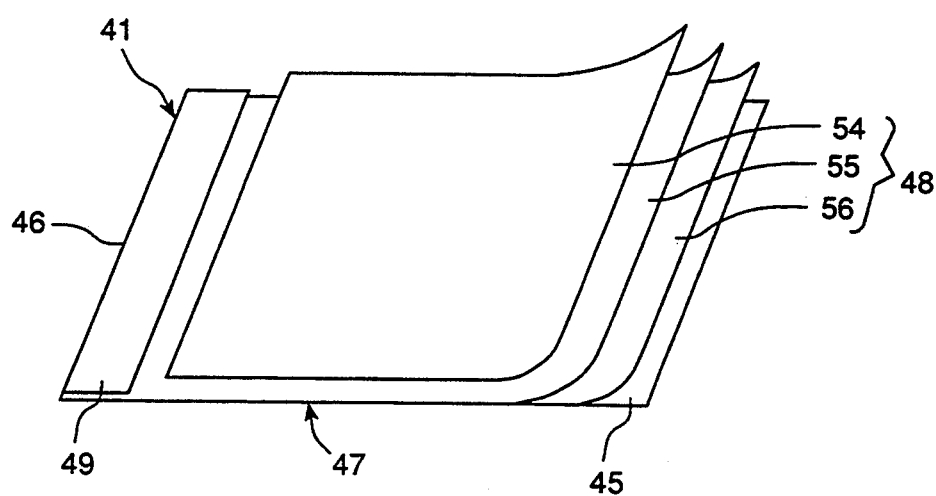
FIG. 10 is diagram showing a perspective overall view of the home-delivery slip sheets shown in FIG. 9.

As shown in FIG. 9 and 10, a home-delivery slip 41 comprises a piece of electronic slip sheet 47 and a plurality of slip copies 48. The electronic slip sheet 47 includes a base 45 made from a flexible material and a reinforcement 46 which is durable, enough for withstanding bending stress. The base 45 has a configuration including a film made of a material such as polyimide which can be easily bent as shown in FIG. 9.

An antenna 50 for receiving and transmitting data and a high-frequency circuit pattern 53 are mounted on the base 45. The antenna 50 and the high-frequency circuit pattern 53 are made of metal foil.

Figure 11:
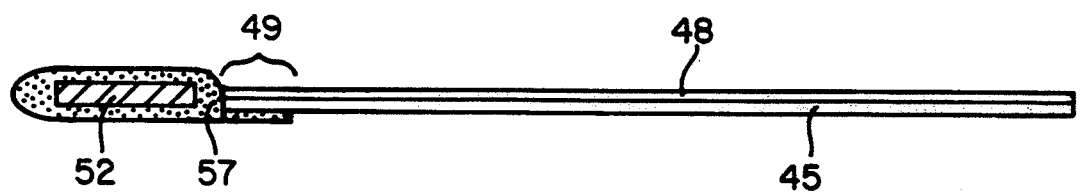
FIG. 11 is a cross-section diagram of the above home-delivery slip.

The reinforcement 46 which is fixed at the end of the home-delivery slip 41 is provided with an IC 51 and a film-type battery 52. The IC 51 comprises integrated-circuit components and other elements which are fixed to form a single body on a base. As shown in FIG. 11, the IC 51 and the battery 52 are veiled with an elastic cover 57 made of, for example, rubber for protecting them against physical shocks, loads and the like. The antenna 50, the IC 51, the battery 52 and the high-frequency circuit pattern 53 together constitute the responding circuit 44. It should be noted, however, that since the responding circuit 44 has a similar configuration to that shown in FIG. 2, a detailed description of its internal configuration and its principle of operation is omitted.

As shown in FIG. 10, the slip copies 48 include a requester copy 54, a delivery copy 55 and a recipient copy 56. The slip copies 48 are bound with a binder 49 which has a seam, allowing the slip copies 48 to be torn off from the binder 49. FIG. 10 shows a slip copy 54 for the sender torn off from the tag binder 49.

Figure 12:
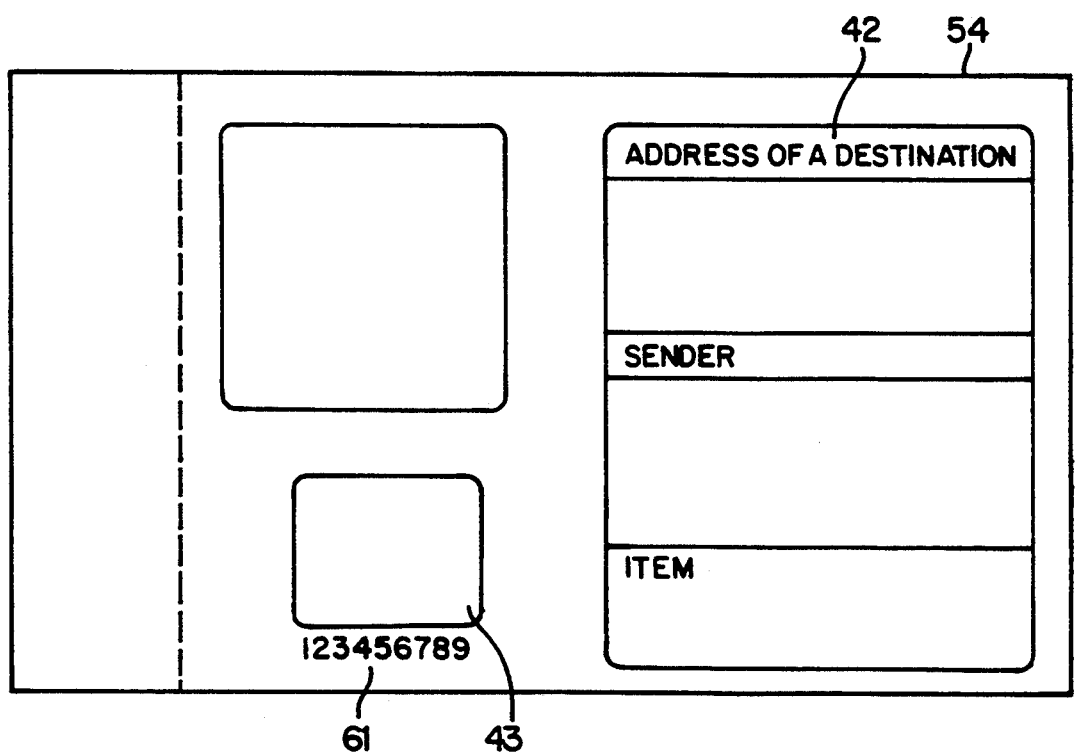
FIG. 12 is an explanatory diagram used for explaining entry blanks of the slip form of the home-delivery slip.
Figure 13:
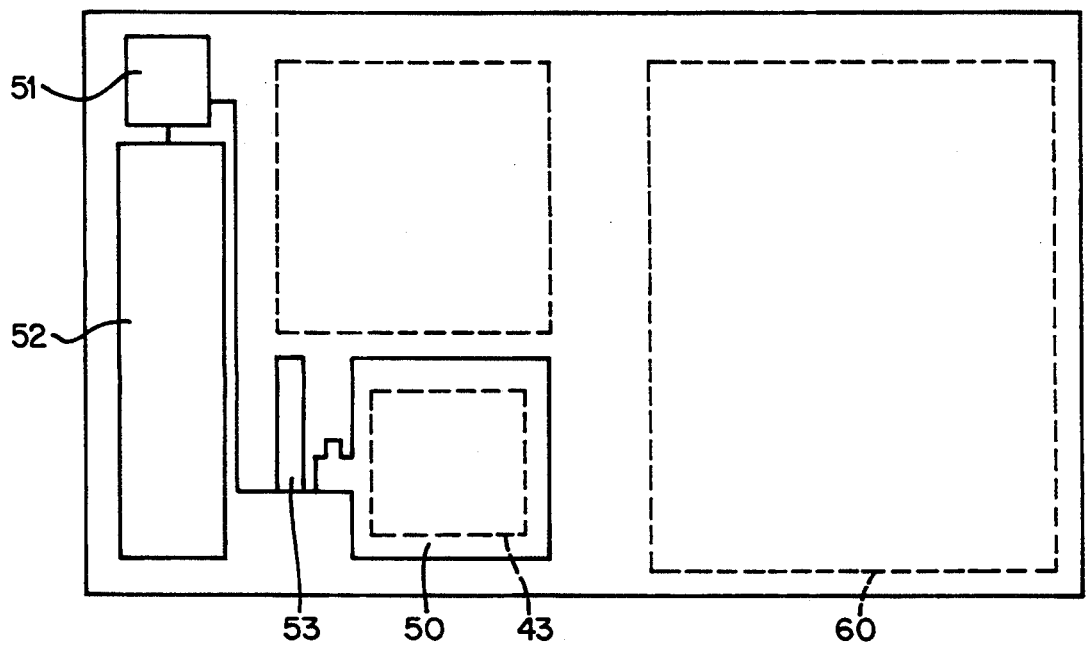
FIG. 13 is an explanatory diagram used for explaining a layout of the entry blanks of the home-delivery slip and an antenna.

As shown in FIG. 12, the sender's slip copy 54 includes a code-entry blank 43 for entering predetermined information such as the identification code of the private parcel receiving center, a hand-written entry blank 42 for entering the names and addresses of the recipient and the sender and a bar code 61. As shown in FIG. 5, the code-entry blank 43 is laid out to overlap a flat part such as the antenna 50.

A delivery slip 55 and a slip copy 56 for the recipient are designed so that information entered in the hand-written entry-blank 42 and the code-entry blank 43 is copied into the delivery slip 55 and the recipient's slip copy 56. An electronic slip sheet 47 has an adhesive back surface, allowing the home-delivery slip 41 to be affixed to a parcel.

As described above, in this embodiment, the responding circuit 44, the IC 51 and the battery 52 which together form the home-delivery slip 41 are provided with the reinforcement 46 to constitute a configuration capable of withstanding external physical shocks, pressure and the like. In addition, since the reinforcement 46 is fixed at the end of the home-delivery slip 41, portions of the home-delivery slip 41 other than its end can be bent freely. Accordingly, the home-delivery slip 41 can be affixed with ease to a parcel even if the surface of the parcel is uneven or the shape of the parcel is peculiar. Moreover, even when such a home-delivery slip 41 is bent, no stress is applied to the IC 51 and the battery 52 by virtue of the reinforcement 46.

The antenna 50 is fixed on the base 45 below the code-entry blank 43. Since the antenna 50 is made of a metal foil, however, the code-entry blank 43 has a flat surface with no uneven portions, allowing information to be entered therein easily with no hindrance.

Figure 14:
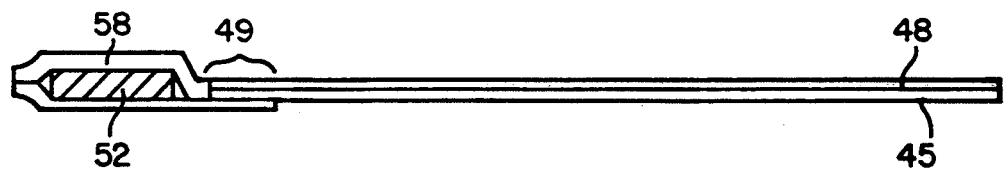
FIG. 14 is a cross-section diagram of a first modification example of an IC section and a battery protection mechanism for the home-delivery slip of the electronic tag.

FIG. 14 shows a first example of modification of the protection structure for the IC 51 and the battery 52 described above. As shown in the figure, the IC 51 and the battery 52 are packed in a vacuum space enclosed by a compound resin 58 made of a rubber material or the like. The rubber compound resin 58 serves as a cushioning structure for protecting the IC 51 and the battery 52 against external shocks, loads and the like.

Figure 15:
FIG. 15 is a cross-section diagram of a second modification example of an IC section and a battery protection mechanism for the home-delivery slip of the electronic tag.

As a second example of modification of the protection structure, a long delivery slip 55 is forms a veil over the IC 51 and the battery 52 as shown in FIG. 15. A cover 59 of the delivery slip 55 that veils the IC 51 and the battery 52 is filled with resin to form a structure that protects the IC 51 and the battery 52 against physical shocks, loads and the like. As an alternative, the home-delivery slip 41 can also be enclosed entirely in a flexible bag made of a compound resin.

Figure 16:
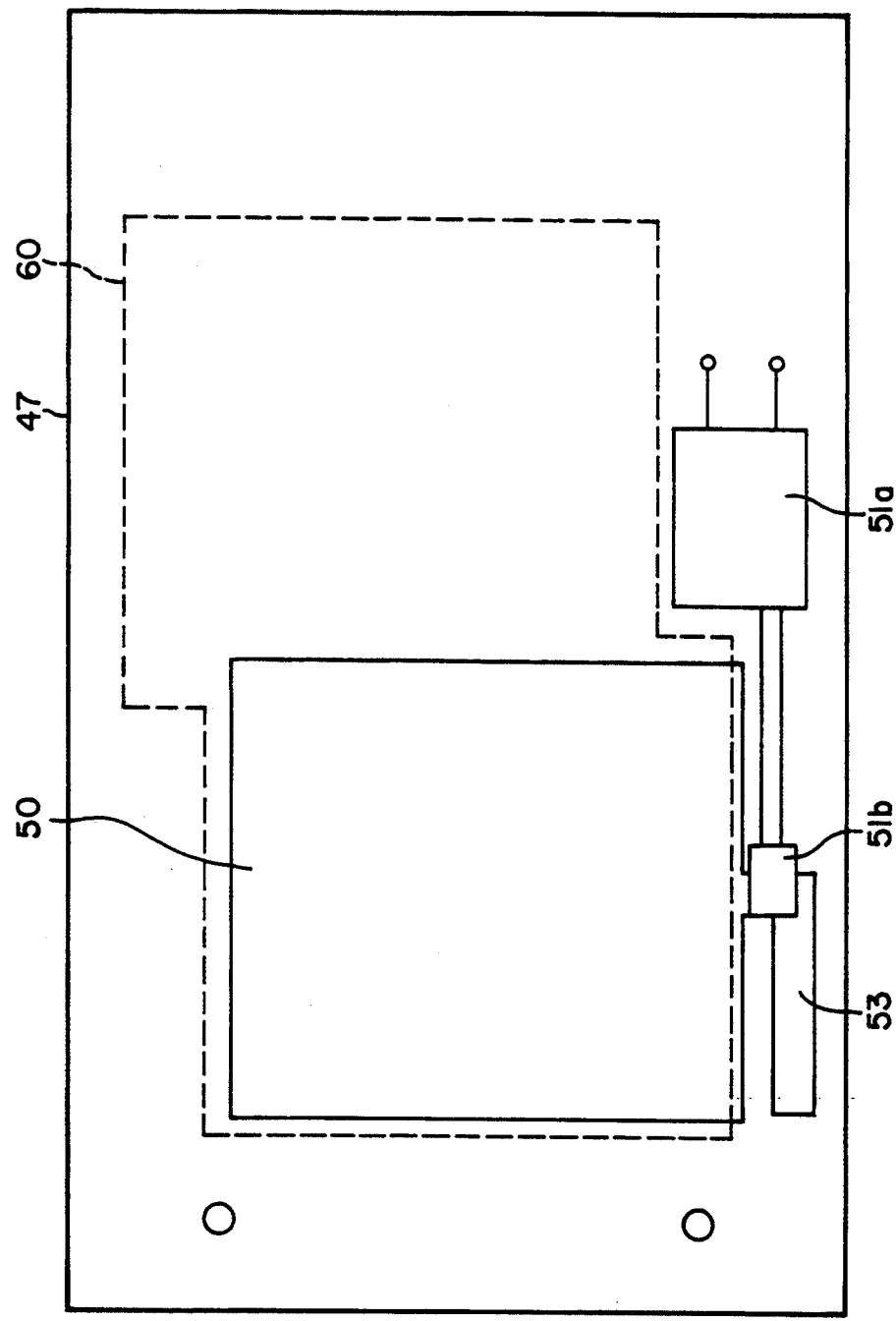
FIG. 16 is an explanatory diagram used for explaining an example with a responding circuit provided at the lower part of the home-delivery slip of the electronic tag.

In the embodiment described above, the IC 51 and the battery 52 are fixed at the end of the home-delivery slip 41. It should be noted, however, that they can also be fixed at the upper or lower part of the home-delivery slip 41. In the case of an example shown in FIG. 16, an IC 51a, a modem component 51b and a high-frequency circuit pattern 53 are fixed at the lower part of an electronic slip sheet 47. The antenna 50 is laid out on a location overlapping a hand-written entry blank 60. With this configuration, the home-delivery slip does not lose its flexibility and still has a capability of protecting its responding circuit embedded therein against external shocks, loads and the like. Note that the modem component 51b and the high-frequency circuit pattern 53 correspond to the modulator 24 and the detector 25 shown in FIG. 2.

Next, a third embodiment implementing the overall structure of the electronic tag is described. With this embodiment, no special writing apparatus is required at a private parcel receiving center. The embodiment implements a structure of an electronic home-delivery slip that allows delivery data to be stored in the electronic slip very easily.

Figure 17:
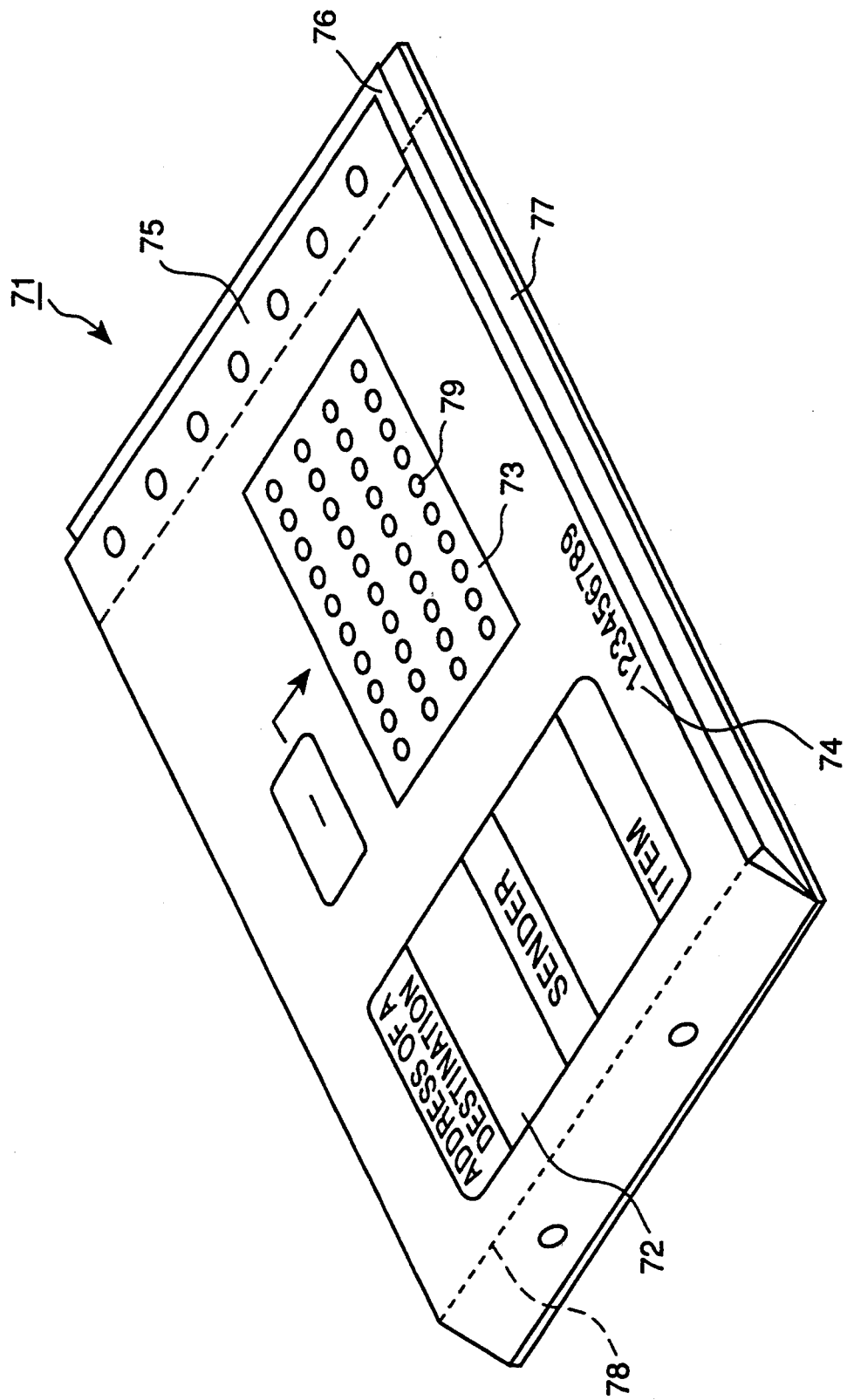
FIG. 17 is a simplified diagram showing a home-delivery slip and an external view of a third embodiment implementing the overall structure of an electronic tag for the home-delivery slip in accordance with the present invention.

As shown in FIG. 17, a home-delivery slip 71 comprises a hand-written slip sheet 75, a copy 76 and an electronic slip sheet 77 bound at the end of the home-delivery slip 71 to form a bundle. The hand-written slip sheet 75, the copy 76 and the electronic slip sheet 77 each have a seam 78 which allows each of them to be torn off from the home-delivery slip 71.

A hand-written entry blank 72, a code portion 73, and slip serial number 74 are laid on the surface of each of the hand-written slip sheet 75, the copy 76 and the electronic slip sheet 77. The hand-written entry blank 72 is used for entering the names and addresses of a sender and a recipient whereas the code portion 73 is used for encoding delivery data. The code portion 73 comprises a matrix of punch holes 79 having four lines and ten columns. Such a matrix of punch holes 79 is used for encoding the numbers 0 to 9.

Figure 18:
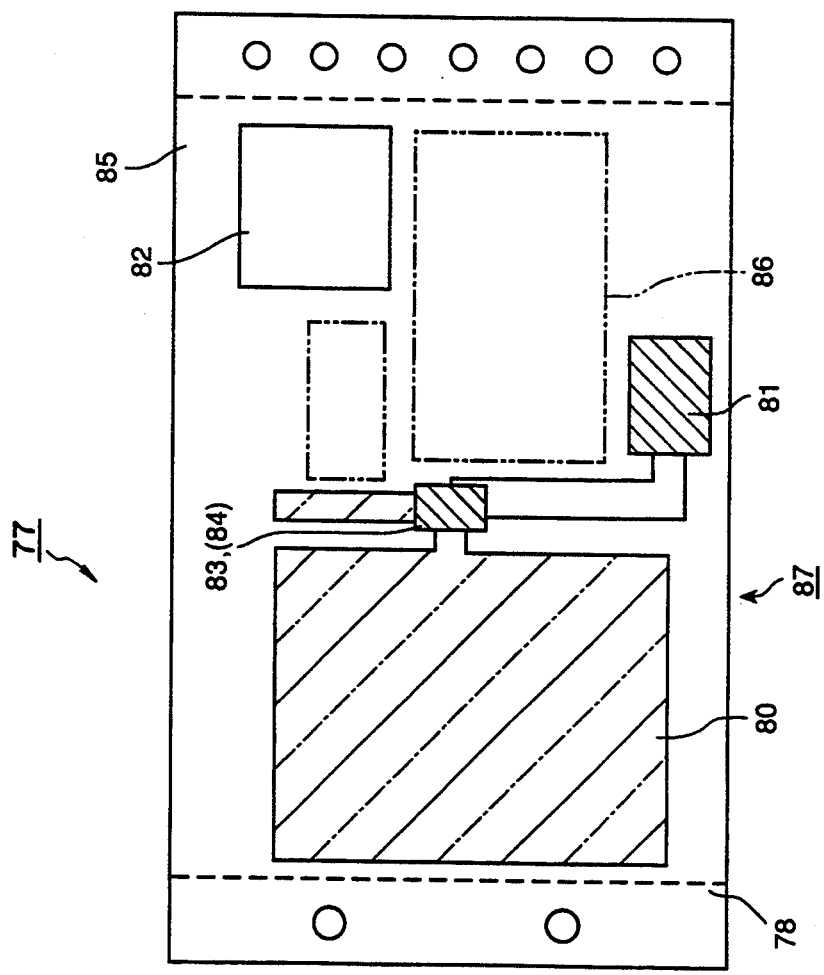
FIG. 18 is a diagram showing a configuration of an electronic tag sheet for the home-delivery slip shown in FIG. 17.

As shown in FIG. 18, the electronic slip sheet 77 is a flexible print board 85. Mounted on the surface of the flexible print board 85 are, among other components, a planar antenna 80, a modulation circuit 83, a demodulation circuit 84, an IC serving as a data processing unit 81, a code circuitry 86 and a paper battery 82 which together constitute a responding circuit 87. Note that the code circuitry 86 comprises circuits corresponding to the numbers 0 to 9. Even though the planar antenna 80 is laid out on a location overlapping the hand-written entry blank 72, it does not become a hindrance to the filling-in of information into the hand-written entry blank 72. The code circuitry 86 is laid out on a location overlapping the the code portion 73 so that it can encode delivery data. Except for the code circuitry 86, the responding circuit 87 has the same configuration as that shown in FIG. 2. Therefore, a detailed description of its internal configuration and its principle of operation is omitted here.

Figure 19:
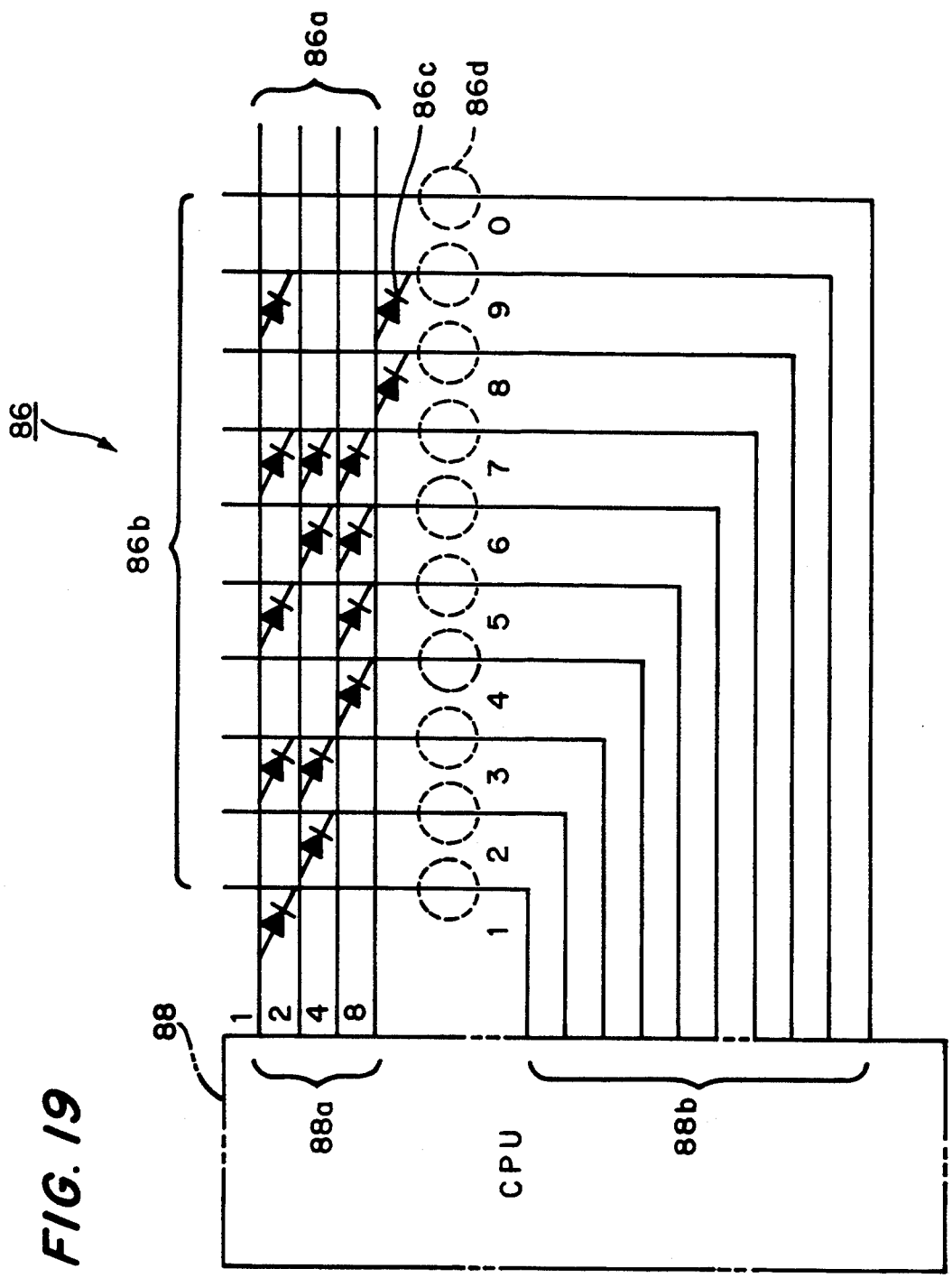
FIG. 19 is a circuit diagram showing an electrical configuration of a code circuitry incorporated in the home-delivery slip of the electronic tag.

As shown in FIG. 19, a conductor pattern 86a which comprises four horizontal wires representing weight values 1, 2, 4 and 8 respectively is created on the code circuitry 86. The four horizontal wires are connected to pins 88a on the upper part of a CPU 88 in the data processing unit 81. Similarly, a conductor pattern 86b comprising ten vertical wires is also created on the code circuitry 86 in such a way that the ten vertical wires cross the four horizontal wires of the conductor pattern 86a. The ten vertical wires are connected to pins 88b on the lower part of the CPU 88. Diodes 86c are used to properly connect the ten vertical wires of the conductor pattern 86b to the four horizontal wires of the conductor pattern 86a so that the ten vertical wires represent the numbers 0 to 9 respectively.

On each of the vertical lines of the conductor pattern 86b, a cut-off portion 86d enclosed by a circle seam is created to enable the conduction through the wire to be cut off. The cut-off portion 86d is associated with a punch hole 79 described earlier. When a hole is punched through the cut-off portion 86d which corresponds to a punch hole 79 representing the number 0, no current flows to the CPU 88 through the vertical wire associated with the punched cut-off portion 86d. The CPU 88 can therefore decode the code represented by the punched line of the conductor pattern 86b as the number 0.

As such, by punching holes 79 through cut-off portions 86d, vertical wires of the conductor pattern 86b can be rendered non-conducting, which can, in turn, be used to represent delivery data. A delivery code can thus be easily entered into the home-delivery slip 71 in a way that can be electronically read.

The use of the home-delivery slip 71 which is equipped with an electronic slip sheet 77 having the configuration described above is described with reference to FIG. 20.

Figure 20:
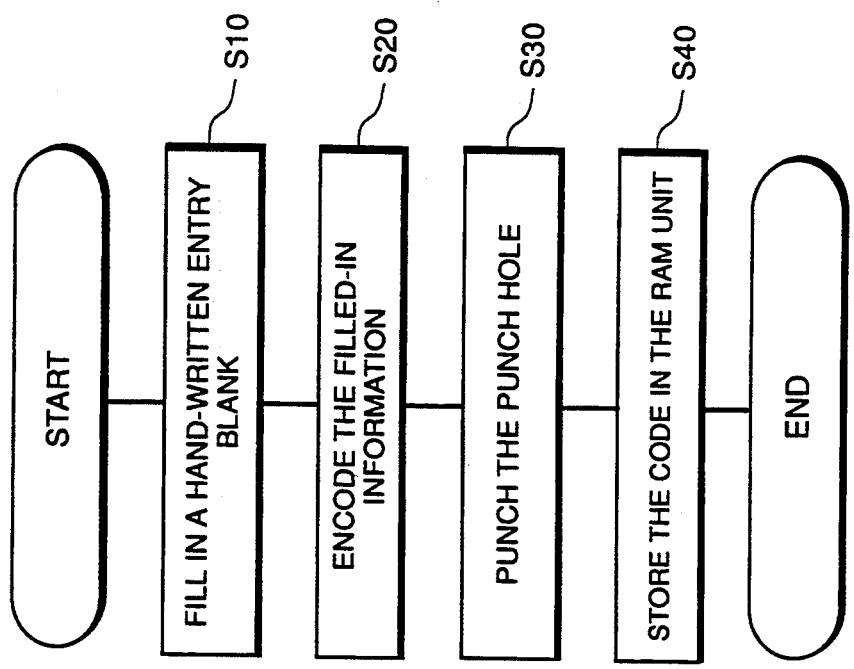
FIG. 20 is a flowchart showing a procedure for using the home-delivery slip of the electronic tag.

At Step S10 of a procedure shown in FIG. 20, the names and addresses of a sender and a recipient are written by-hand on the entry blank 72. At Step S20, the hand-written information is encoded. Then, with the hand-written- slip sheet 75, the copy 76 and the electronic slip sheet 77 remaining in a state of overlapping each other, holes 79 are punched with a ball-point pen, for example, to represent the code at Step S30. This creates a code circuitry 86 .which corresponds to the code representing the delivery data. At Step S40, the code represented by the conduction state of the code circuitry 86 is read by the CPU 88 and stored in a RAM unit as delivery data. Then, the home-delivery slip 71 is affixed to a parcel to be delivered and sent along with the parcel to a delivery center.

As described above, in this embodiment, by punching holes 79 and cut-off portions 86d of the code circuitry 86 embedded in the electronic slip sheet 77, a code representing delivery data can be stored in a RAM unit in the electronic slip sheet 77. A dedicated writing apparatus is thus not required at the private parcel receiving center. Even though no special writing apparatus is available, delivery data can be stored in the home-delivery slip 71 very easily. As a result, even a person not well trained on the use of an electronic tag can do the job processing correctly because all the work is computerized.

In addition, since the punched holes 79 can be verified visually, delivery data can be entered correctly and, based on the punched holes 79, a new home-delivery slip 71 can be reissued if information stored in the storage means incorporated in the electronic circuit embedded in the electronic tag is, by any chance, destroyed.

A circuit for correcting codes or corrected punch holes also for correction use can be provided in advance in addition to the code circuitry 86. Such a correcting means allows codes to be easily corrected by merely punching holes. In the embodiment described above, the CPU 88 reads a code based on a conducting state of the code circuitry 86 and stores the code into a RAM unit. It should be noted, however, that a code can also be detected from the conducting state of the code circuitry 86 each time a query signal is received from an interrogator mentioned later. With such a scheme, it is not necessary to provide a storage means such as a RAM unit.

Figure 21:
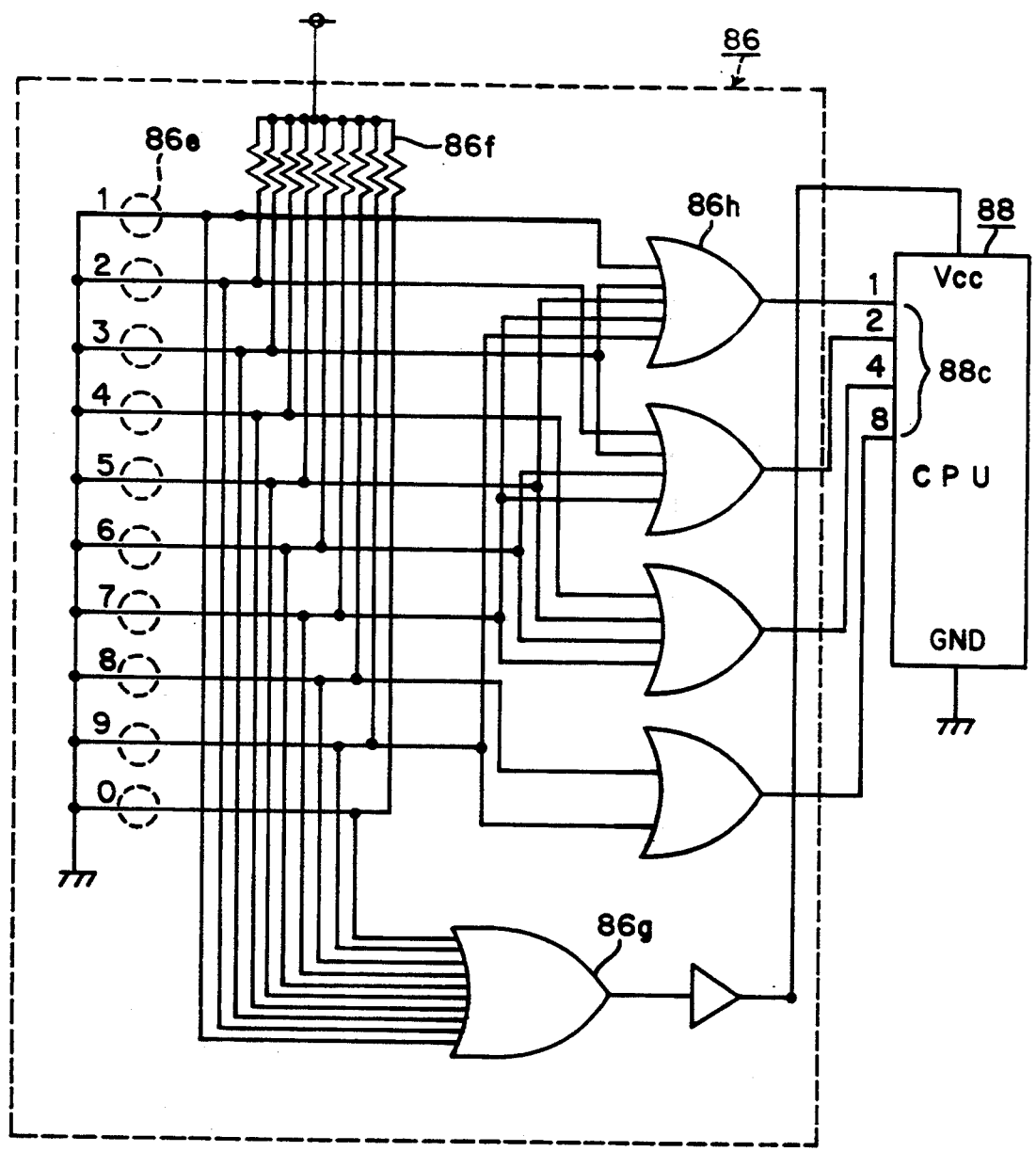
FIG. 21 is a circuit diagram showing an electrical configuration of a first modified example of the above code circuitry.

Next, a first example of modification of the code circuitry described above is explained. As shown in FIG. 21, when a cut-off portion 86e representing a number in the range 0 to 9 is punched through its associated punch hole 79, the CPU 88 is activated, inputting its corresponding numerical data. To be more specific, when a cut-off portion 86e is punched, its associated connection line is driven by a pull-up resistor to a high state. A driving circuit 86g receives the high signal from the connection line, and turns on the power of the CPU 88. At the same time, an encoder 86h converts the state of the ten connection lines representing the numbers 0 to 9 into binary data which is input to the CPU 88 through its pins 88c. In this way, numerical data in the range 0 to 9 represented by a punched hole 79 is read by the CPU 88. In order to enter a code comprising four digits, the number of punch holes that must be made available on the code portion 73 is $4 \times 10 = 40$.

In this configuration, not until a hole 79 is punched to enter a code into the responding circuit of the home-delivery slip does the responding circuit needs to be powered up. Accordingly, prior to punching the hole 79, consumption of power supplied by a battery embedded in the responding circuit can be suppressed because the responding circuit is not in use. The embodiment is thus effective when to preserve the electronic slip. A detailed embodiment with a structure allowing for the preservation of its electronic slip is described later.

Figure 22:
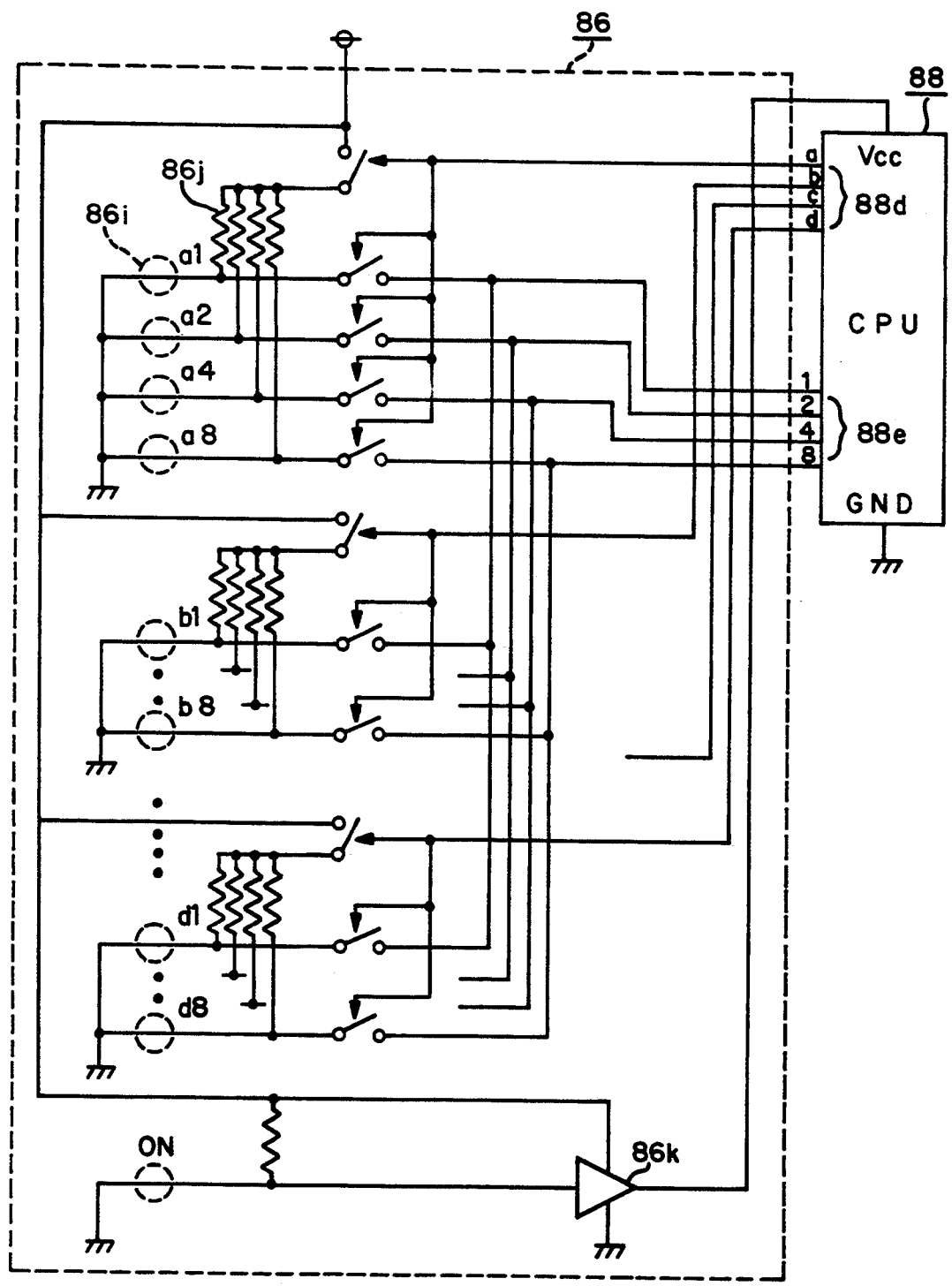
FIG. 22 is a circuit diagram showing an electrical configuration of a second modified example of the above code circuitry.

Next, a second example of modification of the code circuitry 86 is described by referring to FIG. 22. As shown in the figure, a punched hole 79 is directly input as binary data. As any hole 79 is punched, a power supply drives the CPU 88. To be more specific, when a cut-off portion 86i is punched through its associated punch hole 79 representing a number in the range 0 to 9, an input of an activation circuit 86k is driven to a high state by pull-up registor 86j, turning on the power of the CPU 88. At the same time, binary numerical data representing the number in the range 0 to 9 is electrically read by the CPU 88 through its pins 88e as conveniently as a digit of data is input from a ROM unit via its pins 88d. It should be noted that in this case, in order to enter a code comprising four digits, the number of punch holes that must be made available on the code portion 73 is only $4 \times 4 + 1 = 17$. As such, the number of punch holes can be made smaller than that of the first example.

As described above, the configurtion of the responding circuit 44 of the home-delivery slip 120 includes an embedded battery. A batteryless responding circuit 150 shown in FIG. 28 can be used. In the case of the responding circuit 150 shown in FIG. 28, driving power is obtained from a query signal S1. As for the storage means, memory such as a ROM unit that does not require a battery back-up is employed.

Figure 28:
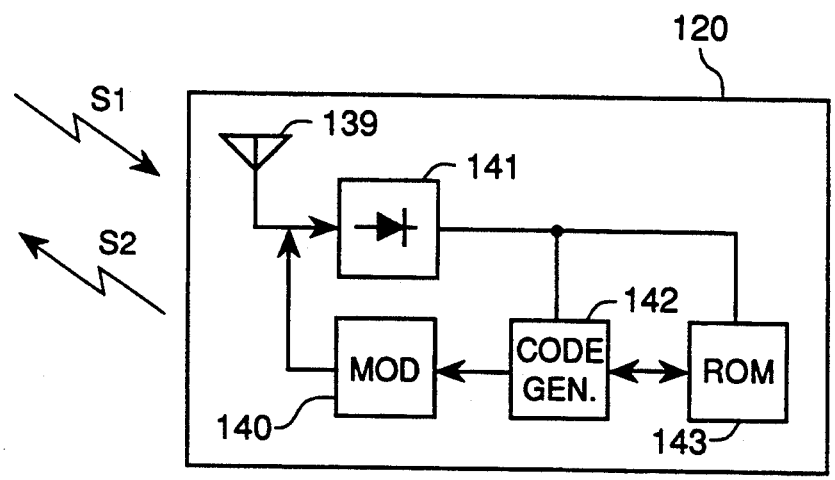
FIG. 28 is a block diagram showing another simplified configuration of the responding circuit.

As shown in FIG. 28, the responding circuit 150 has a configuration comprising a transmitting/receiving antenna 139, a rectifier 141, a modulator 140, a ROM unit 143 and an identification-code generator 142. The transmitting/receiving antenna 139 is used for receiving a query signal A1 and transmitting a response signal S2. The rectifier 141 and the modulator 140 are connected to the transmitting/receiving antenna 139. The identification-code generator 142 is connected to the rectifier 141, the modulator 140 and the ROM unit 143.

The power of an incoming query signal S1 is distributed to the rectifier 141 and the modulator 140. Part of the power is rectified by the rectifier 141 and used as a power supply for the ROM unit 143 and the identification-code generator 142. On the other hand, the remaining power of the query signal S1 is modulated by applying delivery information output by the identification-code generator 142, information stored in advance in the ROM unit 143. The modulated signal is transmitted through the transmitting/receiving antenna 139 as a response signal S2. Note that instead of the ROM unit 143, an EEPROM unit the contents of which are electrically erasable can also be used as well.

B. Delivery System Utilizing Electronic Tags

A first embodiment implementing a delivery system which utilizes electronic tags is described as follows.

Figure 23:
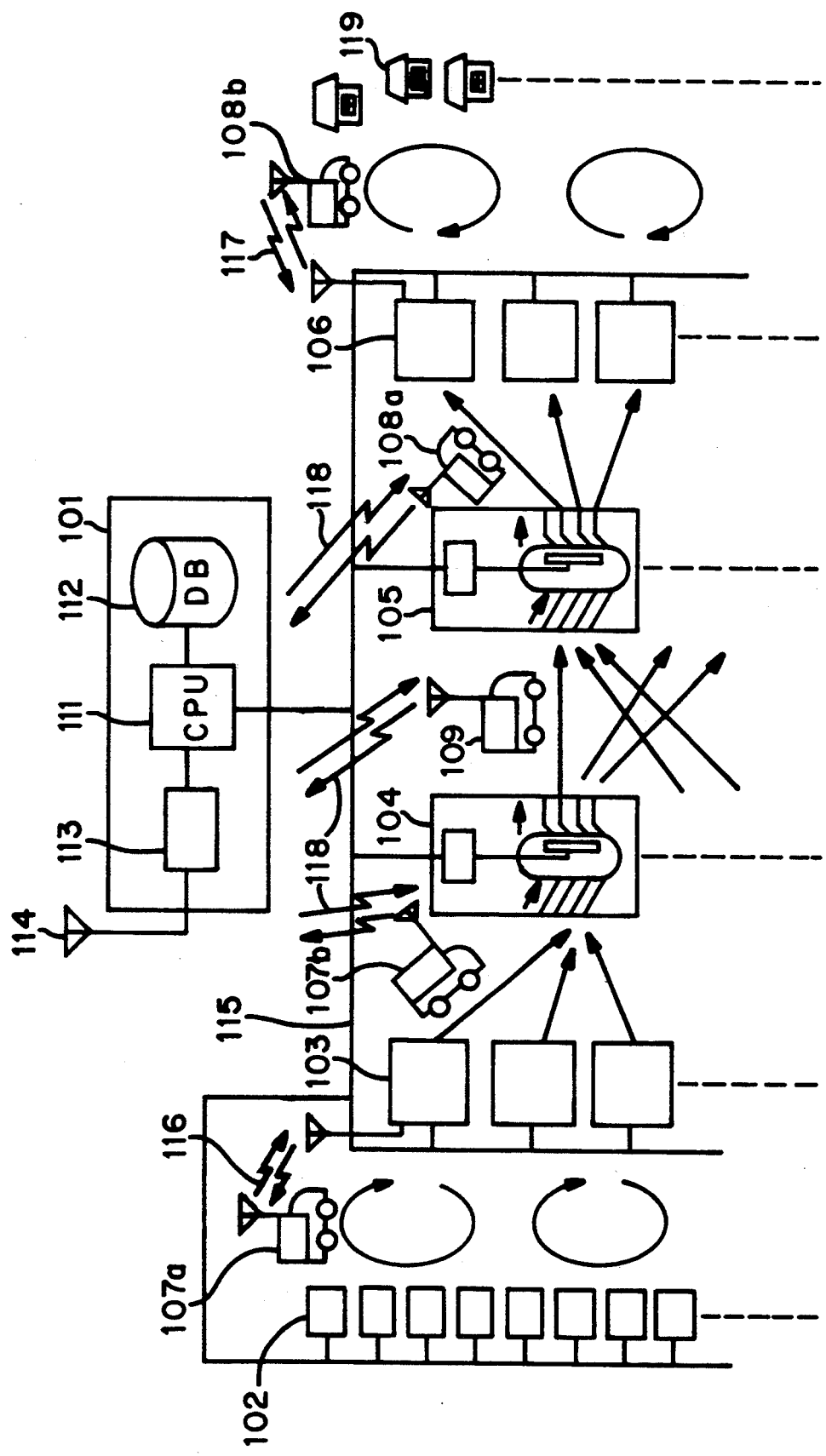
FIG. 23 is a configuration diagram showing an overall delivery system employing the first embodiment of the electronic tag.

FIG. 23 shows a central office 101 for controlling the entire delivery system. Central office 101 is equipped with a transmitter/receiver 113 for transmitting and receiving electromagnetic waves through a transmitting/receiving antenna 114, a CPU 111 serving as a host computer and a data base 112 for storing various types of data. The central office 101 is connected to a number of local offices to be described later by a data transmission line 115 to form a computer network. The central office 101 serves as the nucleus of the computer network.

The computer network comprises the central office 101 described above, local delivery centers 104 and 105, regional business offices 103 and 106 and private parcel receiving centers 102 which are connected to each other by the data transmission line 115. Note that the data transmission line 115 can be a dedicated communication line or the public transmission line.

A cargo truck 107a is used for conveying parcels requested for delivery from a private parcel receiving center 102 to a regional business office 103. The cargo truck 107a is equipped with an antenna for establishing a radio communication channel 116 with an antenna installed at a regional business office 103. Information on parcel delivery such as places where parcels are loaded and unloaded is exchanged through the radio communication channel 116.

The radio communication channel 116 and other radio communication channels 117 and 118 to be described later are designed using a variety of radio communication lines such as a satellite communication channel, a public data line and an MCA (Multi-Channel Access) line which can be formed in a radio zone having a radius of 15 to 25 km.

Another cargo truck 107b is used for transporting parcels collected at a regional business office 103 to a local delivery center 104. The cargo truck 107b is also equipped with an antenna for establishing the radio communication channel 118 with the transmitting-/receiving antenna 114 installed at the central office 101. Likewise, information on parcel delivery is also exchanged through the radio communication channel 118.

A transport truck 109 is used for carrying parcels collected and sorted at the local delivery center 104 to the local delivery center 105 close to destinations of the parcels. The transport truck 109 is also equipped with an antenna for establishing the radio communication channel 117 with the transmitting/ receiving antenna 114 installed at the central office 101. Similarly, information on parcel delivery is also exchanged through the radio communication channel 117.

A delivery truck 108a is used for carrying parcels brought to the local delivery center 105 to a regional business office 106 close to destinations of the parcels. The delivery truck 108a is also equipped with an antenna for establishing another radio communication channel 118 with the transmitting/ receiving antenna 114 installed at the central office 101. Likewise, information on parcel delivery is also exchanged through the radio communication channel 118.

Finally, a delivery truck 108b is used for carrying parcels brought to a regional business office 106 to final destinations of the parcels. The delivery truck 108b is also equipped with an antenna for establishing another radio communication channel 117 with an antenna installed at the regional business office 106. Likewise, information on parcel delivery is also exchanged through the -radio communication channel 117.

The overall operation of the configuration described above is described as follows.

As shown in FIG. 23, when a sender requests a private parcel receiving center 102 to deliver a parcel, a home-delivery slip is issued at the private parcel receiving center 102 for the parcel. At that time, delivery information for the parcel such as the names and addresses of the sender and the recipient is entered by operating a terminal and transmitted to the CPU 111 of the central office 101 through the data transmission line 115. At the central office 101, the delivery information is then stored in the data base 112. Subsequently, code information including a destination code, a code corresponding to the delivery data, is transmitted by the CPU 111 through the data transmission line 115 to the private parcel receiving center 102 where the code information is entered to the home-delivery slip by applying an electromagnetic technique. The process to-issue the home-delivery slip is thereby completed. The home-delivery slip issued as such is then affixed to the parcel requested for delivery.

The cargo truck 107a collects parcels with home-delivery slips affixed from a number of private parcel receiving centers 102, and carries them to a regional business office 103. When a parcel requested for delivery is loaded into the cargo truck 107a, delivery information is read using a slip read/write apparatus from the home-delivery slip affixed on the parcel. The read delivery information, loading information in this case, is then transmitted to the regional business office 103 through the radio communication channel 116. In this way, the regional business office 103 is informed of parcels by a cargo truck 107a which carries the parcels recorded and kept track of by the data base 112 in the central office 101. Note that since the configuration of the slip read/write apparatus is virtually similar to that of an interrogator to be explained later, the description of the slip read/write apparatus is omitted here.

If the cargo truck 107a visits only private parcel receiving centers 102 having parcels for delivery the information of which is recorded in the data base 112, the efficiency of the collection of parcels can be enhanced. Private parcel receiving centers 102 to be visited by the cargo truck 107a are actually selected as follows. A regional business office 103 obtains delivery information for parcels collected in its region from the data base 112 through the data transmission line 115. Based on the delivery information obtained as such, the regional business office 103 selects private parcel receiving centers 102, requesting the cargo truck 107a to visit only the selected private parcel receiving centers 102 through the radio communication channel 116.

As described earlier, the regional business office 103 exchanges a variety of data with the cargo truck 107a through the radio communication channel 116. In addition, while moving parcels brought to the regional business office 103 to a shipping exit, it accesses delivery information stored in the home-delivery slips using a slip read/write apparatus. Delivery information read by the slip read/write apparatus is then transmitted to the CPU 111 through the data transmission line 115. At the same time, necessary processing such as entering dates and the like is also carried out at the regional business office 103.

After undergoing the processing as such, the parcels are loaded into the cargo truck 107b and then carried to the delivery center 104. Every time the regional business office 103 receives delivery information, loading information in this case, from the cargo truck 107a through the radio communication channel 116, the delivery information is forwarded to the CPU 111 of the center office 101 through the data transmission line 115.

Parcels are brought from a number of regional business offices 103 to a receiving entrance of the delivery center 104 and conveyed by a belt conveyor to a shipping exit. While the parcels are being conveyed to the shipping exit, delivery information is read from their home-delivery slips by a slip read/write apparatus and transmitted to a sorting control terminal which controls a shipping control apparatus by outputting a control signal thereto. The shipping control apparatus receives the control signal and demultiplexes the parcels moving toward the shipping exit on the conveyor to several destinations in accordance with the delivery information. In this way, the shipping control apparatus automatically sorts the parcels by destination. Afterward, the sorted parcels are carried to the local delivery center 105 by the transport truck 109.

Here, the processing carried out by the sorting control terminal is mainly processing to obtain sorting information. The sorting control terminal may obtain sorting data included in the delivery information or, as another alternative, may request the CPU 111 to search the data base 112 for sorting data by sending other delivery information, for example, a destination code or the serial number of the home-delivery slip to the central office 101 through the data transmission line 115 in case the delivery information does not include such sorting data.

At the delivery center 105, parcels brought thereto by the transport truck 109 from the delivery center 104 are sorted before being sent to regional business offices 106. It should be noted that parcels are sorted at the delivery center 105 in the same way as they are sorted at the delivery center 104. Therefore, there is no need to repeat the description of the sorting here.

The delivery truck 108b delivers parcels brought to the regional business office 106 to their destinations. As a parcel is unloaded at its destination, delivery information is read from a home-delivery slip affixed on the parcel by using a slip read/write apparatus and then transmitted to the regional business office 106 through the radio communication channel 117. The regional business office 106, in turn, transmits the parcel-unloading information to the central office 101 through the data transmission line 115, recording it into the data base 112 as delivery-completion information. At this time, the home-delivery slips affixed on parcels can be collected. In this case, when a parcel is delivered to a recipient, the home-delivery slip affixed thereon is peeled off and taken back to the regional business office 106 to indicate the completion of the delivery.

Next, a configuration of the private parcel receiving center 102 cited above is described in detail.

Figure 24:
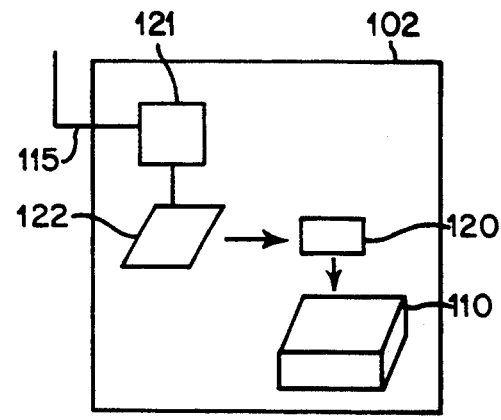
FIG. 24 is a diagram showing a configuration of a parcel handling agent in the above delivery system.

FIG. 24 shows the private parcel receiving center 102 is equipped with a network terminal 121 connected to the data transmission line 115 and a slip-issuing machine 122 connected to the network terminal 121.

When a sender requests the delivery of a parcel 110 at the private parcel receiving center 102, delivery information of the parcel 110 such as the names and addresses of the sender and a recipient is transmitted by the network terminal 121 to the CPU 111 of the central office 101 through the data transmission line 115 to be stored in the data base 112. In response to the delivery information, the CPU 111 transmits code information such as a destination code to the slip-issuing machine 122 through the data transmission line 115. Upon receiving the code information, the slip-issuing machine 122 issues a home-delivery slip 120, writing the code information into the home-delivery slip 120 by using an electromagnetic technique. The home-delivery slip 120 is finally affixed to the parcel 110. It should be noted that since the slip-issuing machine 122 has a similar configuration to the slip issuing apparatus 180 shown in FIG. 31, detailed description of its internal configuration and its principle of operation is ommitted.

Next, detailed configurations of the cargo trucks 107a and 107b, the delivery trucks 108a and 108b, the transport truck 109 and the regional business offices 103 and 106 are described. Note that the cargo trucks 107a and 107b, the delivery trucks 108a and 108b and the transport truck 109 all have the same configurations, whereas the regional business office 103 has an identical configuration with that of the office 106. Therefore, only the configurations of the cargo truck 107a and the regional business office 103 are explained by referring to FIG. 25.

Figure 25:
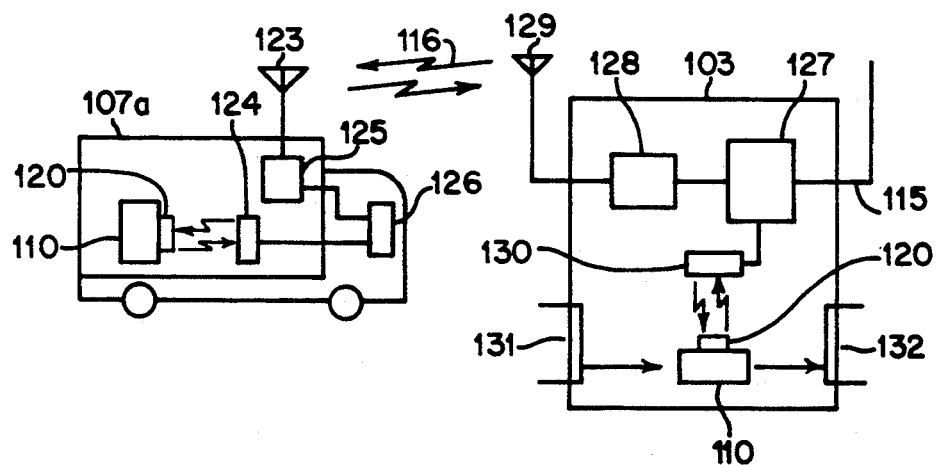
FIG. 25 is a diagram showing a cargo truck and a configuration of a business office in the above delivery system.

As shown in FIG. 25, the cargo truck 107a is equipped with a slip read/write apparatus 124, a transmitting/receiving antenna 123, a transmitter/receiver 125 and a vehicle terminal 126. The slip read/write apparatus 124 is used for reading delivery information and writing new data from and into the home-delivery slip 120. The transmitter/receiver 125 is used for transmitting the delivery information and receiving new data as radio waves through the transmitting/receiving antenna 123. The vehicle terminal 126 is used for operating and controlling the transmitter/receiver 125.

When a parcel 110 requested for delivery is loaded into the cargo truck 107a, delivery information is read from a home-delivery slip 120 affixed on the parcel 110 using the slip read/write apparatus 124 and transmitted to the regional business office 103 by using the vehicle terminal 126 through the transmitter/receiver 125, the transmitting/receiving antenna 123 and the radio communication channel 116.

On the other hand, the regional business office 103 is equipped with a transmitting/receiving antenna 129, a transmitter/receiver 128, a slip read/write apparatus 130 and a network terminal 127 which is connected to the data transmission line 115, the transmitter/receiver 128 and the slip read/write apparatus 130. The transmitter/receiver 128 is used for transmitting and receiving radio waves through the antenna 129 and the slip read/write apparatus 130 is used for accessing delivery information stored in the home-delivery slip 120.

While radio waves are being exchanged with the cargo truck 107a, delivery information is read by the slip read/write apparatus 130 from the home-delivery slip 120 affixed on the parcel 110 incoming from a receiving entrance 131 of the regional business office 103. The delivery information read as such is then transmitted to the CPU 111 through network terminal 127 and the data transmission line 115 to be collected in the data base 112. The central office 101 is thereby informed that at least parcels recorded in the data base 112 have presently been received by the regional business office 103. The parcel 110 is later conveyed to a shipping exit 132 and loaded onto the cargo truck 107b.

Next, configurations of the delivery centers 104 and 105 are described. Since their configurations are identical with each other, only that of the delivery center 104 is explained by referring to FIG. 26.

Figure 26:
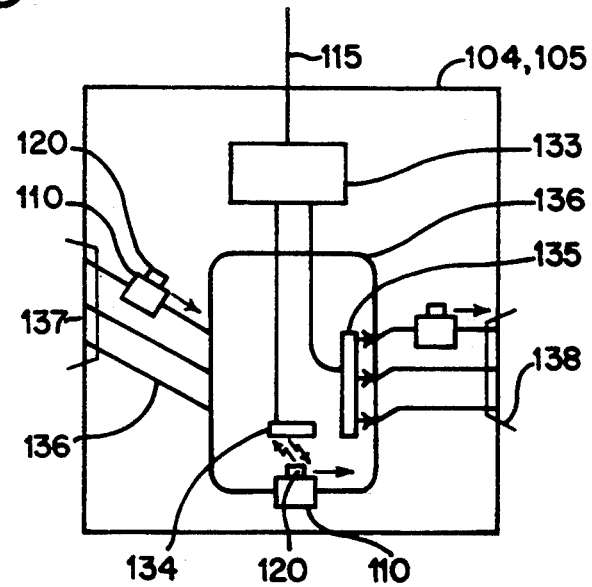
FIG. 26 is a diagram showing a configuration of a delivery center in the above delivery system.

As shown in FIG. 26, the delivery center is equipped with a slip read/write apparatus 134, a belt conveyor 136, a shipping-destination control apparatus 135 serving as a parcel sorter and a sorting control terminal 133 connected to the shipping-destination control apparatus 135 and the slip read/write apparatus 134. The slip read/write apparatus 134 is used for accessing delivery information stored in the home-delivery slip 120. The belt conveyor 136 is used for conveying parcels from a receiving entrance 137 to the shipping-destination control apparatus 135 which is used for determining the shipping destinations of the parcels on the belt conveyor 136 and sorting the parcels accordingly based on the delivery information.

The parcel 110 received from the regional business office 103 at a receiving entrance 137 is conveyed to a location close to the slip read/write apparatus 134 by the belt conveyor 136. The slip read/write apparatus 134 reads delivery information from the home-delivery slip 120 afixed on the parcel 110 and transmits the delivery information to the sorting control terminal 133. Receiving the delivery information, the sorting control terminal 133 outputs a control signal to the shipping-destination control apparatus 135. Being controlled by the signal, the shipping-destination control apparatus 135 sorts the parcels on the belt conveyor 136 based on the delivery information, sending each parcel to its corresponding shipping exit 138 where the parcel 110 is loaded into the transport truck 109. It should be noted that for processing delivery information including no sorting data, the sorting control terminal 133 requests the CPU 111 to search the data base 122 for sorting data by transmitting other delivery information such as a destination code or the serial number of the home-delivery slip 120 to the central office 101 through the data transmission line 115. In this way, the sorting data is retrieved from the data base 112.

As described above, the embodiment implementing a delivery system comprises the central office 101, the private parcel receiving centers 102, the business offices 103 and the delivery centers 104 which are connected to each other by the data transmission line 115, being put in an on-line state. In addition, the cargo trucks 107a and 107b, the delivery trucks 108a and 108b as well as the transport truck 109 which collect and convey delivery parcels always read delivery information from home-delivery slips affixed on the parcels and transmit it to the central office 101 in real-time. Accordingly, the central office 101 is capable, also in a real-time manner, of keeping track of the status of a delivery parcel such as what office, that is, a private parcel receiving center, a business office or a delivery center the parcel is currently located at. Therefore, when a sender or a recipient makes an inquiry as to what is the current status of the parcel requested for delivery, the answer to the question can be given immediately.

In addition, the cargo truck 107b shuttling between the business office 103 and the delivery center 104, the delivery truck 108a shuttling between the business office 106 and the delivery center 105 and the transport truck shuttling between the delivery centers 104 and 105 provide loading information when they load the parcel 110. Based on the loading information, a variety of instructions can be given to the trucks. For example, when the number of parcels loaded in a truck is small, an instruction can be given to the truck through the radio communication channel 118 to change its direction. On its way to an original destination and send it to another delivery center instead. In this way, the efficiency of the truck utilization can be improved.

In the first embodiment of the delivery system, a sender requests the private parcel receiving center 102 to send a parcel 110. It should be noted, however, that by using techniques described below, the cargo truck 107 can be instructed to directly pick up a parcel 110 at the sender's address without the need for the sender to visit the private parcel receiving center 102. These techniques can be applied to the delivery system described above.

In a first technique, the business office 103 is directly requested by a sender to deliver a parcel 110. A handwritten temporary delivery slip is then issued at the residence of the sender and affixed to the parcel 110. After the parcel 110 is loaded into the cargo truck 107, a home-delivery slip 120 is issued onboard the cargo truck 107 or at the business office 103 and then affixed to the parcel 110. It should be noted, however, that the cost of delivery according to the first technique is increased by the cost of issuing a temporary slip. In a second technique, the structure of the home-delivery slip 120 itself is designed so that information can be filled in even with the home-delivery slip 120 affixed on the parcel 110. After the parcel 110 with a home-delivery slip 120 affixed thereon is collected, delivery information such as a delivery code can be filled in onboard the cargo truck 107 or at the business office 103. As a third technique, much like a private parcel receiving center 102, the sender's residence is also equipped with an network terminal 121 and a slip-issuing machine 122 to establish an on-line communication with the central office 101.

In addition, in the first embodiment of the delivery system, when the delivery centers 104 and 105 automatically sort parcels, they need to access the data base 112 of the central office 101 for information in a real-time manner. In this case, if a real-time problem is encountered during such an access for transmitting or receiving data, a small data base can be installed at each delivery center. In such a configuration, sorting information such as the present location and the destination of the parcel 110 can be exchanged in advance between the small data base and the data base 112 of the central office 101.

Figure 29:
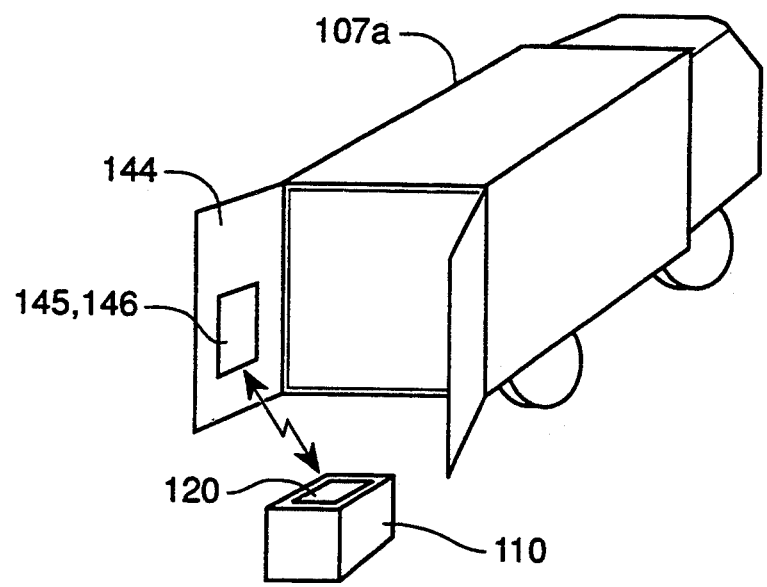
FIG. 29 is a simplified diagram showing an outline of an onboard tag writing machine to be mounted and used in a vehicle.

Also in the first embodiment of the delivery system, each truck is equipped with a slip read/write apparatus 124 for reading and writing information from and into a home-delivery slip 120. By providing the slip read/write apparatus 124 with a transmitting antenna 145 and a receiving antenna 146 at the loading/unloading door 144 of the truck as shown in FIG. 29, a parcel 110 can be checked while it is being loaded into or unloaded from the truck. An action can thus be taken immediately in case a parcel .110 is lost during the transportation.

In addition, by writing processing information such as information on where the parcel 110 is loaded into the home-delivery slip 120 with the slip read/write apparatuses 130, 134 and 124, processing undergone by the parcel 110 so far can be checked. Moreover, the processing information stored in the home-delivery slip 120 is useful for the subsequent management of the parcel 110. Accordingly, when it is not necessary to write processing information into a home-delivery slip 120, a slip reading machine for merely fetching delivery information from the home-delivery slip 120 can be used instead of such a slip read/write apparatus. Moreover, instead of writing processing information into a home-delivery slip 120, the information can be directly written into the data base 112 through the on-line communication in order to record the processing items.

In the embodiment implementing the delivery system described above, the data transmission line 115 is typically designed as follows. Mass data transmission lines are installed between the central office 101 and the delivery centers 104 and 105. As for the communication between the delivery centers 104 and 105 and the business offices 103 and 106, dedicated small-capacity transmission lines are used. The public transmission lines are utilized for communication between the private parcel receiving centers 102 and the central office 101. By building a hybrid data transmission line comprising mass, small-capacity and public transmission lines as such, the line efficiency can be enhanced. In addition, the delivery centers 104 and 105 can serve as a base station for the radio communication channels 118 instead of the central office 101.

Next, a second embodiment implementing the delivery system that makes use of electronic tags is described. When implemented into the second embodiment, the delivery system will never, as a whole, become too large in size. In addition, with the second embodiment, information on the current location of a parcel can be obtained in a real-time manner.

Figure 27:
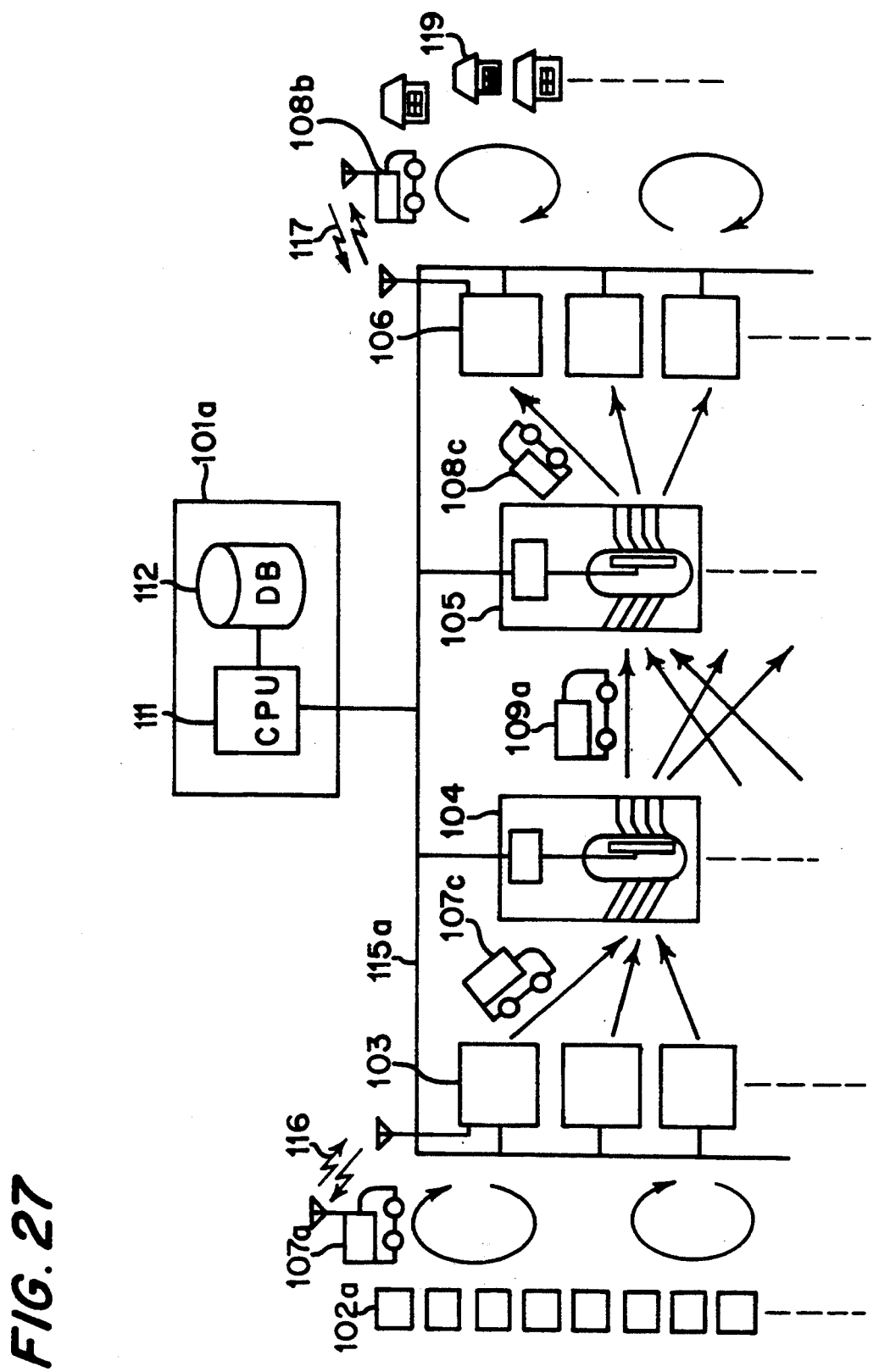
FIG. 27 is a configuration diagram showing an overall delivery system employing the second embodiment of the electronic tag.

As shown in FIG. 27, the central office 101a has a configuration comprising only a CPU 111 and a data base 112. Much like the conventional private parcel receiving center, the present private parcel receiving center 102a is equipped with neither the network terminal 121 nor the slip issuing apparatus 122 described earlier. In addition, the cargo truck 107c, the transport truck 109a and the delivery truck 109a are no more than ordinary transportation trucks which do not have equipment such as the slip read/write apparatus 124 for accessing a home-delivery slip 120 at all. Moreover, unlike the data transmission line 115, the data transmission line 115a is not extended to the private parcel receiving centers 102a. As a result, the second embodiment becomes simpler.

The delivery system with the configuration described above uses home-delivery slips which include slip serial numbers for identifying the delivery slips themselves and other delivery information. These pieces of information are determined in advance and stored into the home-delivery slips at the time of manufacture. The home-delivery slips with their slip serial numbers and the other information stored therein in advance are shipped to the private parcel receiving centers. Therefore, neither parcels received at a private parcel receiving center 102a nor parcels directly collected by a cargo truck 107a at the residences of senders, do not require a network terminals nor a slip read/write apparatus.

When a sender requests a private parcel receiving center 102a shown in FIG. 27 to send a parcel, the sender fills in hand-written information into predetermined entry blanks of a home-delivery slip which is then affixed to the parcel.

The cargo truck 107a stops at the private parcel receiving centers 102a, loading parcels each with a home-delivery slip affixed thereon. The cargo truck 107a then transports the parcels to a regional business office 103. When loading a parcel requested for delivery into the truck 107a, delivery information, a slip serial number in this case, is read from the home-delivery slip affixed on the parcel by using an onboard slip read/write apparatus 124 and transmitted to the business office 103 through the radio communication channel 116.

At the business office 103, delivery information of the parcel such as the names and addresses of the sender and the recipient is transmitted by operating a terminal to the CPU 111 of the central office 101a through the data transmission line 115a. At the central office 101a, the delivery information is stored into the data base 112, being associated with its slip serial number. In response to the delivery information, the CPU 111 transmits code information such as a destination code through the data transmission line 115a to the business office 103 where it is written into the home-delivery slip by using an electromagnetical technique.

When reading or writing delivery information of a parcel, the slip serial number of the home-delivery is used as a key for accessing the data base 112. The delivery information of the home-delivery slip is thereby read or written. Operations thereafter are carried out in the same way as the first embodiment described earlier except for those of the transport truck 109a and the delivery truck 108c. The parcel is finally delivered to the recipient's address.

As such, in the second embodiment of the delivery system, it is not necessary to install facilities dedicated for all small functions of the delivery system. Accordingly, the delivery system does not, as a whole, become too large and the current location of a parcel can be identified in a real-time manner.

In the delivery system implemented by the second embodiment as described above, the cargo truck 107c shuttling between a business office 103 and a delivery center 104, the delivery truck 108c shuttling between a business office 106 and a delivery center 105 and the transport truck shuttling between delivery centers 104 and 105 are not equipped with an apparatus for identifying a parcel using an electromagnetic means. Accordingly, while the vehicles are shuttling between the offices, parcels they are carrying are beyond control. As a result, it is more difficult to rationalize the utilization of the trucks in comparison to the first embodiment.

None the less, it is possible to control parcels to be delivered. For example, by obtaining information on parcels and trucks at the business offices 103 and 106 and the delivery centers 104 and 105 or the like, it is possible to know which truck is, at the present real time, carrying a particular parcel. The second embodiment thus allows a place where a parcel has been lost during the transportation to be identified by once unloading all parcels from a truck at a business office 103 or 106 or a delivery center 104 or 105. As such, even in the system configuration of the second embodiment, the present location of a parcel can therefore be identified in a real-time manner. As a result, an inquiry about a lost parcel can be answered immediately.

It should be noted that when it is not necessary for the cargo truck 107a and the delivery truck 108b to control parcels in a real-time manner, a transport truck can be used to replace both of them. In this way, the cost of the the delivery system as a whole can be reduced. In this case, however, it becomes difficult to operate the trucks efficiently.

In the delivery system according to that implemented by the second embodiment, it is also possible to use only slip serial numbers as delivery information. In this case, when it is desired to read or write a destination code or other parcel information such as the weight, dimensions and freight of a parcel, such data can be read or written from or into the data base 112 of the central office 101a through the data transmission line 115a. In this way, the home-delivery slip can be designed to embed only a small amount of memory. In addition, since a facility for writing delivery information into the home-delivery slip can be omitted, the slip can be manufactured at an extremely low cost.

Furthermore, if the slip serial number is the only delivery information of the home-delivery slip, the slip can be issued at a delivery-slip issuing place according to exactly the same procedure as the conventional delivery slip. By introducing the configuration described above, a delivery system can be implemented without increasing excess loads of the terminals at the private parcel receiving centers.

In the case of a delivery slip with a destination code stored in advance as is disclosed in Japanese Patent Laid-Open No. 62-111821 for example, it becomes necessary to make delivery slips available for all destinations at every delivery-slip issuing place. Therefore, delivery slips for all destinations have to be kept in stock at every private parcel receiving center. Such delivery slips cause a problem that the space for preserving the delivery slips becomes large in size. It also raises a possibility that a parcel is sent to a different destination from the request of a sender or a parcel is lost when a delivery slip for a certain destination is affixed to a parcel to be sent to a different destination from the slip. In the case of the delivery system described above, on the other hand, only a delivery-slip identification number is written into a home-delivery slip. Accordingly, a storage place is not needed for every destination. The above problem is solved.

C. Preservation of Electronic Tags

A first embodiment of the electronic tag- that allows the electronic tag to be preserved is described as follows.

Figure 30:
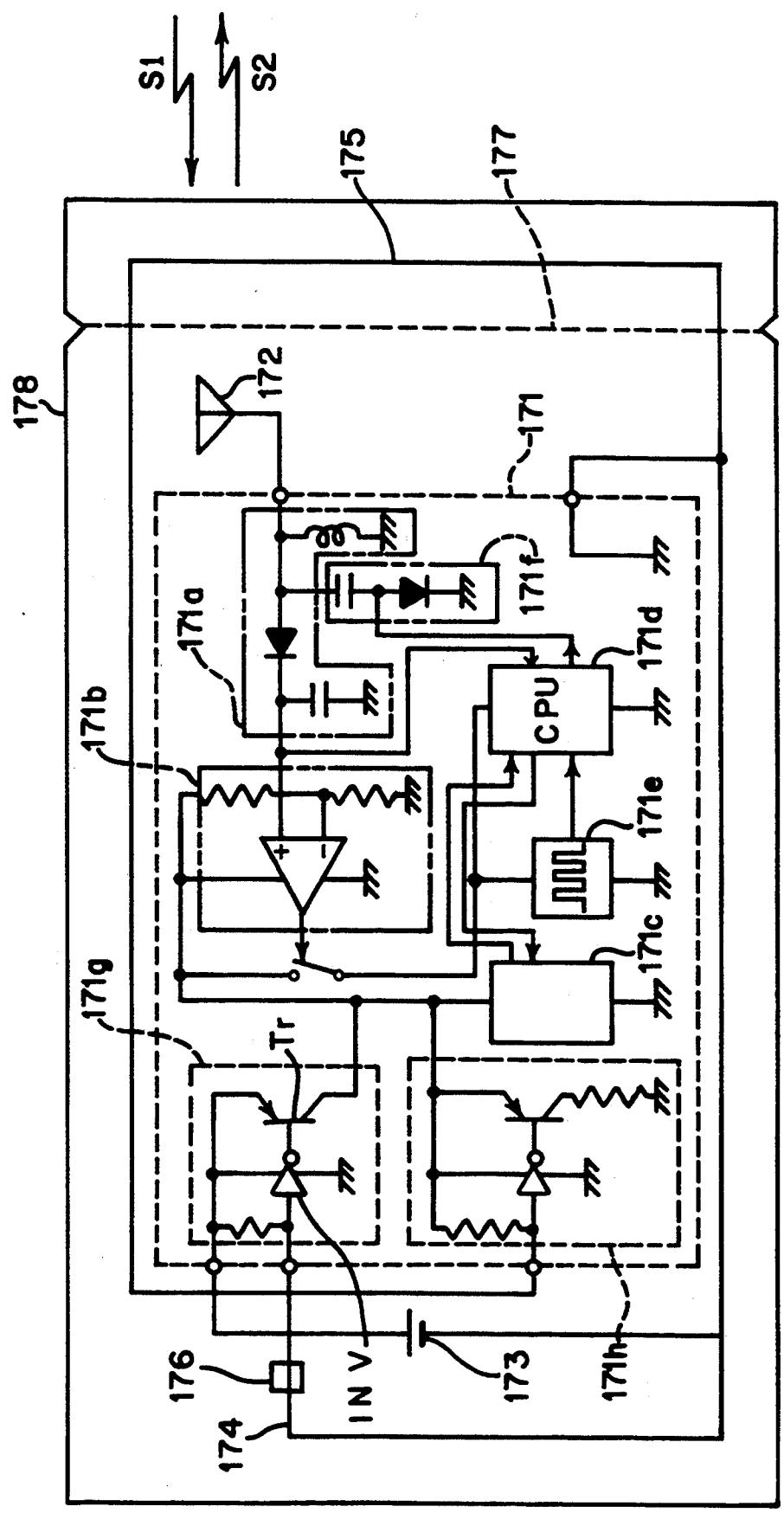
FIG. 30 is a circuit diagram showing an actual configuration of a responding circuit employed in the first embodiment of the electronic tag with a technique for preserving its home-delivery slip taken into consideration.

FIG. 30 shows a responding circuit 178 which is configured to include an IC 171 for processing internal signals, an antenna 172 for receiving query signals S1 and transmitting response signals S2, an embedded battery 173 for providing electric power to the IC 171, an operation starting line 174 for halting the responding circuit 178 prior to the start of its use, and an operation ending line 175 for terminating the operation of the responding circuit 178 at the end of its use. A punch hole 176 is provided on the operation starting line 174 and a tear-away line 177 is provided, crossing the operation ending line 175. Polyester, polyimid or paper is typically used as a base material for creating the responding circuit 178 so as to allow the punch hole 176 to be easily punched by using a punch incorporated in a slip issuing apparatus to be described later.

The IC 171 is configured to comprise a detector 171a, a level comparator 171b, a memory unit 171c, a CPU 171d, a clock generator 171e, a modulator 171f, an activating circuit 171g and a discharging circuit 171h. The detector 171a is used for fetching information conveyed by query signals S1. The level comparator 171b queries whether query signal S1 have been received based on the level of a signal output by the detector 171a and, accordingly, for turning on the power supplied to the circuits. The memory unit 171c used for storing, among other things, information on parcels. The CPU 171d is used for executing transmitting operations based on the information on parcels stored in the memory unit 171c. The clock generator 171e is used for generating a clock signal for driving the CPU 171d. The modulator 171f is used for modulating query signals S1 with a signal output by the CPU 171d and generating response signals S2 to be transmitted through the antenna 172. The activating circuit 171g is configured to mainly comprise a transistor Tr and an inverter INV.

Next, the principle of operation of the embodiment having the configuration described above is explained.

Before the responding circuit 178 is used or when a home-delivery slip 189 is put in storage, the operation starting line 174 shown in FIG. 30 is in a connected state. Accordingly, the input signal to the inverter INV is set at a low level and the transistor Tr is in a cut-off state.

When using the responding circuit 178, first, the punch hole 176 on the responding circuit 178 is punched using a punch incorporated in the slip issuing apparatus. Accordingly, the operation starting line 174 is broken, raising the input signal to the inverter INV to a high level which puts the transistor Tr in a conducting state. In this state, the operation of the responding circuit 178 is started. It should be noted that prior to the start of the operation of the responding circuit 178, the consumed current is of the order of 0.1 microamperes in magnitude. Accordingly, even if the home-delivery slip 189 is kept in storage for one year, it consumes only 0.9 mAh of current from the embedded battery 173. As such, the circuit configuration can considerably reduce the consumption of power out off the embedded battery 173 during the storage period.

When information on a parcel is written into the responding circuit 178 in its operating state by the slip issuing apparatus to be described later, a first query signal S1 is received through the antenna 172 from the slip issuing apparatus. The first query signal conveys a write command and information on a parcel. The query signal S1 actuates the level comparator 171b which, in turn, supplies power to the CPU 171d and the clock generator 171e to cause them to start. Receiving the write command, the CPU 171d writes the information on a parcel into the memory unit 171c. The memory unit 171c which has entered an operating state prior to the write operation retains the stored information on a parcel by virtue of the backed up by the embedded battery 173.

When query signals S1 are received again through the antenna 172 after the information on a parcel has been written into the memory unit 171c, the level comparator 171b supplies of power to the CPU 171d and the clock generator 171e to resume. The CPU 171d then modulates the query signals S1 with the information on a parcel stored in the memory unit 171c, generating response signals S2 conveying the information on a parcel which are finally transmitted through the antenna 172. In order to reduce the number of data transmission errors in the response signals S2, it is recommended that two stages be used in the transmission of 1 bit as in the case of Manchester's code or the F2F code.

When the home-delivery slip 189 is finished being used, the operation ending line 175 of the responding circuit 178 is broken by pulling apart the home-delivery slip 189 along the tear-away line 177 in order to avoid radio interferences and malfunctions. When a box with a used home-delivery slip affixed thereon is roused, response signals generated by a new home-delivery slip would be interfered by those originated from the used one, causing a malfunction to occur during automatic sorting. By cutting the operation ending line 175, the discharging circuit 171h is activated, discharging residual electric charge in the embedded battery 173. This prevents further use of the home-delivery slip 189.

Next, a detailed configuration of the slip issuing apparatus cited above is described.

Figure 31:
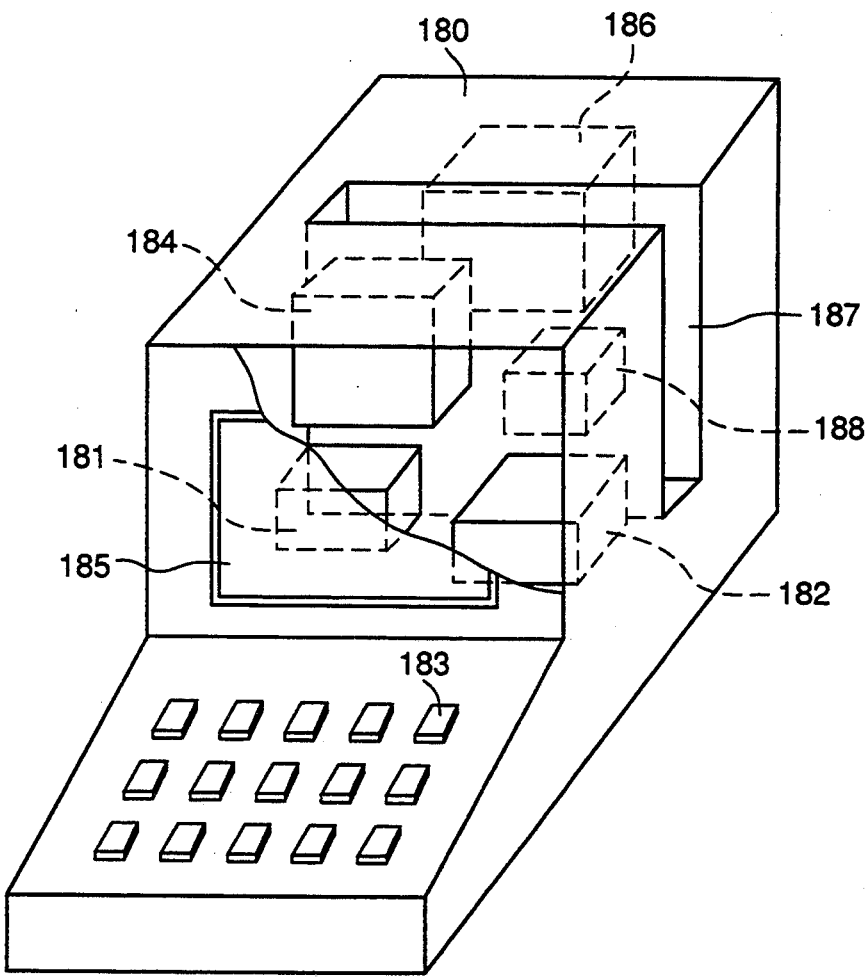
FIG. 31 is a diagram showing a simplified configuration of a issuing machine for issuing home-delivery slips.

FIG. 31 shows the slip issuing apparatus 180 is configured to comprise a setting slit 187 for inserting a home-delivery slip 189, a punch 181 for punching a punch hole 176 of the responding circuit 178, a bar-code reader 182 for reading a bar code 43 on the home-delivery slip 189, a keyboard 183 for entering information on a parcel, a writer 184 for writing necessary information into the responding circuit 178, a display unit 185 for displaying written information, a computer 186 for processing information and controlling the other components and a printer 188 for printing necessary information onto predetermined positions on the home-delivery slip 189. It should be noted that the bar code 43 which represents the serial number of the home-delivery slip 189 has been placed thereon in advance. It should be noted that since the writer 184 has a similar configulation to a interrogator described later, detailed description of its internal can figulation and its principle of operation is omitted.

Here, a procedure for issuing a home-delivery slip 189 used in the delivery system is described as follows.

Figure 32:
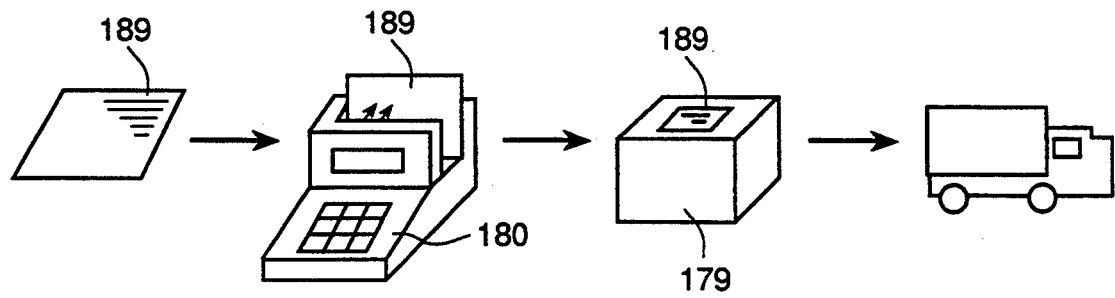
FIG. 32 is an explanatory diagram used for explaining the entire flow of a process of issuing home-delivery slips.
Figure 33:
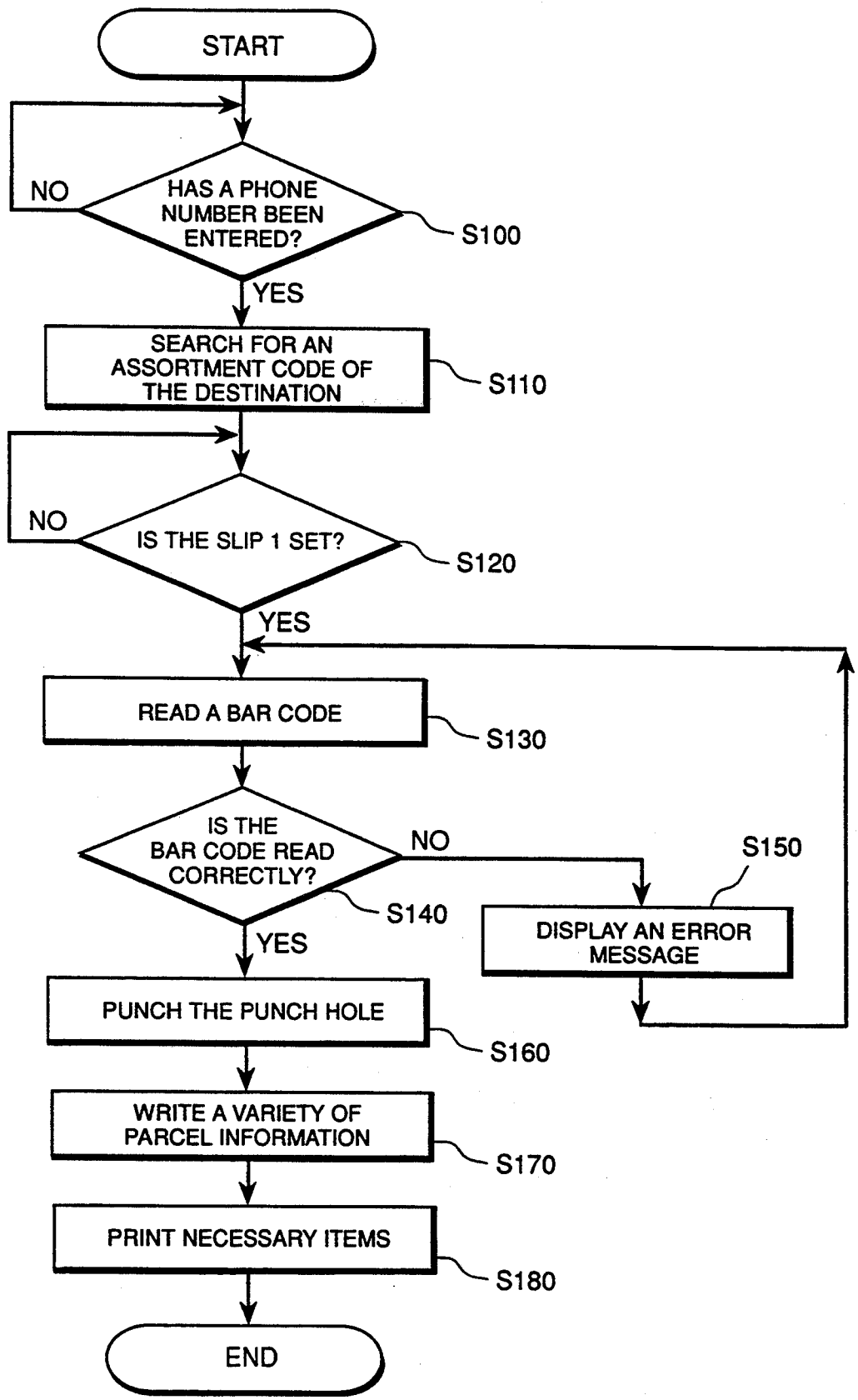
FIG. 33 is a flowchart showing the operation of a computer incorporated in the issuing machine shown in FIG. 31.

FIG. 32 and 33 show when a sender visiting a private parcel receiving center to send a parcel 179. First, the requester fills in necessary items such as the address and the phone number of a recipient into the hand-written entry blank 2 of a home-delivery slip 189. A person in charge of parcel delivery at the private parcel receiving center then verifies the hand-written items before entering information such as the phone number of the recipient, a freight, the classification of the parcel 179 into the slip issuing apparatus 180 via the keyboard 183. At Step S100 of FIG. 32, the computer 186 inputs the entered phone number and at step S110, the computer 186 uses the entered phone number for searching memory for a sorting number. As the operation to enter information has been totally completed, the person in charge of parcel delivery sets the home-delivery slip 189 in the setting slit 187 of the issuing apparatus 180 so that its front side, the side on which the hand-written-blank 2 is located, is facing the user.

At Step S120, the home-delivery slip 189 on the setting slit 187 is detected by the issuing apparatus 180 and a read command is issued to the bar-code reader 182. At Step S130, the bar code 15 printed on the display portion 3 of the home-delivery slip 189 is read in order to input the ID number of the home-delivery slip 189. At that time, if the home-delivery slip 189 is not properly set, the bar code 15 is not correctly read. In this case, at Step S140, the read status of the bar code 15 is determined as incorrect and at Step S150, a display-command signal is issued to output an error message to the display unit 185. The error message is used to request the user that the home-delivery slip 189 be set once more.

When a determination is made that the bar code 15 has been read correctly, a punch-command signal is output to the punch 181 at Step S160 in order to punch the hole 176 on the operation starting line 174 of the responding circuit 174. Subsequently, at Step S170, a write-command signal is output to the writer 184 to write information on the parcel 179 such as the serial number of the home-delivery slip 189, the sorting code, the freight and the classification of the parcel 179. At Step S180, a print-command signal is further output to a printer 188 to print necessary data.

When all data has been filled in, the sender affixes the home-delivery slip 189 to the parcel 179 which is then kept at the private parcel receiving center with a copy of the home-delivery slip 189 given to the sender and the remaining copies retained as archival copies. As an alternative, delivery data can be stored in memory either internal or external to the slip issuing apparatus 180 instead of keeping the slip copies as archival copies. Then, the parcel 179 with the home-delivery slip 189 affixed thereon is loaded into a truck and carried to a delivery center where the parcel 179 undergoes sorting.

Not until the punch hole 176 of the responding circuit 178 is punched by the punch 181 incorporated in the slip issuing apparatus 180 that the home-delivery slip 189 implemented by this embodiment virtually operates. Thus, while the home-delivery slip 189 is being kept in stock, the consumption of power frpm the embedded battery 173 is reduced substantially, allowing the home-delivery slip 189 to be preserved for a long period of time.

As described above, the slip issuing apparatus 180 is equipped with the printer 188 for printing necessary information at predetermined locations on the home-delivery slip 189. It should be noted, however, that the necessary information can be output to the display unit 185 and entered by the person in charge of delivery at the private parcel receiving center into the home-delivery slip 189. In this way, the printer 188 can be eliminated from the configuration.

Examples of information storage media other than the home-delivery slip 189 described above include lift tickets handled at a ticket gate of a lift platform at a skiing ground and tickets or series of tickets for vehicles. If such an information storage medium employs a responding circuit with an embedded battery, consumption of power during the storage period becomes a problem. In this case, the present invention can be applied to solve the problem.

Next, a second embodiment of the electronic tag along with a preferred way to keep it in storage is described. In this embodiment, power consumption is not started until a sheet of a plurality of copies constituting the home-delivery slip is torn off.

Figure 34A:
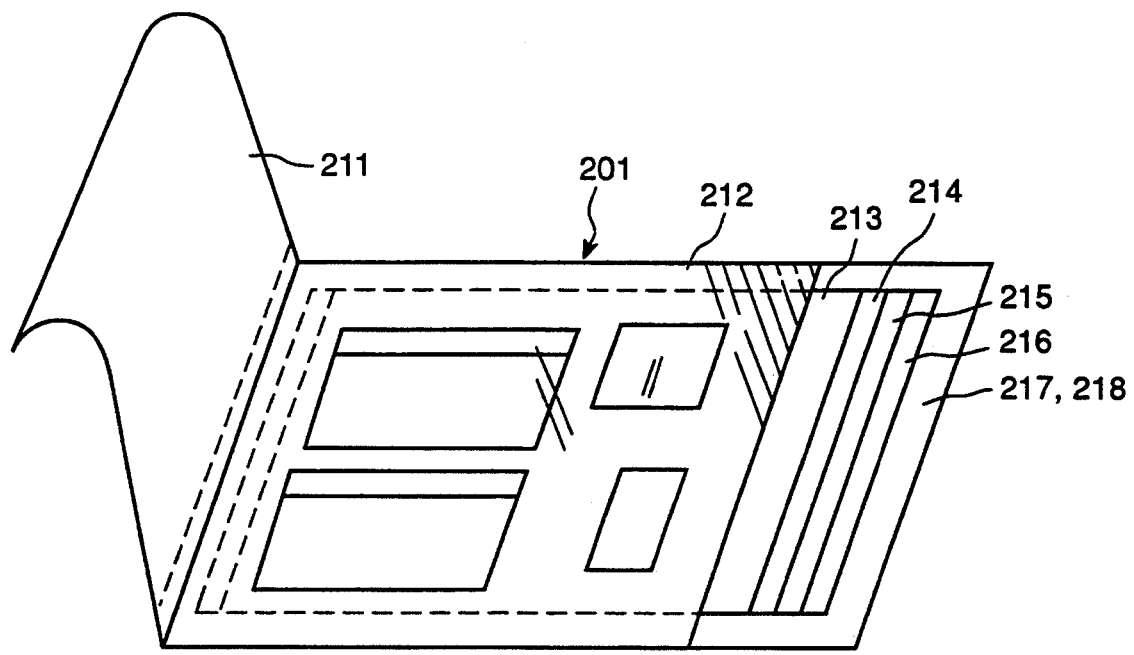
FIGS. 34(A) and 34(B) are diagrams showing a simplified configuration of a home-delivery slip of the second embodiment of the electronic tag which allows for the preservation of the electronic tag.
Figure 34B:
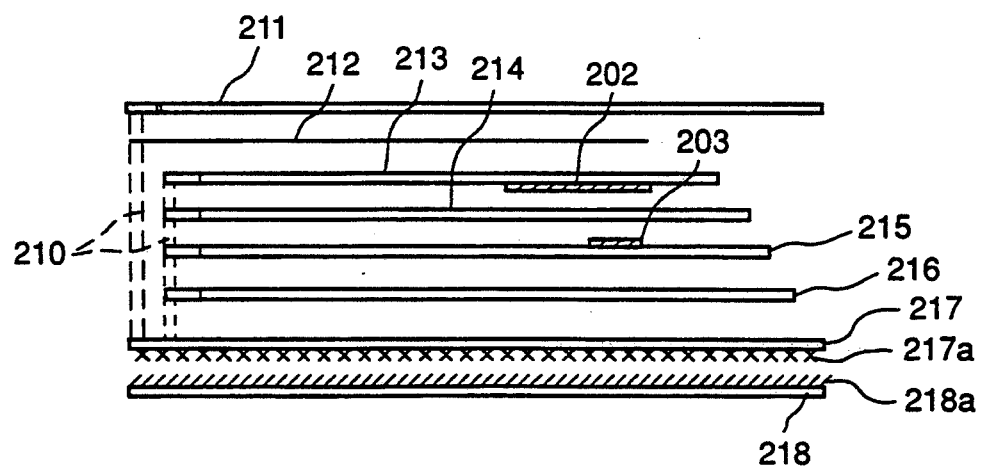

Reference numeral 201 shown in FIG. 34 (A) and (B) is a home-delivery slip used for delivery of a parcel. As described later, the home-delivery slip 201 comprises, among other parts, the slip copies and a responding circuit for storing delivery information such as the names and addresses of the sender and recipient of a parcel, receiving a query signal from an external interrogator and transmitting delivery information in response to such a query signal.

FIG. 34 (A) shows that the home-delivery slip 201 comprises a sender copy 211 and inner copies 213, 214, 215 and 216. The sender copy 211 is torn off and given to a sender after predetermined information has been filled in to hand-written entry blanks of the home-delivery slip 201. The inner copies 213 to 216 are affixed to a parcel. Typically, the inner copy 213 is collected by a delivery person at the end of delivery. The inner copy 214 is used as a bill given to the sender when delivery is requested. The inner copy 215 is given to the recipient and the inner copy 216 is used by the accounting department of the delivery company for processing.

A transparent protective polyethylene film 212 is affixed on the inner copy 213. The copy 211, the inner copies 213 to 216 and the film 212 are affixed to the upper surface of a label base paper 217 through a binder 210 using a binding agent.

An adhesive layer 217a is provided on the lower surface of the label base paper 217 for sticking the home-delivery slip 201 to a parcel. The adhesive layer 217a is protected by a separate paper 218. A silicon layer 218a is provided between the separate paper 218 and the adhesive layer 217a so as to allow the separate paper 218 to be peeled off from the label base paper 217 with ease.

FIG. 34 (B) shows a responding circuit 202 embedded in the inner copy 213. The responding circuit 202 is used for responding to a query signal received from an external interrogator which is not shown in the figure. The inner copy 215 embeds a battery 203 for supplying power to the responding circuit 202. The responsing circuit 202 and the battery 203 are insulated from each other by the inner copy 214. When using the home-delivery slip 201 for delivery of a parcel, the inner copy 214 is torn off so as to allow power to be supplied from the battery 203 to the responding circuit 202.

Figure 35:
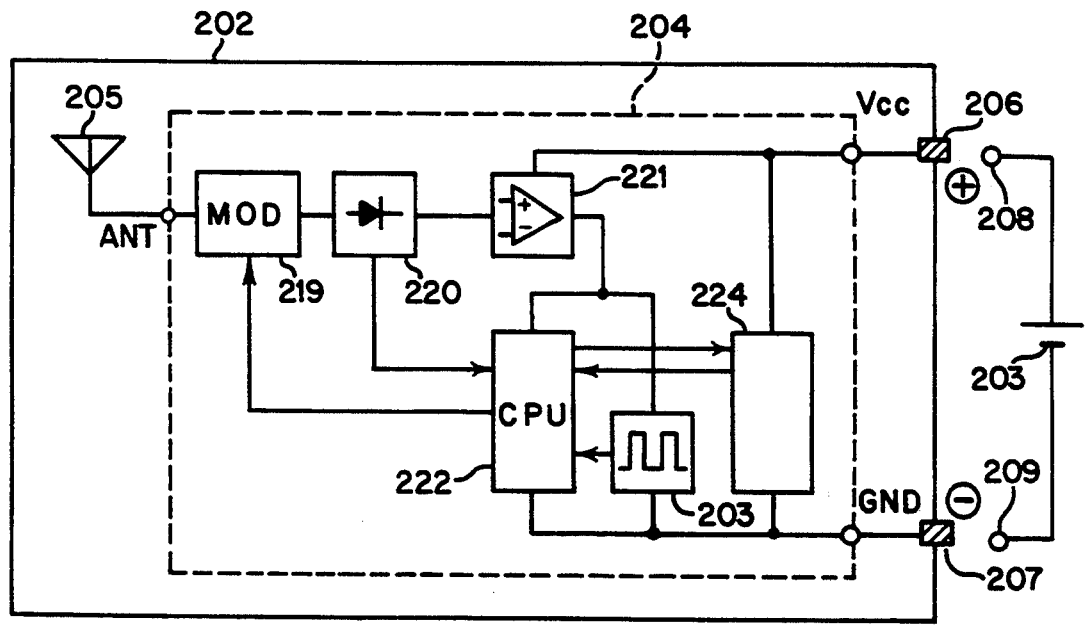
FIG. 35 is a block diagram showing an electrical configuration of the electronic tag for the above home-delivery slip shown in FIG. 34.

As shown in FIG. 35, the responding circuit 202 comprises an IC 204 and an antenna 205. The IC 204 includes a modulator 219, a detector 220, a level comparator 221, a CPU 222, a clock generator 223 and a memory unit 224.

As shown in the figure, the responding circuit 202 is equipped with a positive electrode 206 and a negative electrode 207. The positive electrode 206 is connected to the Vcc terminal of the IC 204 whereas the negative electrode 207 is connected to its GND terminal. Unless the inner copy 214 shown in FIG. 34 is torn off, no power is supplied from the battery 203 to the responding circuit 202 because the inner copy 214 is located between the electrodes 206 and 207 of the responding circuit 202 and terminals 208 and 209 of the battery 203. With the inner copy 214 torn off, however, the electrodes 206 and 207 of the responding circuit 202 come in contact with the terminals 208 and 209 of the battery 203, allowing power from the battery 203 to be supplied to the responding circuit 202 and, thus, putting the responding circuit 202 in a state capable of responding to a query signal received from an interrogator.

The home-delivery slip 201 having the configuration described above is used in a way described as follows.

First of all, the hand-written entry blanks of the home-delivery slip 201 are filled with information such as the names and addresses of a sender and a recipient. The sender copy 211 and the inner copy which serves as a bill are then torn off and given to the sender. When the inner copy 214 is torn off, the battery 203 starts supplying power to the responding circuit 202, putting the memory unit 224 of the responding circuit 202 in a state allowing data to be written thereto. Subsequently, the same information about a parcel as data entered in the hand-written entry blanks of the home-delivery slip 202 is written into the memory unit 224 of the responding circuit 202 by using a certain writer. Finally, the home-delivery slip 201 is affixed to a parcel.

The parcel is collected at a delivery center where the parcel is conveyed by a line conveyor for sorting. While the parcel is being conveyed on the line, it receives query signals from interrogators installed at locations along the line. In response to the query signals, information on delivery such as the recipient's address stored in memory 224 is transmitted. The interrogators receives the information on delivery transmitted from the responding circuit 202, identifying the destination of the parcel in a non-contact way (i.e., without making physical contact with it). The parcel thereby undergoes automatic sorting based on the identified destination.

In the case of the home-delivery slip 201 described above, the responding circuit 202 is insulated from the battery 203 by the inner copy 214 to be torn off at the delivery time of-.a parcel. When the inner copy 214 is torn off, the battery 203 supplies power to the responding circuit 202 so that during the use of the home-delivery slip 201, the battery 203 sustains adequate driving power for operating the responding circuit 202. Accordingly, the home-delivery slip 201 can be used even after a long period of stock time.

Next, a third embodiment of the electronic tag with any technique to keep it in storage taken into consideration is described. In the case of this embodiment, bending a predetermined portion of the home-delivery slip causes an embedded battery to start supplying power.

Figure 37:
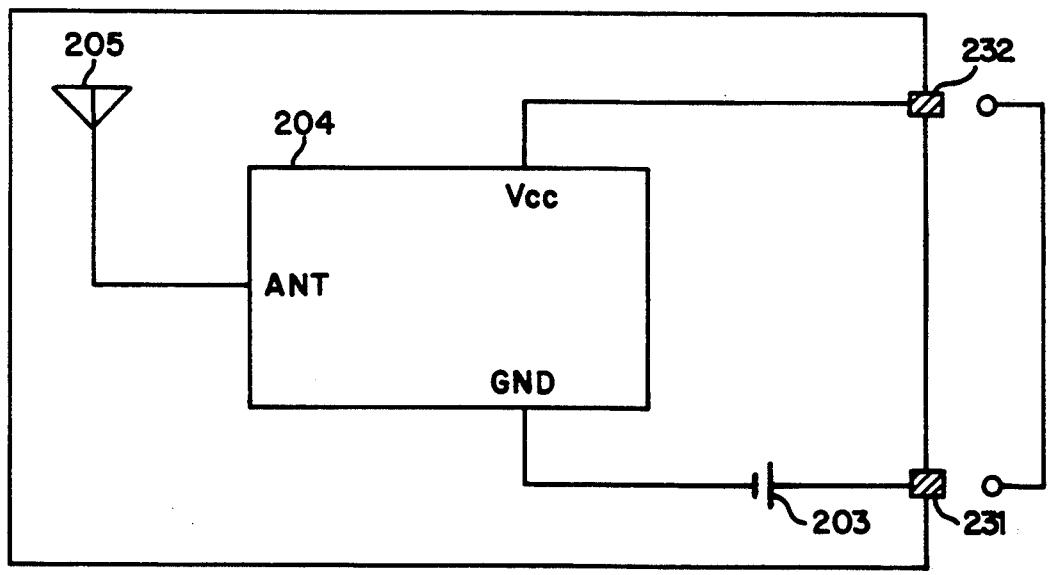
FIG. 37 is a block diagram showing an electrical configuration of the electronic tag for the home-delivery slip shown in FIG. 36.
Figure 36A:
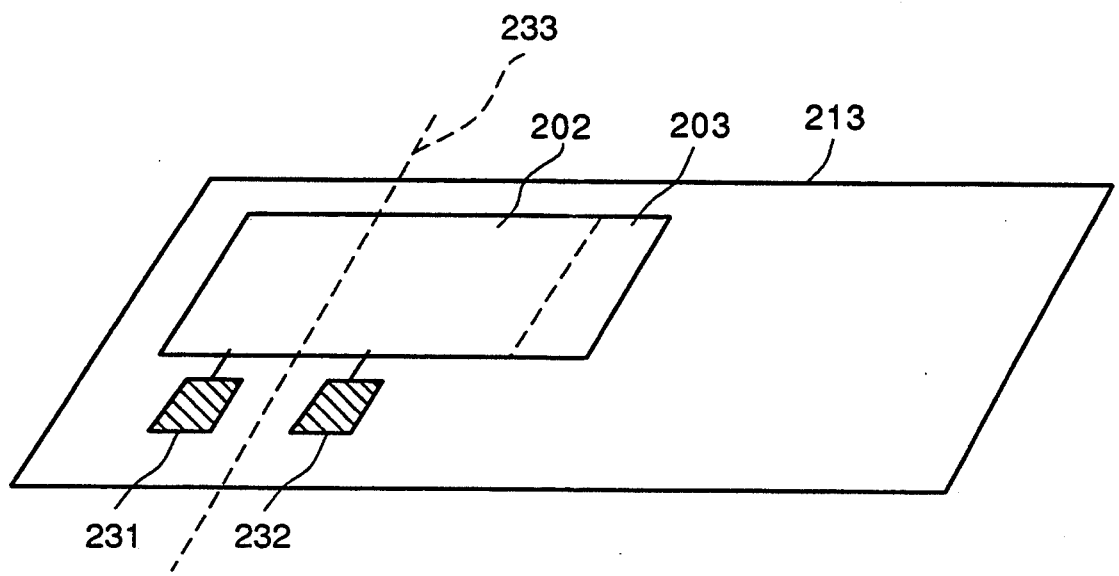
FIGS. 36(A) and 36(B) are diagrams showing a simplified configuration of a home-delivery slip handled by the third embodiment of the electronic tag which allows for preservation of the electronic tag.
Figure 36B:
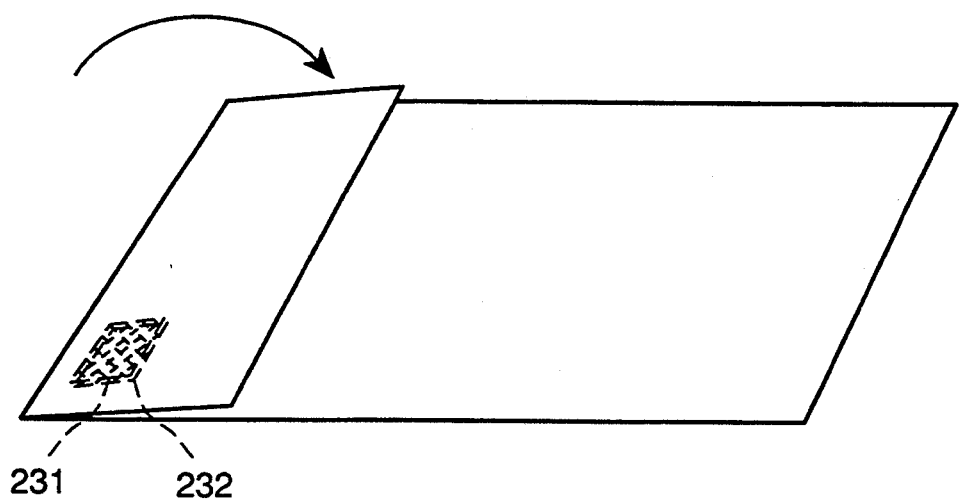

FIGS. 36 (A) and (B) show a slip copy 213 provided with a responding circuit 202 and a battery 203. The negative pole of the battery 203 is connected to the ground terminal of the IC 204 whereas its positive pole is connected to an electrode 531 and another electrode 232 is connected to the Vcc terminal of the IC 204 as shown in FIG. 37. As shown in FIG. 36 (A), the electrodes 231 and 232 on the slip copy 213 are separated from each other by a gap. When the electrodes 231 and 232 do not come in contact with each other, the battery 203 supplies no power to the the responding circuit 202. When the slip copy 213 is bent along a line 233 passing the center between the electrodes 231 and 232 as shown in FIG. 36 (B), however, the electrode 231 comes in contact with the electrode 232, causing the battery 203 to start supplying power to the responding circuit 202 and, thus, putting the responding circuit 202 in a state capable of responding to a query signal received from an interrogator.

Next, an example modification of the third embodiment described above is explained.

Figure 38A:
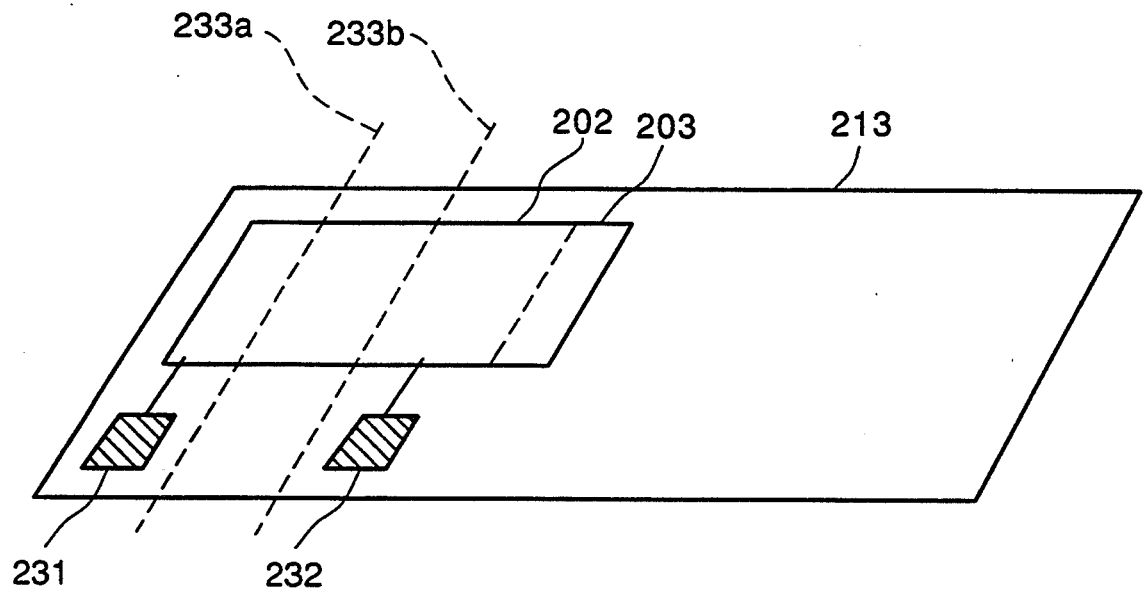
FIGS. 38(A) and 38(B) are diagrams showing a simplified configuration of a modified example of the home-delivery slip.
Figure 38B:
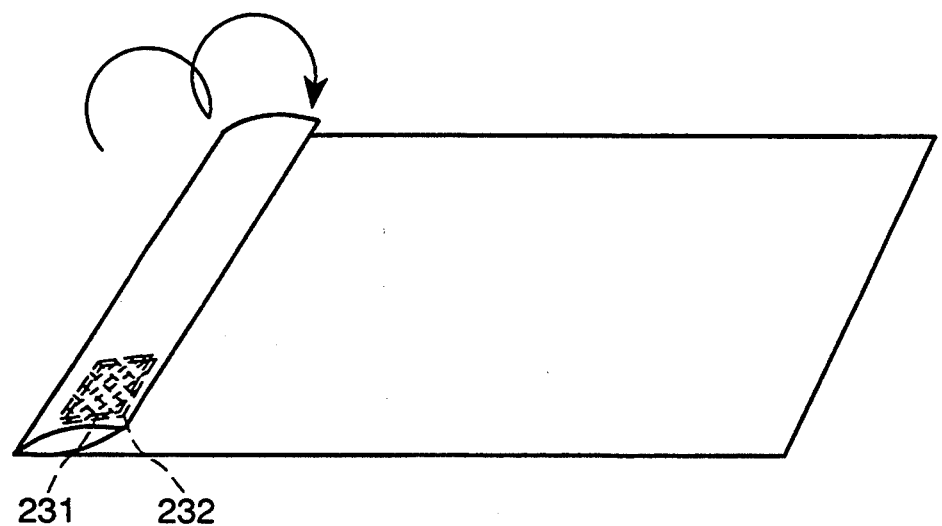

In the third embodiment, the electrode 232 is provided on the same surface of the slip copy 213 as the responding circuit 202. On the contrary, the modification example has the electrode 231 provided on the surface opposite to the responding circuit 202 as shown in FIG. 38. Bending the slip copy 213 along a line 233a and further bending it along another line 233b cause the electrode 231 to come in contact with the electrode 232, thus, enabling the battery 203 to supply power to the responding circuit 202.

In the modification example shown in FIG. 38, the two electrodes 231 and 232 are provided on the upper and lower surfaces of the slip copy 213 respectively. Accordingly, even if a metal plate comes in contact with the slip copy 213 by accident, the responding circuit 202 by no means operates.

Next, a second modification of the third embodiment described above is explained.

Figure 39:
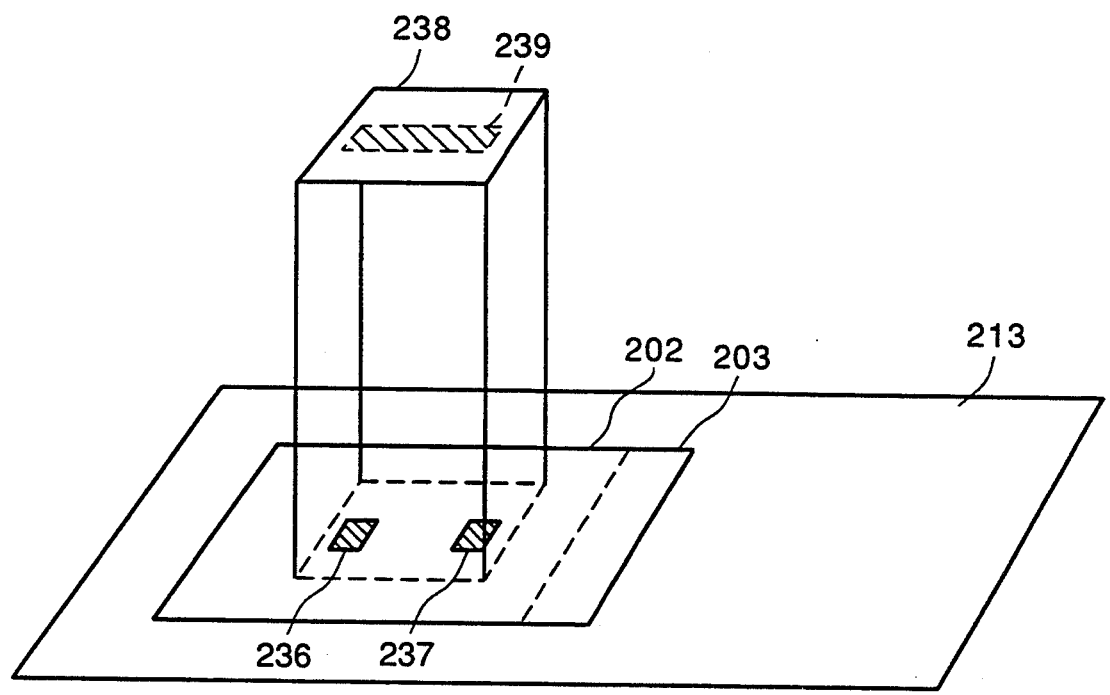
FIG. 39 is a diagram showing a simplified configuration of another modified example of the home-delivery slip.

FIG. 39 shows a responding circuit 202 equipped with electrodes 236 and 237 which are similar to the electrodes 231 and 232 shown in FIG. 36. By sticking a sheet 238 having a conductive portion 239 to the electrodes 236 and 237, they are electrically connected and the battery 203 can thus supply power to the responding circuit 202.

By the way, a plurality of conductive portions 239 can be prepared for the sheet 238 and the slip copy 213 can be equipped with pairs of electrodes having functions different from the function of the electrodes 236 and 237 to start the operation of the responding circuit 202. With this scheme, a desired function can be executed by sticking the sheet 238 to the responding circuit 202.

Next, a fourth embodiment of the electronic tag provided with a technique for keeping the electronic tag in stock is described. In this fourth embodiment, tearing off a predetermined portion of the home-delivery slip causes an embedded battery to start supplying power to a responding circuit.

Figure 40:
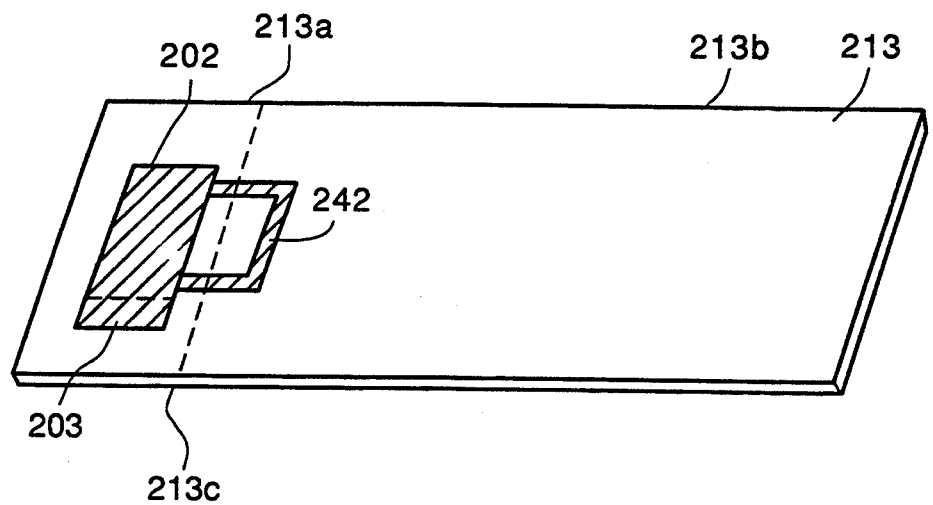
FIG. 40 is a diagram showing a simplified configuration of a home-delivery slip handled by the fourth embodiment of the electronic tag which allows for the preservation of the electronic tags.

As shown in FIG. 40, a slip copy 213 has a seam 213c for tearing off the slip copy 213. The seam 213c divides the slip copy 213 into two sides 213a and 213b. A responding circuit 202 and a battery 203 are provided On the side 213a. A conductive portion 242 of the responding circuit 202 is extended to the side 213b across the seam 213c. The conductive portion 242 cuts off a power-supply route from the battery 203 to the responding circuit 202. Tearing off the slip copy 213 along the seam 213c cuts the conductive portion 242, allowing power to be supplied from the battery 203 to the responding circuit 202.

Figure 41:
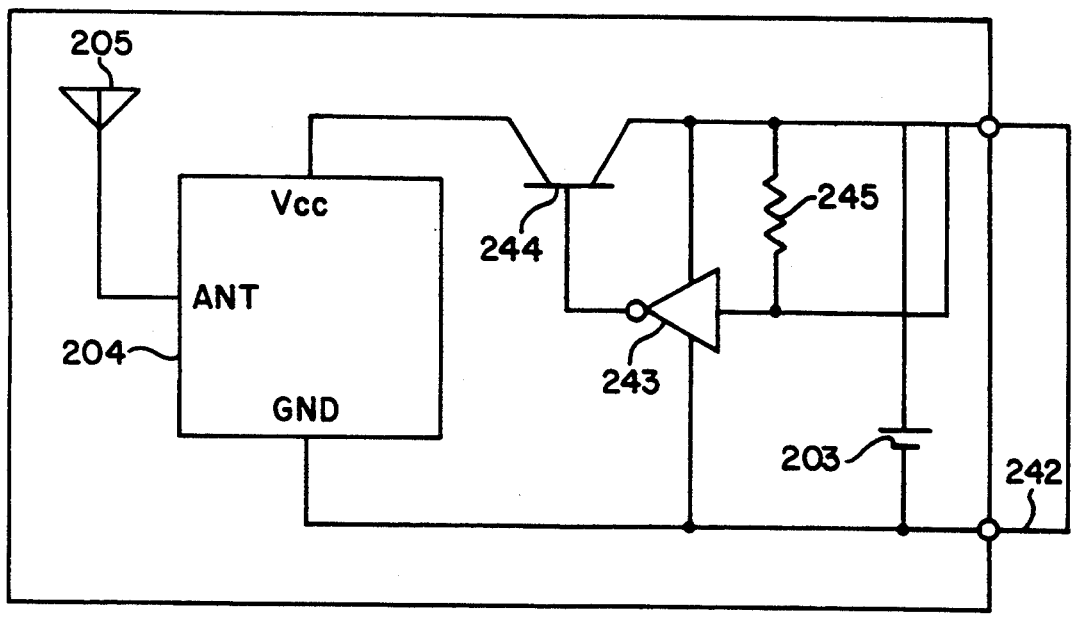
FIG. 41 is a block diagram showing an electrical configuration of the electronic tag for the home-delivery slip shown in FIG. 40.
Figure 42:
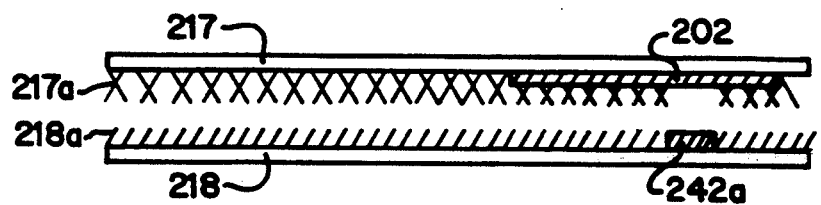
FIG. 42 is a diagram showing a simplified configuration of a modified example of the home-delivery slip.

As shown in FIG. 41, the negative pole of the battery 203 is connected to the input terminal of an inverter 243 by the conductive portion 242. The output of the inverter 243 is, on the other hand, connected to the base of a transistor 244 which serves as a switch for turning on power. In this arrangement, the base of the transistor 144 is sustained at a high level, putting its emitter and collector in a non-cunducting state. Accordingly, no power is supplied from the battery 203 to the Vcc terminal of an IC 204 of the responding circuit 202.

When the conductive portion 242 is cut, however, the voltage of the battery 203 is applied to the input terminal of the inverter 243 through a resistor 245. In this case, the output of the inverter 243 and, thus, the base of the transistor 244 are brought to a low level. Current is therefore conducted and takes place between the emitter and the collector of the transistor 244, allowing power to be supplied from the battery 203 to the Vcc terminal of the IC 204.

Next, a modification example of the fourth embodiment is described.

The responding circuit 202 which includes the IC 204 is provided with a label base paper 217. The conductive portion 242a for cutting off the supply of power to the IC 204 is provided on a separate paper 218 of the home-delivery slip 201. When the home-delivery slip 201 is affixed to a parcel, the separate paper 218 is peeled off, supplying power to the IC 204.

Next, another modification example of the fourth embodiment is described. As is generally known, a CPU can be switched between a stand-by mode, an operation wait state, and an operating mode. A copy of the home-delivery slip shown in FIG. 43 employs a CPU 222 which does not operate until the home-delivery slip is put to use.

Figure 43:
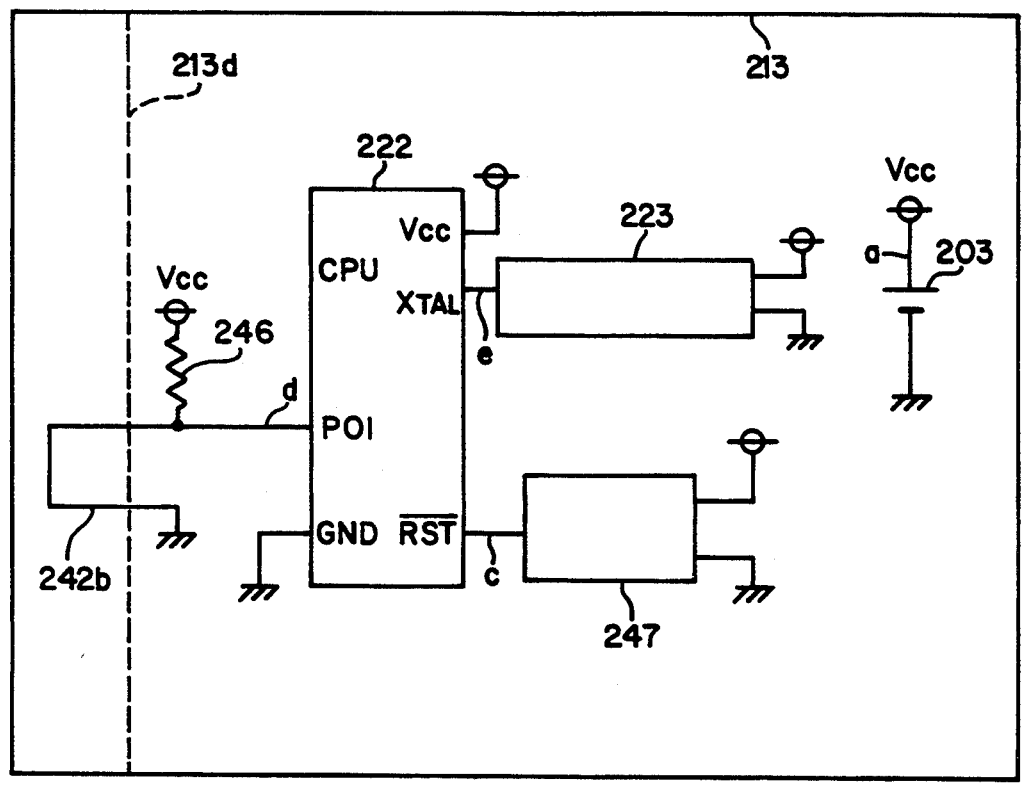
FIG. 43 is a diagram showing a simplified configuration of another modified example of the home-delivery slip.

As shown in FIG. 43, an input port PO1 of the CPU 222 is connected to a conductor 242b whose other end is grounded. The conductor 242b is connected to the Vcc terminal of a power supply through a resistor 246. The conductor 242b is created on the slip copy 213 as a pattern into a configuration so that when the slip copy 213 is torn off along a seam 213d created thereon, the conductor 242b is cut off.

Figure 44:
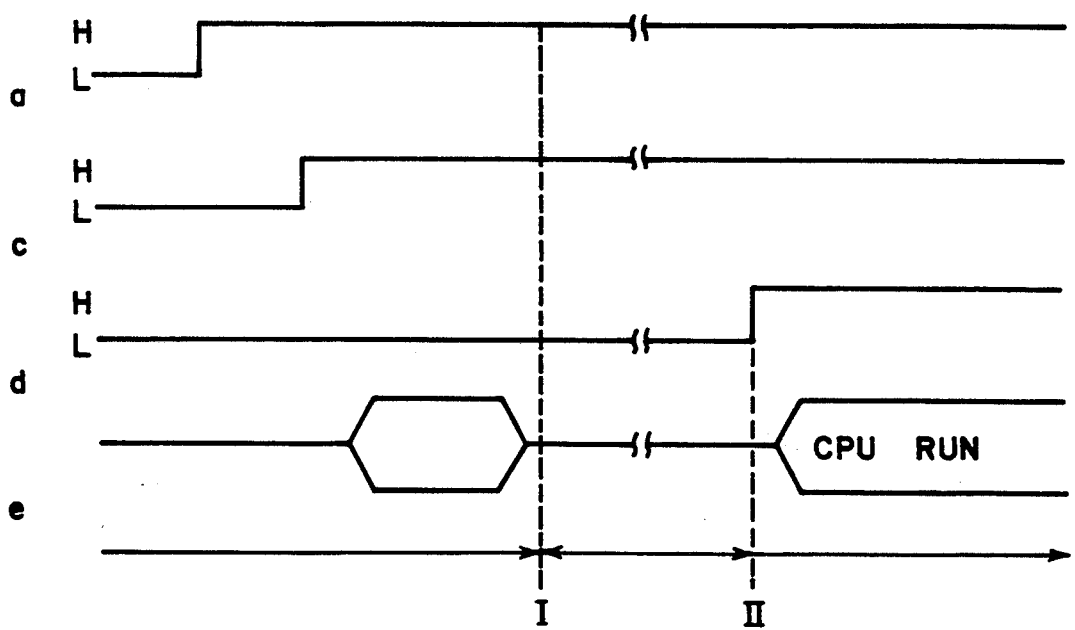
FIG. 44 is a timing chart used for explaining the operation timing of the electronic tag for the other modified example of the home-delivery slip shown in FIG. 43.

A battery 203 is embedded during the manufacture of the home-delivery slip shown in FIG. 44. The battery 203 supplies power (a) to the CPU 222, a clock generator 223 and a voltage detecting circuit 247. The CPU 222 is driven by a clock signal from the clock generator 223 and carries out initialization in response to a level change of a signal (c) supplied by the voltage detecting circuit 247 to the reset pin of the CPU 222. Since the input port PO1 is pulled down to a low level (d), the CPU immediately enters a stand-by mode.

When the home-delivery slip is used, the slip copy 213 is torn off along the seam 213d, applying the power supply voltage VCC to the input port PO1 and, thus, putting the CPU 222 in the operating mode. Accordingly, the CPU has been in the stand-by mode during the stocking period since the initialization until it is put to use. In the stand-by made, only little power is consumed, lengthening the life of the home-delivery slip.

Next, a fifth embodiment of the electronic tag provided with a technique for keeping the home-delivery slip in stock is described. In this embodiment, the home-delivery slip is equipped with a photoelectric converting element which is covered by a shading seal. By peeling off the shading seal, the timing at which power is supplied from an embedded battery can be controlled.

Figure 45:
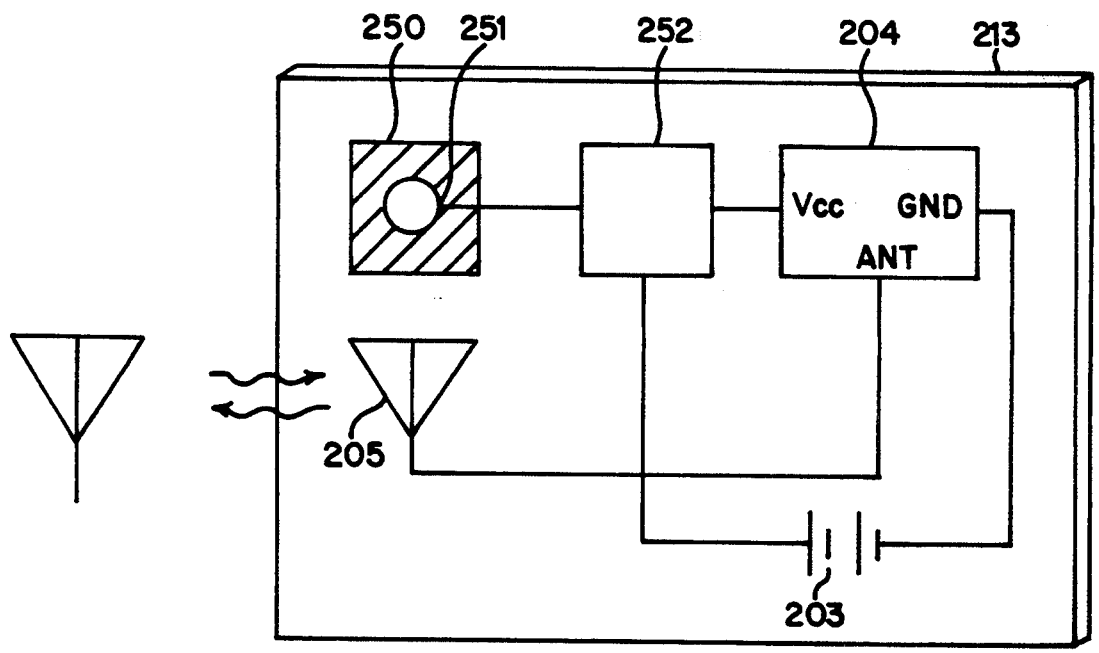
FIG. 45 is a diagram showing a simplified configuration of a home-delivery slip handled by the fifth embodiment of the electronic tag which allows for the preservation of the electronic tag.
Figure 46:
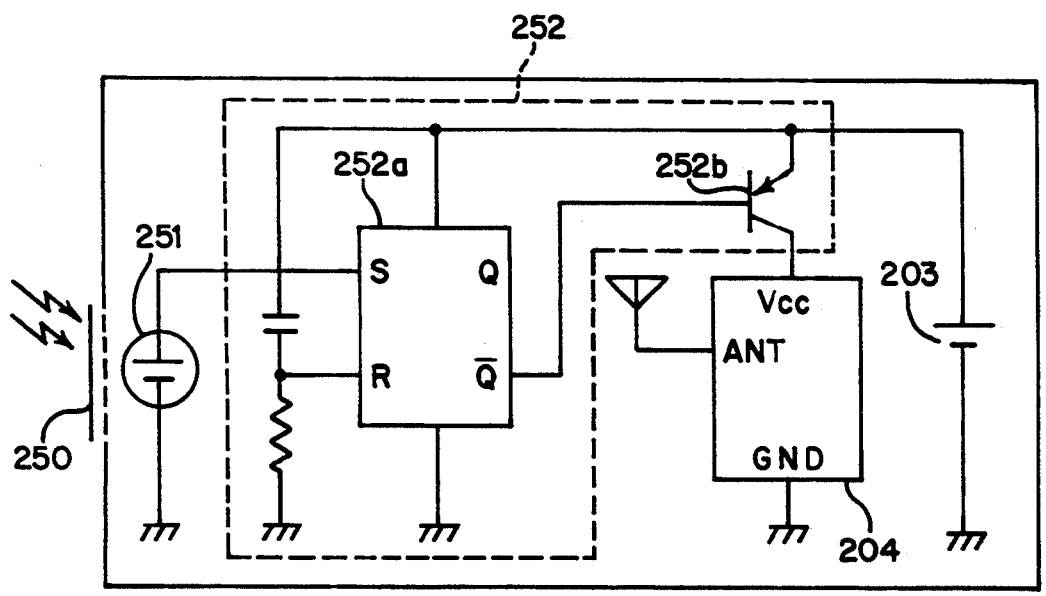
FIG. 46 is a block diagram showing an electrical configuration of the electronic tag for the home-delivery slip shown in FIG. 45.

As shown in FIG. 45, a slip copy 213 comprises the IC 204 described above, an antenna 205, a battery 203, a photovoltaic power device 251 and a switching device 252. The photovoltaic power device 251 receives light with normal room illumination, converting it into electric power. Receiving the electric power generated by the photovoltaic power device 251 turns on the switching device 252, sustaining the on state thereafter. Typically, the switching device 252 comprises a flip-flop circuit 252a and a transistor 252b as shown in FIG. 46. A shading seal 250 is affixed on the photovoltaic power device 251 until the home-delivery slip is put to use.

With the shading seal 250 affixed on the slip copy 213 as shown in FIG. 46, the photovoltaic power device 251 does not generate electric power. In this state, the S terminal of the flip-flop circuit 252a is thus held at a low level. At the time the R terminal of the flip-flop circuit 252a is connected to the battery 203, it is raised instantaneously to a high level. However, since the R terminal is grounded, it is immediately pulled down to a low level thereafter. Accordingly, the inverted output of the flip-flop circuit 252a is raised to a high level. Since the inverted output of the flip-flop circuit 252a is connected to the base of a transistor 252b, its emitter and collector are put in a non-conducting state, allowing no power to be supplied from the battery 203 to the IC 204.

When the shading seal 250 is peeled off, the photovoltaic power device 251 generates electric power, raising the S terminal of the flip-flop circuit 252a to a high level. On the other hand, since its R terminal remains at the low level as it is, its inverted output is pulled down to a low level. Accordingly, current .flows from the emitter to the collector of the transistor 252b, allowing power to be supplied from the battery 203 to the IC 204.

Next, a sixth embodiment is described. The embodiment implements the electronic tag, taking a technique for keeping the home-delivery slip in stock into consideration. In the sixth embodiment, an air battery 255 is employed as an embedded battery of the home-delivery slip. The air battery 255 is veiled by a sealing cover 256. When the sealing cover 256 is peeled off, the air battery 255 operates, supplying power to a responding circuit 202.

Figure 47:
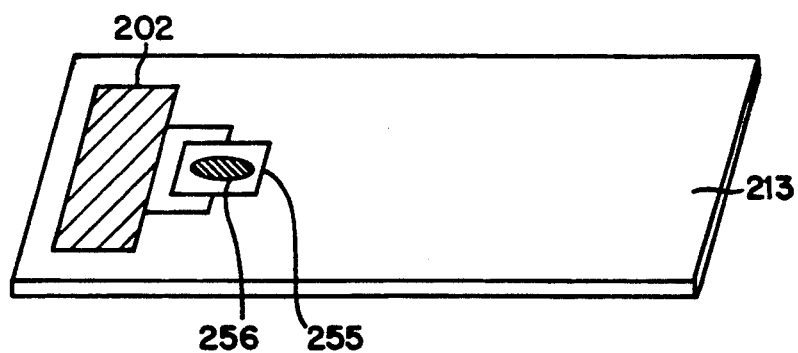
FIG. 47 is a diagram showing a simplified configuration of a home-delivery slip handled by the sixth embodiment of the electronic tag which allows for the preservation of the electronic tag.

FIG. 47 shows a slip copy 213 which is equipped with the air battery 255 instead of the ordinary battery. The air battery 255 generates electric power in an atmospheric environment. The air battery 255 is isolated from the atmosphere by the sealing cover 256 until the home-delivery slip is put to use. When the sealing cover 256 is peeled off, the air battery 255 generates electric power, providing power to an IC 204 of the responding circuit 202.

Next, a seventh embodiment is described. The embodiment implements the electronic tag, taking a technique for keeping the home-delivery slip in stock into consideration. In the seventh embodiment, a paper battery, a physically independent body from the home-delivery slip, is employed. By sticking the paper battery to a slip copy, power is supplied from the battery to a responding circuit embedded in the slip copy.

Figure 48:
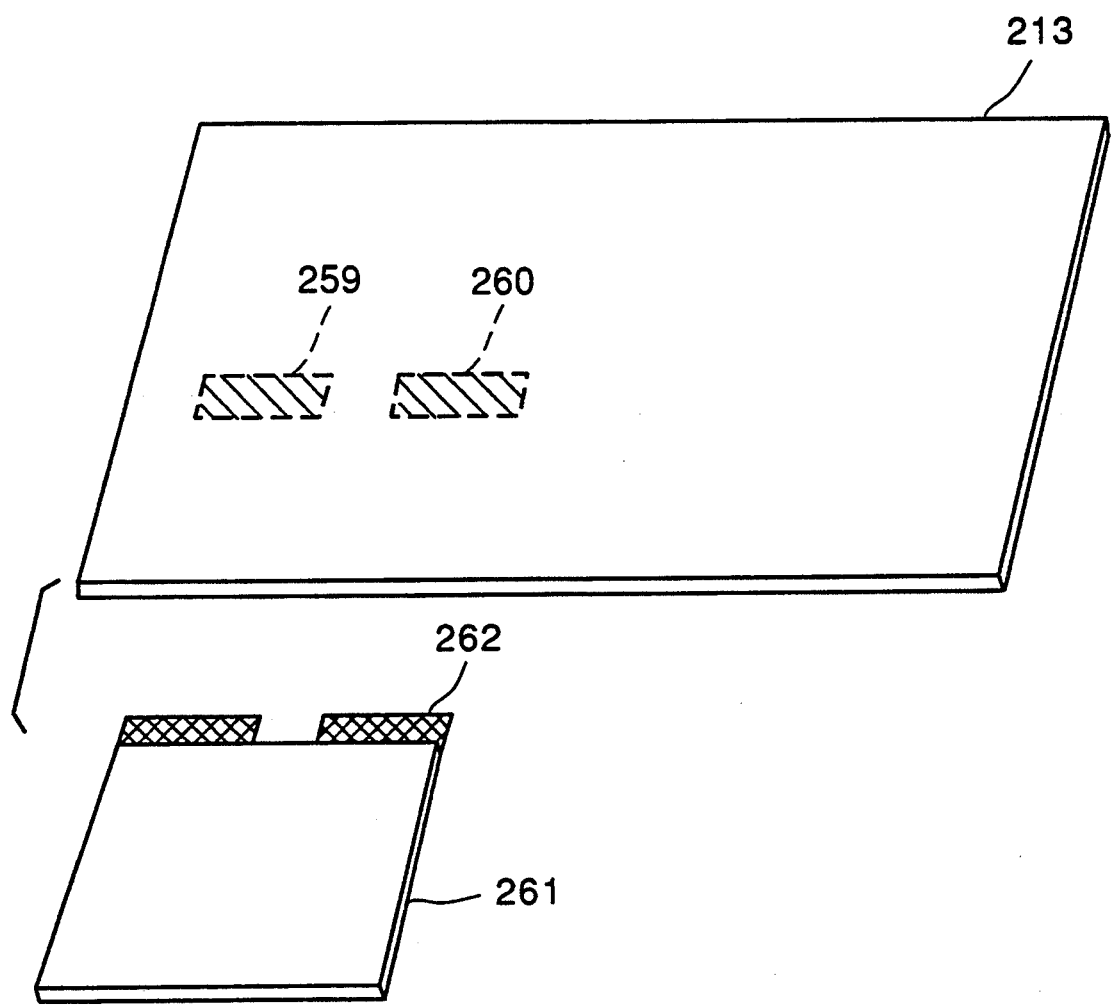
FIG. 48 is a diagram showing a simplified configuration of a home-delivery slip handled by the seventh embodiment of the electronic tag which allows for the preservation of the electronic tag.

FIG. 48 shows electrode patterns 259 and 260 for sticking a paper battery are provided on the lower surface of a slip copy 213. When using the home-delivery slip, a paper battery 261 coated with a conducting adhesive agent 262 is affixed to the lower surface of the slip copy 213, correctly fitting the negative and positive poles of the battery 261 to the electrode patterns 259 and 260. The embedded responding circuit is thereby activated. It should be noted that the electrode patterns 259 and 260 can also be provided on the upper surface of the slip copy 213 as well. In addition, a conductive tape can be used instead of the conducting adhesive agent.

D. Techniques for Issuing Electronic Tags

Described below is a first embodiment which implements the electronic tag, taking a technique for issuing the electronic tag into consideration.

Figure 49:
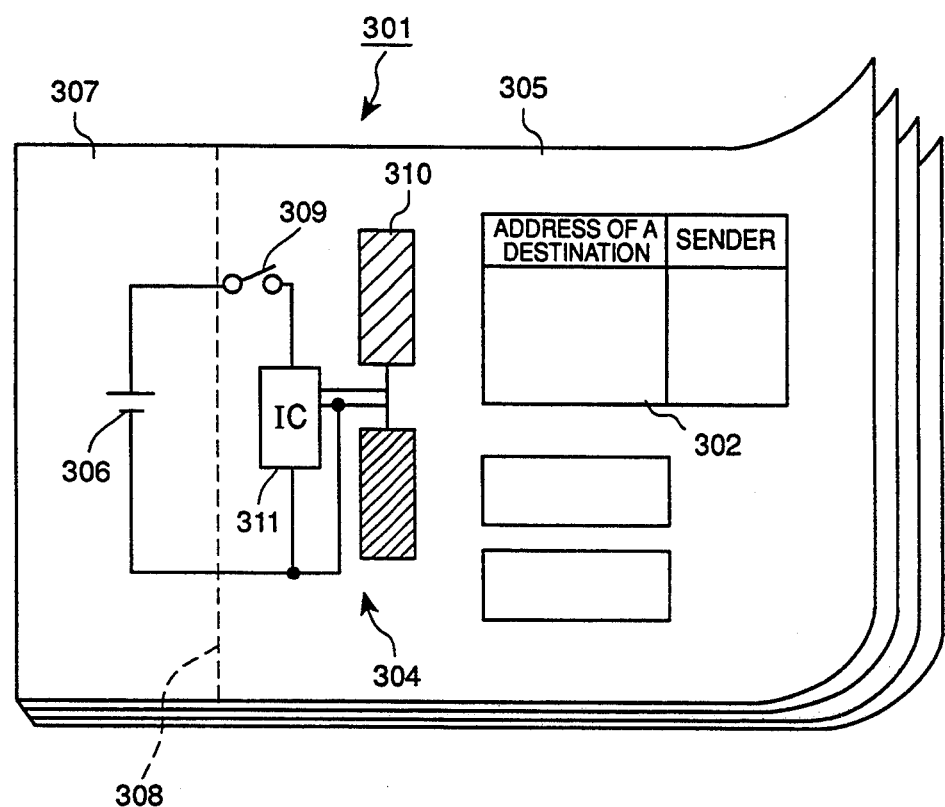
FIG. 49 is a diagram showing a simplified configuration of a home-delivery slip of the first embodiment of the electronic tag which takes the issuance of the electronic tag into consideration.

As shown in FIG. 49, a home-delivery slip 301 is configured to comprise two main portions: a slip form 305 and a power supply 307. The slip form 305 includes a hand-written entry blank 302 and is equipped with a responding circuit 304. On the other hand, the power supply 307 incorporates a battery 306. The slip form 305 and the power supply 307 are separated from each other by a seam 308. A switch 309 for electrically connecting and disconnecting the battery 306 to and from the responding circuit 304 is provided on the side of the slip form 305 in close proximity to the seam 308. The home-delivery slip 301 comprises a plurality of forms such as a sender copy, a delivery copy and a recipient copy bound together at their ends to form a bundle as shown in FIG. 49.

The hand-written entry blank 302 is filled up by hand by the sender with information such as the originator and destination and by the person in charge of delivery at the private parcel receiving center with data such as a freight and a sorting code representing a destination office.

A basic configuration of the responding circuit 304 comprises an antenna 310 for receiving and transmitting data and an IC 311 which includes control circuits and memory for storing delivery data. Data is entered into the IC 311 typically by a writer using a radio-wave technique. Data stored in the IC 311 includes a sorting code representing a delivery region and a telephone number. Such data is entered into the IC 311 when a parcel is received at the private parcel receiving center.

Figure 50:
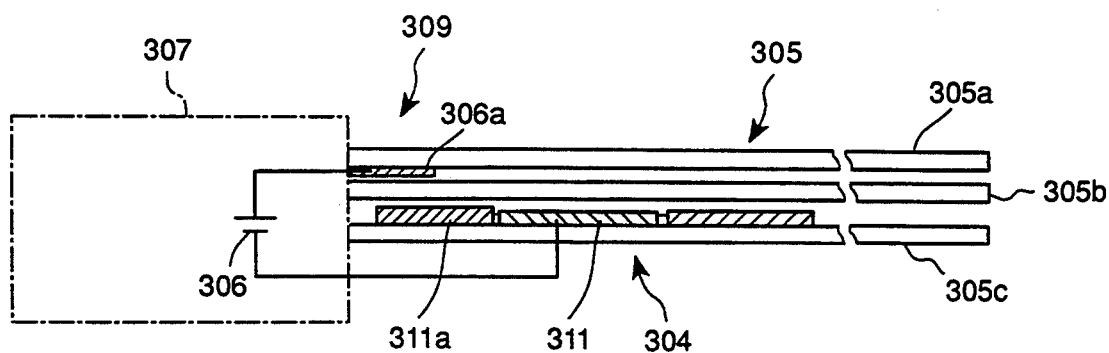
FIG. 50 is a diagram showing a cross section of a switch employed in the electronic tag providing for a technique for issuing the home-delivery slip shown in FIG. 49.

As shown in a cross-section diagram of FIG. 50, the switch 309 is configured to comprise a slip copy 305a for the private parcel receiving center, a slip copy 305c embedding the responding circuit 304 and a piece of insulating paper 305b sandwiched between the slip copies 305a and 305c. A power-supply conductor pattern 306a connected to the battery 306 is created on the lower surface of the slip copy 305a. On the other hand, an conductor pattern 311a connected to the IC 311 is created on the upper surface of the slip copy 305c. Accordingly, by peeling off the piece of insulating paper 305b at the private parcel receiving center, the switch can be turned on to connect both the conductor patterns 306a and 311a to each other. In this state, power is supplied to the responding circuit 304, allowing delivery data to be entered thereto.

Figure 51:
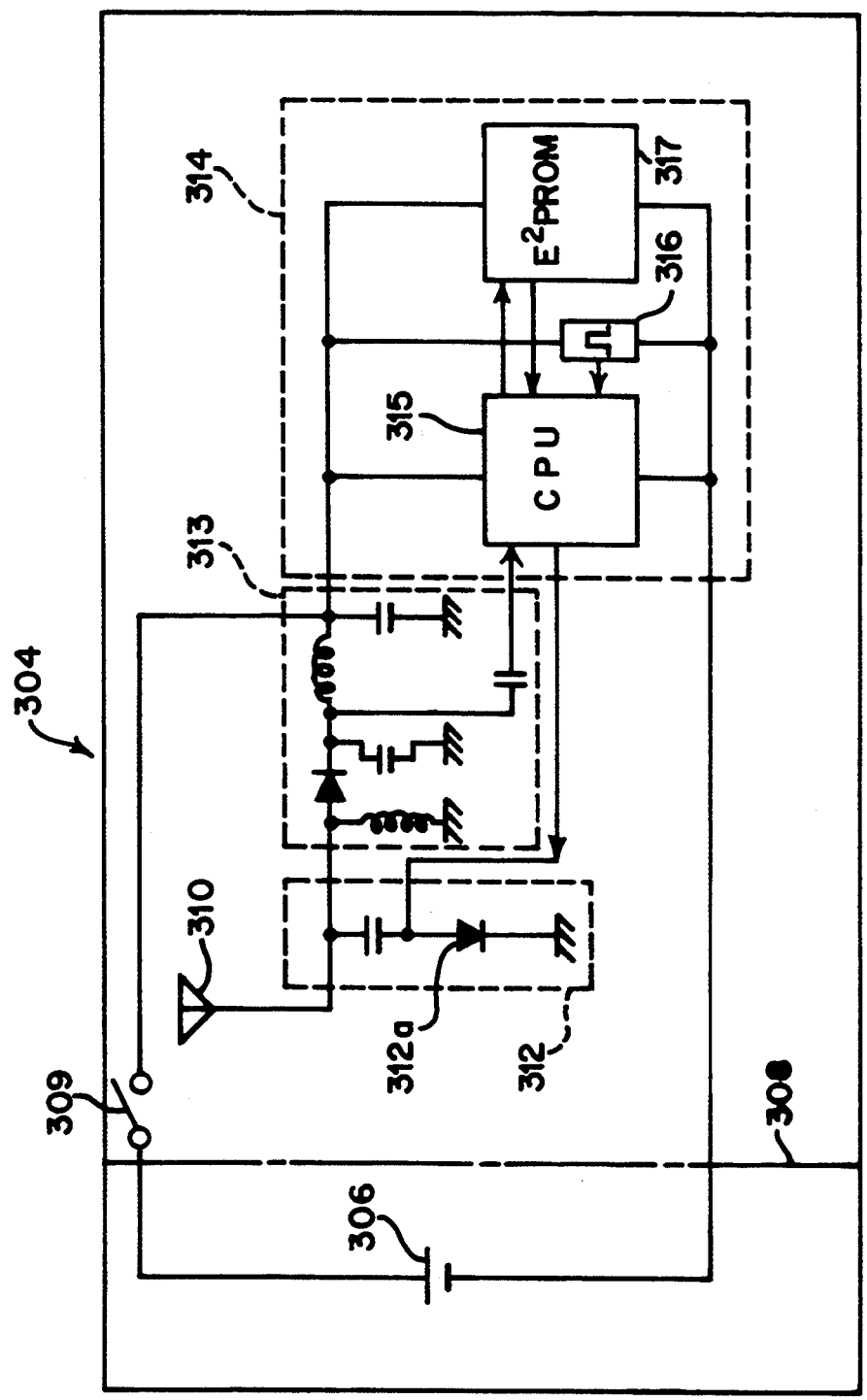
FIG. 51 is a circuit diagram showing an electrical configuration of a responding circuit of the above home-delivery slip.

Next, an electrical configuration of the responding circuit 304 is described by referring to FIG. 51.

As shown in the figure, the responding circuit 304 embeds an antenna 310, a modulator 312, a rectifier 313 and a response logic circuit 314 which comprises a CPU 315, a clock generator 316 and an EEPROM unit 317. The antenna 310 is used for receiving and transmitting data. The antenna 310 is also used for receiving power conveyed by incoming radio waves. The EEPROM unit 317 is used for storing a program to be executed by the CPU 315 and received data.

The principle of operation of the above responding circuit 304 is described as follows.

During sorting, a query signal is fetched from radio waves received by the antenna 310. If the query signal is a command inquiring data such as a destination, the CPU 315 executes a prestored program from the EEPROM unit 317, reading data therefrom. The CPU 315 then outputs a signal corresponding to the data to the modulator 312. The conductive/non-conductive state of a diode 312a incorporated in the modulator 312 changes depending upon the signal output by the CPU 315. As such, while the impedance of the modulator 312 is being varied, the data is transmitted through the antenna 310 as modulated waves.

As described above, the embodiment implements the home-delivery slip 301 in which the battery 306 and the responding circuit 304 are created with a circuit connecting the battery 306 and the responding circuit 304 to each other cut-off in advance. Not until delivery data is entered at the private parcel receiving center will the battery 306 be connected to the responding circuit 304. With the battery 306 connected to the responding circuit 304, data such as an assorment code can be entered. Accordingly, delivery data can be entered to the responding circuit 304 which receives power supplied by the stable battery 306, no matter how the home-delivery slip 301 is used at the private parcel receiving center.

After delivery data has been entered, the battery 306 is discarded by peeling it off along a seam 308. The home-delivery slip 301 can then be used as a conventional electronic tag without a power supply. Therefore, the battery 306 is only used for entering data at the beginning of the electronic tag usage. No power is consumed from the battery 306 until the electronic tag is put to use. In this way, the life of the electronic tag can be lengthened. In addition, the battery 306 can be designed into a compact configuration capable of functioning at an initial time at which data is entered.

In addition, since the battery 306 is left at the private parcel receiving center, it can be collected with ease, thus, solving the garbage problem.

As an alternative means for starting the supply of power by the battery, a sleep mode of the CPU can also be utilized as well. In this case, a high-level voltage is supplied to a sleep pin by removing a grounded conductor pattern.

The following is description of a second embodiment which implements the electronic tag provided with a technique for issuing the electronic tag. The embodiment implements a series of home-delivery slips into a contiguous piece of paper. After a variety of information has been filled in to a piece of home-delivery slip, it is torn off from the contiguous paper. In this way, the work to issue home-delivery slips can be easily done even if a large number of parcels need to be sent to different destinations.

Figure 52:
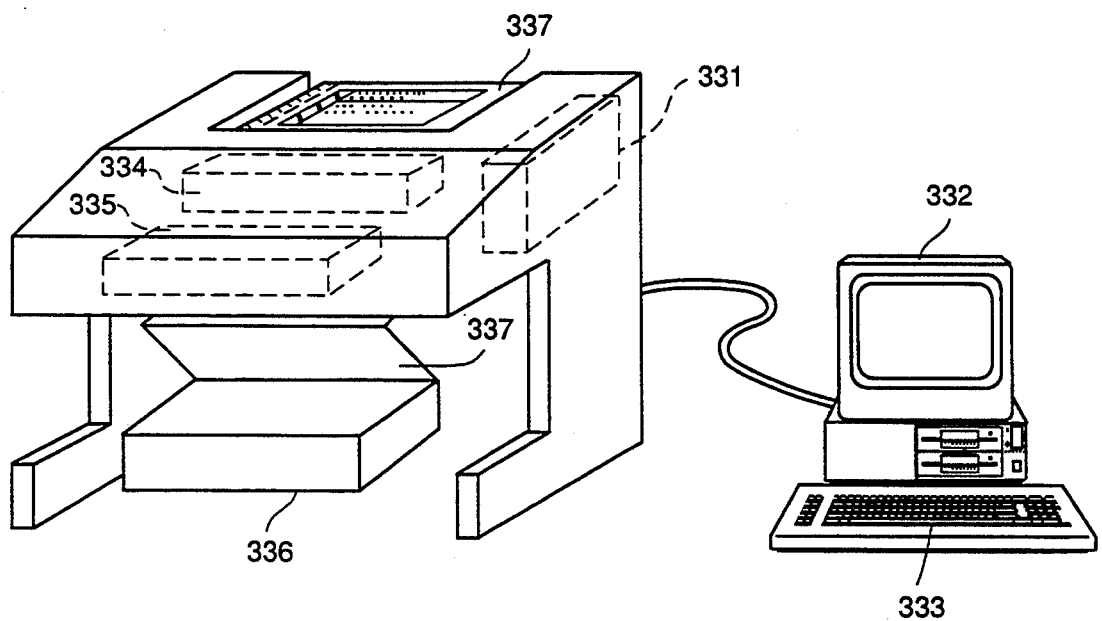
FIG. 52 is a diagram showing a perspective view of issuing apparatus providing for a technique for issuing a second embodiment of the electronic tag for home-delivery slips.
Figure 53:
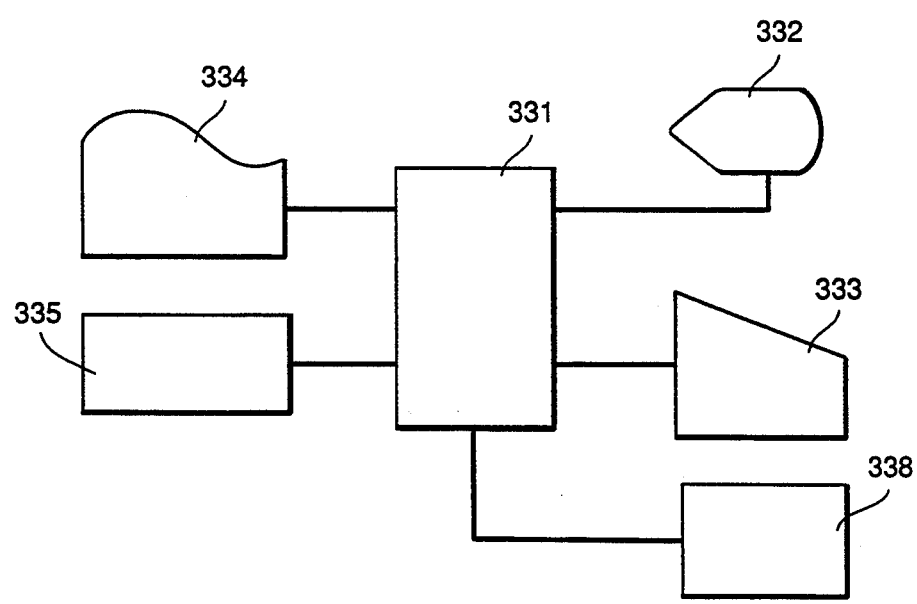
FIG. 53 is a block diagram of the issuing apparatus shown in FIG. 52.

FIGS. 52 and 53 shows a slip-issuing apparatus comprising a computer 331, a display unit 332, an input unit 333, an auxiliary storage unit 338, a printer 334 and an interrogator 333. A series of home-delivery slips to be issued by the slip issuing apparatus form a contiguous piece of slip paper 336. The auxiliary storage unit 338, one of the components in the configuration of the slip issuing apparatus, includes a reader/writer of a storage medium like a floppy disk or a memory card for storing data such as names of places and phone numbers. The printer 334 feeds the slip paper 336 along a predetermined path, printing predetermined items such as addressees onto entry blanks on the slip paper 336 using a printing mechanism which is provided on the path. An ordinary printer is used. A detailed configuration of interrogator 333 will be described later.

Next, the slip paper 336 is described.

Figure 54A:
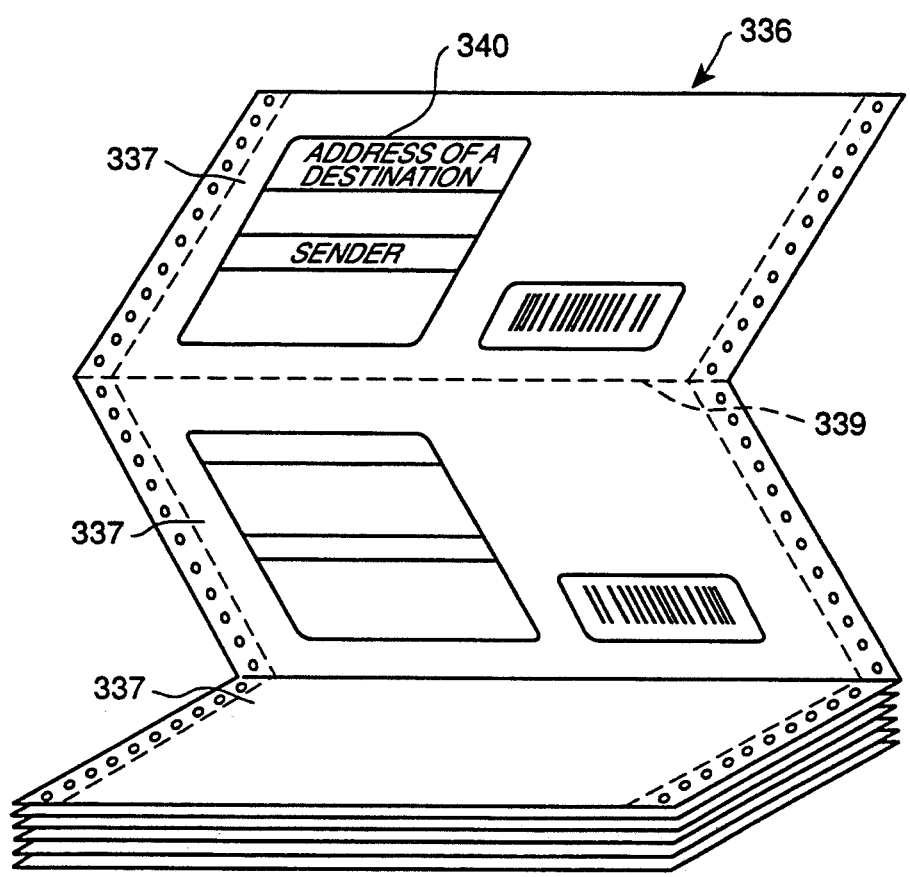
FIGS. 54(A) and 54(B) are diagrams showing a perspective view of slips of the embodiment shown in FIG. 52.
Figure 54B:
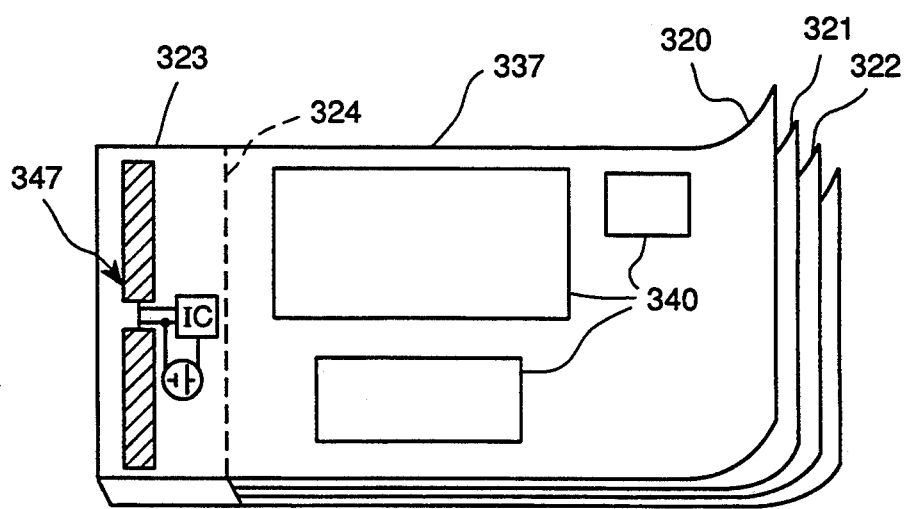

As shown in FIG. 54(A), the slip paper 336 forms a series of home-delivery slips 337 which are provided with seams 339 on the borders between two adjacent ones. A home-delivery slip 337 shown in FIG. 54(B) comprises, among other sheets, a sender copy 320 provided with an entry blank 340, a delivery slip copy 321 to be collected at delivery and a recipient copy which are bound by a binder 323 to form a bundled configuration. A seam 324 is formed in close proximity to the binder 323 for tearing off each of the slip copies. The binder 323 includes an embedded responding circuit 347.

Next, the principle of operation of the slip issuing apparatus mentioned above is described.

Figure 57:
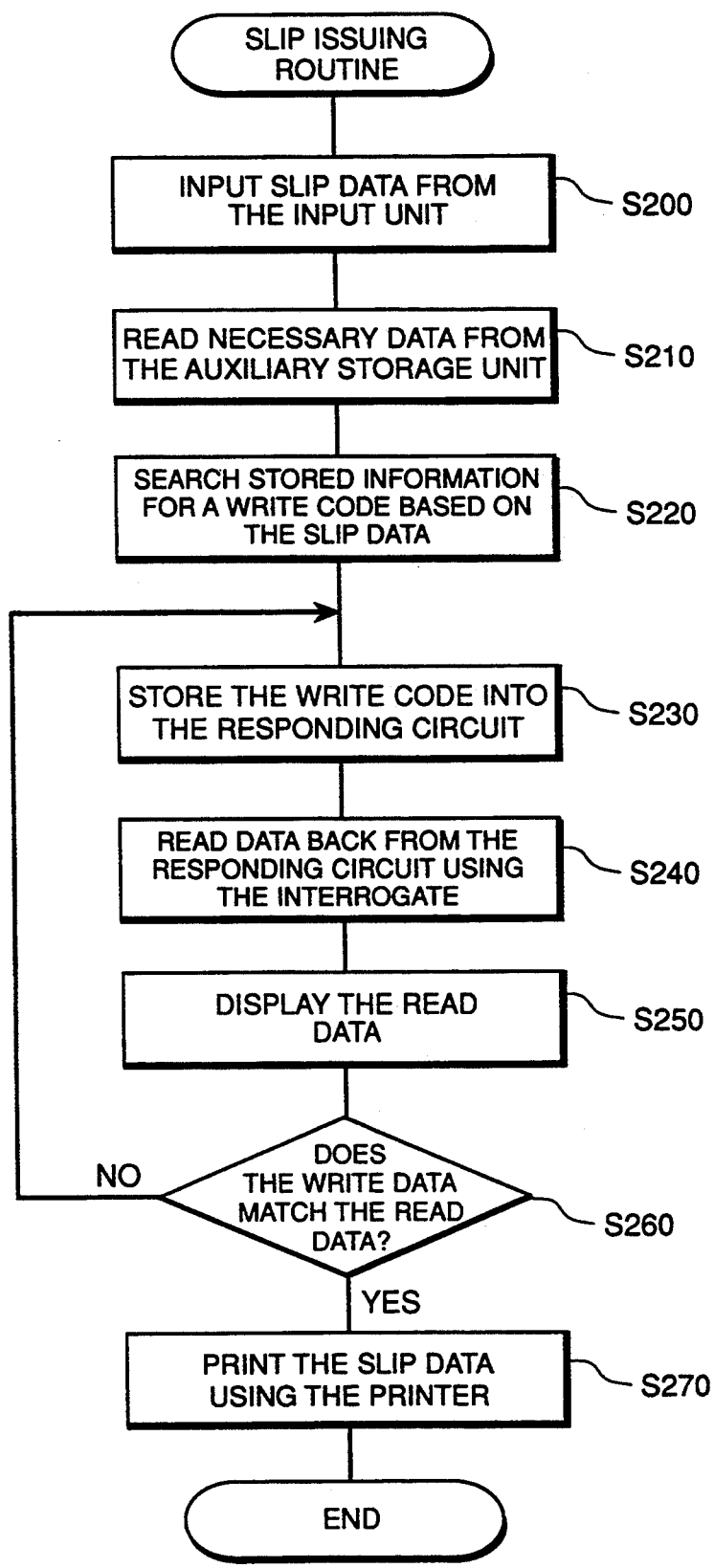
FIG. 57 is a flowchart of a slip issuing routine executed by the CPU of a computer incorporated in the slip issuing apparatus shown in FIG. 52.

The CPU employed by the computer 331 of the slip issuing apparatus executes a slip issuing routine shown in FIG. 57 in order to issue home-delivery slips.

Figure 55:
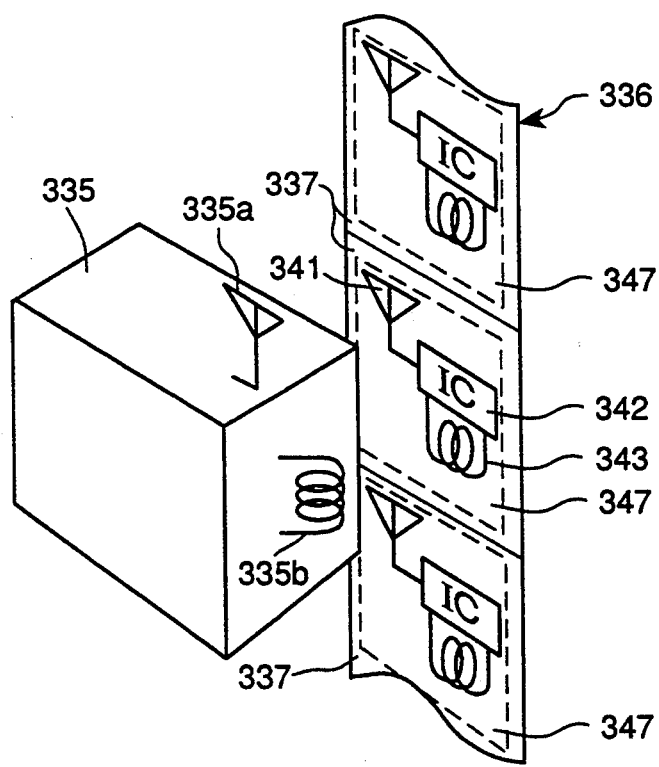
FIG. 55 is a diagram showing a perspective view of the layout of the slip papers and an interrogator used in conjunction with the embodiment shown in FIG. 52.

The slip paper 336 and the interrogator 335 are postured into an arrangement shown in FIG. 55. With this arrangement, the CPU employed by the computer 331 of the slip issuing apparatus executes the slip issuing routine. First, the CPU reads slip data input by the input unit 333 at Step S200 of FIG. 57. The slip data includes information on an addressee and a key for searching a data base which is already stored in advance in the auxiliary storage unit 338.

Subsequently, at Step S210, information necessary for the slip issuing processing is read from the auxiliary storage unit 338 and set as internal information. The information read from the auxiliary storage unit 338 corresponds to the slip data. Examples of the information include a set of data associated with a predetermined region and a predetermined field. Then, at Step S220, the internal information is searched for write codes for the slip data. The write codes include data necessary for the management of the parcel by the computer 331. The write codes include a destination code and a specific code identifying a region to be used for automatic sorting of the parcel.

Next, at Step S230, a write-processing subroutine is executed to write the write code into the responding circuit 347 of the slip 337. As the write operation is completed, the interrogator 335 reads data from the responding circuit at Step S240. At Step S250, the read data is output to the display unit 332 in order to verify that the data has been written correctly.

At Step S260, the read data is checked against the written data. If they do not match each others the operations executed at Step S230 to S250 are repeated. Otherwise, the processing flow continues to Step S270 at which the slip data is printed by the printer 334 onto the entry blank 340 on the slip 337.

Next, the write-processing subroutine executed at Step S230 is described.

Figure 58:
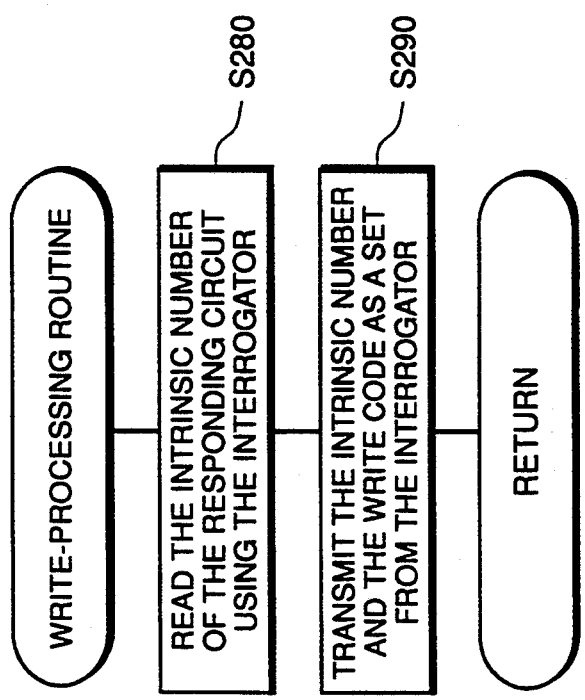
FIG. 58 is a flowchart showing detailed operations of a write subroutine invoked by the slip issuing routine shown in FIG. 57.

First, At Step S280 of FIG. 58, the CPU of the interrogator 335 reads the intrinsic number of the responding circuit 347. At Step S290, the read intrinsic number and the write code are transmitted from the interrogator 335 as a set. This is done to identify the responding circuit 347 of the slip 337 into which the data is to be written. In this way, the risk of writing the transmitted data into the responding circuit 347 of a slip 337 other than the intended one by mistake can be avoided.

As described above, the CPU employed by the computer 331 of the slip issuing apparatus executes the slip issuing routine, controlling the interrogator 335, the printer 334 and the display unit 332. In this way, data can be written correctly into the responding circuit 347 of a predetermined slip 337 of the slip paper 336. In addition, characters or notations such as a bar code representing the data written in the responding circuit 347 are printed onto the entry blank 340 of the slip 337 in which the responding circuit 347 is embedded. After the slip issuing process is completed, each slip is torn off from the slip paper 336 along a seam 339 and affixed to a parcel.

Next, the principles of operation of the interrogator 335 which is controlled by the computer 331 and the responding circuit 347 are described.

Figure 59:
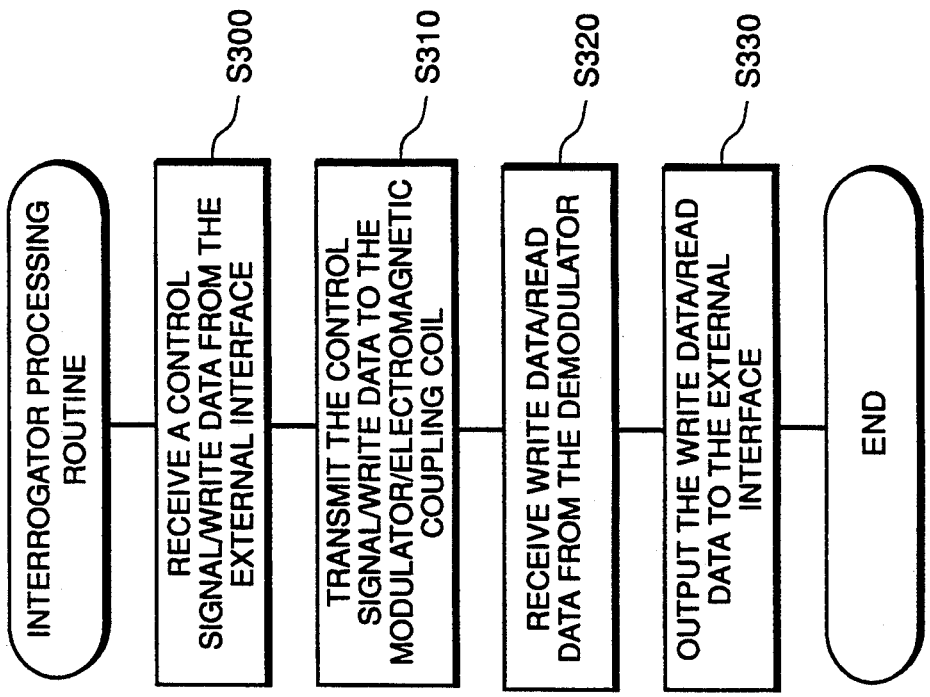
FIG. 59 is a flowchart of an interrogating routine executed by the CPU of the interrogator incorporated in the slip issuing apparatus.
Figure 60:
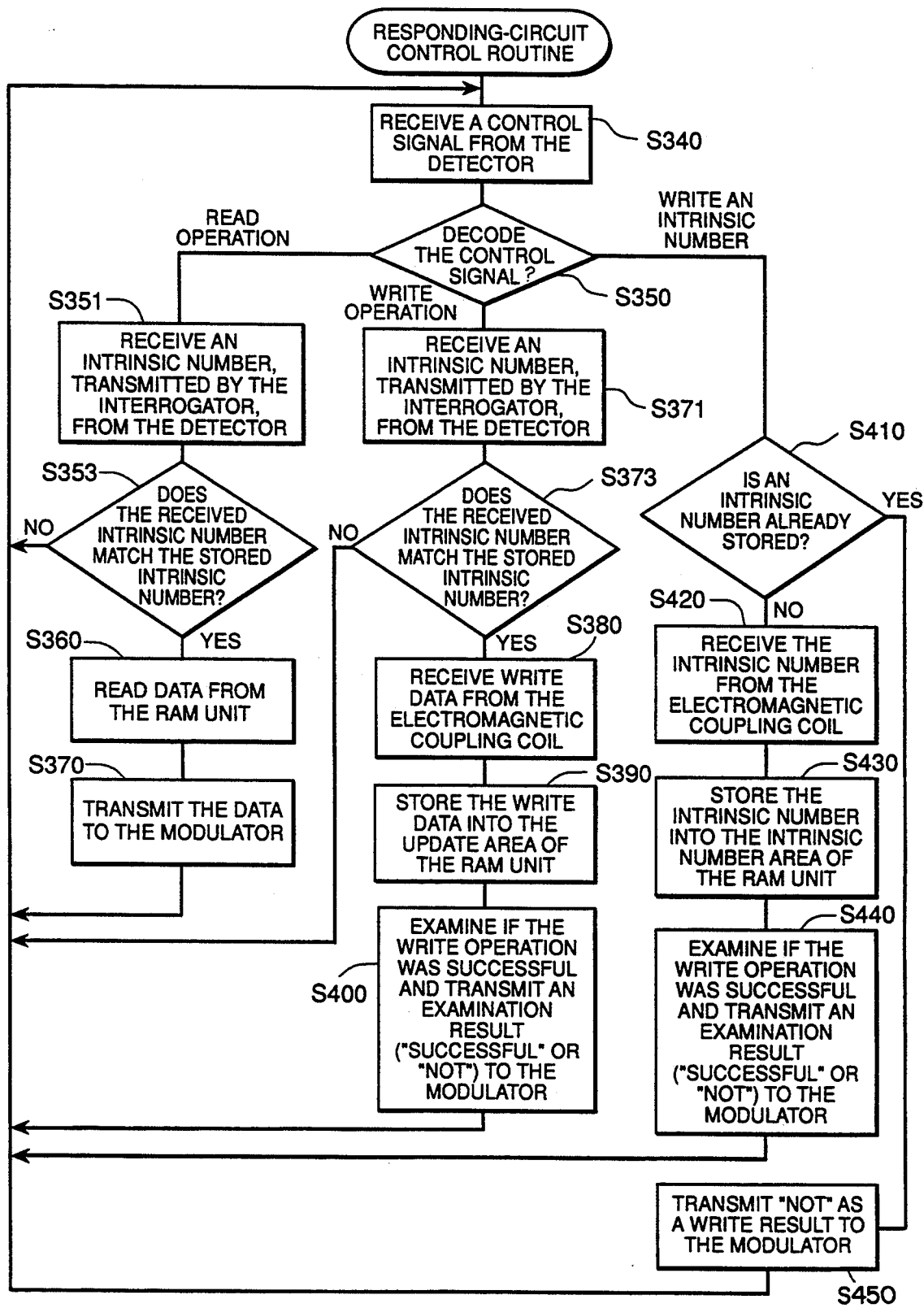
FIG. 60 is a flowchart of a write subroutine executed by the CPU of a responding circuit incorporated in the home-delivery slip.

FIGS. 59 and 60 show routines executed by the interrogator 335 and the responding circuit 347 respectively. When operations to read and write data are requested during the execution of the write processing subroutine of the slip issuing routine described above, the CPU of the interrogator 335 executes the interrogator processing routine shown in FIG. 59.

Figure 61:
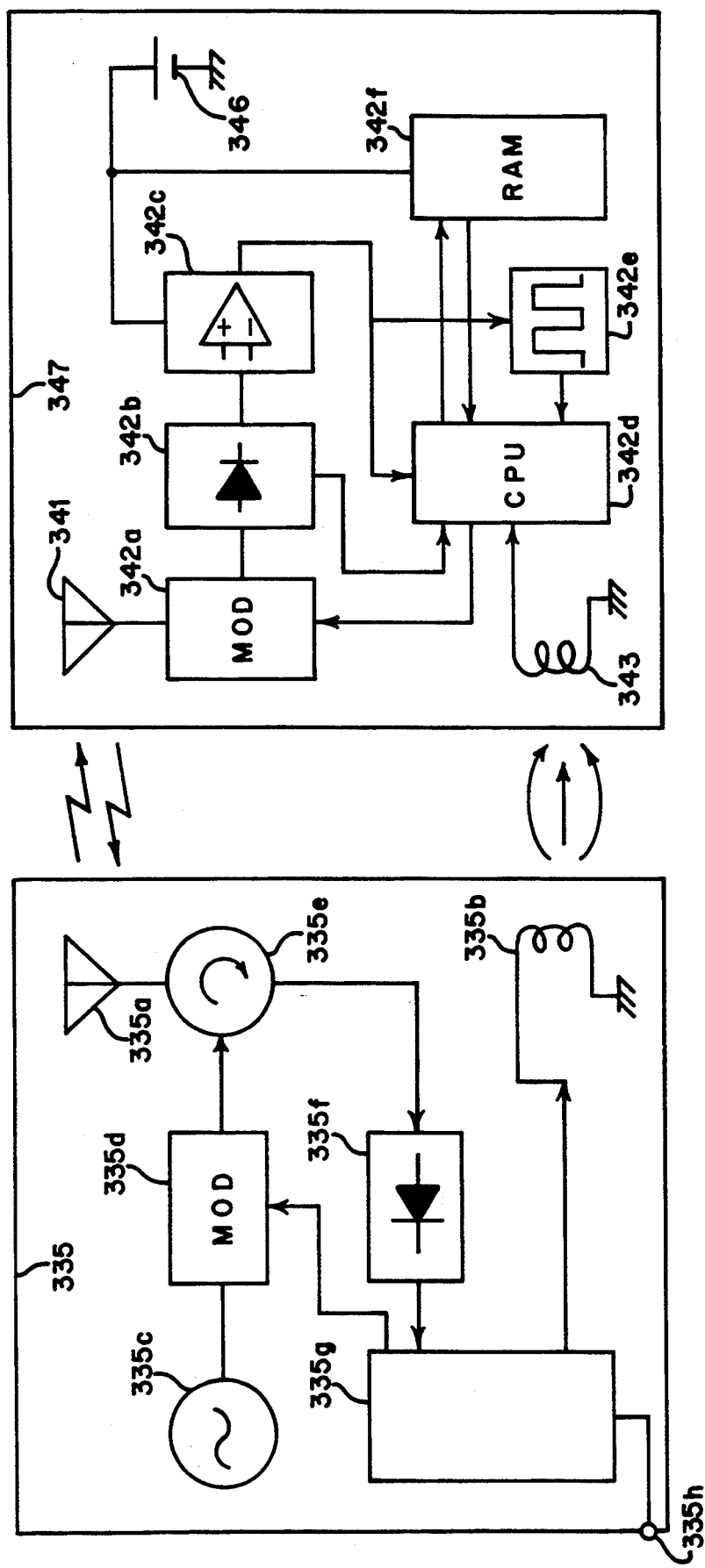
FIG. 61 is a diagram showing skeleton configurations of the interrogator and the responding circuit.

First, at Step S300, the CPU of a signal processing unit 335g shown in FIG. 61 reads a control signal or write data, which was transmitted by the computer 331 of the slip issuing apparatus, from an external-interface unit 335h. Next, at Step S310, a control signal and write data are output to a modulator 335d and an electromagnetic coupling coil 335b respectively. And for getting the CPU 342d of the responding circuit 347 to be operated, when write data is output to the electromagnetic coupling coil 335b, the modulator 335d modulates carrier waves made by carrier oscillator 335c to transmission radio waves based by transmitted control signals.

Then the transmission radio waves superimposing control signals are sent to a circulator 335e, and transmission radio waves are also transmitted by a receiving/transmitting antenna 335a at the same time.

Subsequently, at Step S320, a write result or read data, which was received from the responding circuit 347, is input from the demodulator 335f. The write result or read data is then output to the external-interface unit 335h at Step S330. The data output to the external-interface unit 335h is used during processings executed by the computer 331 of the slip issuing apparatus at Step S350 and S360 of the slip issuing routine.

Next, operations carried out by the responding circuit 347 of the slip 337 in response to a signal received from the interrogator 335 are described.

As shown in FIG. 61, when the responding circuit 347 receives a query signal transmitted by the interrogator 335 through an antenna 341 and the output signal voltage of the detector 342h is higher than standard level voltage compared by the level comparator 342c, a battery 346 is connected to a CPU 342d and a clock generator 342e. Not until the receipt of such a query signal will the battery 346 connected to the CPU 342d and the clock generator 342e. Upon receiving power from the battery 346, the CPU 342d starts to operate, executing a responding-circuit control routine of FIG. 60 stored in a RAM unit 342f.

At Step S340, the beginning of the responding-circuit control routine, the CPU 342d, first of all, reads a control signal (the query signal cited above) from a detector 342b. Then, at Step S350, the control signal is decoded in order to carry out subsequent processing.

If the control signal is decoded to be a read request, the processing flow continues to Step S351 at which an intrinsic number transmitted by the interrogator 335 is read from the detector 342b. At Step S353, the intrinsic number fetched from the detector 342b is compared to an embedded intrinsic number. Only if they match each other, does the processing flow continue to Step S360 at which data requested by the control signal is read from the memory unit 342f. Then, at Step S370, the data is output to a modulator 342a. The data including the intrinsic number is transmitted through the antenna 341. The intrinsic number transmitted as such is utilized in the write processing subroutine described above.

If the control signal is found to be a write request, the processing flow continues to Step S371 at which an intrinsic number transmitted by the interrogator 335 is read from the detector 342b. At Step S373, the intrinsic number read from the detector 342b is compared to the embedded intrinsic number. Only if both the numbers match each other, does the processing flow continue to Step S380 at which data to be written, a write code in this case, is read from the electromagnetic coupling coil 343. Then, at Step S390, the data is written into an update area in the memory unit 342f. Subsequently, at Step S400, the operation carried out at Step S390 is examined to check if the data has been written correctly. A result of the examination, that is, whether the write operation has been "successful" or "not" is transmitted to the modulator 342a. The data written as such is used by the computer for administering the destination and the like of the parcel. In this way, data such as the destination of a parcel is written into the memory unit 342f when the responding circuit 347 carries out the operations at Steps S380 and S390.

If the control signal is found to be a request to write an intrinsic number, on the other hand, the processing flow continues to Step S410. It should be noted that a request to write an intrinsic number is by no means received from the interrogator 335 of the slip issuing apparatus, but from another interrogator at the time the responding circuit 347 is manufactured at a factory. The other interrogator has the same configuration as the interrogator 335. A request to write an intrinsic number is issued during preprocessing of a slip.

At Step S410, the responding circuit 347 checks to see whether the intrinsic number has been set or not. If not set yet, the processing flow continues to Step S420 at which the instruction number requested by the control signal is read from the electromagnetic coupling coil 343. Then, at Step S430, the intrinsic number is written into a specific area for it in the memory unit 342f. Afterwards, at Step S440, the operation carried out at Step S430 is examined to check if the data has been written correctly. A result of the examination, that is, whether the write operation has been "successful" or "not" is transmitted to the modulator 342a. If, at Step S410, the intrinsic number is found to have been set, the processing flow continues to Step S450 at which the examination result "not" is transmitted to the modulator 342 as a write result.

The processings carried out at Steps S410 to S450 set an intrinsic number in an individual responding circuit 347. The intrinsic number is used for distinguishing its responding circuit 347 from others during the process of issuing a slip 337 in which the responding circuit 347 is embedded.

Using the slip issuing apparatus for the home-delivery slip 337 described above, by merely entering necessary data via its input unit 333, a predetermined slip 337 of the paper slip 336 can be issued with the data correctly written into the responding circuit 347 embedded in the predetermined slip 337 and information, which corresponds to the data, printed on the entry blank 340 of the same slip 337. As a result, the work to issue a slip 337 can be done very easily.

Figure 56:
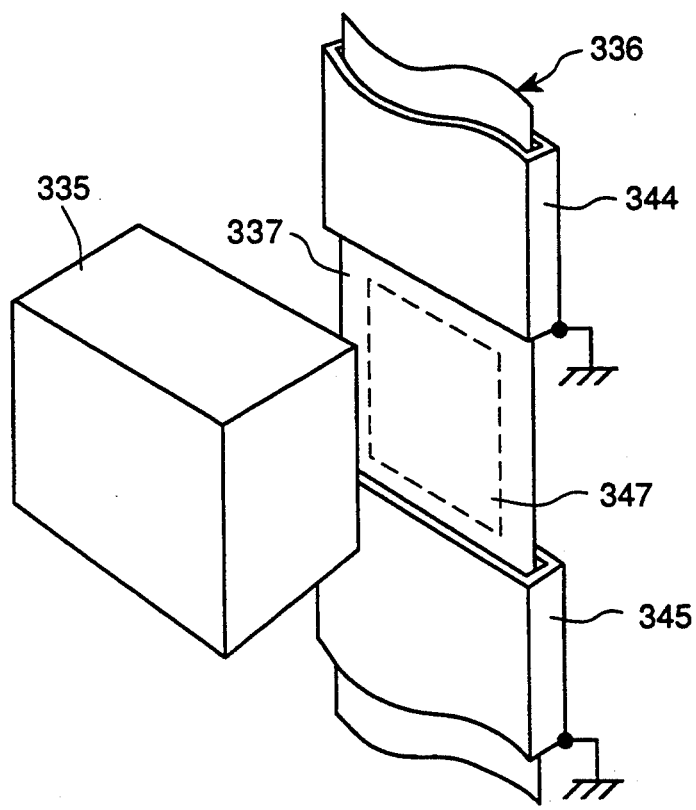
FIG. 56 is a diagram showing a perspective view of the layout of the slip papers and an interrogator used in conjunction with another embodiment.

In addition, shown in FIG. 56, the slips 337 of the slip paper 336 before and after the one exposed to the interrogator 335 are covered by electromagnetic shields 344 and 345 respectively in order to prevent the preceding and succeeding responding circuits 347 from receiving radio waves transmitted by the interrogator 335. Moreover, each responding circuit 347 is assigned an intrinsic number for distinguishing it from others while writing data thereto so that all responding circuits 347 except the one being used as a target of the write operation do not respond to the interrogator 335. Accordingly, the slip issuing technique has an advantage that data written into a responding circuit 347 undoubtedly corresponds to information printed onto the entry blank 340 of the slip 337 in which the responding circuit 347 is embedded.

Next, embodiments other than the second one described above are briefly explained as follows. In the case of a series of slips 337, since their responding circuits 347 are adjacent to each other as shown in FIG. 55, there is a possibility that data will be inadvertently written into a responding circuit 347 other than the intended target. As a means for preventing such incorrect writing of data from occurring, electromagnetic shields 344 and 345 are installed as shown in FIG. 56. The electromagnetic shields 344 and 345 protect responding circuits 347 adjacent to the one both on a series of slips 337, to which data is being written, against radio waves transmitted by the interrogator 335. Other alternatives include a technique of utilizing electromagnetic coupling with a narrow communication area through which radio waves pass during a write operation, a technique of enlarging the gap between two adjacent responding circuit 347 to a size large enough to prevent incorrect writing of data from occurring, a technique of using a contacting write terminal and a technique of weakening a write signal output by the interrogator 335 to a magnitude small enough so as to limit the writing area to the target responding circuit 347 only. And the responding circuits 178 shown in FIG. 30 can also be issued by the slip issuing machine 180 shown in FIG. 31.

E. Collection of Electronic Tags

The following is description of embodiments of the electronic tag which take techniques for collecting the home-delivery slip into consideration.

Figure 62:
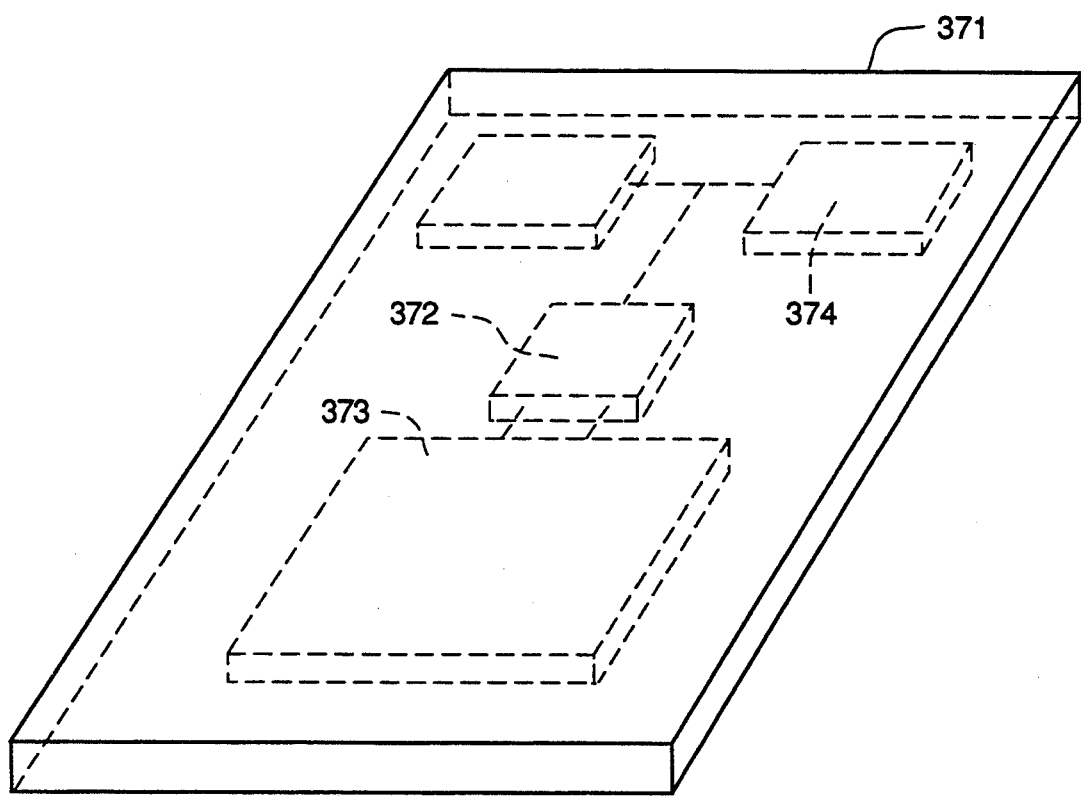
FIG. 62 is a diagram showing a perspective view of a responding circuit of the electronic tag providing for a technique for collecting home-delivery slips.

An embodiment, which implements a home-delivery slip comprising, among other sheets, a sender slip copy, a delivery slip copy and a recipient slip copy, has a responding circuit 371 fixed on the lower surface of the delivery slip copy. The responding circuit 371 embeds, among other components, an IC 372, a battery 373 and an antenna 374 which are laid out into a configuration shown in FIG. 62. The configulation of the responding circuit is similar to that configured in FIG. 2.

The home-delivery slip with the configuration described above is used as follows.

First of all, its hand-written blank is filled up with information on the sender, recipient and so on and the same data as the information filled in is written into memory of the responding circuit 371. The home-delivery slip is then attached to a parcel. Subsequently, while the parcel with the home-delivery slip attached thereon is being conveyed by a sorting line conveyer, slip reader/writer installed at several places along the line conveyer receive information on the destination and the like from the responding circuit 371. As such, the destination of the parcel is identified by using a non-contacting means. That is one which is not in physical contact with the parcel. In this way, the parcel undergoes automatic sorting by region based on the identified destination.

As the parcel is delivered to the recipient, the delivery person requests the recipient to put a signature of acceptance to the delivery slip copy, one of the copy sheets of the home-delivery slip. The delivery slip copy is then torn off for collection. The responding circuit 371 embedded in the delivery slip is collected as well. Accordingly, when the box of a parcel which has been used once is recycled, the box no longer bears a responding circuit 371 since it has already been collected along with the delivery slip copy of the used home-delivery slip, and therefore a new responding circuit 371 of a new home-delivery slip will function. This prevents malfunction during the automatic sorting process.

In the home-delivery slip described above, the responding circuit 371 is embedded in the delivery slip copy to be collected at the end of the delivery. Thus, the responding circuit 371 is always collected along with the delivery slip copy. As a result, the responding circuit 371 can be collected very easily and the collection of the responding circuit 371 prevents malfunctions from occurring. In addition, since the responding circuit 371 is always collected along with the delivery slip copy, the battery 373 and other electronic components can be disposed through a predetermined safe process.

Moreover, since the responding circuit 371 is formed into a card, it can be easily affixed to or peeled off from the delivery slip copy. Such a design has an advantage that the responding circuit 371 can be easily reutilized. Furthermore, the circuit is accommodated in a resin-mold card which gives another advantage of preventing the circuit from being damaged.

Another embodiment is suitable for a delivery system in which the responding circuit is used only during the automatic sorting process and not needed in processings other than the automatic sorting process. The embodiment used in such a delivery system is designed into a configuration with a responding circuit embedded in a sheet of the electronic tag which is torn off at the end of the automatic sorting process.

F. Disposition of Electronic Tags

The following is description of embodiments implementing the electronic tag with techniques for disposing the electronic tag taken into consideration.

Figure 63:
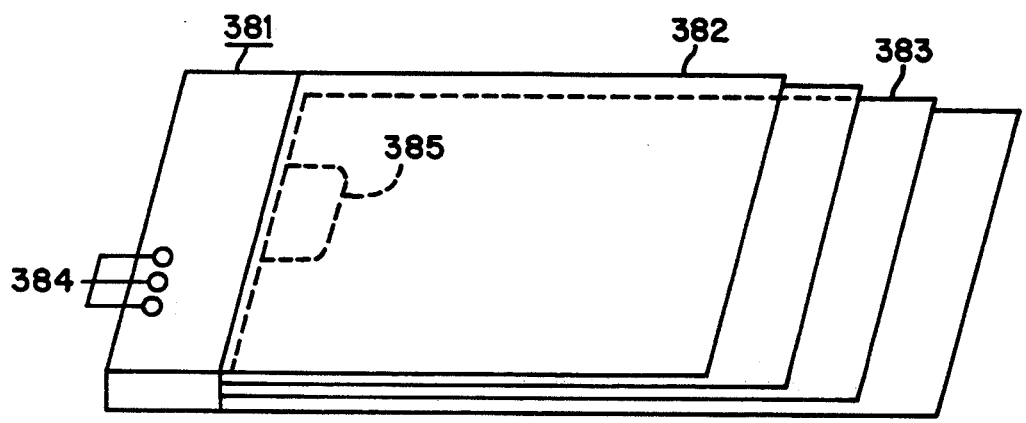
FIG. 63 shows a perspective of a skeleton configuration of a first embodiment of an electronic tag providing for a technique for disposing home-delivery slips.

FIG. 63 shows an embodiment implementing the electronic tag having a configuration comprising a pile of slip sheets 382 and a responding circuit which together form a bundle. The slip sheets 382 include a sender copy, a delivery copy 383 and a recipient copy which each have a seam in close proximity to the responding circuit 381. Data write terminals 384 are provided on the upper surface of the responding circuit 381. A power-supply connection wire 385 of the responding circuit 381 is extended to the outside of the responding circuit 381 across the seam over the lower surface of the delivery copy 383.

Figure 64:
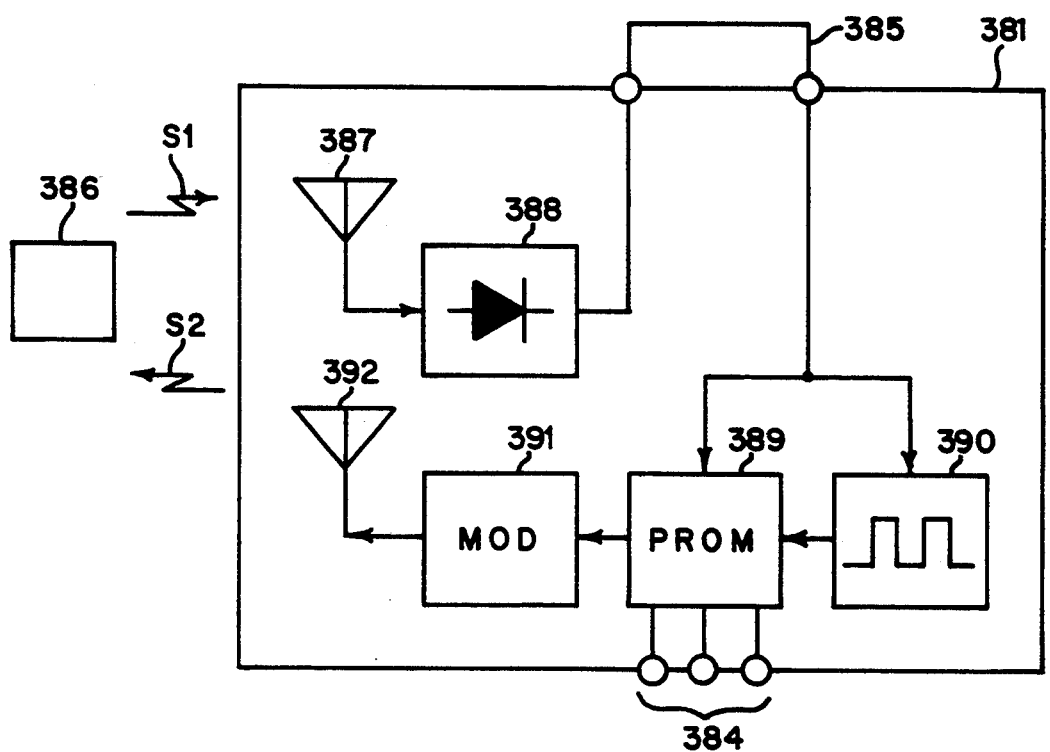
FIG. 64 is a block diagram of a circuit configuration of a responding circuit employed in the electronic tag providing for a technique for disposing home-delivery slips shown in FIG. 63.

As shown in FIG. 64, the responding circuit 381 is configured to comprise a receiving antenna 387, a detector 388, a memory unit 389, a clock generator 390, a modulator 391 and a transmitting antenna 392. The power-supply connection wire 385 connects the detector 388 to the memory unit 389 and the clock generator 390. The detector 388 is driven by power conveyed by incoming electromagnetic waves through the receiving antenna 387. Typically, non-volatile PROMs are used as the memory unit 389. Data to be written into the memory unit 389 is entered through the data write terminals 384. It should be noted, however, that if data stored in the memory unit 389 needs sometimes to be updated, electrically rewritable EEPROMs (Electrically Erasable PROMs) are used as the memory unit 389. The memory unit 389 outputs data in synchronization with a clock signal generated by the clock generator 390. The modulator 391 modulates the electromagnetic waves with data output by the memory unit 389, sending the modulated waves to the transmitting antenna 392 for transmission to an interrogator 386.

The responding circuit 381 described above receives a query signal S1 transmitted by the interrogator 386 through the receiving antenna 387. The interrogator 386 is typically installed on an automatic sorting line. The query signal S1 received as such is converted into a direct-current power supply by the detector 388. The direct-current power supply drives the memory unit 389 and the clock generator 390 through the power-supply connection wire 385. Driven by the direct-current power supply, the memory unit 389 outputs data stored therein in advance in synchronization with the clock signal generated by the clock generator 390 as described above. The data output by the memory unit 389 is used to vary the conductibility of a diode employed in the modulator 391 and, thus, the impedance thereof. The variation of the impedance, in turn, modulates the signal S1 received from the interrogator 386, reflecting the data as a response signal S2 to the interrogator 386 through the transmitting antenna 392. Any conventional varactor diode or the like may be used for this purpose.

The home-delivery slip with the configuration described above is used as follows.

First, the slip 382 is filled up with information on the sender, recipient and the like and the same data as the information is written into the memory unit 389 of the responding circuit 381 via the data write terminals 384. The home-delivery slip is then affixed to a parcel. Subsequently, while the parcel with the home-delivery slip affixed thereon is being conveyed by a sorting line conveyer, the interrogators 386 installed at several places along the line conveyer receive information on the destination and the like from the responding circuit 371. As such, the destination of the parcel is identified by using a non-contacting means. In this way, the parcel undergoes automatic sorting by region based on the identified destination.

As the parcel is delivered to the recipient, the delivery man requests the recipient to put a signature of acceptance to the delivery copy 383, one of the copy sheets of the home-delivery slip. The delivery copy 383 is then torn off for collection. Since the power-supply connection wire 385 of the responding circuit 381 is embedded in the delivery copy 383, it is also removed along with the delivery copy 383. With the power-supply connection wire 385 removed, the memory unit 389 and the clock generator 390 of the responding circuit 381 are disconnected from the direct-current power supply. This results in the responding circuit 381 does not work anymore.

With the home-delivery slip described above, there may be cases in which it is desired to recycle a parcel box which was used before and still has a home-delivery slip affixed thereon as it is. In this case, since its responding circuit 381 is no longer functional, only the responding circuit 381 of a new home-delivery slip will work. As a result, the parcel can be automatically sorted without a malfunction and it is thus not necessary to collect the responding circuit 381 in order to prevent a malfunction from occurring.

In the embodiment described above, the PROM memory unit 389 is not provided on the side of the responding circuit 381 and no battery is embedded therein either. Accordingly, the embodiment has an advantage that its responding circuit 381 has a simple configuration.

In order to disable the function of the responding circuit 381, it is basically necessary to make the responding circuit 381 transmit no response signal S2. It can be done by removing the power-supply connection wire 385. In addition to the removal of the power-supply connection wire 385, one of the following configurations can also be implemented as a means for disposing the responding circuit 381.

The responding circuit 381 is configured so that the creation of power supply out off the query signal S1 can be disabled. In this configuration, the wire connecting the receiving antenna 387 to the detector 388, the wire connecting the detector 388 to the PROM memory unit 389, the wire connecting the detector 388 to the clock generator 390, the wire connecting the PROM memory unit 389 to the modulator 391 or the wire connecting the modulator 391 to the transmitting antenna 392 is formed to stretch to the side of the delivery copy 383. As a design alternative, the responding circuit 381 is configured so that a functional block can be disabled by cutting an internal wire of the block. In this configuration, the internal wire of the detector 388, the clock generator 390 or the modulator 391 is formed to stretch to the side of the delivery copy 383. As another design alternative, the responding circuit 381 may be configured so that its receiving and transmitting functions can be disabled by removing some or all of the components. In this configuration, either the receiving antenna 387 or the transmitting antenna 392 is created to stretch to the side of the delivery copy 383.

Next, first modification examples of the first embodiment described above are explained.

Figure 65:
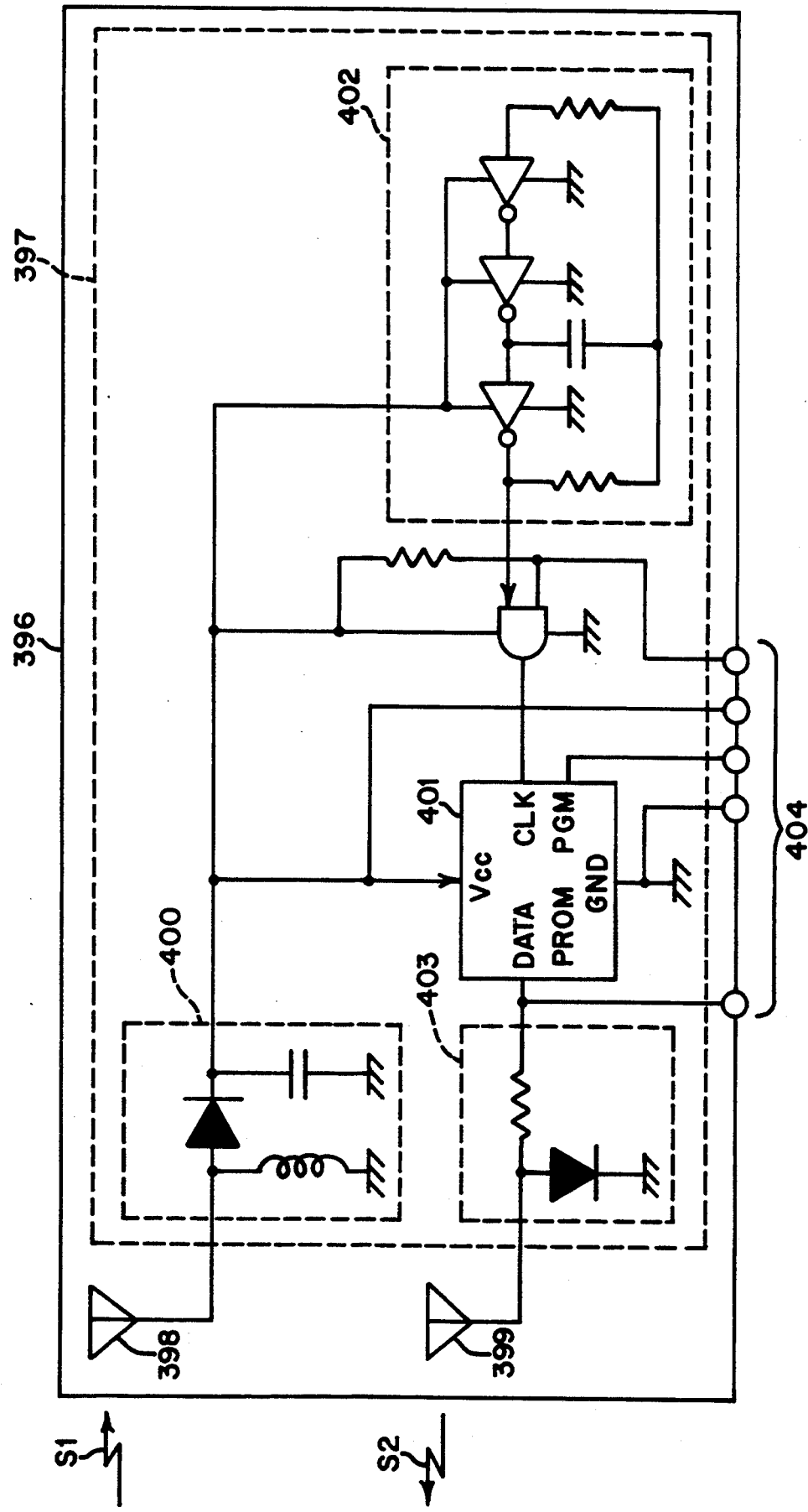
FIG. 65 is a circuit diagram of a configuration of a first modified example of the first embodiment shown in FIG. 63.

As shown in FIG. 65, a responding circuit 396 is configured to comprise an IC 397, a receiving antenna 398 and a transmitting antenna 399. The IC 397 is further configured to comprise a detector 400, a PROM unit 401, a clock generator 402 and a modulator 403. Data write terminals 404 are provided externally to the IC 397.

Figure 66A:
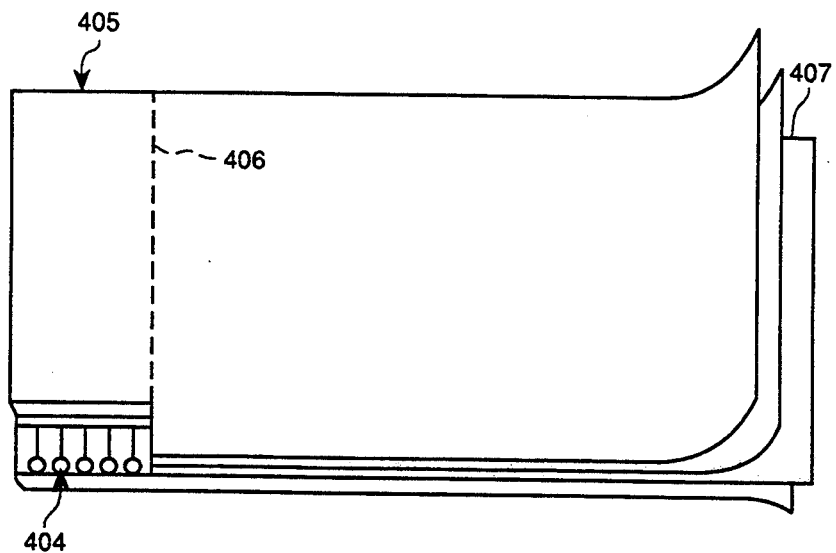
FIGS. 66(A)-66(C) are explanatory diagrams showing a skeleton configuration of the first modified example for home-delivery slips shown in FIG. 65.
Figure 66B:
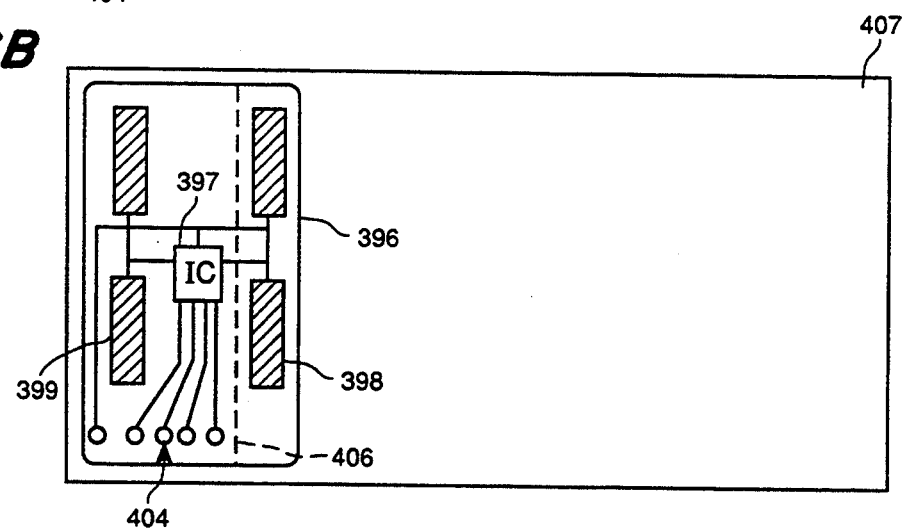
Figure 66C:
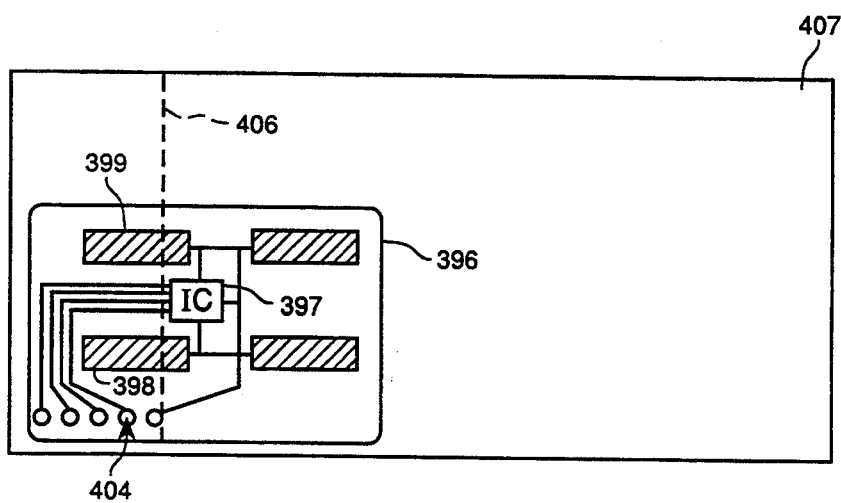

As shown in FIG. 66 (A), the responding circuit 386 is embedded in a delivery slip copy 407 which is to be torn off at the end of parcel delivery. A seam 406 is provided between a slip binder 405 and each copy sheet of the home-delivery slip. The data write terminals 404 which serve as input terminals are fixed at a location exposed to the lower part of the slip binder 405. Portions of the slip copies on the slip binder 405 which overlap the data write terminal 404 are cut off so as to make the data write terminals 404 more easily accessible.

As shown in FIGS. 66 (B) and (C), the responding circuit 396 is created in the delivery slip copy 407 on both sides of the seam 406. In an example shown in FIG. 66 (B), the receiving antenna 398 is formed on the side of the delivery slip copy 407 to be torn off. As an example shown in FIG. 66 (C), the receiving antenna 398, part of the transmitting antenna 399 and IC 397 are created on the side of the delivery slip copy 407 to be torn off. It should be noted that the entire transmitting antenna 399 can also be formed on the side of the delivery slip copy 407 to be torn off.

In a configuration other than those shown in FIG. 66 (B) and (C), one of internal wires of the IC 397 is pulled out to the outside of the IC 397 and stretched to the tear-away side of a delivery slip copy 407. In still another configuration, part or the entire of the receiving antenna 398 or the transmitting antenna 399 is formed on the tear-away side of the delivery slip copy 407 so that when this side is torn off, the receiving and transmitting capability of the responding circuit 396 is reduced to an inoperative level.

Also in the case of a home-delivery slip which is equipped with a responding circuit 396 with its aforementioned signal processing unit accommodated in the IC 397, the responding circuit 396 can be rendered inoperative by tearing off the delivery slip copy 407 at the end of delivery of a parcel as in the case of the embodiments described so far. Accordingly, a malfunction can be prevented from occurring.

Next, a second modification example of the first embodiment described above is explained.

Figure 68:
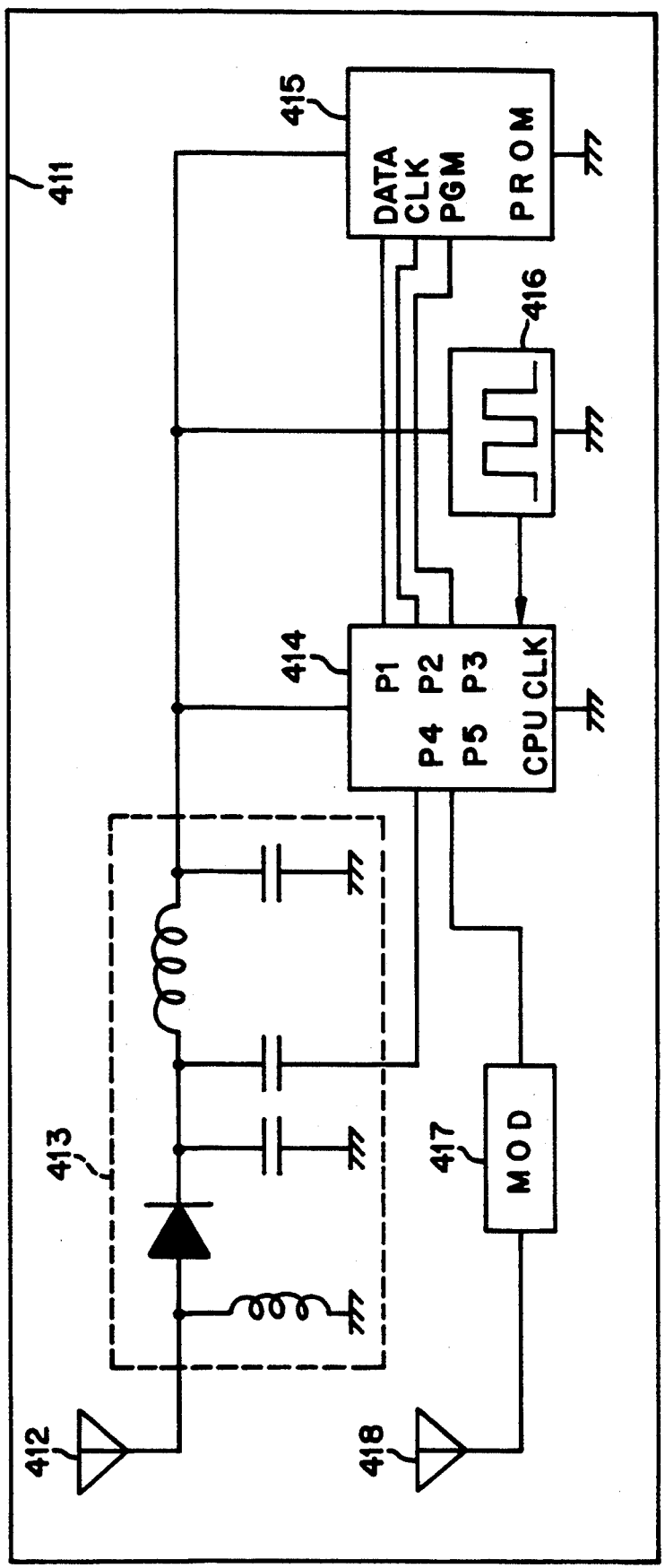
FIG. 68 is a circuit diagram of a configuration of a third modified example of the first embodiment shown in FIG. 63.

In the second modification example, no data write terminals are used. A responding circuit 411 implementing non-contact write operations with no data write terminals is explained by referring to FIG. 68.

Much like the responding circuits 396 used in the first modification examples described previously, the responding circuit 411 shown in FIG. 68 is formed in a delivery slip copy, crossing a seam. The responding circuit 411 is configured to comprise a receiving antenna 412, a detector 413, a CPU 414, a PROM unit 415, a clock generator 416, a modulator 417 and a transmitting antenna 418.

The detector 413 derives a direct-current power supply from electromagnetic waves received from an interrogator through the receiving antenna 412. The detector 413 also demodulates the electromagnetic waves, outputting the demodulated data to the CPU 414. The direct-current power supply is connected to the CPU 414, the PROM unit 415 and the clock generator 416. Driven by a clock signal from the clock generator 416, the CPU 414 operates, executing a program stored in advance in the PROM unit 415. The modulator 417 modulates the received electromagnetic waves with data output by the PROM unit 415, transmitting the modulated waves to the interrogator through the transmitting antenna 418.

On the other hand, data such as a destination is written into the PROM unit 415 as follows.

First, the responding circuit 411 receives a query signal transmitted by an interrogator 386 through the receiving antenna 412. The query signal received as such is converted by the detector 413 into a direct-current power supply which is used as an internal source of electric power. The direct-current power supply drives the CPU 414, the PROM unit 415 and the clock generator 416. Driven by the direct-current power supply, the CPU 414 executes a program stored in advance in the PROM unit 415 in synchronization with a clock signal output by the clock generator 416.

The received data is demodulated by the detector 413. If data output by the detector 413 is information on the destination or the like, it is stored into the PROM unit 415. If the data output by the detector 413 is a request for information on a destination or the like, however, the CPU 414 executes a program stored in advance in the PROM unit 415, reading the requested information from the PROM unit 415. The CPU 414 then outputs a signal, which represents the information, to the modulator 417. The signal is used by the modulator 417 to vary the conductibility of a diode employed therein, thus, changing its impedance. In this way, the modulator 417 modulates the electromagnetic waves received from the interrogator 386 with the signal representing the information read from the PROM unit 415. The electromagnetic waves are reflected as a modulated signal conveying the information and then transmitted back to the interrogator 386 through the transmitting antenna 418. As a result, a home-delivery slip equipped with the responding circuit 411 allows data to be written into the PROM unit 415 using a non-contacting means in addition to the effects of the first embodiment described above.

Next, third modification examples of the -first embodiment described above are explained.

The responding circuits of the second modification examples each have a battery embedded in the home-delivery slip much like the circuit shown in FIG. 2. The battery supplies power to the responding circuit, enabling it to transmit information stored therein to an interrogator.

Figure 67A:
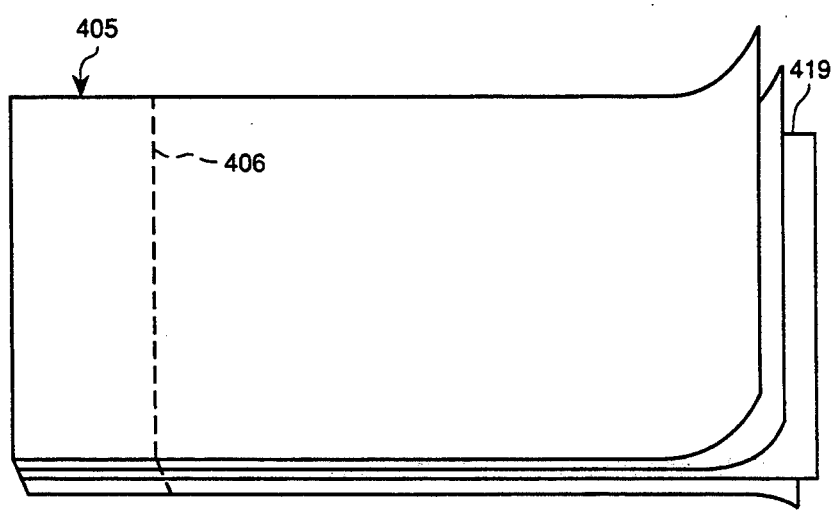
FIGS. 67(A)-67(C) are circuit diagrams of a configuration of a second modified example of the first embodiment shown in FIG. 63.
Figure 67B:
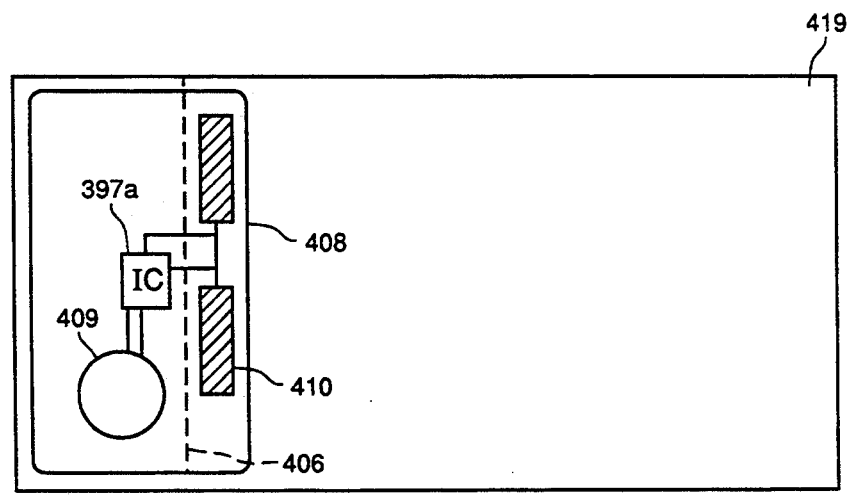
Figure 67C:
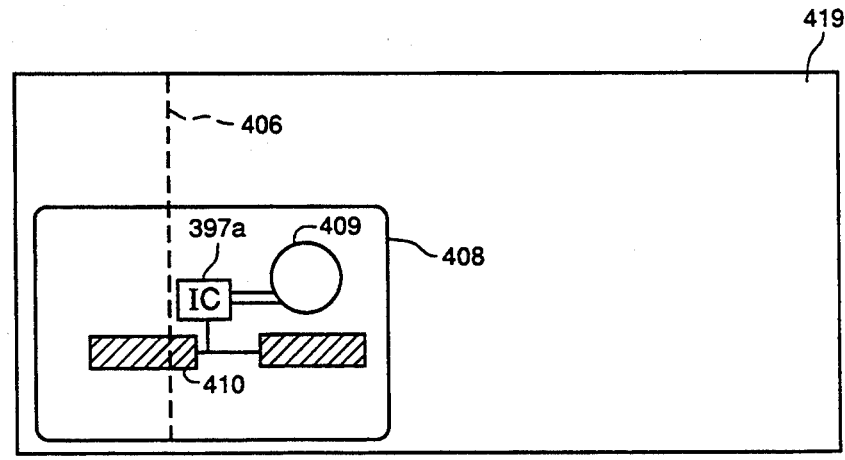

As shown in FIGS. 67 (A) to (C), the responding circuit, which is denoted by reference numeral 408, is formed in a delivery slip copy 419 to be torn off at the end of delivery of a parcel. A seam 406 is provided between a slip binder 405 and each copy sheet of the home-delivery slip. The responding circuit 408 is created in the delivery slip copy 419 on both sides of the seam 406. In an example shown in FIG. 67 (B), the transmitting/receiving antenna 410 is formed on the tear-away side of the delivery slip copy 419. As an example shown in FIG. 66 (C), a transmitting/receiving antenna 410, most of the IC 397a and a battery 409 are created on the tear-away side of the delivery slip copy 419.

Much like the first modification examples described earlier, after the home-delivery slip has been used, the delivery slip copy 419 is torn off along the seam 406 in order to disable its responding circuit 408. In the third modification examples, a zinc-carbon dry battery, alkaline dry battery, zinc-air battery containing no mercury, solar battery or the like is used as the embedded battery.

The battery should contain no mercury and no cadmium. If a home-delivery slip is discarded after its use with its responding circuit having a battery containing a pollution material like the mercury and cadmium as it is, the battery can be destroied to leak harmful materials, giving rise to a destructive environmental problem such as a pollution. When disposing a battery containing such a harmful material, techniques for collecting an electronic tag described former are used. These techniques are applied to a third embodiment of the electronic tag. As for batteries containing no such harmful materials described above, their responding circuits can be disposed in the same way as the batteryless first embodiment without causing any environmental problems.

The following is description of second to fifth embodiments of the electronic tag with techniques for disposing the electronic tag taken into consideration. These second to fifth embodiments each adopt a technique for disposing a home-delivery slip which embeds a battery containing a dangerous material such as a lithium battery. Note that it is needless to say that these second to fifth embodiments are also applicable to the disposal of a home-delivery slip which embeds a battery containing no dangerous material such as a zinc-carbon dry battery mentioned above.

First of all, the second embodiment of the electronic tag with a disposal technique thereof taken into consideration is described. In the second embodiment, by tearing off a predetermined part of the home-delivery slip after its use, a forcibly-discharging circuit embedded in the home-delivery circuit is activated, causing an embedded battery to forcibly discharge its electric charge.

Figure 69:
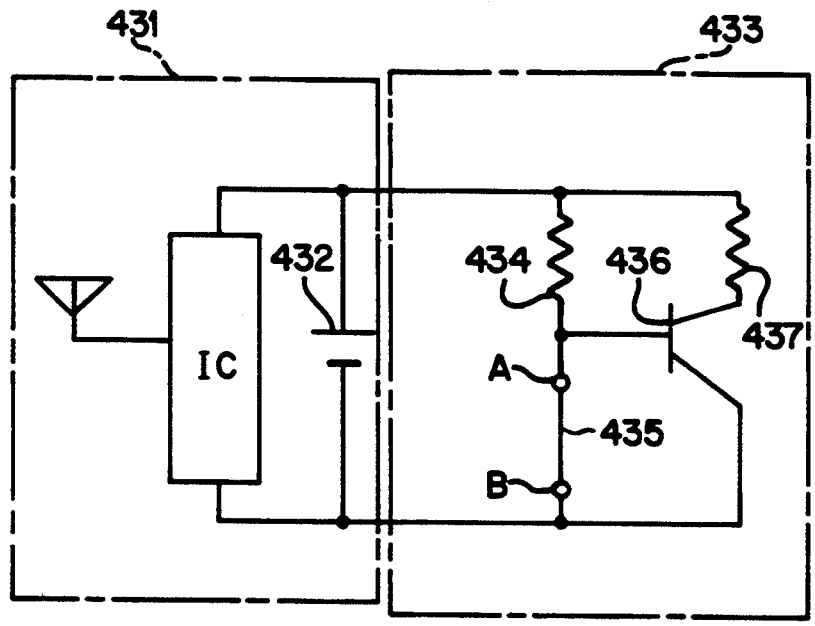
FIG. 69 is a diagram showing a configuration of a responding circuit and a forcibly-discharging circuit employed in a second embodiment of an electronic tag providing for a technique for disposing home-delivery slips.

The forcibly-discharging circuit, denoted by reference numeral 433 FIG. 69, is embedded in a home-delivery slip. As shown the figure, the forcibly-discharging circuit 433 which is connected to a responding circuit 431 and a battery 432 is configured to comprise a discharging resistor 437, a transistor 436, a bias resistor 434 and-a remove-away jumper 435. The discharging resistor 437 connects the collector of the transistor 436 to the positive pole of the battery 432 whereas the bias resistor 434 connects the base of the transistor 436 to the positive pole of the battery 432. The remove-away jumper 435 is placed between terminals (A) and (B) which are wired to the base of the transistor 436 and the negative pole of the battery 432 respectively.

Figure 70:
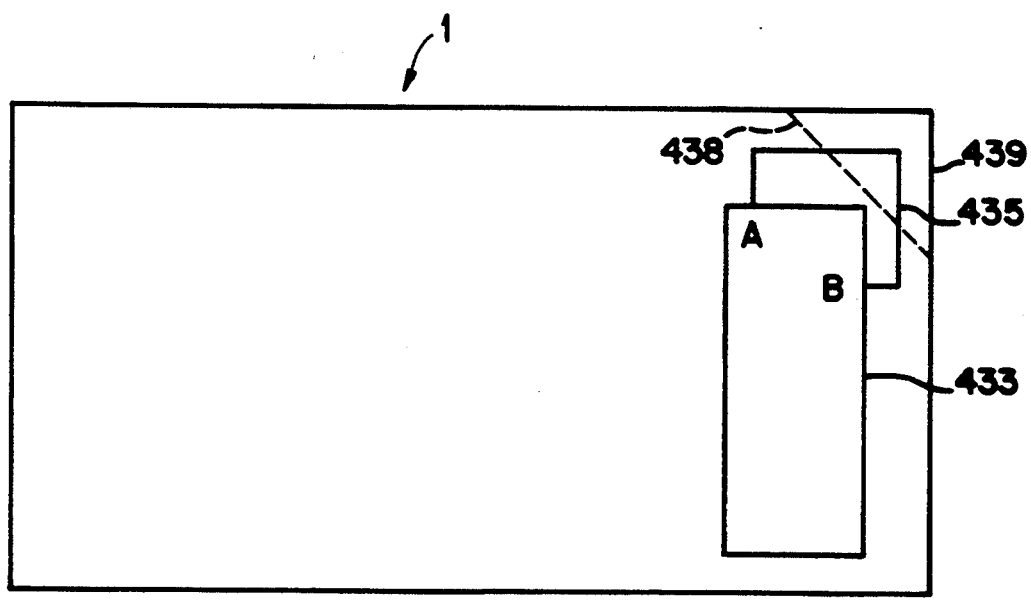
FIG. 70 is an explanatory diagram used for explaining the operation of the electronic tag incorporating the forcibly-discharging circuit shogun in FIG. 69.

As shown in FIG. 70, a diagonal seam 438 is provided on the lower surface of the home-delivery slip 1 at a corner of a binder in which the responding circuit 431 and the forcibly-discharging circuit 433 are embedded. The diagonal seam 438 and the corner at which the seam 438 is provided constitute a tear-away triangle 439. The remove-away jumper 435 is formed to stretch from the forcibly-discharging circuit 433 to the tear-away triangle 439. Thus, by tearing off the tear-away triangle 439, the remove-away jumper 435 is cut. It is obvious from the circuit shown in FIG. 69 that cutting the remove-away jumper 435 causes a bias current to flow to the transistor 436, turning on the transistor 436. In this state, the discharging resistor 437 consumes power, forcibly discharging electric charge from the battery 432.

The home-delivery slip 1 having the configuration described above is disposed upon the completion of the parcel delivery as follows.

As the delivery of a parcel is completed, the delivery man requests the recipient to put a signature of acceptance to a delivery slip copy, one of copy sheets of the home-delivery slip 1. The delivery slip copy is then torn off from the home-delivery slip 1 for collection. At that time, the delivery man cuts off the tear-away triangle 439. As described earlier, as the tear-away triangle 439 is cut off, the forcibly-discharging circuit 433 works, forcibly discharging electric charge from the battery 432. In this way, a usable residual material contained in the battery 432, such as an active lithium metal in the case of a lithium battery, vanishes by virtue of the forcible discharge which takes place at the time the parcel delivery is completed.

As described above, with the aforementioned home-delivery slip 1, the battery 432 can be discharged forcibly by merely cutting off the tear-away triangle 439. Therefore, there is no fear of a fire's breaking or heat's being generated by the battery 432 which is, in turn, caused by a damaged state the battery 432 or an opened hole thereon. The embodiment thus has an effect that the home-delivery slip 1 can be discarded with ease. As a result, the home-delivery slip 1 can be treated as ordinary garbage without the need for collecting it.

In addition, let a parcel box that was once used before, for example, be recycled. Since a new home-delivery slip is affixed to the used parcel box, two responding circuits 431 coexist thereon. However, the responding circuit 431 of the used home-delivery slip 1 is inoperative because of the forcible discharging of the embedded battery 432. It is only the responding circuit 431 of the new home-delivery slip that works. As a result, the embodiment has an advantage that no malfunction occurs when it responds to a query given by an interrogator. Examples of a malfunction include two signals returned simultaneously by the two responding circuits 431 and no signal received at all.

It should be noted that if the forcibly-discharging circuit 433 is configured by forming the remove-away jumper 435 thereof to stretch from the seam in close proximity to the binder to the delivery slip copy, the battery can be forcibly discharged at the same time by merely collecting the delivery slip copy upon the completion of the parcel delivery.

Next, the third embodiment of the electronic tag adopting a technique for disposing the electronic tag is described. In the third embodiment, a battery embedded in the home-delivery slip is forcibly discharged by removing a sheet of insulating paper placed at a predetermined location at the end of the use of the home-delivery slip.

Figure 71:
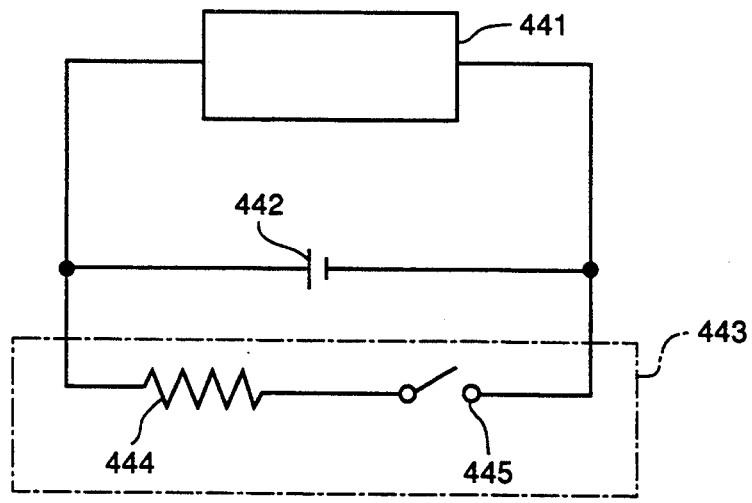
FIG. 71 is a diagram showing a configuration of a responding circuit and a forcibly-discharging circuit employed in a third embodiment of an electronic tag providing for a technique for disposing home-delivery slips.
Figure 72:
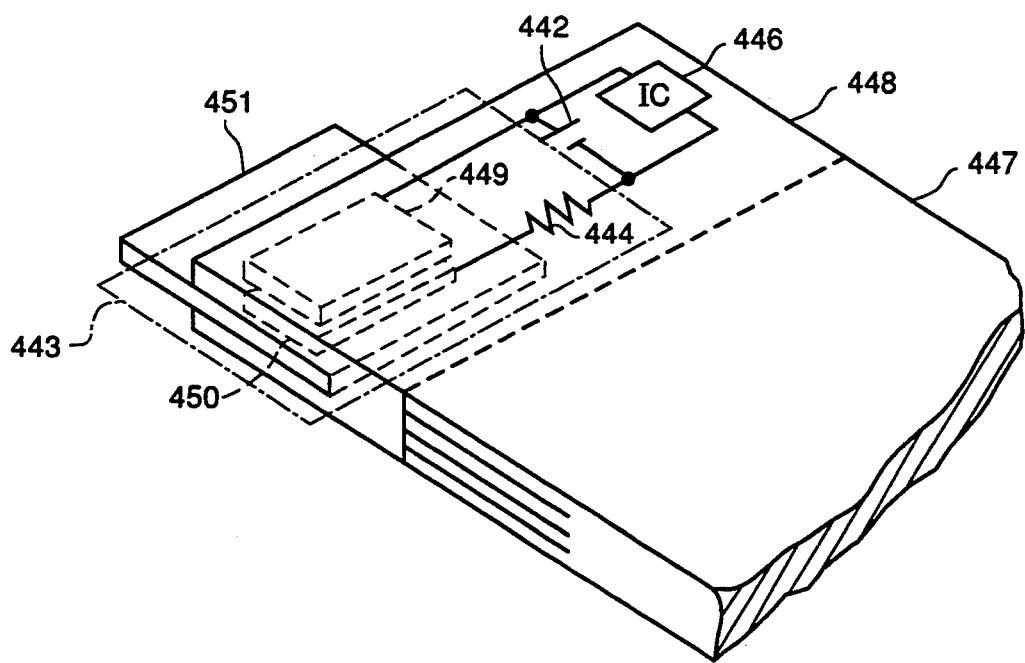
FIG. 72 is a diagram showing a perspective view of main parts of the electronic tag of the home-delivery slip incorporating the forcibly-discharging circuit shown in FIG. 71.
Figure 73A:
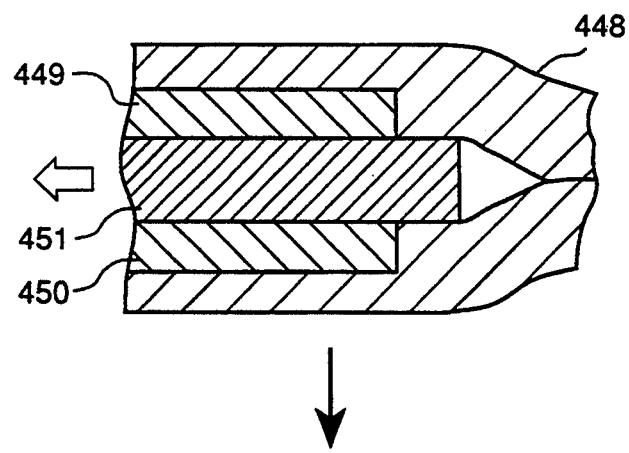
FIGS. 73(A) and 73(B) show cross sections of the electronic tag shown in FIG. 72.
Figure 73B:
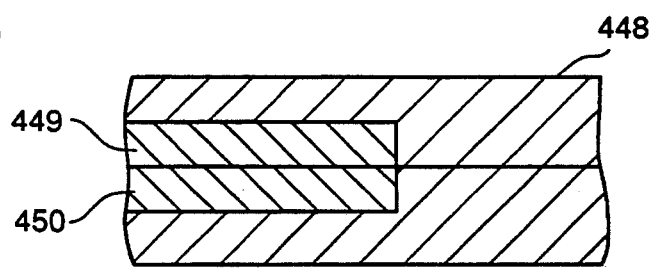

As shown in FIG. 71, a forcibly-discharging circuit 443 comprises a discharging resistor 444 and a switch 445 connected in series to each other. The forcibly-discharging circuit 443 is connected in parallel to a battery 442. As shown in FIG. 72, the forcibly-discharging circuit 443, the battery 442 and an IC 446 which serves as a responding circuit 441 are embedded in a binder 448 of a home-delivery slip 447. The switch 445 comprises two pieces of conductors 449 and 450 and the sheet of insulating paper denoted by reference numeral 451. As shown in FIG. 73 (A), the two pieces of conductors 449 and 450 are embedded in two separate slip sheets of the binder 448. The sheet of insulating paper 451 is sandwiched between the two pieces of conductors 449 and 450 in order to sustain the two conductors 449 and 450 in a non-conducting state.

The home-delivery slip 447 having the configuration described above is used as follows.

As described above, the sheet of insulating paper 451 holds the two conductors 449 and 450 in a non-conducting state, until the use of the responding circuit 441 is ended, for example, upon the completion of the automatic sorting of the parcel or upon the completion of the parcel delivery.

As the use of the responding circuit 441 is ended upon the completion of the parcel delivery, the delivery man requests the recipient to put a signature of acceptance to the slip delivery copy of the home-delivery slip 447. The delivery slip copy is then torn off from the home-delivery slip 447 for collection. At that time, the sheet of insulating paper 451 is also removed from the binder 448 as well. As shown in FIG. 73 (B), the two pieces of conductors 449 and 450 thereby come in contact with each other, transiting to a conducting state.

In other words, the switch 445 of the forcibly-discharging circuit 443 is turned on. In this state, the discharging resistor 444 consumes power, forcibly discharging electric charge from the battery 442. As a result, a usable substance remaining in the battery 442 at the end of the parcel delivery vanishes by virtue of the forcible discharging of the battery 442.

With the home-delivery slip 447 described above, the battery 442 can be forcibly discharged by merely removing the sheet of insulating paper 451, providing an effect that allows the home-delivery slip 447 to be disposed with ease as is the case with the first embodiment. The home-delivery slip 447 can thus be treated as ordinary garbage without the need for collecting its responding circuit 431.

Next, the fourth embodiment of the electronic tag which adopts a technique for disposing the electronic tag is described. In this embodiment, a battery embedded in a home-delivery slip can be forcibly discharged by merely pressing a pin provided at a predetermined location at the end of the usage of the home-delivery slip.

Figure 74:
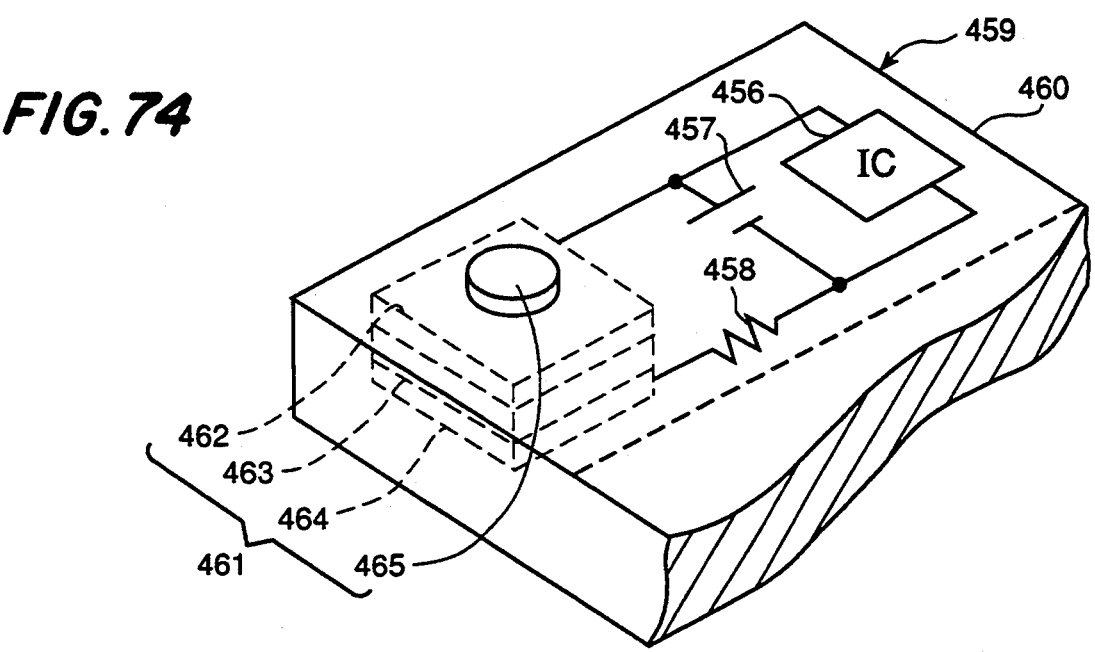
FIG. 74 is a diagram showing a perspective view of main parts of a fourth embodiment implementing an electronic tag providing for a technique for disposing home-delivery slips.

As shown in FIG. 74, a home-delivery slip 459 is equipped with a binder 460 in which a discharging resistor 458, a battery 457 and a switch 461 are embedded along with an IC 456. The discharging resistor 458 and the IC 456 serve as a forcibly-discharging circuit and a responding circuit respectively. The switch 461 is configured to comprise two pieces of conductors 462 and 464, a sheet of insulating paper 463 and a pin 465. As shown in a cross-section diagram of FIG. 75 (A), the two pieces of conductors 462 and 463 are sandwiched by layers of the binder 460 but separated from each other by the sheet of insulating paper 463 and, thus, put in a non-conducting state. The pin 465 is plugged from the outside of the binder 460, with a needle 465a thereof penetrating the sheet of insulating paper 463 through the conductor 462. However, the needle 465a does not come in contact with the conductor 463.

The home-delivery slip 459 having the configuration described above is used as follows.

The sheet of insulating paper 463 holds the two pieces of conductors 462 and 464 in a non-conducting state until the use of its responding circuit 441 is ended upon the completion of the automatic sorting of the parcel described earlier or the like.

Figure 75A:
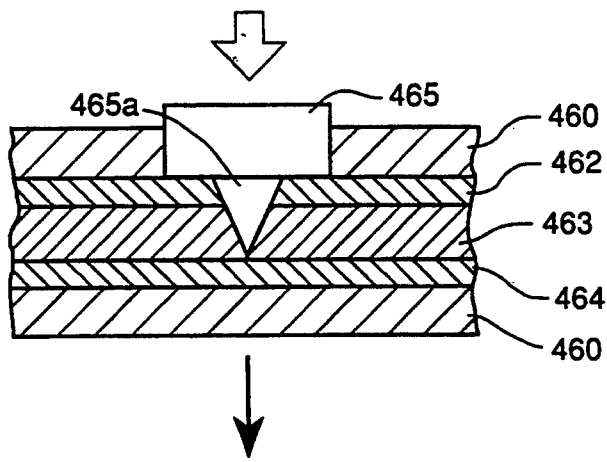
FIGS. 75(A) and 75(B) show cross sections of the main parts shown in FIG. 74.
Figure 75B:
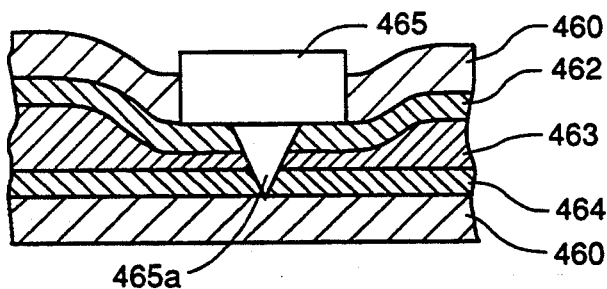

As the use of the responding circuit 441 is ended upon the completion of the parcel delivery, the delivery man requests the recipient to put a signature of acceptance to the slip delivery copy of the home-delivery slip 459. The delivery slip copy is then torn off from the home-delivery slip 459 for collection. At that time, the pin 465 is pressed. By doing so, the tip of the needle 465a penetrates the conductor 464 as shown in FIG. 75 (B), putting the two pieces of conductors 462 and 464 in a conducting state. The switch 461 of the forcibly-discharging circuit is thereby turned on. In this state, the discharging resistor 458 consumes electric power, forcibly discharging electric charge from the battery 457. As a result, a usable substance remaining in the battery 457 at the end of the parcel delivery vanishes by virtue of the forcible discharging of the battery 432.

With the home-delivery slip 459 described above, the battery 457 can be forcibly discharged by merely pressing the pin 465, providing an effect that allows the home-delivery slip 459 to be disposed with ease as is the case with the second embodiment. The home-delivery slip 459 can thus be treated as ordinary garbage without the need for collecting its responding circuit.

Next, the fifth embodiment of the electronic tag which adopts a technique for disposing the electronic tag is described. In this embodiment, a battery embedded in a home-delivery slip can be forcibly discharged by merely transmitting predetermined electromagnetic waves, upon the completion of the use of the home-delivery slip, to the responding circuit for requesting an internal CPU thereof to execute a forcible-discharge process routine.

An embedded battery in this embodiment can be forcibly discharged by using a non-contacting means. To be more specific, by taking an eraser 471 near a home-delivery slip 472 affixed on a parcel (W) as shown in FIG. 56, the battery embedded therein is discharged deliberately. Much like the embodiments described so far, a responding circuit 473 shown in FIG. 77 and a forcibly-discharging circuit 476 shown in FIG. 77 are embedded in binder of the home-delivery slip 472.

Figure 77:
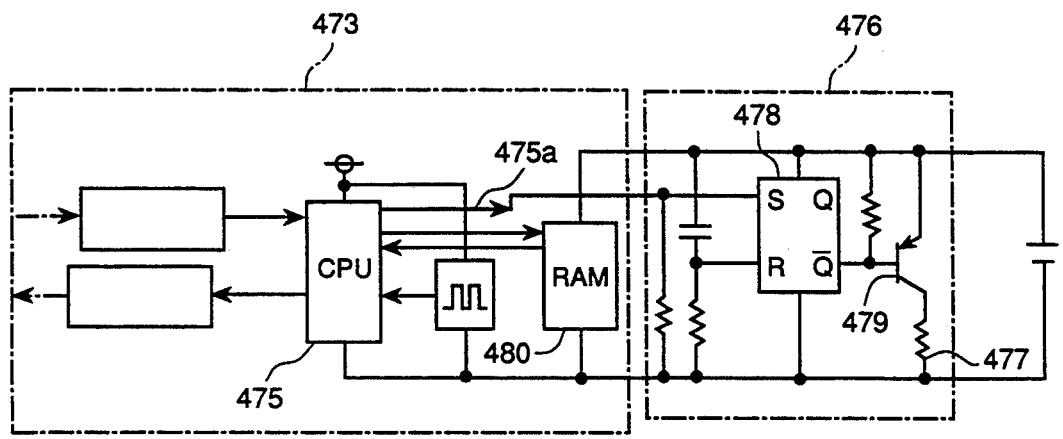
FIG. 77 is a diagram showing a configuration of a responding circuit and a forcibly-discharging circuit employed in the electronic tag shown in FIG. 76.

As shown in FIG. 77, the forcibly-discharging circuit 476 in this embodiment is configured to comprise a discharging resistor 477, a flip-flop circuit 478 and a transistor 479. The collector of the transistor 479 is connected to the positive pole of the battery 474. The discharging resistor 477 connects the emitter of the transistor 479 to the negative pole of the battery 474. The base of the transistor 479 is connected to the inverted output of the flip-flop circuit 478. The S terminal of the flip-flop circuit 478 is connected by a signal line 475a to a discharge-mechanism control pin of a CPU 475. The S terminal of the flip-flop circuit 478 is connected to a terminal of a condenser. The other terminal of the condenser is connected to the positive pole of the battery 474.

The principle of operation of the forcibly-discharging circuit 476 having the configuration described above is explained as follows.

The discharge-mechanism control pin of the CPU 475 provides the S terminal of the flip-flop circuit 478 with a high-level or low-level input signal through the signal line 475a. The high-level input signal is provided for forcibly discharging the battery 474 whereas the low-level input signal is provided at times other than a discharging time. In order to output the high-level or low-level signal, the CPU 475 executes a responding-circuit control routine to be described later.

The CPU 475 retains the low-level input signal at the S terminal of the flip-flop circuit 478 till the use of a responding circuit 473 is ended, for example, upon the completion of the automatic sorting of the parcel described earlier. The R terminal is instantaneously raised to a high level at the time the condenser is connected to the battery 474 but immediately goes low thereafter. Therefore, the inverted output of the flip-flop circuit 478 is pulled up to a high level after the battery 474 is connected. Since the high-level inverted output of the flip-flop circuit 478 is connected to the base of the transistor 479, the transistor 479 is put in a non-conducting state, allowing no current to flow through the resistor 477.

As the CPU 475 executes processing to be described later, determining that the forcible discharging of the battery needs to be done, the CPU 475 asserts a high-level signal on the signal line 475a connected to its discharge-mechanism control pin, raising the S terminal of the flip-flop circuit 478 to a high level. Since the R terminal remains at a low level, the inverted output of the flip-flop circuit 478 goes low, turning on the transistor 479. In this state, the discharging resistor 477 consumes electric power, forcibly discharging electric charge from the battery 474.

Figure 78:
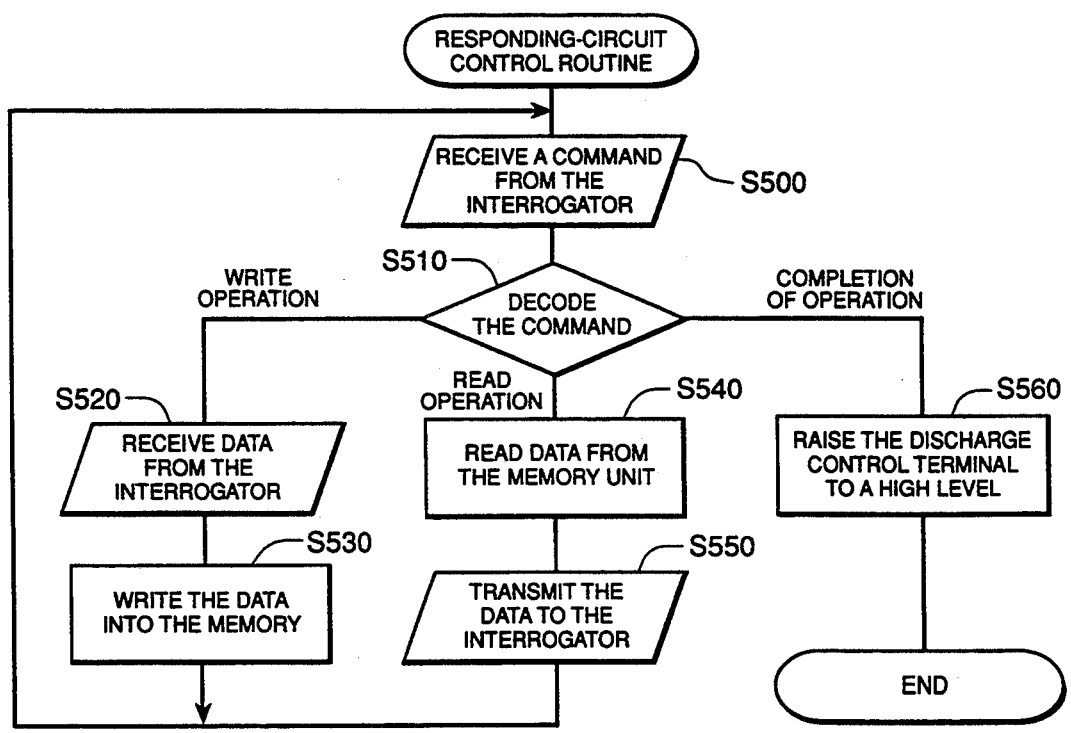
FIG. 78 is a flowchart of control processing executed by a CPU of the responding circuit shown in FIG. 77.

Next, the responding-circuit control routine executed by the CPU 475 as described above is explained by referring to FIG. 78.

The CPU 475 starts the execution of the responding-circuit control routine with Step S500 at which a command received from an interrogator is, first of all, processed. At Step S510, the command is decoded to determine processing to be done accordingly.

If the command is decoded at Step S510 to be a request to write data, at Step S520, the data is received from the interrogator and at Step S530, the data is written into a memory unit 480. The processing flow then returns to the beginning of the routine.

If the command is decoded at Step S510 to be a request to read data, on the other hand, the data is read form the memory unit 480 of the responding circuit at Step S540 and then transmitted to the interrogator at Step S550 before returning to the beginning of the control routine.

If the command is found at Step S510 to be a request to end operation, the discharge-mechanism control pin is raised to a high level at Step S560 before finally terminating the execution of the control routine.

When the discharge-mechanism control pin is raised to a high level at Step S560, the S terminal of the flip-flop circuit 478 goes high as well, bringing the inverted output of the flip-flop circuit 478 to a low level. In this state, the transistor 479 turns on, forcibly discharging electric charge from the battery 474.

Figure 76:
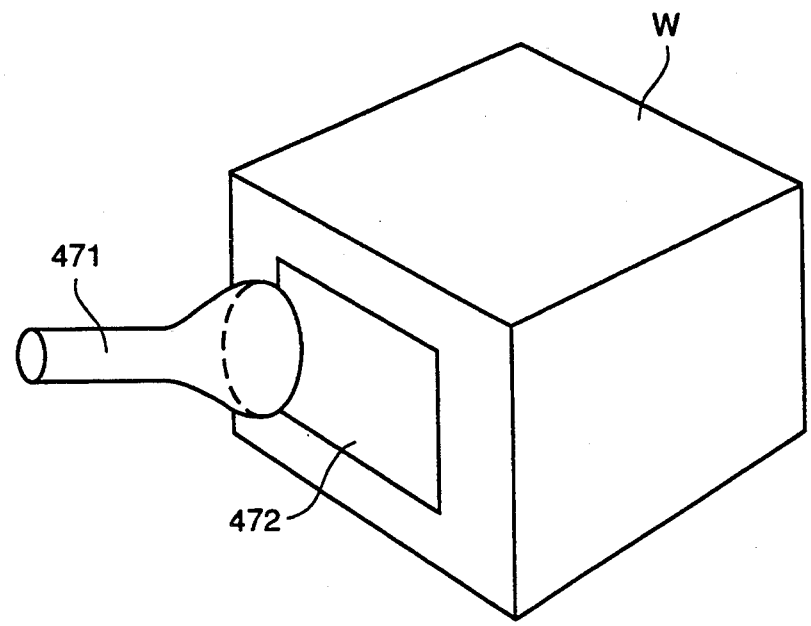
FIG. 76 is an explanatory diagram used for explaining an application of a fifth embodiment of an electronic tag providing for a technique for disposing home-delivery slips.

The battery 474 is forcibly discharged typically when the responding circuit receives a command to terminate its operation from an interrogator installed on an automatic sorting line or on a delivery vehicle. By using the eraser 471 shown in FIG. 76, the battery 432 can also be forcibly discharged with ease. Note that since the eraser 471 has an identical structure with the interrogator to be described later, description of its configuration in actual terms is omitted.

The home-delivery slip 472 described above has an effect of allowing the battery 474 to be forcibly discharged even more easily by using a non-contacting means in addition to the effect that allows the home-delivery slip 472 to be disposed with ease by virtue of the forcible discharging of the battery 474.

G. Structure of the Interrogator for Reading Information from the Electronic Tag The following is description of a first embodiment implementing the structure of an interrogator for reading information from the electronic tag.

The interrogator implemented by the embodiment transmits electromagnetic waves to a home-delivery slip equipped with a responding circuit when the parcel is sorted in order to request the responding circuit to return delivery data stored therein.

Figure 79:
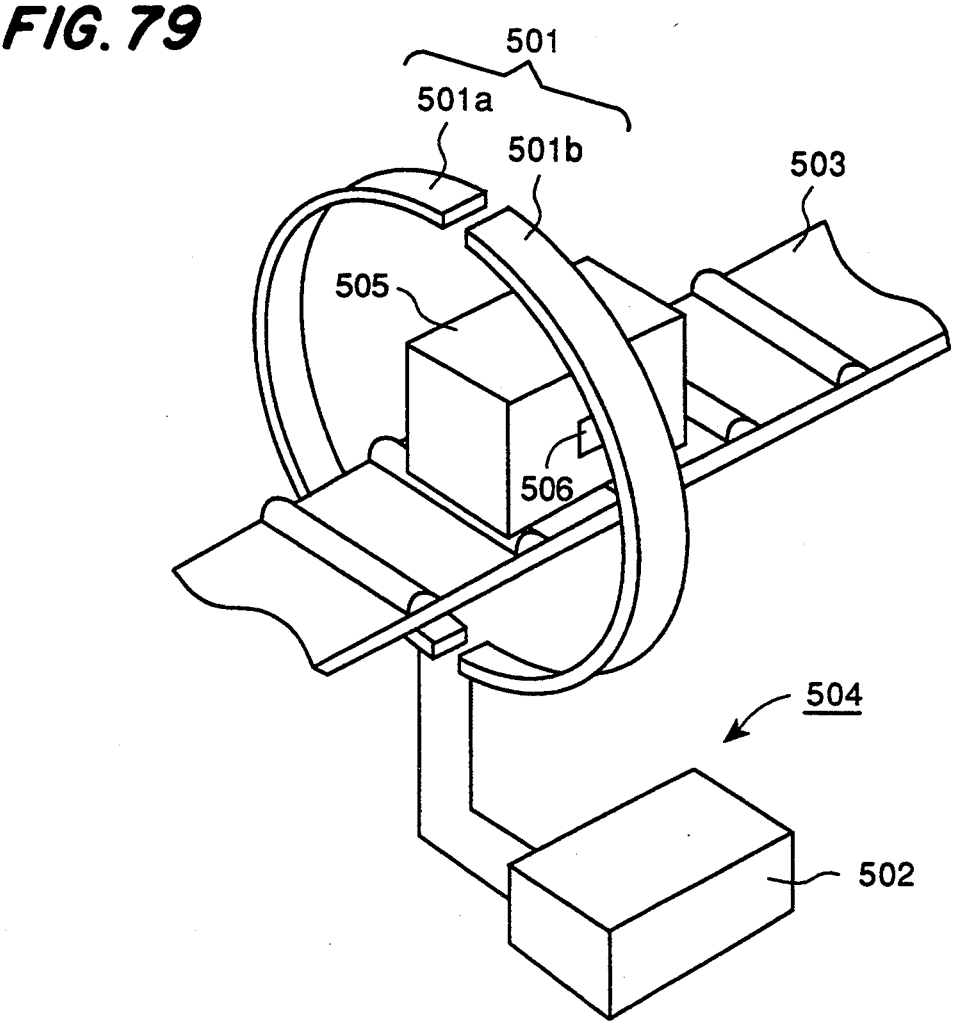
FIG. 79 is a diagram showing a perspective view of the overall structure of a first embodiment implementing an interrogator for reading information from an electronic tag.

The interrogator, denoted by reference numeral 504 in FIG. 79, comprises a transmitting/receiving antenna 501 and a data processing unit 502 for controlling transmitting and receiving operations and processing a signal received from the transmitting/receiving antenna 501. The transmitting/receiving antenna 501 is installed so that a circular portion thereof surrounds a belt conveyor 503 which is used for conveying a parcel 505.

Figure 80:
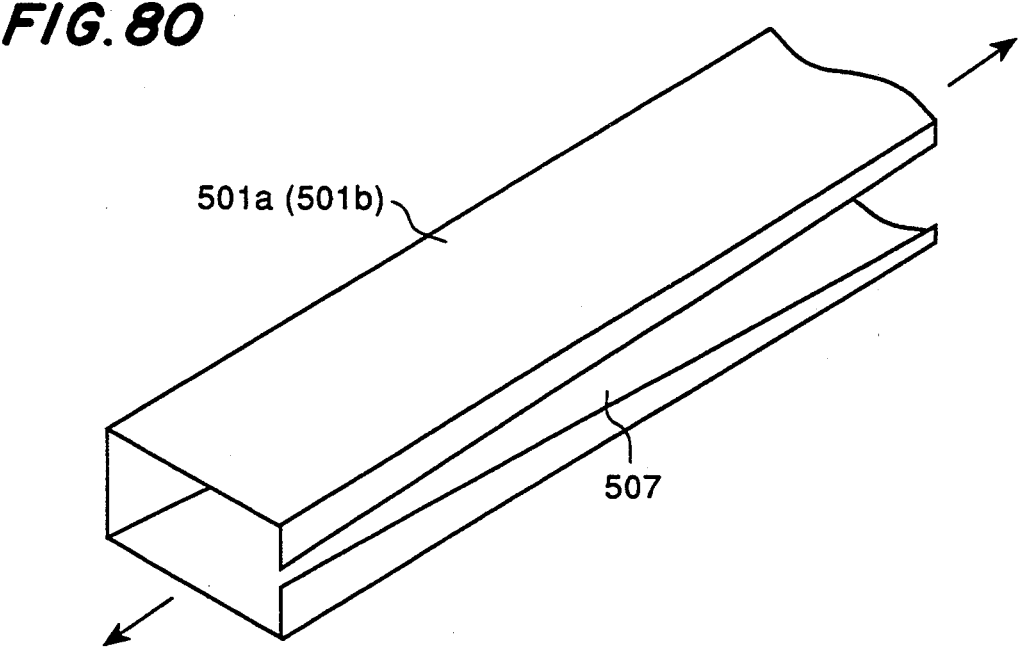
FIG. 80 is a diagram showing a perspective view of the part of an antenna of the interrogator shown in FIG. 79.

The transmitting/receiving antenna 501 is configured to comprise a pair of semicircular waveguides 501a and 501b which are placed on the right-hand and left-hand aides of the belt conveyor respectively. Each of the waveguides 501a and 501b is a leakage-wave antenna having a groove 507 on its surface as shown in FIG. 80. The groove 507 of each of the waveguides 501a and 501b is designed to have a width which gradually increases from a minimum on the base side of the antenna 501 to a maximum on its end side. Such a design allows electromagnetic waves to be transmitted uniformly from the whole portions of the antenna 501.

Next, an electrical configuration of the interrogator 504 described above is described by referring to FIG. 81.

Figure 81:
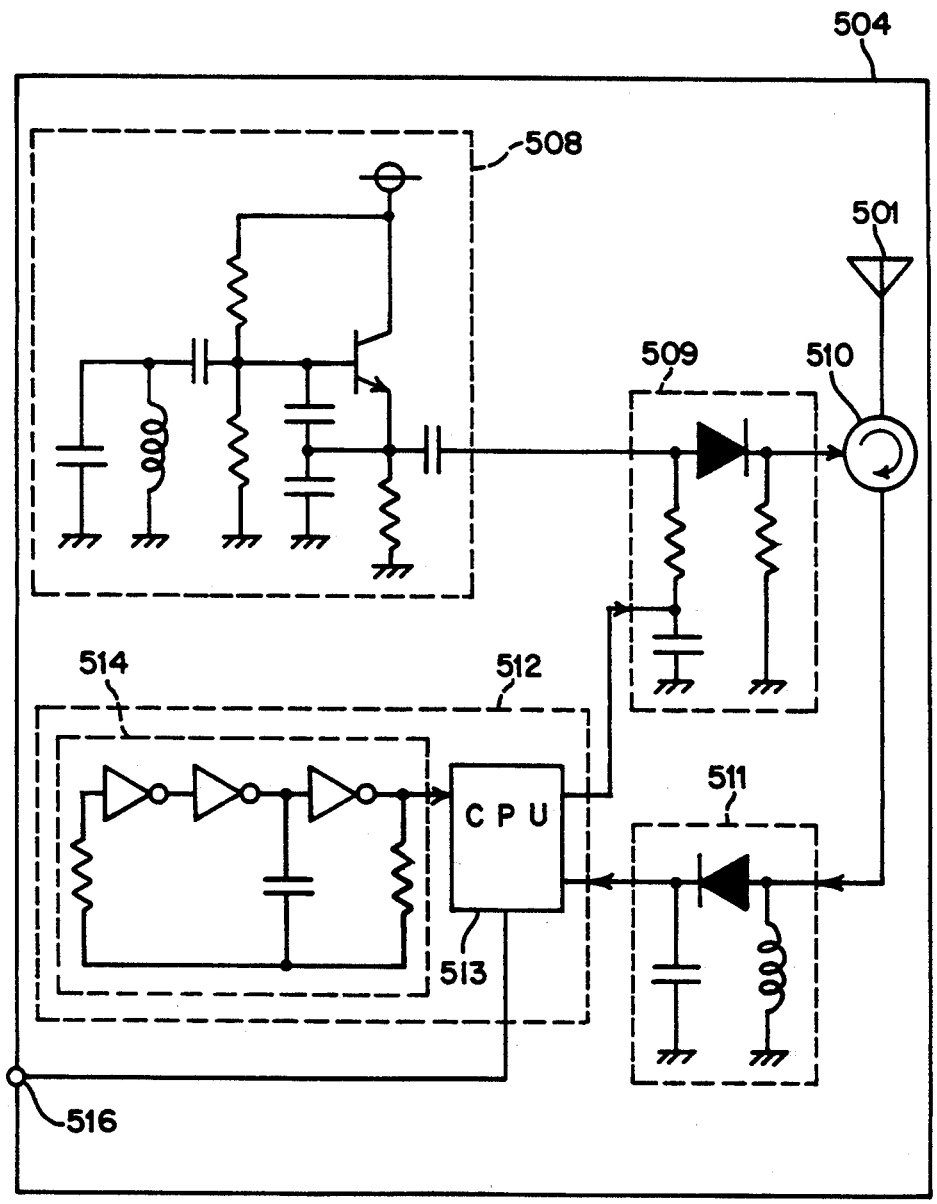
FIG. 81 is a circuit diagram showing an electrical configuration of the responding circuit shogun in FIG. 79.

As shown in FIG. 81, the interrogator 504 is configured to comprise a carrier oscillator 508 for generating the carrier of transmitted electromagnetic waves, a modulator 509 for superimposing information on the carrier, a circulator 510 for separating transmitted and received waves from each other, a wave splitter 49 for splitting transmitted waves among the two waveguides 501a and 501b of the antenna 501, the transmitting-/receiving antenna 501 serving as an entrance and exit for electromagnetic waves, a demodulator 511 for extracting information out off received waves and a signal processing unit 512 for processing information by controlling the modulator 509 and the demodulator 511.

The signal processing unit 512 is further configured to comprise a CPU 513 for processing information and establishing communication with the outside world and a clock generator 514 for providing the CPU 513 with an operation clock signal. It should be noted that the transmitting/receiving antenna 501 employed in this embodiment is further configured to comprise the waveguides 501a and 501b as described above. The wave splitter for splitting electromagnetic waves among the waveguides 501a and 501b is placed between the antenna 501 and the circulator 510 but not shown in the figure.

Next, the principle of operation of the interrogator 504 having the circuit configuration described above is explained.

Waves to be transmitted by the interrogator 504 are generated by modulating a carrier output by the carrier oscillator 508 by means of the modulator 509. In other words, data sent by the signal processing unit 512 to the modulator 509 is superimposed on the transmitted waves by the modulator 509.

Transmission waves produced as such are sent to the circulator 510 and then splitted by the splitter among the two waveguides 501a and 501b of the transmitting-/receiving antenna 501 which finally transmits them to the air.

As a response signal transmitted by a responding circuit 4 employed by the home-delivery slip 506 is received by the transmitting/receiving antenna 501, they are forwarded to the demodulator 511 through the circulator 510. The demodulator 511 extracts information out of the received electromagnetic waves and provides the information to the signal processing unit 512 to be processed therein.

Receiving control signals and a variety of information supplied by an external interface 516, the signal processing unit 512 sends data for transmission to the modulator 509. The signal processing unit 512 further outputs data to the external interface 516. An example of the data is an identification code of the responding circuit 4 received from the demodulator 511.

In this embodiment, since the transmitting/receiving antenna 501 of the interrogator 504 has a circular form surrounding the belt conveyor 503 for conveying a parcel 505 during the sorting, delivery data can be read from the responding circuit 4 reliably regardless of the location on the parcel 505 on which the home-delivery slip 506 is affixed. Accordingly, the embodiment has a significant effect which enhances the efficiency of the parcel sorting job due to the fact that it is not necessary to reposition the parcel 505 on the belt conveyor 503 on purpose during the sorting so as to expose the home-delivery slip 506 in a predetermined direction.

Next, a second embodiment implementing the structure of the interrogator for reading information from the electronic tag is described. In this embodiment, the interrogator is installed so that information can be read reliably regardless of the size of a parcel on which a home-delivery slip is affixed.

Figure 82:
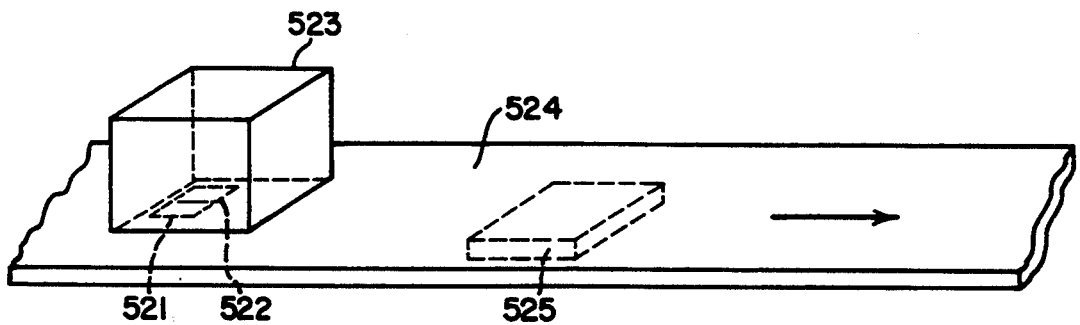
FIG. 82 is a diagram showing a perspective view of the overall structure of a second embodiment implementing an interrogator for reading information from an electronic tag.

At a delivery center, a parcel 523 with a home-delivery slip 522 affixed thereon is conveyed by a belt conveyor 524 as shogun in FIG. 82. A transmitting/receiving antenna 525 of an interrogator 504 is placed directly below the belt conveyor 524, being separated therefrom by a small gap. The antenna 525 transmits a query signal to a responding circuit 521 of the home-delivery slip 522 and receives identification data and the like which are transmitted by the responding circuit 521 in response to the query signal. Based on the identification data received by the transmitting/receiving antenna 525, an sorting machine, not shown in the figure, sorts the parcel 523.

It should be noted here that since the material, which the belt conveyor 524 is made of, has to be capable of passing electromagnetic waves, a metal must be avoided. For example, even though plastic is suitable, plastic mixed with a metal is not.

In the second embodiment with the configuration described above, a parcel 523 is placed on the belt conveyor 524 so that the home-delivery slip 522 affixed thereon is exposed to the belt conveyor 524 while the parcel is being conveyed. Data can thus be read from the home-delivery slip 522 by the transmitting/receiving antenna 525 which is installed in close proximity to the belt conveyor 524. As a result, an identification code of a destination and the like transmitted by a home-delivery slip affixed on a parcel can be prevented from being confused with those transmitted by a home-delivery slip affixed on another parcel.

Next, a third embodiment implementing the structure of the interrogator for reading information from the electronic tag is described. In this embodiment, the interrogator is installed with the size of the parcel having a home-delivery slip affixed thereon taken into consideration.

Figure 83:
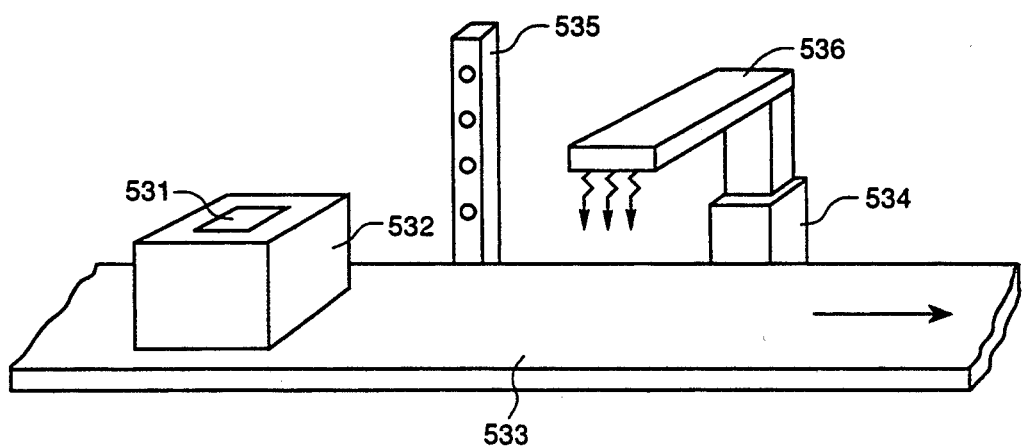
FIG. 83 is a diagram showing a perspective view of the overall structure of a third embodiment implementing an interrogator for reading information from an electronic tag.

As shown in FIG. 83, an arm 534 that can be moved up and down freely is installed beside a belt conveyor 524. The arm 534 is equipped with a transmitting/receiving antenna 525 of an interrogator 5. The transmitting/receiving antenna 525 is fixed right above the belt conveyor 524. A height sensor 535 for detecting the height of a parcel 523 is installed also beside the belt conveyor 524.

In this embodiment, before an identification code is read by the transmitting/receiving antenna 525, the height of the parcel 523 is first measured by the height sensor 535. The height of the parcel 532 measured by the height sensor 535 is then used for altering the altitude of the transmitting/receiving antenna 525. The altitude of the transmitting/receiving antenna 525 is changed by moving the arm 534 up or down using a control circuit and a motor which are not shown in the figure. Based on the height of the parcel 532 received from the height sensor 535, the control circuit and the motor drive the arm 534 to move the transmitting/receiving antenna 536 to a desired altitude.

It should be noted, however, that since the transmitting/receiving antenna 536 is positioned above the parcel 532, the parcel 532 has to be put on the belt conveyor 533 so that its surface on which a home-delivery slip 531 is affixed faces upward, being exposed to the transmitting/receiving antenna 536.

In the third embodiment described above, the altitude of the transmitting/receiving antenna 536 can be adjusted to the height of the parcel 532. Information can thus be read from a position in close proximity to the home-delivery slip 531 even if the height varies from parcel to parcel. As a result, an identification code of a destination and the like transmitted by a home-delivery slip affixed on a parcel can be prevented from being confused with those transmitted by a home-delivery slip affixed on another parcel.

Next, a fourth embodiment implementing the structure of the interrogator for reading information from the electronic tag is described. This embodiment combines the features of the second and third embodiments described above. To be more specific, the interrogator is installed by considering not only the size of a parcel with a home-delivery slip affixed thereon, but also the freedom to choose any arbitrary position on the parcel to which the home-delivery slip is to be affixed.

Figure 84:
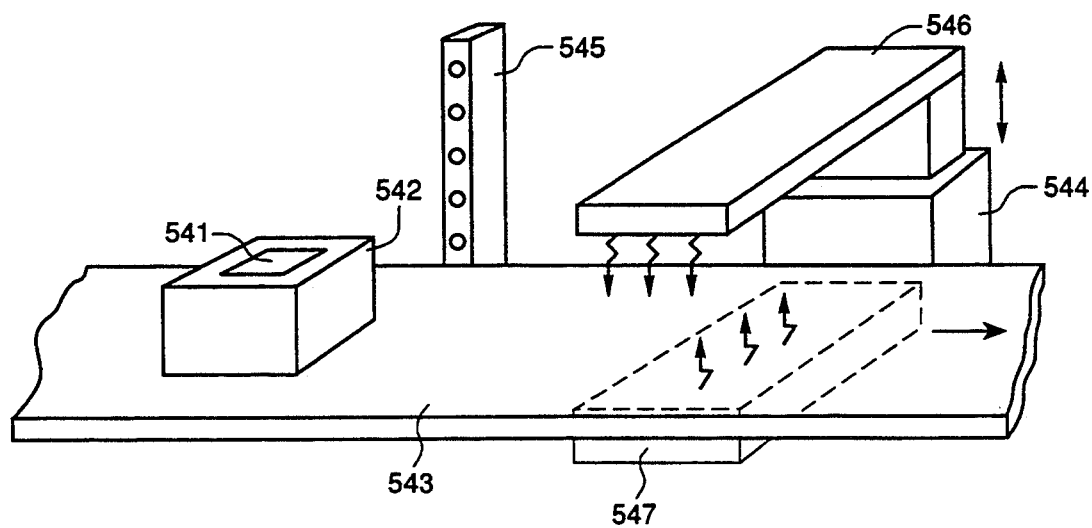
FIG. 84 is a diagram showing a perspective view of the overall structure of a fourth embodiment implementing an interrogator for reading information from an electronic tag.

As shown in FIG. 84, transmitting/receiving antennas 547 and 546 of an interrogator 504 are installed directly below and right above a belt conveyor 543.

When a parcel 542 is conveyed by the belt conveyor 543, first of all, a height sensor 545 examines the height of the parcel 542. Then, a signal is transmitted by the height sensor 545 to an arm 544. The signal is used for requesting the arm 544 to raise or lower the transmitting/receiving antenna 546 in accordance with the measured height.

As the parcel 542 passes through the space between the two transmitting/receiving antennas 546 and 547, a home-delivery slip 541 affixed on the bottom of the parcel 542 can communicate with the lower transmitting/receiving antenna 547. A home-delivery slip 541 sticked on the top of the parcel 542, on the other hand, can communicate with the upper transmitting/receiving antenna 546.

The transmitting/receiving antennas 546 and 547 are designed so that their surfaces each have an area 1.5 to 2 times those of the top or bottom surface of any parcel 542. With such a design, even a home-delivery slip 541 affixed on a side surface of a parcel 542 can still communicate with either of the transmitting/receiving antennas 546 and 547.

In addition, in order to avoid interferences between the two transmitting/receiving antennas 546 and 547, the frequencies of query electromagnetic waves transmitted by them are separated from each other by about 3 MHz.

In the third embodiment described above, information can be read out off a home-delivery slip 541 by either of the transmitting/receiving antennas 546 and 547 from a position in close proximity thereto regardless of the location on the parcel 542 on which the home-delivery slip 541 is affixed. As a result, an identification code of a destination and the like transmitted by a home-delivery slip affixed on a parcel can be prevented from being confused with those transmitted by a home-delivery slip affixed on another parcel.

Next, a fifth embodiment implementing the structure of the interrogator for reading information from the electronic tag is described. In this embodiment, a plurality of interrogators are used each for transmitting query electromagnetic waves with a transmission time different from one another so as to allow information to be read properly from a home-delivery slip regardless of the position on the parcel on which the home-delivery slip is affixed.

Figure 85:
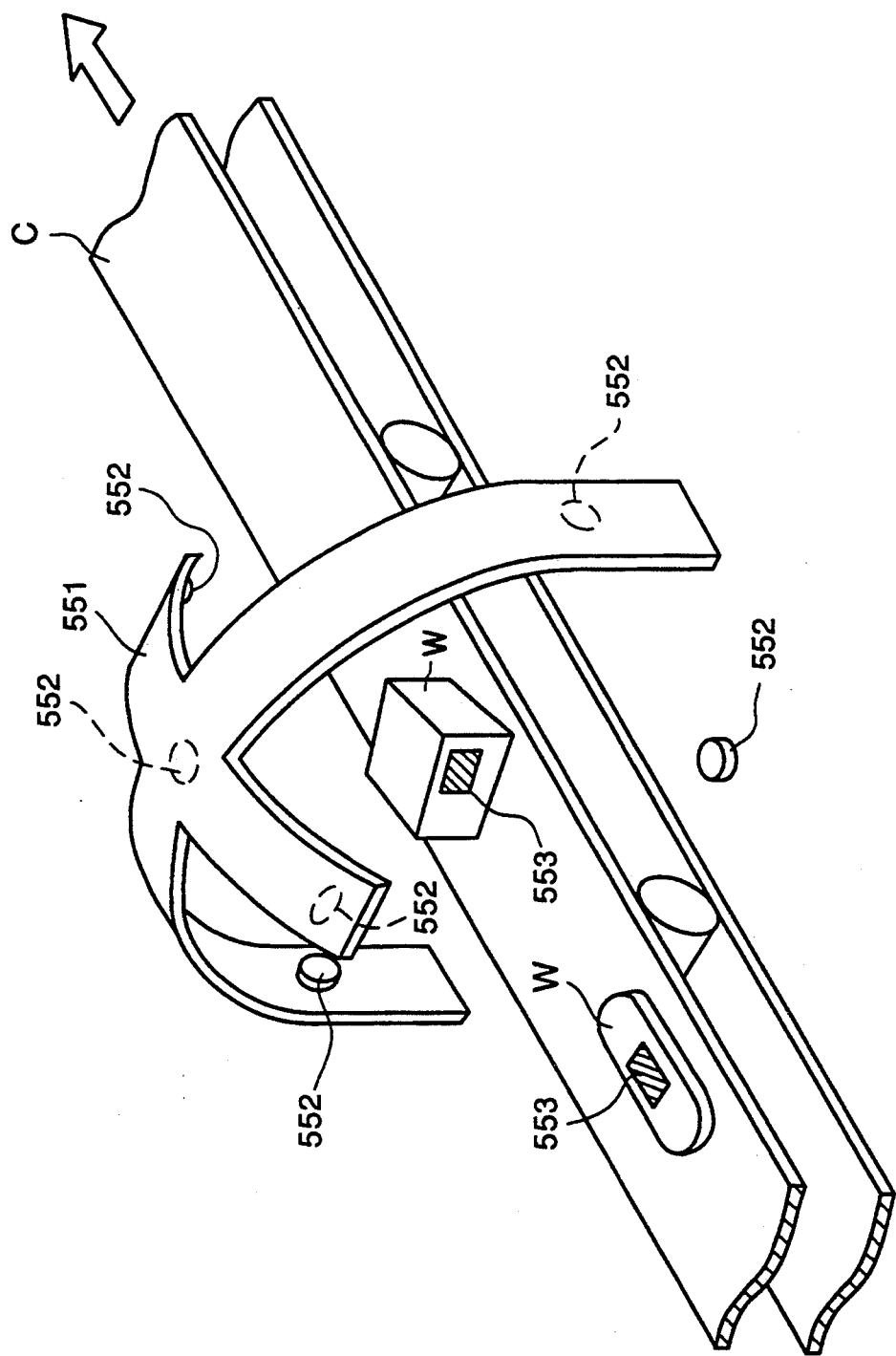
FIG. 85 is a diagram showing a perspective view of the overall structure of a fifth embodiment implementing an interrogator for reading information from an electronic tag.

As shown in FIG. 85, an interrogating system is configured to comprise a frame 551, a plurality of interrogators 552, a controlling apparatus 554 to be described later and a host computer not shown in the figure. The controlling apparatus 554, which is shown in FIG. 86, is used for controlling the interrogators 552.

The frame 551 is installed around a belt conveyor (C) for conveying a parcel (W). Both ends of the frame 551 are placed on the left-hand and right-hand sides of the belt conveyor (C). Six interrogators 552 are fixed on the inner side of the frame 551. Two of the interrogators 552 are installed on the left-hand and right-hand aides of the belt conveyor (C). One of them is fixed right above the belt conveyor (C). Other two are attached on both ends of a longitudinal portion of the frame 551. The remaining one is placed directly below the belt conveyor (C). As such, the layout of the interrogators 552 is devised into an arrangement allowing for the freedom to stick a home-delivery slip 553 to any location on the parcel (W). The controlling apparatus 554, which is shown in FIG. 86 and described later, further shifts the transmission time of one interrogator 552 from that of another, enabling the interrogating system to communicate with the home-delivery slip 553 through one of its interrogators 552 regardless of the direction in which the home-delivery slip 553 is affixed on the parcel (W).

Next, the controlling apparatus 554 for controlling the interrogators 552 is described.

Figure 86:
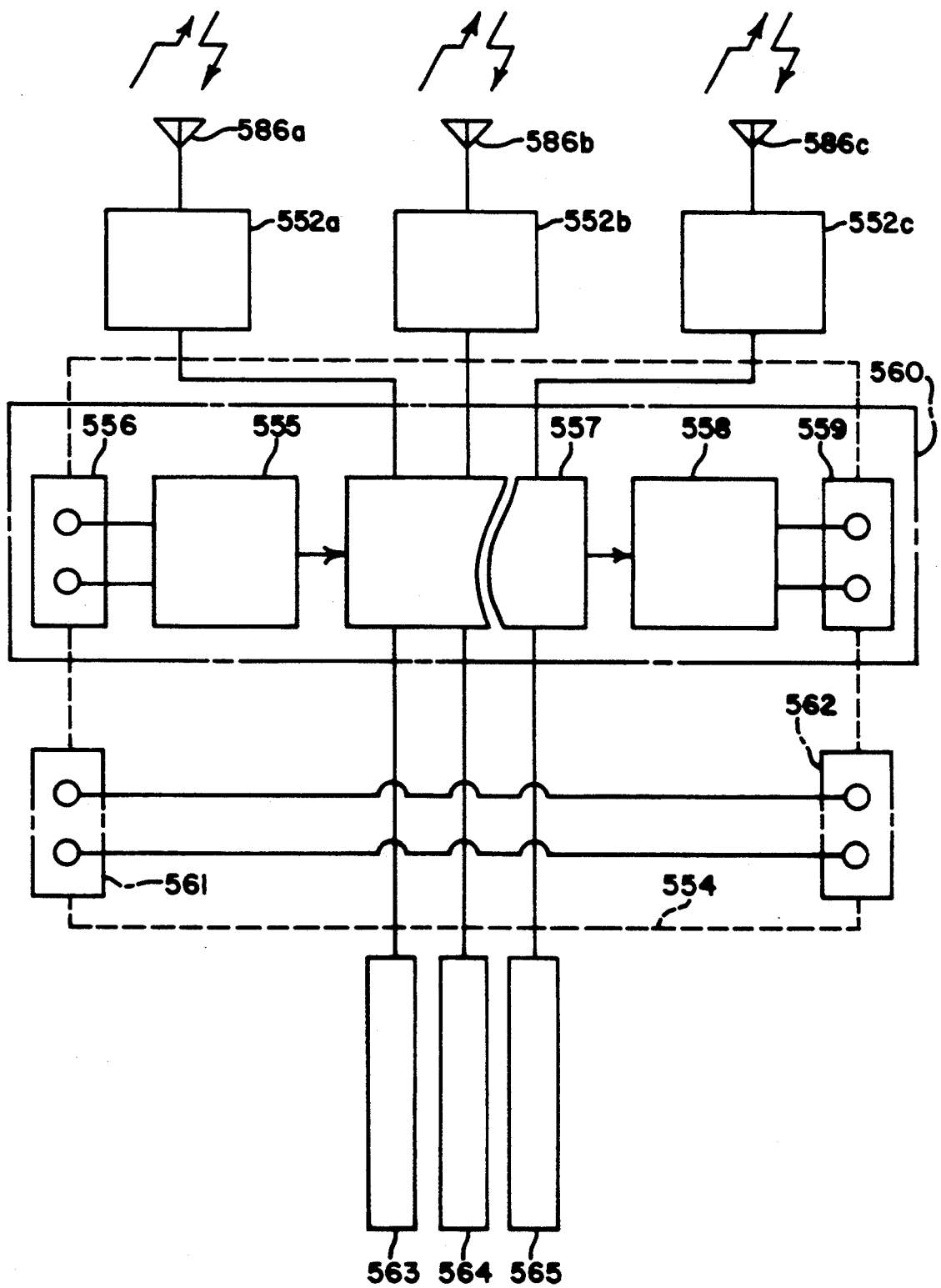
FIG. 86 is a block diagram showing a skeleton configuration of a controlling apparatus for controlling the above interrogator.

As shown in FIG. 86, the controlling apparatus 554 is equipped with a controller 560 and successive-control-signal return terminals 561 and 562. The successive-control-signal return terminals 561 and 562 are connected to each other. The controller 560 comprises a successive-control-signal input circuit 555 and its terminals 556, an interrogator controlling unit 557, a successive-control-signal output circuit 558 and its terminals 559. Three interrogators 552 are connected to the controller 560. Each interogator 552 is connected to the transmitting/receiving antenna 586, respectively. In addition, host communication ports 563, 564 and 565 are also connected to the controller 560 for communicating with a host computer.

The successive-control-signal input circuit 555 and its terminals 556, the successive-control-signal output circuit 558 and its terminals 559 and the successive-control-signal return terminals 461 and 462 each have a configuration for connecting the controlling apparatus 554. As described later, by connecting the controlling apparatus 554, a number of interrogators 552 can be controlled.

Next, a detailed circuit configuration of the controller 560 cited above is described.

Figure 87:
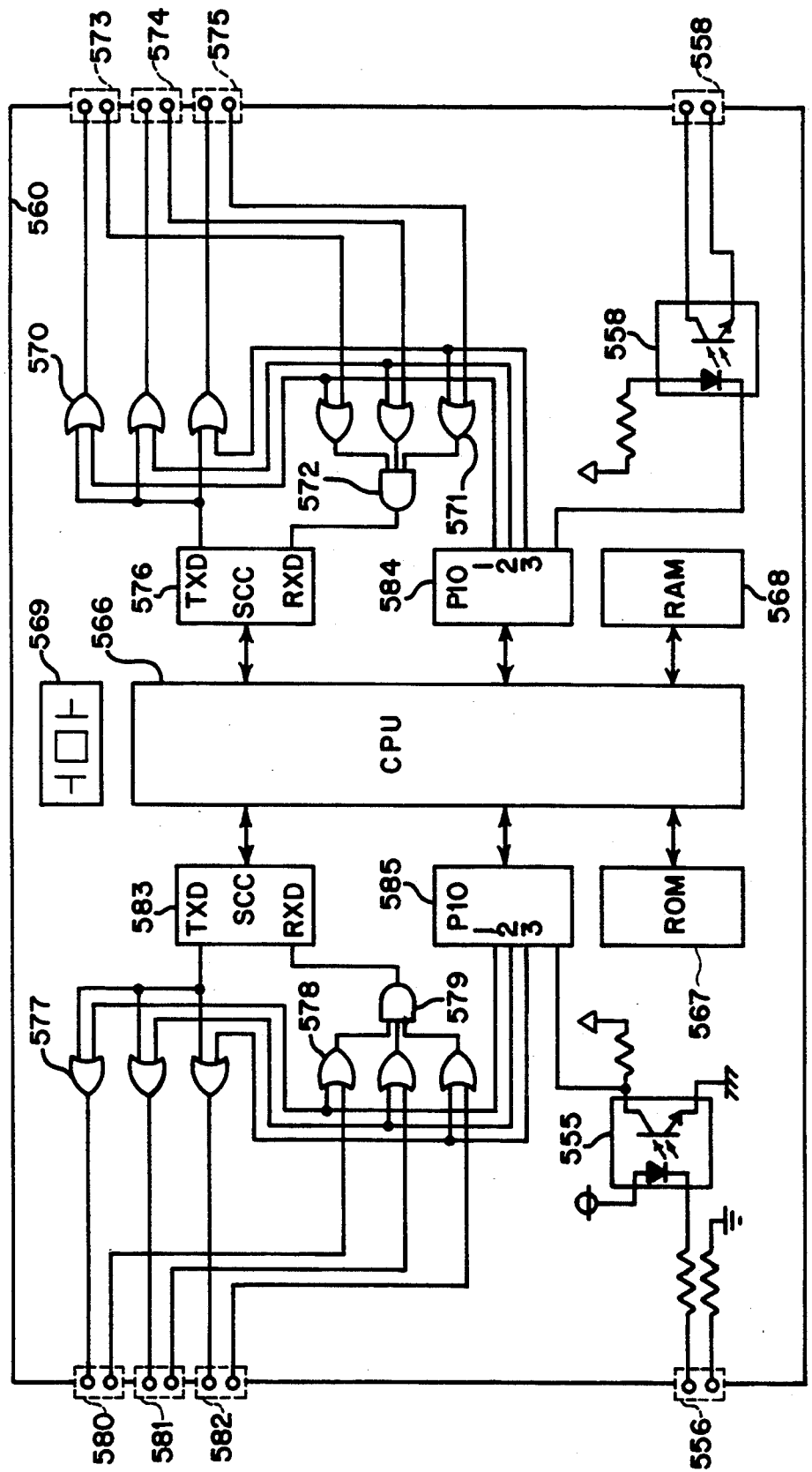
FIG. 87 is a circuit diagram of a circuit configuration of a controller used in the controlling apparatus shown in FIG. 86.
Figure 88A:
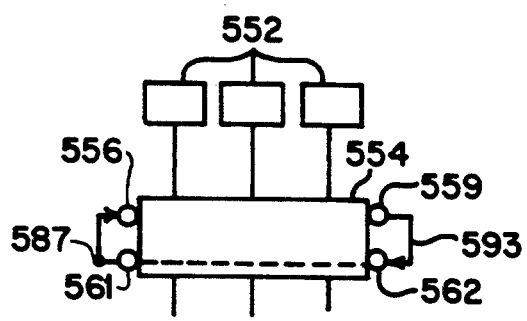
FIGS. 88(A)-88(D) are explanatory diagrams showing connection examples of the controlling apparatuses.
Figure 88B:
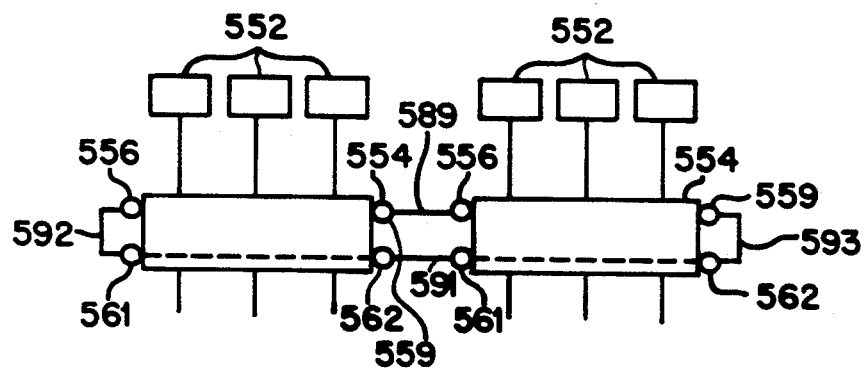
Figure 88C:
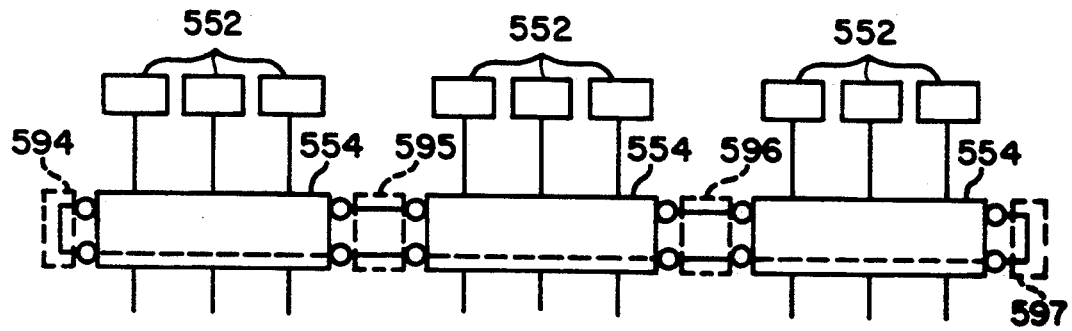
Figure 88D:
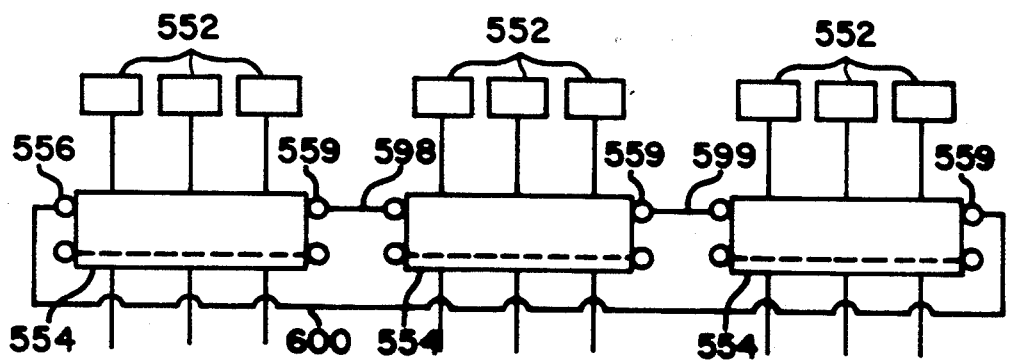

As shown in FIG. 87, the controller 560 is equipped with a computer, the successive-control-signal input circuit 555 and its terminals 556, and the successive-control-signal output circuit 558 and its terminals 559. The computer comprises, among other components, a CPU 566, a ROM unit 567, a RAM unit 568 and an oscillator 569. The successive-control-signal input circuit 555 and the successive-control-signal output circuit 558 each employ a phototransistor in order to separate a power supply system of communication lines connecting the controlling apparatus 554 from PIOs (Parallel Input/Output Controller) 584 and 585.

Figure 93:
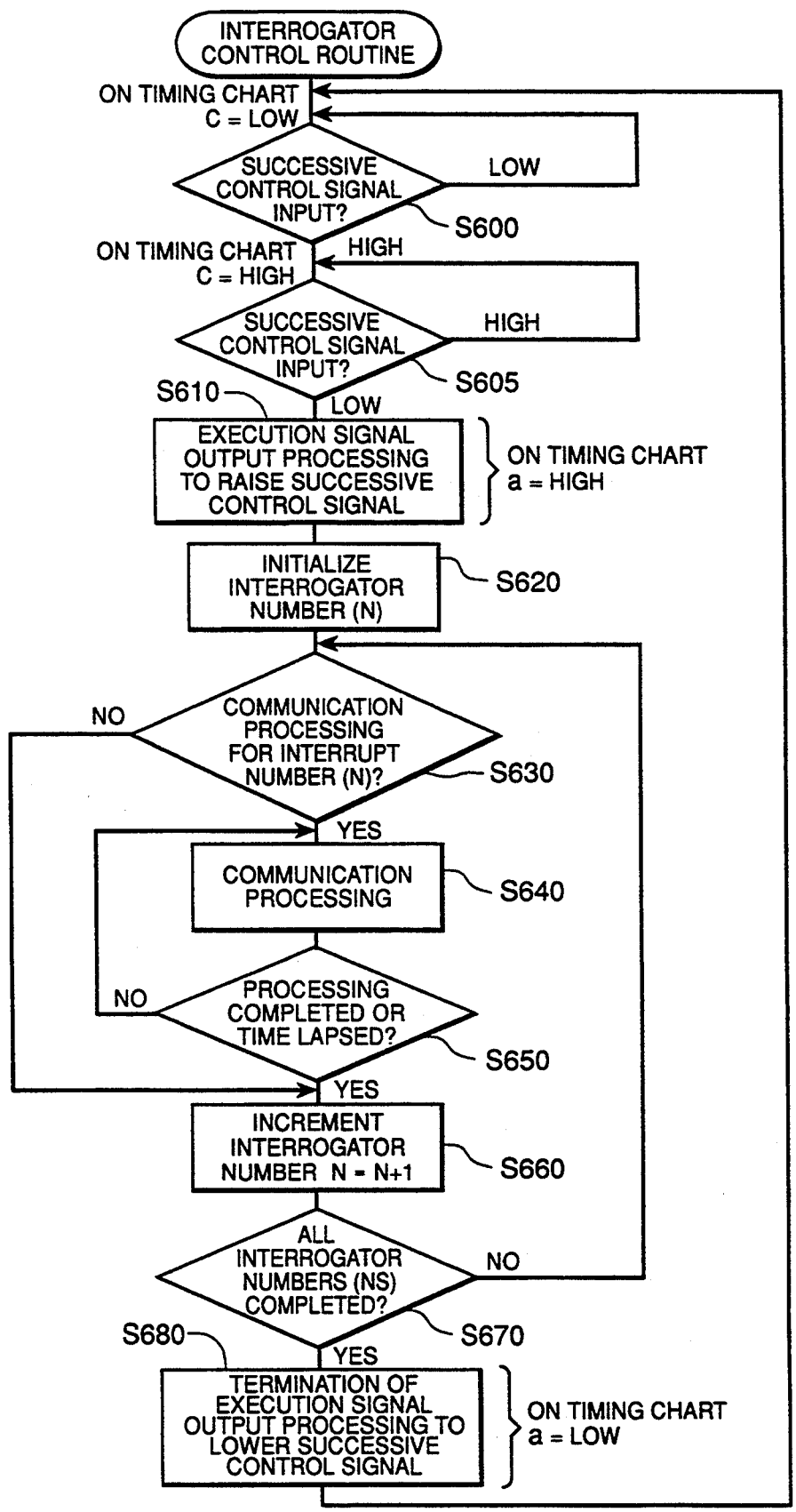
FIG. 93 is a flowchart showing an interrogation control routine executed by the controller.

The ROM unit 567 is used for storing programs such as an interrogator control routine shown in FIG. 93 and data. As described later, the CPU 566 reads the data and executes the programs stored in the ROM unit 567, exchanging information with the interrogators 552 and the host computer. The CPU 566 also controls the interrogators 552.

A circuit used by the controller 560 for transmitting and receiving data to and from the interrogators 552 is configured to comprise transmission-interrogator select gates 570, reception-interrogator select gates 571, a reception SSC input gate 572, interrogator control interfaces 573, 574 and 575 and an SCC (Serial Communication Controller) 576 and the PIO 584.

A circuit for transmitting and receiving data to and from the host computer comprises transmission host communication line select gales 577, reception host communication line select gates 578, a reception SSC input gate 579, host communication control interfaces 580, 581 and 582 and an SCC (Serial Communication Controller) 583 and the PIO 585.

First of all, the circuit for transmitting and receiving data to and from the interrogators 552 is described.

The transmission-interrogator select gates 570 are implemented using three OR circuits which each receive an output signal from a TXD pin of the SCC 576 and one of outputs 1 to 3 of the PIO 584. The outputs of the three OR circuits are connected to the interrogator control interfaces 573, 574 and 575 respectively. The reception-interrogator select gates 571 are implemented also using three OR circuits which receive one of the outputs 1 to 3 of the PIO 584 and inputs from the interrogator control interfaces 573, 574 and 575. The outputs of the OR circuits are supplied to the reception SCC input gate 572 the output of which is connected to an RXD pin of the SCC 576.

The functions to transmit and receive data to and from the interrogators 552 are carried out as follows.

First of all, the CPU 556 outputs an interrogator select signal to the PIO 584 in order to select one of the interrogator control interfaces 573, 574 and 575. The selected one is connected to the TXD and RXD pins of the SCC 576. Assume, for example, that receiving the interrogator select signal, the PIO 584 raises its outputs 1 and 2 to a high level but pulls down its output 3 to a low level. In this case, the interrogator control interface 575 associated with the output 3 is selected. As such, one of the interrogator control interfaces 573, 574 and 575 associated with one of the outputs 1 to 3 of the PIO 584 that is pulled down to a low level gets selected by the interrogator select signal. The CPU 566 then controls the SCC 576 to output a signal during transmission through its TXD pin which is finally forwarded to the selected interrogator control interface 575. During reception, a signal received through the selected interrogator control interface 575 is supplied to the RXD pin of the SCC 576.

Next, the circuit for transmitting and receiving data to and from the host computer is described.

The transmission host communication line select gates 577 are implemented using three OR circuits which each receive an output signal from a TXD pin of the SCC 583 and one of outputs 1 to 3 of the PIO 585. The outputs of the three OR circuits are connected to the host communication control interfaces 580, 581 and 582 respectively. The reception host communication line select gates 578 are implemented also using three OR circuits which receive one of the outputs 1 to 3 of the PIO 585 and inputs from the host communication control interfaces 580, 581 and 582. The outputs of the OR circuits are supplied to the reception SCC input gate 579 the output of which is connected to an RXD pin of the SCC 583.

The functions to transmit and receive data to and from the host computer are carried out as follows.

First of all, the CPU 556 outputs a host communication line select signal to the PIO 585 in order to select one of the host communication control interfaces 580, 581 and 582. The selected one is connected to the TXD and RXD pins of the SCC 583. Assume, for example, that receiving the host communication line select signal, the PIO 585 raises its outputs 1 and 2 to a high level but pulls down its output 3 to a low level. In this case, the host communication control interface 582 associated with the output 3 is selected. As such, one of the host communication control interfaces 580, 581 and 582 associated with one of the outputs 1 to 3 of the PIO 585 that is pulled down to a low level gets selected by the host communication line select signal.

The CPU 566 then controls the SCC 583 to output a signal during transmission through its TXD pin which is finally forwarded to the selected host communication control interface 582. During reception, a signal received through the selected host communication control interface 582 is supplied to the RXD pin of the SCC 583. The controlling apparatus 554 for controlling the interrogators 552 described above is used as follows.

The controlling apparatus 554 is connected to the interrogators 552 as shogun in FIG. 88.

FIG. 88 (A) shows a skeleton structure in which one unit of controlling apparatus 554 is used. The successive-control-signal input terminal 556 and the successive-control-signal return terminal 561 are shortened using a connection line 587. The successive-control-signal output terminal 559 and the successive-control-signal return terminal 562 are-shortened using a connection line 588. A control signal output by the successive-control-signal output terminal 558 is supplied to the successive-control-signal input terminal 555 through the terminal 559, the connection line 588, the successive-control-signal return terminal 562, the successive-control-signal return terminal 561, the connection line 587 and the terminal 556.

FIG. 88 (B) shows a skeleton structure in which two units of controlling apparatuses 554 are used. This configuration allows six interrogators 552 to be connected. A loop starting from the successive-control-signal Output terminal 559 of one controlling apparatus 554 and ending at the successive-control-signal input terminal 556 of the other controlling apparatus 554 can be formed through connection lines 589, 591, 592 and 593 by utilizing the successive-control-signal return terminals 561 and 562. Accordingly, a successive control signal output by the successive-control-signal output circuit 558 of one controlling apparatus 554 can be supplied to the successive-control-signal input circuit 555 of the other controlling apparatus 554.

FIG. 88 (C) shows a skeleton structure in which three units of controlling apparatuses 554 are used. This configuration allows nine interrogators 552 to be connected. A loop starting from the successive-control-signal output terminal 559 of one controlling apparatus 554 and ending at the successive-control-signal input terminal 556 of another controlling apparatus 554 can be formed through connection lines 594, 595, 596 and 597 by utilizing the successive-control-signal return terminals 561 and 562. Accordingly, a successive control signal output by one controlling apparatus 554 can be supplied to a next controlling apparatus 554.

FIG. 88 (D) shows a skeleton structure in which three units of controlling apparatuses 554 are used like the configuration of FIG. 88 (C). Connection lines 598, 599 and 600 are used for connecting the three controlling apparatuses 554 but the successive-control-signal return terminals 561 and 562 are not utilized.

Next, the principle of operation of a controlling-apparatus system with the configuration shown in FIG. 88 (C), in which three units of controlling apparatuses 554a, 554b and 554c are connected to nine units of interrogators 552a-1 to 552a-3, 552b-1 to 552b-3 and 552c-1 to 552c-3, is described.

Figure 89:
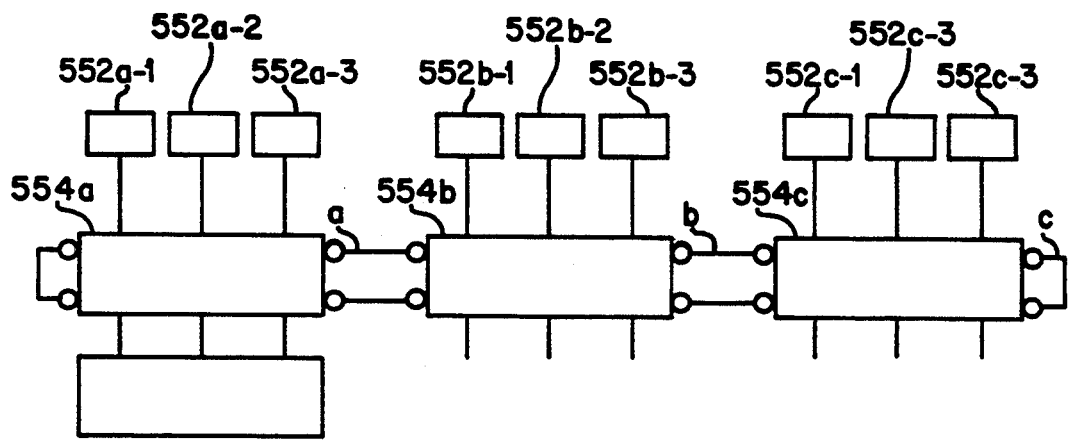
FIGS. 89(A) and 89(B) are timing charts used for explaining the operation of the interrogator.
Figure 89:
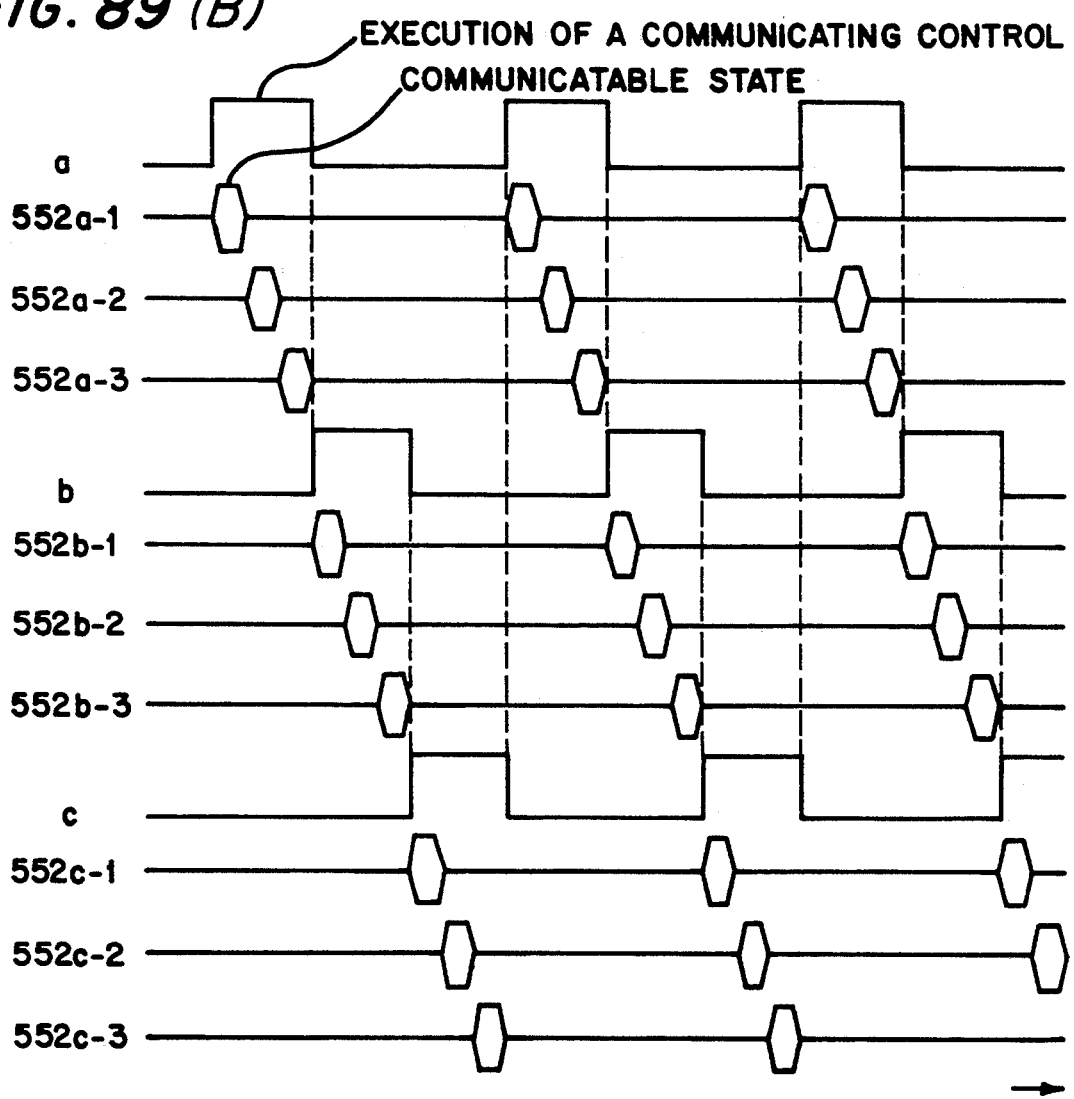

The CPU 566 executes an interrogator control routine, which is shown in FIG. 93 and to be described later, in order to shift communicatable timings of the nine interrogators 552 into such a scheme that those timings do not overlap each other as shown in FIG. 89. During a period in which the controlling apparatus 554a has an operation right, a successive control signal (a) is raised to a high level and the interrogators 552a-1 to 552a-3 are enabled to communicate one after another. As the controlling of the interrogators 552a-1 to 552a-3 is completed, the controlling apparatus 554a relinquishes the operation right, pulling down the the successive control signal (a) to a low level. Receiving the low-level successive control signal (a), the controlling apparatus 554b at the next stage is granted an operation right, successively raising the successive control signal (b) to a high level. While the successive control signal (b) is being held at the high level, the interrogators 552b-1 to 552b-3 are enabled to communicate one after another.

As the control of the interrogators 552b-1 to 552b-3 is completed, the controlling apparatus 554b pulls down the successive control signal (b) to a low level, relinquishing the operation right. Receiving the low-level successive control signal (b), the controlling apparatus 554c at the next stage acknowledges the operation right successively granted thereto, raising a successive control signal (c) to a high level. In this state, the interrogators 552c-1 to 552c-3 are put in a communicatable state one after another. As the control of the interrogators 552c-1 to 552c-3 is completed, the controlling apparatus 554c pulls down the successive control signal (c) to a low level, relinquishing the operation right.

The control operations described above are repeated in order to sequentially put the nine interrogators 552 in a communicatable state by shifting their timings. In the communication state, data is exchanged with the host computer through the host-side communication ports 563, 564 and 565. Based on the data exchanged with the host computer, the controlling apparatus 554 requests an interrogator 552 to transmit a query signal to a responding circuit 40 on the parcel (W) and forwards data returned by the responding circuit 521 to the host computer.

Figure 90A:
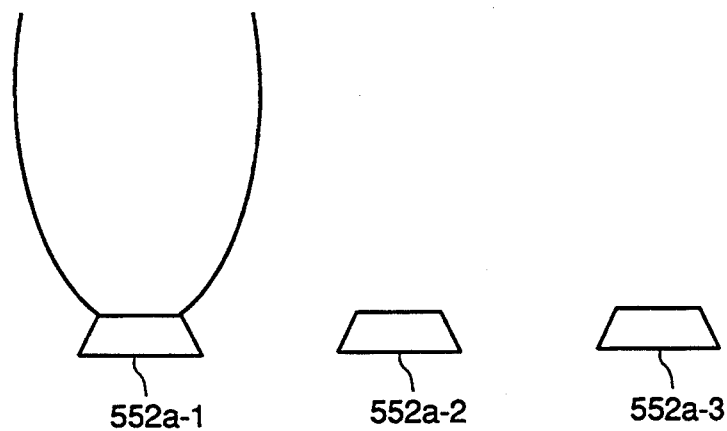
FIGS. 90(A)-90(C) are explanatory diagrams used for explaining the operation of the interrogator.
Figure 90B:
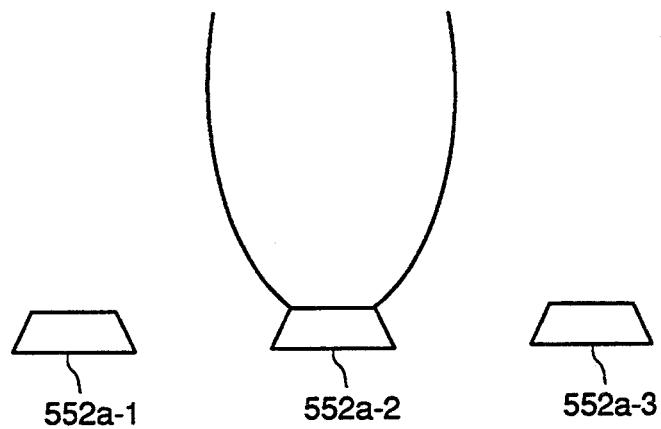
Figure 90C:
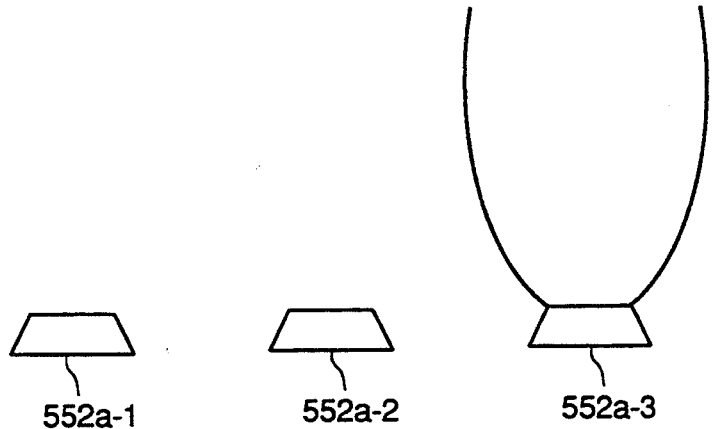
Figure 91:
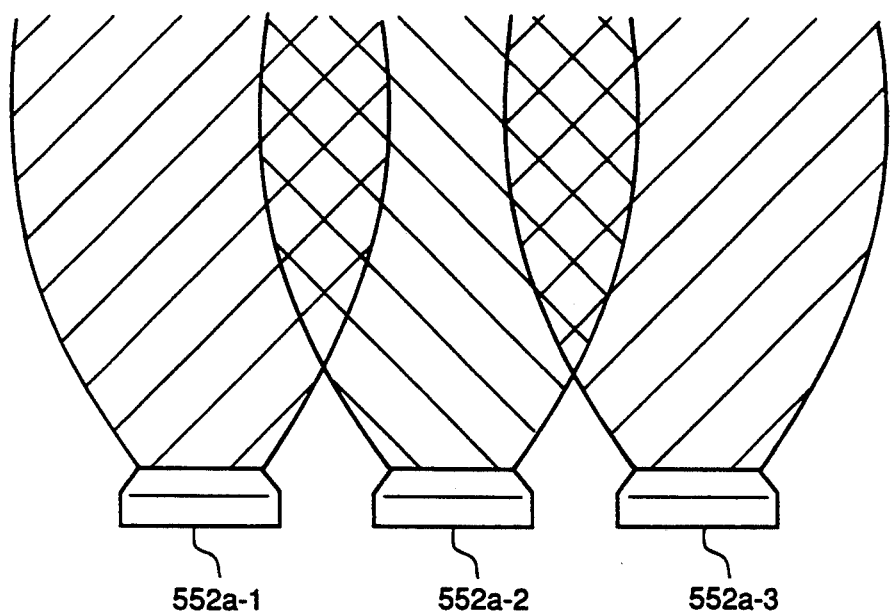
FIG. 91 is an explanatory diagram used for explaining a communicable area of interrogators.

Accordingly, the three interrogators 552a-1 to 552a-3 connected to the controlling apparatus 554a enter a communicatable state one after another with the lapse of time as shown in FIG. 90. It is obvious from the figure, that the range for exchanging electromagnetic waves is sequentially shifted from one interrogator 552 to another. As a result, if the communication ranges in which the interrogators 552a-1 to 552a-3 transmit and receive electromagnetic waves are concatenated, a wide communication area is resulted in as shown in FIG. 91. It should be noted, that since the individual periods of time during which the interrogators 552 transmit and receive electromagnetic waves do not timewise coincide with each other, no radio interferences occur.

Figure 92:
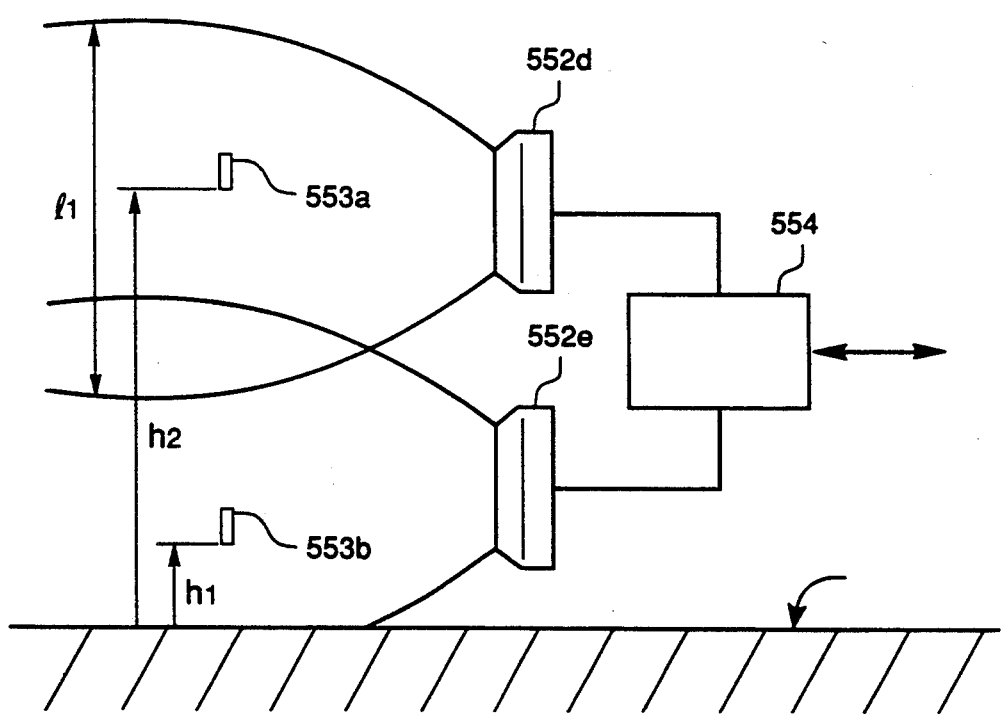
FIG. 92 is an explanatory diagram used for explaining a communication example between the interrogator and the responding circuit.

The widened communication range described above is effective when applied to, for example, the following case. In an automatic sorting process, the altitude of a responding circuit 521 entering a frame 551 varies depending upon the size of the parcel as shown in FIG. 85. In general, therefore, the altitude of a responding circuit 553a is different from that of another responding circuit 553b as shown in FIG. 92. The responding circuit 553a approaching the interrogators 552 with an altitude (h2) falls into the communication range of an interrogator 552d. Accordingly, the responding circuit 553a can communicate with the interrogator 552d. On the other hand, the responding circuit 553b approaching the interrogators 552 with an altitude (h1) does not enter the communication range of the interrogator 552d. Fortunately, however, an interrogator 552e is installed so that its communication range partially overlaps that of the interrogator 552d and covers the altitude (h1) of the responding circuit 553b. The responding circuit 553b can thus communicate with the interrogator 552e the communication timing of which is shifted from that of the interrogator 552d.

In order to accomplish the control to sequentially switch the communication period from an interrogator 552 to another by shifting the timing as described above, the CPU 566 employed by the controller 560 of the controlling apparatus 554 executes the following interrogator control routine.

At Step S600 at the beginning of the interrogator control routine shown in FIG. 93, the CPU 566 is in a state waiting for the successive control signal input to rise to a high level. As the successive control signal input is raised to a high level, the CPU enters Step S605 at which it waits for the successive control signal input to go low. As the successive control signal input turns from the high level to a low level during the wait state at Step S605, the execution of the interrogator control routine continues to Step S610 at which an execution signal output processing is carried out to output a successive control signal through the terminal 559 of the successive control signal output circuit 558.

Subsequently, at Step S620, an interrogator number (N) is initialized. At Step S630, the CPU 566 checks whether or not a communication processing exists for the interrogator 552 associated with the interrogator number (N). If such a communication processing exists, the execution of the interrogator control routine continues to Step S640 at which the communication processing is accomplished.

At Step S650, the CPU 566 determines that the communication processing has been completed or a predetermined period of time has lapsed. At She S660 following Step S650, the interrogator number (N) is incremented. If, at Step S630 cited above, the CPU 566 judges that no communication processing exists, the execution of the interrogator control routine continues directly to Step S660 to increment the interrogator number (N), skipping the processings of Steps S640 and S650. Then, at Step S670 the CPU 566 checks the interrogator number (N) to determine if communication processings have been completed for all the interrogators 522. If not completed, the processings of Steps S630 to S660 are repeated. If, at Step S670, the communication processings are found to have been completed, the execution of the interrogator control routine continues to Step S680 at which a termination process of the execution signal output processing is carried out to assert a low-level successive control signal on the terminal 559 of the successive control signal output circuit 558.

By executing the above interrogator control routine, during the execution period of the communication control of each controlling apparatus 554a, 554b and 554c, the three interrogators 552 connected to each of them are successively enabled to communicate while their timings are being shifted as is explained in the timing chart of FIG. 89.

It is the controller 560 in each controlling apparatus 554 that shifts the timings of the communication-enabled states of the interrogators 552. The controlling apparatus 554 retains the operation right until the communication processings of all the interrogators connected thereto are completed, holding back the operations of the other controlling apparatuses. Later on, when the communication processings of all the interrogators 552 are completed, the controlling apparatus 554 turns over the operation right held so far to the successive controlling apparatus 554. By executing the above operations, all the interrogators 552 are put in a communication-enabled state sequentially with their communication timings being shifted from each other.

It should be noted that if only one controlling apparatus 554 is used as in the case of the configuration shown in FIG. 88 (A), the interrogators 552f, 552g and 552h operate as indicated by a timing chart shown in FIG. 94. As the operation of the interrogator 552h is completed, a successive control signal (I) output on the connection line 588 turns from a high level to a low level. It is fed back through the communication line 587, restoring the successive control signal (I) back to the high level. At that time, the operation of the interrogator 552f is started. In this way, the interrogators 552f, 552h and 552h are repeatedly put in a communication-enabled state one after another while their operation timings are being shifted. By using the controlling apparatus 554 described above, the communication period is shifted among a plurality of interrogators 552 from one unit to another so that the communication period assigned to an interrogator 552 does not overlap that of another. A wide communication area can thus be obtained by concatenating the communication ranges of the interrogators 552 without causing radio interferences to occur. As a result, the controlling apparatus gives an effect that allows communication with a responding circuit 521 embedded in a home-delivery slip 553 affixed on a parcel (W) to be established no matter how the sizes and the postures of parcels on the belt conveyor are different from each other.

In addition, the controlling apparatus 554 has an advantage that it allows the processing time to be shortened by skipping the communication processing of an interrogator 552 that does not communicate. This is possible because at Step S630 of the interrogator control routine shown in FIG. 93, a decision can be made to bypass an interrogator 522 which is not carrying out communication processing.

Figure 95:
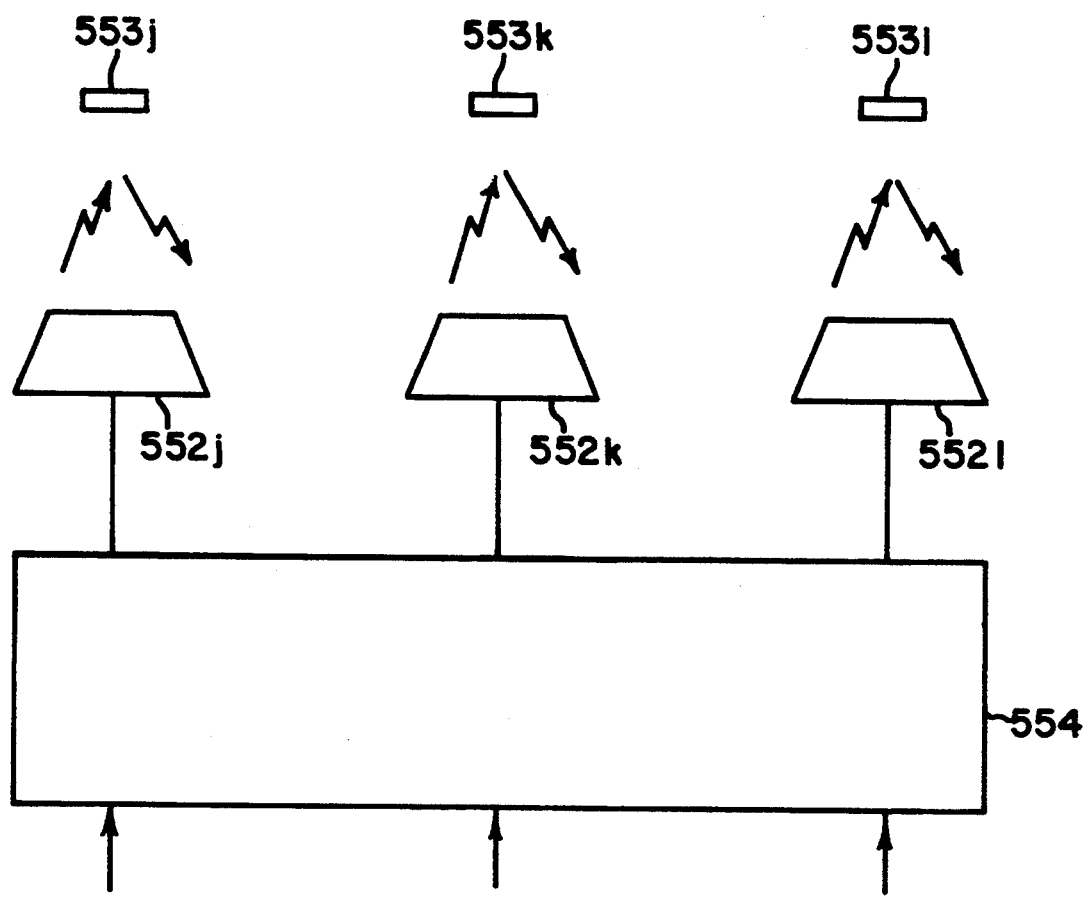
FIG. 95 an explanatory diagram used for explaining another communication example of the interrogator.

In the case of the fifth embodiment described above in which a plurality of interrogators are used, a communication system can be established by assigning interrogators 552j, 552k and 552l communication protocols (a), (b) and (c) respectively which are different from each other as shown in FIG. 95 instead of shifting the communication period from one interrogator 552 to another. Therefore, the interrogators 552j, 552k and 552l can be communicated with the home-delivery-slip 553j, 553k and 553l independently. With such a communication system, home-delivery ships with different protocols of plural home-delivery companies can be read by only one reading line.

As an alternative, each interrogator 552 is assigned a unique electromagnetic-wave frequency. For example, electromagnetic-wave frequencies assigned to the interrogators 552 are shifted from each other by 2 MHz with a frequency of 2.45 GHz taken as a center. In the case of six interrogators 552 shown in FIG. 85, for example, frequencies of 2.445 GHz, 2.447 GHz, 2.449 GHz, 2.451 GHz, 2.453 GHz and 2.455 GHz are assigned individually to the interrogators 552. By assigning a unique frequency to each interrogator 552 as such, the six interrogators 552 can communicate with a responding circuit simultaneously without causing radio interferences to occur.

Accordingly, by shifting the frequencies of the interrogators 552 as described above, radio interferences can be prevented from occurring, resulting in the same effect as the fifth embodiment explained earlier. In addition, since the interrogators 552 can be put in a communication-enabled state at the same time, the time to read information from a responding circuit can be shortened. The shortened time to read information, in turn, gives an advantage that a parcel (W) is allowed to pass through a bundle of interrogators 552 in a short period of time. This means the frame 551 can be made small in size and/or there is room for increasing the transport speed of the belt conveyor (C).

Next, a sixth embodiment implementing the structure of the interrogator for reading information from an electronic tag is explained. In this embodiment, the position of the interrogator transmitting electromagnetic waves can be changed so that information can be read from an electronic tag correctly without regard to the location on the parcel on which the electronic tag is affixed.

Figure 96:
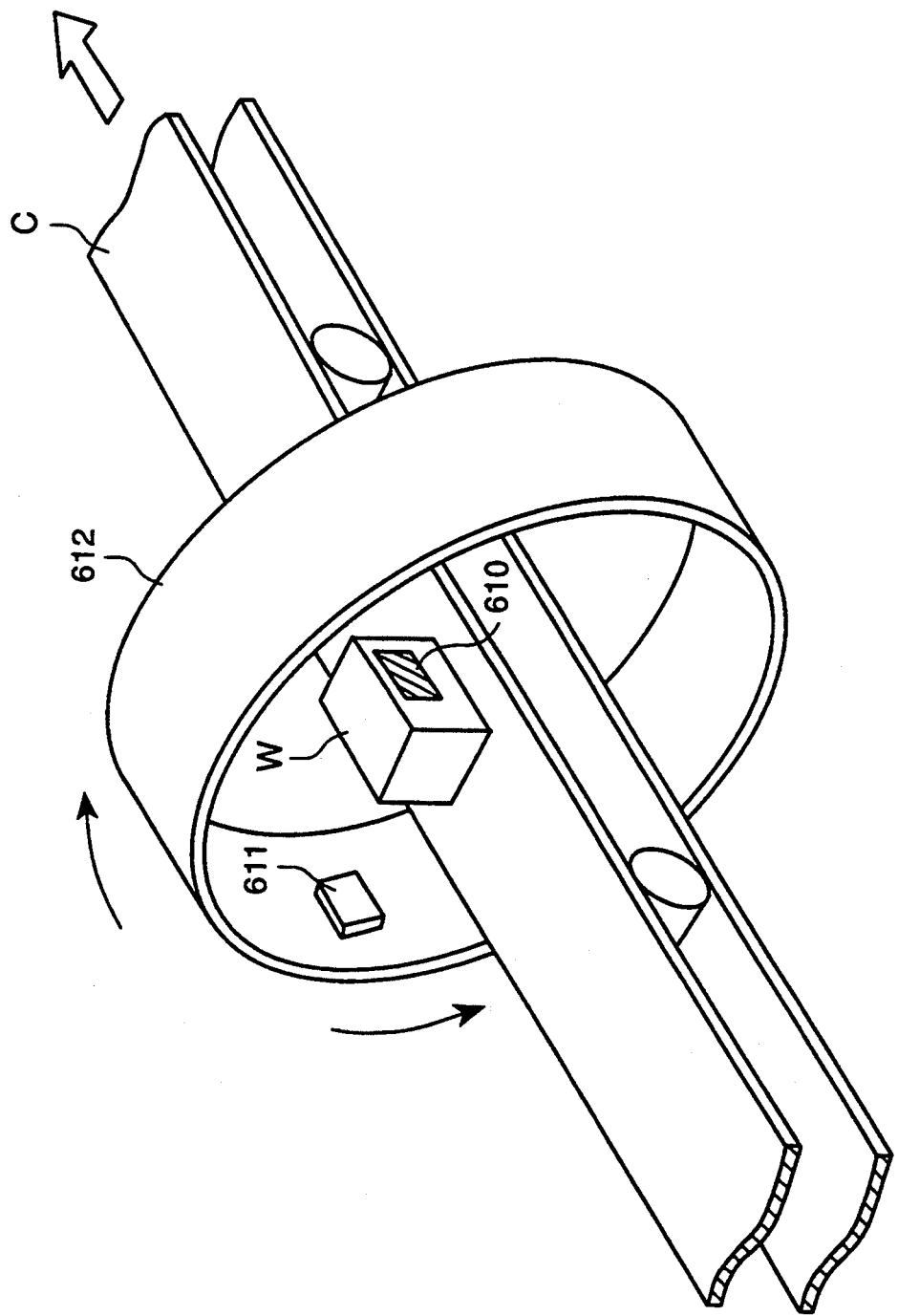
FIG. 96 is a diagram showing a perspective view of the overall structure of a sixth embodiment implementing an interrogator for reading information from an electronic tag.

The embodiment implements an interrogating apparatus into a configuration shown in FIG. 96. The interrogating apparatus is designed into a rotating drum 612 through which the belt conveyor (C) passes. An interrogator 611 is fixed on the inner circumference of the rotating drum 612. The rotational speed and direction of the rotary drum 612 are controlled by a host computer not shown in the figure. The host computer also drives the operation of the interrogator 611.

In the above configuration, the rotating drum 612 rotates, causing the interrogator 611 to resolve around a parcel (W). It is thus possible to put a responding circuit 521 embedded in a home-delivery slip 610 in the communication range of the revolving interrogator 611, even though the position of the home-delivery slip on the parcel (W) varies depending upon the size and the posture on the belt conveyor (C) of the parcel (W). As a result, the interrogating apparatus also gives an effect that allows communication with a responding circuit 521 embedded in a home-delivery slip 610 affixed on a parcel (W) to be established no matter how the sizes and the postures of parcels (W) on the belt conveyor (C) are different from each other without causing radio interferences to occur much like the fifth embodiment described earlier.

Next, a seventh embodiment implementing the structure of the interrogator for reading information from an electronic tag is described. This embodiment is configured so that query electronic waves transmitted by the interrogator have no effect on the human body.

Figure 97:
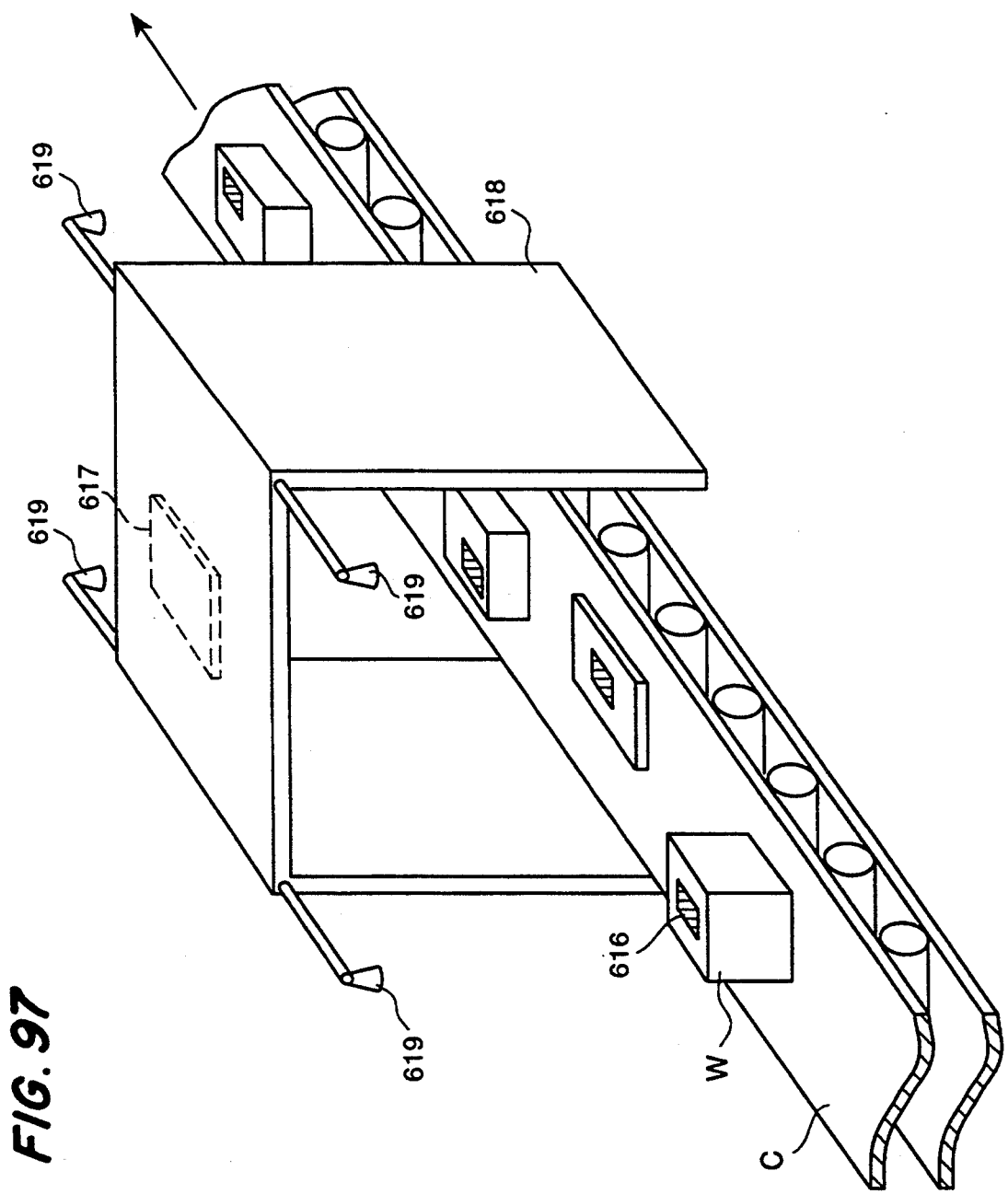
FIG. 97 is a diagram showing a perspective view of the overall structure of the sixth embodiment implementing an interrogator for reading information from an electronic tag equipped with a safety device.

As shown in FIG. 97, a location at which an interrogator 617 is installed has to be separated from a home-delivery ship 616 on a parcel (W) being conveyed by a belt conveyor (C) in an automatic sorting process by at least a distance in the range 30 to 100 cm. This is because the sizes of the parcels (W) greatly differ from each other. In some cases, it is thus necessary to strengthen the output level of electromagnetic waves (a query signal) transmitted by the interrogator 617. For example, at frequencies in the 2.45-GHz band, an output power of 300 mW is permissible legally in Japan. However, at this output level, the effect of the electromagnetic waves on the human body causes some concern.

As shown in FIG. 97, the interrogating apparatus implemented by this embodiment is equipped with a safety device comprising a shielding wall 618 which shield the electromagnetic waves by reflecting or absorbing and approaching-human-body detecting sensors 619. The shielding wall 618 which covers a wide area of the belt conveyor (C) is used for shielding electromagnetic waves. The sensor 619 is used for sensing the human body that is approaching it.

The responding circuit of the home-delivery slip 616 affixed on the parcel (W) establishes communication with the interrogator 617 fixed on the inner surface of the shielding wall 618. The approaching-human-body sensors 619, typically infrared-light sensors capable of detecting the human body approaching it, are installed at the ends of supporting rods which protrude out off openings of the shielding wall 618 in parallel to the belt conveyor (C).

In general, the approaching-human-body sensors 619 are fixed outside the shielding wall 618 close to its openings. However, they can also be installed inside the shielding wall 618 or in close proximity to the belt conveyor (C) which is moving into the inside of the shielding wall 618.

The approaching-human-body sensors 619 of the safety device described above provide inputs to a CPU employed by a controlling apparatus. The CPU reads the inputs by executing an emergency-termination processing routine shown in FIG. 98 during the operation of the belt conveyor (C) which is controlled by the controlling apparatus.

Figure 98:
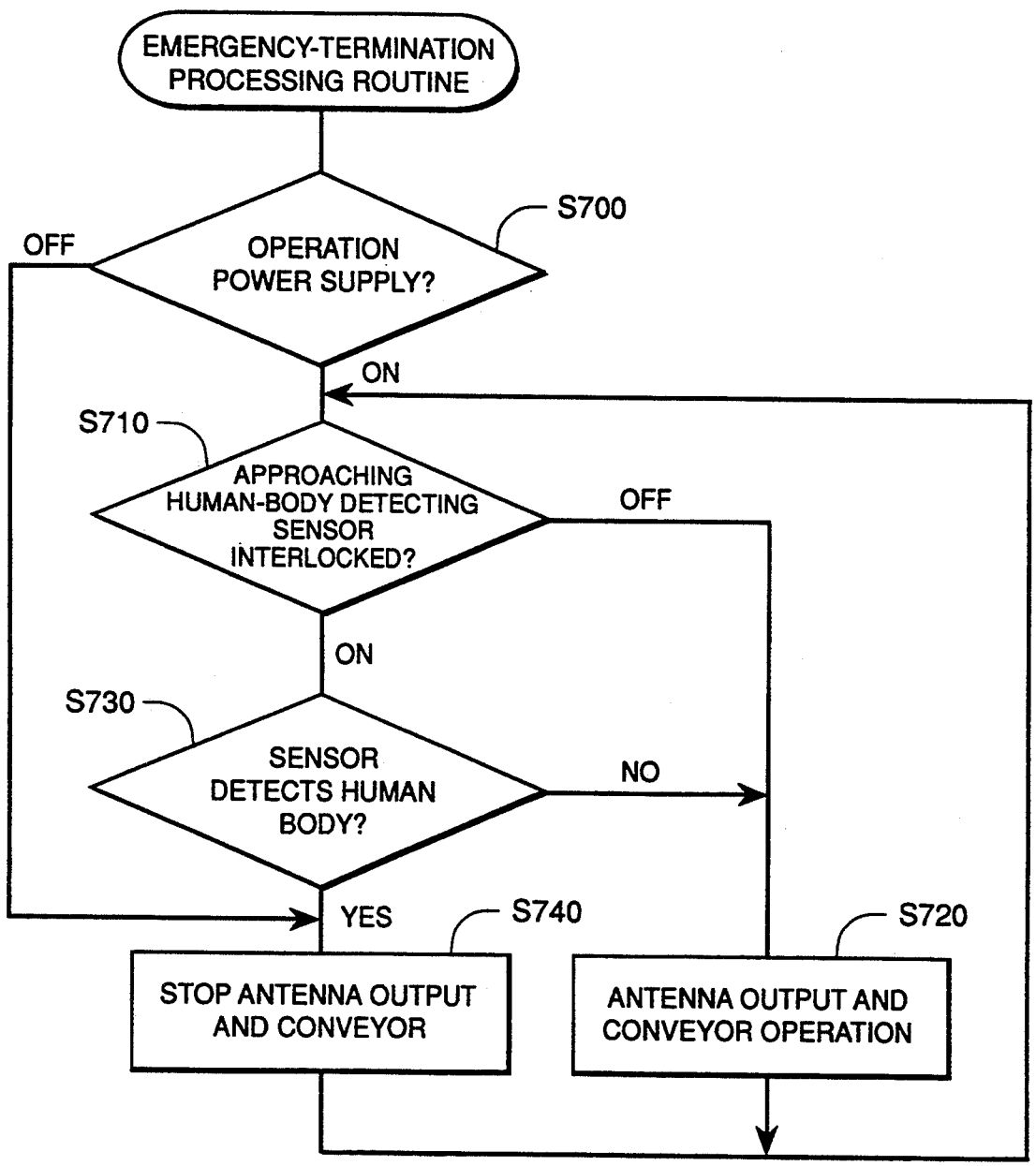
FIG. 98 is a flowchart showing an abnormal-termination processing routine executed by a controlling apparatus for controlling a belt conveyer.

At Step S700 at the beginning of the routine shown in FIG. 98, the CPU verifies that a power supply driving the operation of the belt conveyor (C) is on. At Step S710, the CPU determines whether or not the sensor 619 is interlocked. If the sensor 619 is found at Step S710 to be off, the interrogating system is judged to be operating in a mode not utilizing the safety device. In this case, the execution of the routine continues to Step S720 at which the interrogator 617 continues transmitting electromagnetic waves through its antenna and the operation of the belt conveyor (C) is continued as it is.

If the sensor 619 is found at Step S710 to be interlocked, the interrogating apparatus is judged to be operating in a mode making use of the safety device. In this case, the execution of the routine is continued to Step S730 to find out if a person is approaching the sensor 619. If no person is found approaching the sensor 619 at Step 730, the execution of the routine is continued to Step S720 to sustain the operation of the belt conveyor (C) and the transmission of electromagnetic waves through the antenna as described above. If a person is found approaching the sensor 619 at Step 730, the transmission of electromagnetic waves through the antenna and the operation of the belt conveyor (C) are halted at Step S740 while the human body is approaching the sensor 619. The termination processing carried out at Step S740 is also executed when the power supply driving the operation of the belt conveyor is found to be off at Step S700. The execution of the routine is then continued to Step S730 through Step S710. If, at Step S730, the sensor 619 finds that the human body is no longer approaching it, the execution of the routine is continued to Step S720 to resume the operation of the belt conveyor (C) and the transmission of electromagnetic waves through the antenna as described above.

As such, with the safety device employed in the above configuration, the transmission of electromagnetic waves by the interrogator 617 is discontinued whenever a person is approaching the interrogator 617. The problem caused by the effect of electromagnetic waves on the human body can thus be solved. At the same time, the operation of the belt conveyor (C) is also temporarily halted as well. Accordingly, the operation can be resumed later starting at a point where it has been halted.

Next, a modification example of the above embodiment is described. In the following modification example, the safety function of the safety device described above is further enhanced.

Figure 99:
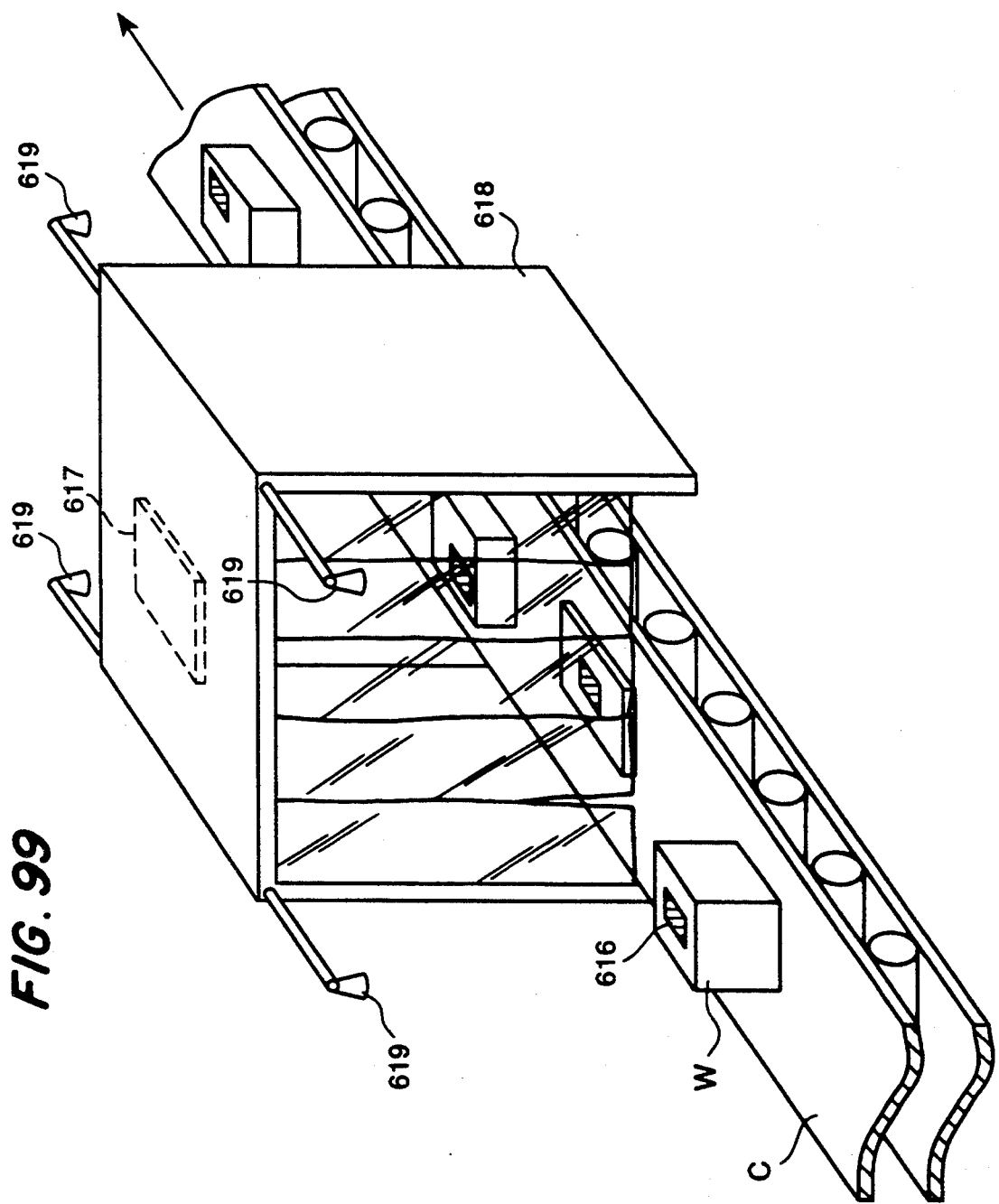
FIG. 99 shows a perspective view of a modification example of the safety device.

As shown in FIG. 99, shielding curtains 620 for shielding electromagnetic waves are provided, being stretched over the openings of the shielding wall 619. The shielding curtains 620 are configured into screens or sheets and made of a metal foil capable of reflecting or absorbing electromagnetic Haves or a resin such as a flexible and transparent vinyl stretched over a metal frame or ferrite. The curtain material is sandwiched by resin sheets.

As such, by utilizing the sensor 619 in conjunction with the shielding curtains 620 in the configuration, the safety feature is much improved. In addition, by virtue of the shielding curtains 620, electromagnetic waves transmitted by the interrogator 617 hit only one parcel (W). The proceeding and succeeding parcels (W) can thus be protected against electromagnetic waves. As a result, the modification example has an advantage that the risk of radio interferences' occurring due to signals returned at the same time by responding circuits of slips on a plurality of parcels (W) can be avoided.

It should be noted that in the configuration employing the shielding curtains 620, the sensor 619 can be installed at the inside of the shielding wall 618. In such a configuration, the transmission of electromagnetic waves by the interrogator 617 and the operation of the belt conveyor (C) are halted when a person opens any of the shielding curtains 620.

H. Manufacturing Techniques of the Electronic Tag

A first embodiment implementing the manufacturing technique of the electronic tag is described as follows.

In this embodiment, circuit patterns are created from a conductor foil 651, a thin metal sheet typically made of copper, aluminum or iron. The base of the circuit board is formed from a board material 652, a thin insulator sheet typically made of polyimide, polyesther or paper. In addition, the same material as the board material 652 is used as a cover material 653 for protecting the circuit patterns and electronic components fixed on the circuit patterns.

Figure 100:
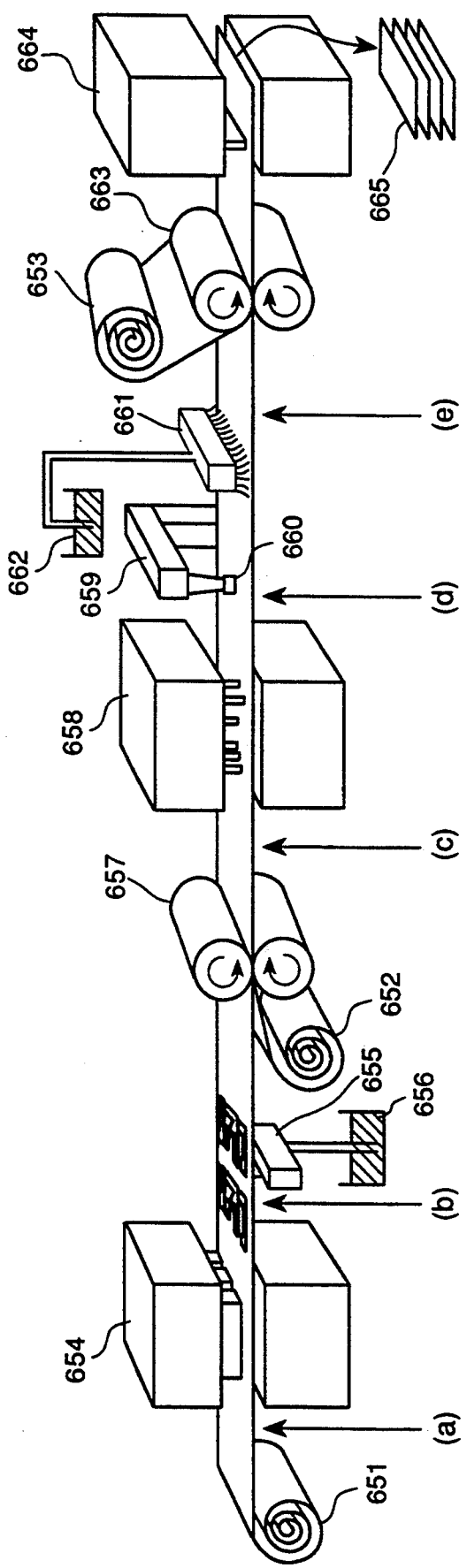
FIG. 100 is an explanatory diagram used for explaining a technique for manufacturing the first embodiment of the electronic tag apparatus.
Figure 101A:
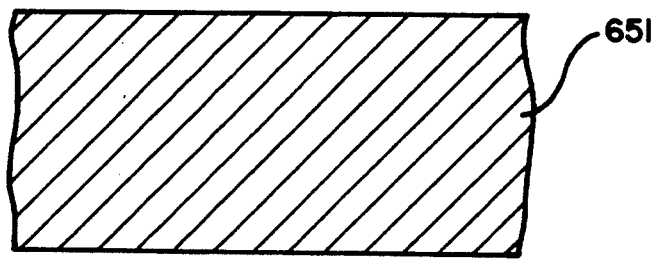
FIGS. 101(A)-101(E) show a manufacturing process flow showing each manufacturing step in the manufacturing of a conductor foil.
Figure 101B:
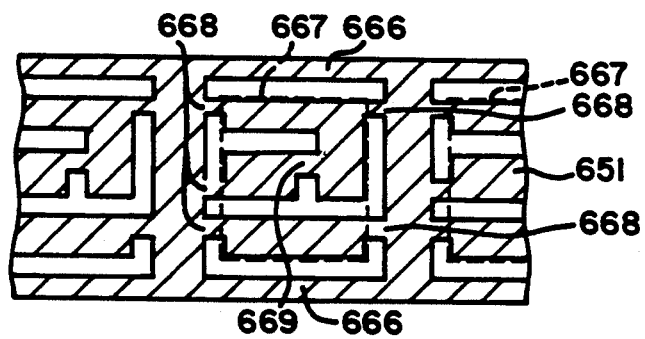
Figure 101C:
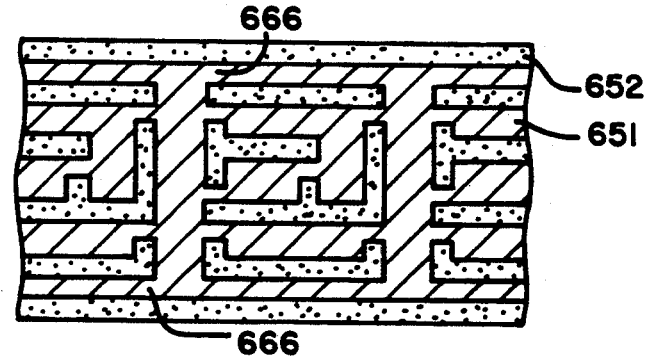
Figure 101D:
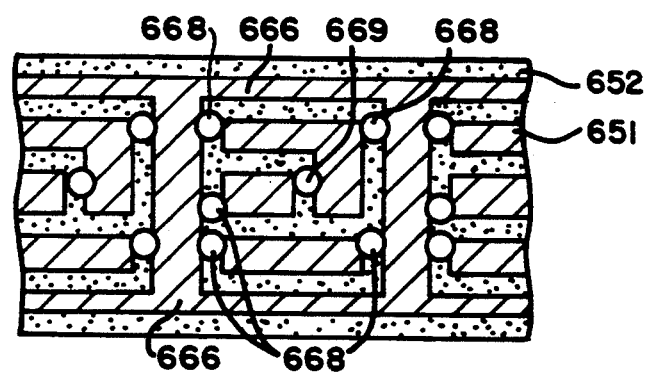
Figure 101E:
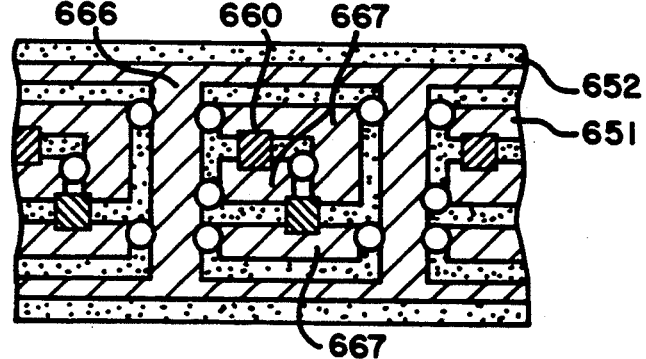

Reference numeral 654 shown in FIG. 100 is a pattern die-cutter for die-cutting the conductor foil 651. Reference numeral 655 denotes a binding-agent coater for coating binding agent 656 on the conductor foil 651. Reference numeral 657 is a pressure roller for strongly joining the conductor foil 651 to the board material 652 through the binding agent 656 by pressing the conductor foil 651 against the board material 652.

Reference numeral 658 is a hole punch for removing connection patterns by perforating holes on the connection patterns. Reference numeral 659 is component mounting equipment for mounting electronic components 660 on a circuit board using conducting adhesive agent or the like. Reference numeral 661 denotes an adhesive-agent coater for coating adhesive agent 662 on the board material 652 with circuit patterns joined thereto. Reference numeral 663 is a pressure roller for attaching the cover material 653 to the board material 652 with the conductor material 651 joined thereto. Reference numeral 664 is an external-shape cutter for creating a finished product 665 by cutting the external form of the board.

The following is process-by-process description of the embodiment implementing the manufacturing technique. The processes are described one after another in a sequential order.

First of all, the conductor foil 651 shown in FIG. 101 (A) is die-cut by the pattern die-cutter 654 so that band-shaped portions 666 stretched in the longitudinal direction of the conductor foil 651, circuit patterns 667 parallel to and separated away by a predetermined gap from the band-shaped portions 666, connection patterns 668 connecting the band-shaped portions 666 to the circuit patterns 667 and the portion 669 connecting patterns in the circuit pattern 667 each other are left on each die of the conductor foil 651 as shown in FIG. 101 (B). Next, the adhesive-agent crater coats the conductor foil 651 die-cut as such with the adhesive agent 656. The conductor foil 651 coated with the adhesive agent 656 is then attached to the board material 652 and sent to the pressure roller 657 where the conductor foil 651 is fixed to the board material 652 by applying pressure thereto as shown in FIG. 101 (C).

Subsequently, a hole punch 658 perforates holes on the conductor foil 651 fixed to the board material 652 in order to remove the connection patterns 668 of the conductor foil 651 and portions 669 connecting a variety of patterns in the circuit patterns 667 as shown in FIG. 101 (D). In this way, the circuit patterns 667 are isolated.

Next, the component mounting equipment 659 mounts the electronic components 660 on the circuit patterns 667 as shown in FIG. 101 (E).

Next, the adhesive-agent coater 661 coats the board material 652, on which the electronic components 660 were mounted, with the adhesive agent 662. The cover material 653 is then attached to the board material 652 coated with the adhesive agent 662 and sent to the pressure roller 663 where the cover material 653 is fixed by applying pressure to the board material 652. Subsequently, the external-shape cutter 664 trims each die into its final external shape. The dies are eventually separated from each other to produce the finished products 665.

In the embodiment of the manufacturing technique described above, since the conductor foil 651 first undergoes a die-cutting process before being fixed to the board material 652, the board material 652 is not cut during the die-cutting process of the conductor foil 651. A thin board material 652 can thus be used. As a result, the manufacturing cost can be reduced compared with the technique of die-cutting a circuit pattern from the conductor foil fixed to the board material ahead of time. In addition, by using paper as the board material 652, an extremely cheap circuit board can be offered.

Moreover, in the case of a circuit pattern to be embedded in a thin flexible sheet such as a slip, a ticket or a card, no special material is required for the board. That is to say, the circuit pattern can be embedded directly to the paper or the resin sheet of which the slip or the card is made of. In this way, the slip, card or the like can be provided with functions of an electronic apparatus for processing and storing data. In addition, since the conductor foil is die-cut perfectly, the circuit patterns can be peeled off with ease from the conductor foil. Accordingly, it is not necessary to create a circuit foil into a particular shape which can be peeled off with ease. As a result, the embodiment gives more freedom as far as shaping a circuit pattern is concerned, making it easier to create a circuit pattern.

Furthermore, since the circuit patterns on each die board linked to the band-shaped portions are conveyed continuously to a processing position to be processed, the circuit boards can be produced in volume in a short period of time. Also, since the electronic components 660 and the cover material 653 are mounted automatically to manufacture the finished products, the cost can further be reduced.

It should be noted that the electronic components 660 are connected to the conductor foil 651 by a soldering means such as wire bonding, conductive adhesive agent or a fixing-by-pressure means.

Note that the processes for mounting the electronic components 660 and fixing the cover material 653 can be eliminated to produce circuit boards which include only circuit patterns. In the embodiment, the conductor foil 651 is coated with the adhesive agent 656. It should be noted, however, that it can be the board material 652 that is coated with the adhesive agent 656 instead of the conductor foil 651. Similarly, it can be the cover material 653 that is coated with the adhesive agent 662 instead of the board material 652 to which the conductor foil 651 is fixed as is the case with the embodiment described above.

Also, in the embodiment, the adhesive agent 662 for sticking the cover material 653 is applied after the electronic components 660 have been mounted. However, the process for mounting the electronic components 660 can be carried out after the process for applying the adhesive agent 662. By reversing the order of the two processes, no special adhesive agent is thus required by the component mounting equipment 659 for mounting the electronic components 660 during the component-mounting process.

In addition, paper or a resin sheet, of which a slip or the like embedding the circuit is made, can be used as the board or/and cover material. Accordingly, the circuits can be created directly on the paper or resin sheet. In this way, a thin electronic apparatus having a variety of functions can be provided at a low cost.

Next, a second embodiment of the technique for manufacturing the electronic tag is described. In particular, this embodiment relates to a technique for directly creating a battery embedded in the home-delivery slip on a flexible sheet.

Figure 102:
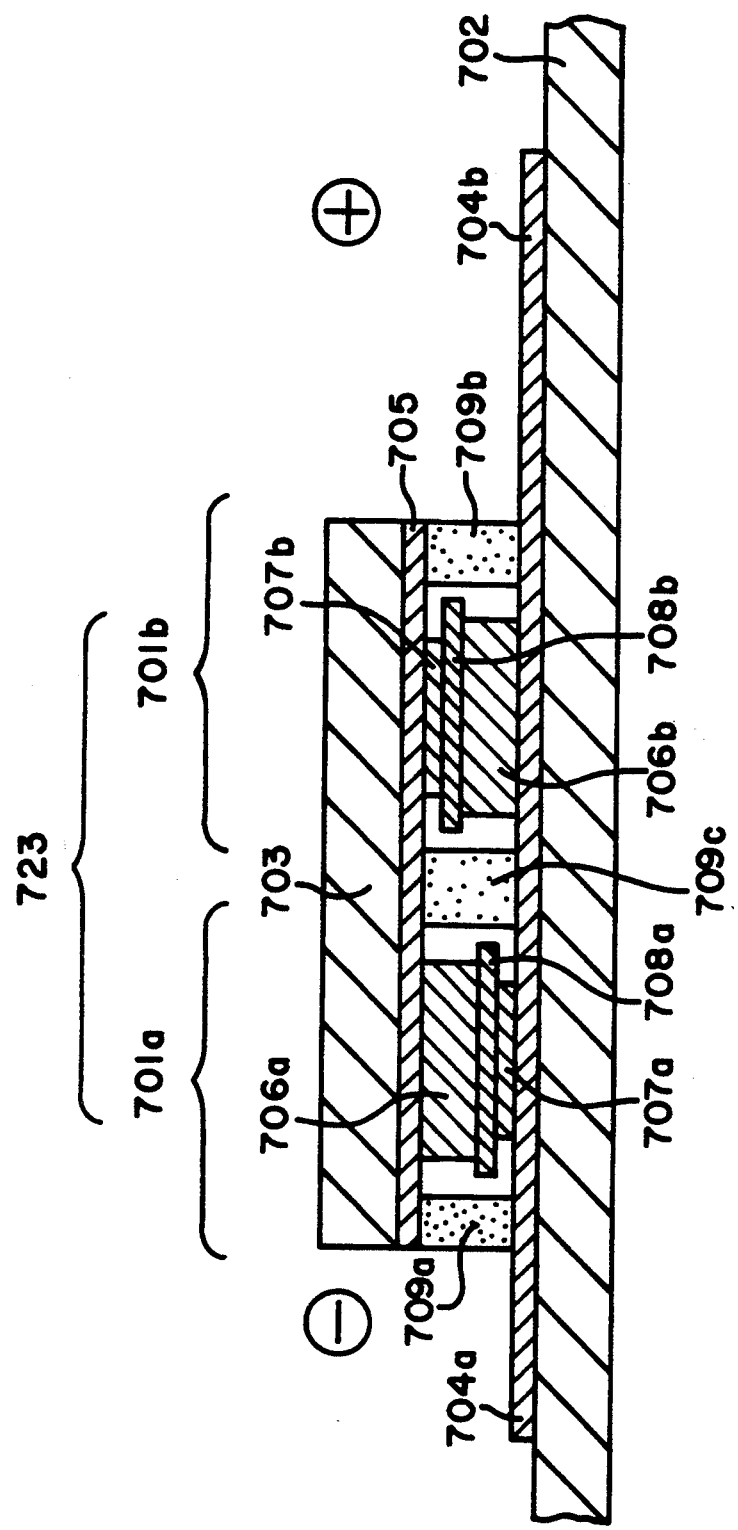
FIG. 102 is a cross-section diagram showing a cross section of a battery manufactured using a manufacturing technique adopted by a second embodiment implementing the manufacturing method of the electronic tag.

As shown in FIG. 102, a battery 723, a paper-type zinc-carbon dry battery in the case of the second embodiment, is directly created on a PET (Polyethylene terephtalate) board 702. The battery 723 is a set battery comprising single cells 701a and 701b which are connected to each other in series in the horizontal direction. The single cell 701a comprises a zinc plate 707a, a manganese-dioxide paste 706a and a separator 708a. Likewise, the single cell 701b comprises a zinc plate 707b, a manganese-dioxide paste 706b and a separator 708b. It should be noted that since the voltage of each of the single cells 701a and 701b is 1.5 (V), the set battery 723 has a total voltage of 3 (V).

The battery 723 is configured so that its components are arranged as follows. Carbon pattern 704a and 704b are created on the PET board 702. A PET sheet 703 is placed on the top. A carbon 705 is created under the PET sheet 703. The zinc plates 707a and 707b are created on the carbon pattern 704a and under the carbon electrode 705 respectively. The manganese-dioxide pastes 706a and 706b are created above the carbon pattern 704b and below the carbon electrode 705 respectively. The separators 708a and 708b which are made of craft paper with paste are created between the zinc plate 707a and the manganese-dioxide pastes 706a and between the zinc plate 707b and the manganese-dioxide-paste 706b respectively. Adhesive agents 709a, 709b and 709c are used to bind and seal the above components.

The manganese dioxide-pastes 706a and 706b are each a well kneaded mixture of positive-pole agent and electrolyte with a ratio of the former to the latter of 61 to 39. The positive-pole agent is a mixture of electrolytic manganese-dioxide, acetylene black and zinc oxide with a ratio of 85 to 14 to 1. The electrolyte is, on the other hand, a mixture of zinc chloride, zinc anmonium and water with a ratio of 26 to 3 to 71. The electrolyte is infiltrated into the entire single cells 701a and 701b.

In the above configuration, the battery 723 has an electrical route which starts with the carbon pattern 704a serving as the negative pole and ends with the carbon pattern 704b serving as the positive pole. The electrical path passes through the zinc plate 707a, the separator 708a, the manganese-dioxide paste 706a, the carbon electrode 705, the zinc plate 707b, the separator 708b and the manganese-dioxide paste 706b.

Figure 103:
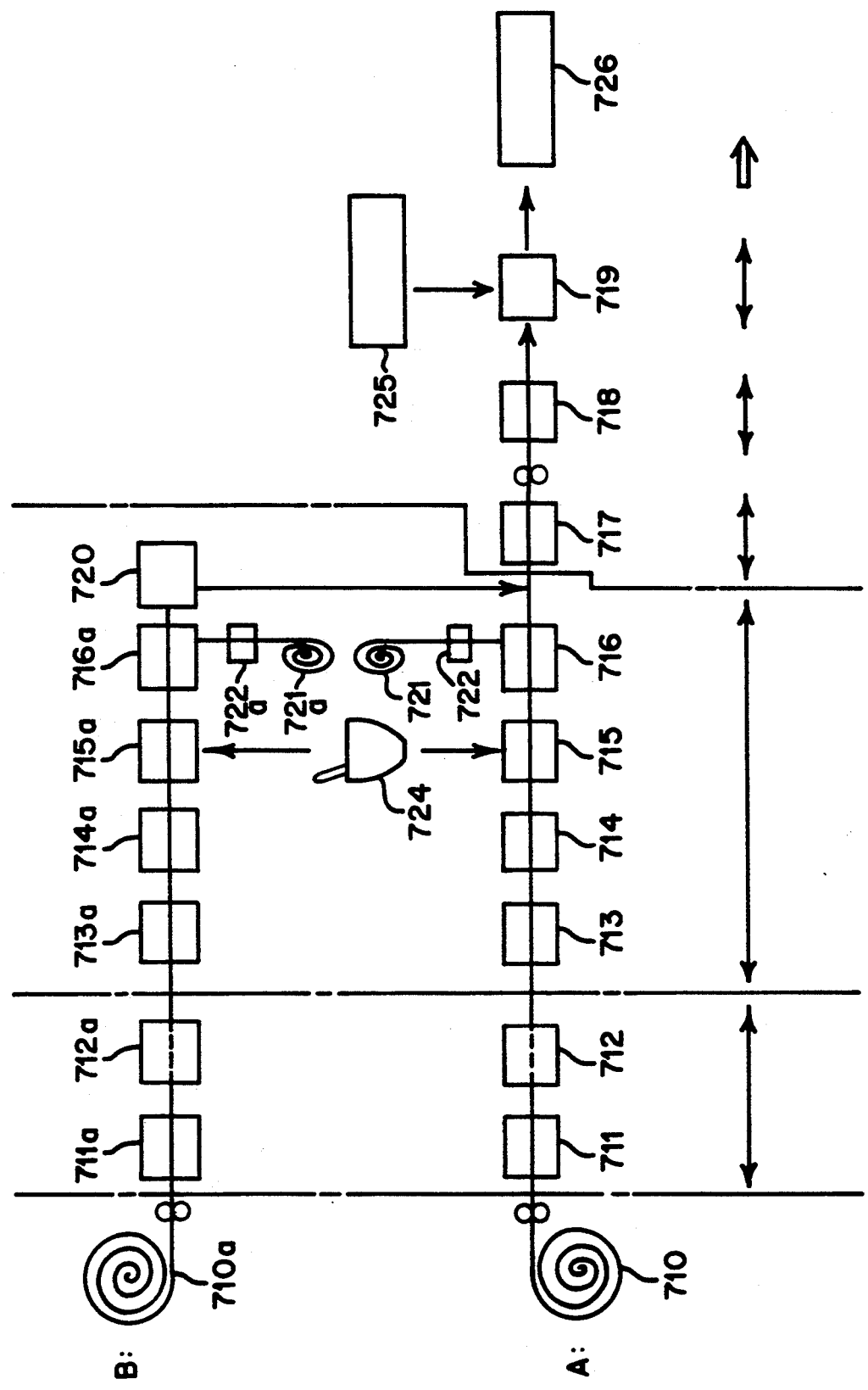
FIG. 103 is a manufacturing-process flowchart showing a skeleton of manufacturing processes of the above manufacturing method.

So far, the technique for manufacturing the home-delivery slip 726 with battery 723 has been described in FIG. 103. FIG. 104 to 107 show states of the PET sheet 703 and the PET board 702 during their manufacturing processes along lines (A) and (B) respectively. In actuality, the lines (A) and (B) are separate lines as described later. The following is process-by-process description of the embodiment. The successive processes are described one after another.

Figure 104:
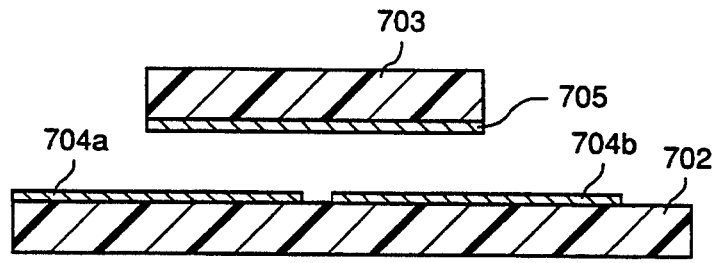
FIG. 104 is a cross-section diagram showing a cross section of the battery during a carbon-pattern printing process of the above manufacturing method.
Figure 105:
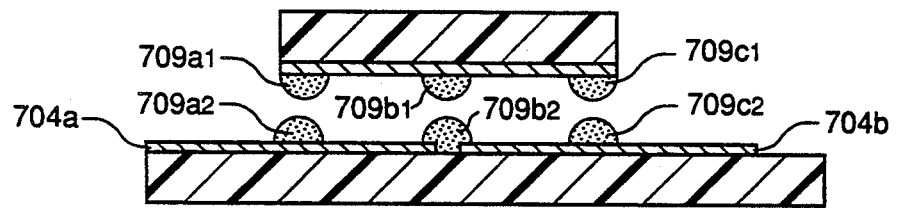
FIG. 105 is a cross-section diagram showing a cross section of the battery during an adhesive-agent coating process of the above manufacturing method.
Figure 106:
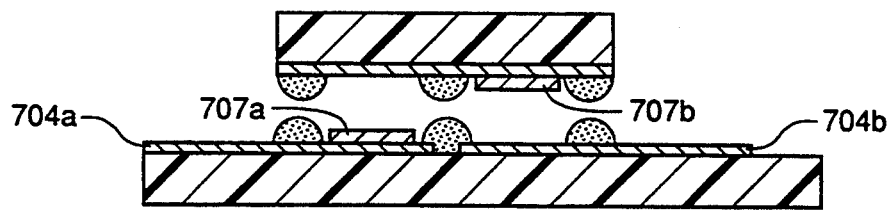
FIG. 106 is a cross-section diagram showing a cross section of the battery during a zinc-plate superimposing process of the above manufacturing method.
Figure 113:
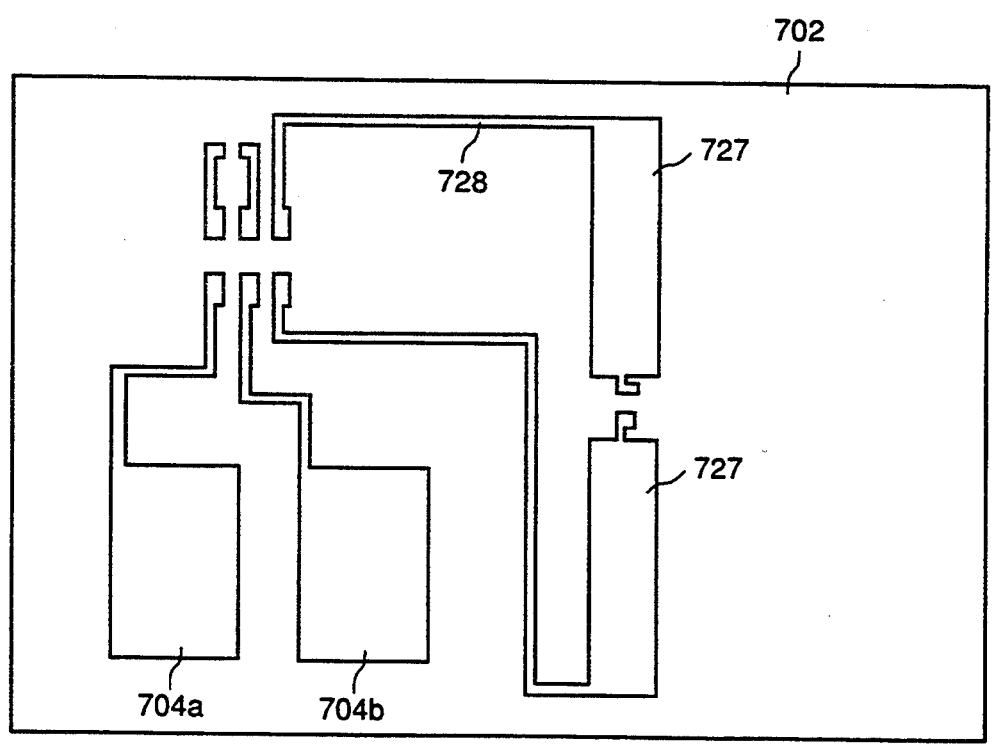
FIG. 113 is a printed-pattern diagram showing printed patterns printed during the carbon-pattern printing process.

On the line (A) shown in FIG. 103, a rolled PET board 710 is sent to a carbon-pattern printer 711 for printing board patterns, printed patterns shown in FIG. 113. Each board pattern includes the carbon pattern 704a and 704b and an antenna 727. A cross section of the battery 723 created in this carbon-pattern printing process is shown in FIG. 104. It should be noted that reference numeral 728 shown in FIG. 113 is a conductive carbon wire. The antenna 727 and the conductive carbon wire 728 are made of carbon which can be disposed by burning. Once they are burned, they become noninflammable garbage, a non-destructive thing that does not damage the environment and, thus, gives rise to no environmental problems. The board pattern is then dried using a drier 712. Typically, the board pattern is heated to 150 degrees Celsius for 10 minutes in order to dry and harden it. Subsequently, the board pattern is coated with adhesive agents 709a2, 709b2 and 709c2 by using an adhesive-agent coater 713. The adhesive agents 709a2, 709b2 and 709c2 are applied to predetermined locations on the carbon pattern 704a and 704b. A cross section of the battery 723 during this adhesive-agent coating process is shown in FIG. 105. Afterward, by using a zinc-plate superimposer 714, the zinc plate 707a is fixed on the carbon pattern 704a with conductive adhesive agent. A cross section of the battery 723 during this zinc-plate superimposing process is shown in FIG. 106.

Figure 107:
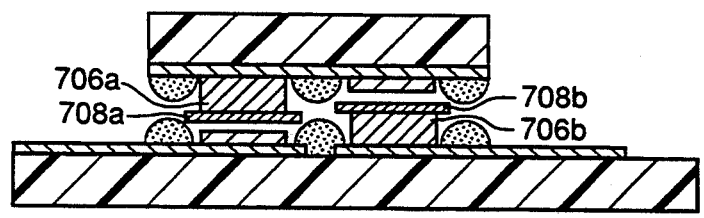
FIG. 107 is a cross-section diagram showing a cross section of the battery during a separator superimposing process of the above manufacturing method.

Then, using a manganese-dioxide-paste printer 715, a paste prepared using a manganese-dioxide-paste maker 724 is printed in order to form the manganese-dioxide paste 706b. Subsequently, the separator 708b is sent out from a rolled craft paper 721 and paste is applied thereto by paste equipment 722. The separator 708b is then mounted on the manganese-dioxide paste 706b. A cross section of the battery 723 during the separator-superimposing process is shown in FIG. 107.

On the line (B) parallel to the line (A) shown in FIG. 103, a rolled PET board 710a is sent to a carbon-pattern printer 711a for printing the carbon electrode 705 shown in FIG. 104. The carbon electrode 705 is then dried using a drier 712a. Subsequently, the carbon electrode 705 is coated with adhesive agents 709a1, 709b1 and 709c1 by using an adhesive-agent coater 713a. A cross section of the the battery 723 during this adhesive-agent coating process is shown in FIG. 105. Afterward, by using a zinc-plate superimposer 714a, the zinc plate 707b is fixed on the carbon electrode 705 with conductive adhesive agent. A cross section of the battery 723 during this zinc-plate superimposing process is shown in FIG. 106.

Then, using a magnanese-dioxide-paste printer 715a, a paste prepared using a manganese-dioxide-paste maker 724 is printed in order to form the manganese-dioxide paste 706a. Subsequently, the separator 708a is sent out from a rolled craft paper 721a and paste is applied thereto by paste equipment 722a. The separator 708a is then mounted on the manganese-dioxide paste 706a. A cross section of the battery 723 during this separator-superimposing process is shown in FIG. 107.

Subsequently, the PET sheet 703, on which the carbon electrode 705, the manganese-dioxide paste 706a, the separator 708a and the zinc plate 707b were created in the successive processes described above, is trimmed to a proper size by using a PET-sheet trimmer 720a.

The PET sheet 703 manufactured along the line (B) is then superimposed on the PET board 710 at the middle of the manufacturing line (A) to form a permanent joint between them. In this process, the battery 723 is completed. A cross section of the completed battery 723 is shown in FIG. 102. As described above, the adhesive-agent coaters 713 and 713a are used for applying adhesive agent. It should be noted, however, that the adhesive-agent coating processes can also be carried out after the manganese-dioxide pastes 706a and 706b have been created. In addition, the separators 708a and 708b can also be superimposed on the zinc plates 707a and 707b respectively instead of the manganese-dioxide pastes 706a and 706b.

Subsequently, a component mounter 717 connects IC, chip resistors, chip condensers and the like to the circuit pattern using conductive adhesive agent. Note that the component mounter 717 includes a component mounting machine and a drier. The PET board 710 is then trimmed by a board trimmer 718 to form pieces of the PET boards 702. In this process, the responding circuit of a home-delivery slip 726 is completed. Finally, the responding circuit is affixed to the lower surface of a slip 725 printed in advance by using a board sticker 719 to produce a complete home-delivery slip 726.

According to this invention, carbon pattern are printed on a PET board as current collectors and a zinc-carbon dry battery is used as a battery embedded in a home-delivery slip as described above. Accordingly, a proper humidity has to be maintained in an atmosphere in which the zinc-carbon dry battery is manufactured in order to prevent the electrolyte from evaporating. As a matter of fact, such an atmosphere is preferred. A special environment such as a clean room is thus unnecessary. As a result, the manufacturing cost is thereby reduced.

In addition, since a battery of this type does not contain mercury, cadmium or the like which gives rise to a pollution problem, or lithium which involves a risk of causing a fire to break out, no environmental problems result from disposing the home-delivery slip 726 at the end of its use. Moreover, since wires in the electronic circuits including the electrodes for interfacing the embedded power supply with electronic circuits and the antenna are made of carbon, the electronic tag can be disposed by burning it after its use much like the conventional home-delivery slip made of paper without causing any environmental problems.

Furthermore, in the manufacturing processes described above, an embedded battery can be directly created on the board of the responding circuit. The thickness of the home-delivery slip can therefore be made very small. In the case of the manufacturing technique implemented by this embodiment, the thickness of the battery portion is 0.5 mm. An extremely flexible home-delivery slip can thus be manufactured. As a result, such a home-delivery slip can be freely affixed to any location on a parcel to be delivered.

Next, a modification example of the second embodiment described above is explained.

Figure 108:
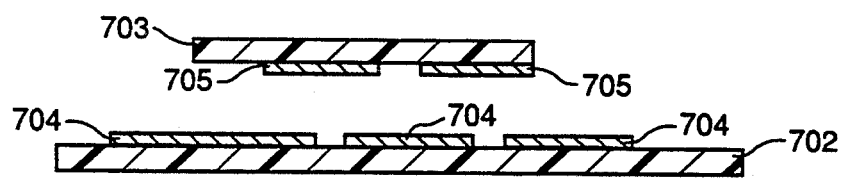
FIG. 108 is a cross-section diagram showing a cross section of the battery during a carbon-pattern printing process of a modification example.
Figure 109:
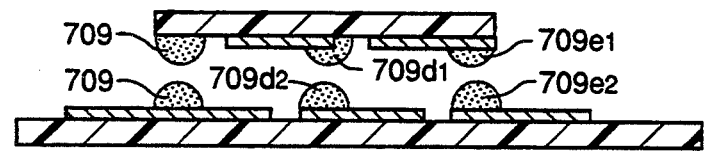
FIG. 109 is a cross-section diagram showing a cross section of the battery during an adhesive-agent coating process of the modification example.
Figure 112:
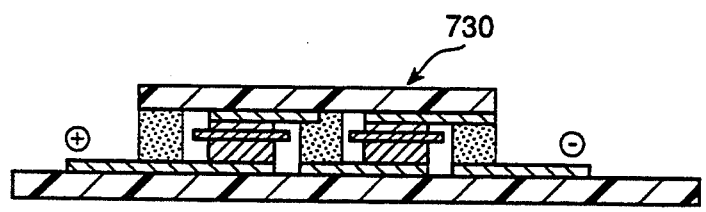
FIG. 112 is a cross-section diagram showing a cross section of the battery manufactured by the modification example.

The embodiment described above is configured so that the directions of the polarities of the single cells 701a and 701b are different from each other. It should be noted, however, Chat the directions of the polarities of the battery 730 can be made the same as shown in FIG. 112. In this case, the carbon pattern are slightly different from those of the embodiment. A technique of manufacturing adopted by the modification example is shown in FIGS. 108 to 112. Since manufacturing processes shown in FIGS. 108 and 109 are the same as those of the embodiment shown in FIGS. 104 and 105, their description is omitted. It should be noted that reference numerals 709d1, 709d2, 709e1 and 709e2 each denote conductive adhesive agent.

Figure 110:
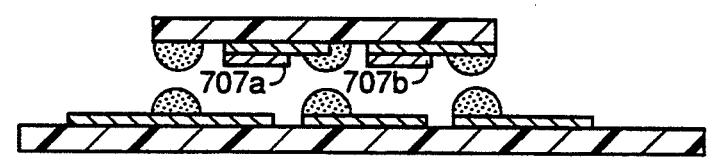
FIG. 110 is a cross-section diagram showing a cross section of the -battery during a zinc-plate superimposing process of the modification example.
Figure 111:
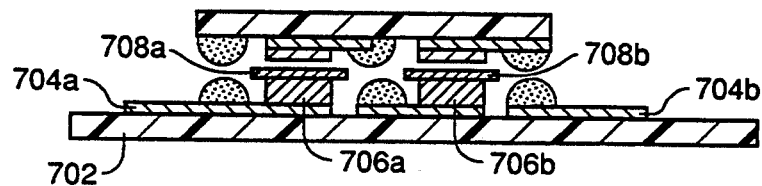
FIG. 111 is a cross-section diagram showing a cross section of the battery during a separator superimposing process of the modification example.

As the process shown in FIG. 109 is completed, on a line (B), the zinc plates 707a and 707b are created on the PET sheet 703 as shown in FIG. 110. Subsequently, shown in FIG. 111 on a line (A), the manganese-dioxide pastes 706a and 706b and the separators 708a and 708b are created on the side of the PET board 702. The PET sheet 703 and the PET board 702 manufactured on the lines (B) and (A) respectively are then joined to each other by attaching the former to the latter to complete the battery 730 as in the case of the embodiment.

As an alternative, the manganese-dioxide pastes 706a and 706b described above can also be a well kneaded mixture of positive-pole agent and paste with a weight ratio of the former to the latter of 60 to 40. The positive-pole agent is a mixture of electrolytic manganese dioxide, acetylene black and zinc oxide with a ratio of 85 to 14 to 1. The paste, on the other hand, is a mixture of electrolyte to be described later and starch. The electrolyte is a mixture of zinc chloride, ammonium chloride and water with a ratio of 26 to 3 to 71. As described above, the paste is a well kneaded mixture of the electrolyte and the starch with a weight ratio of the former to the latter of 50 to 50. As a substitute for the starch cited above, hardened agent made of a mixture of acrylic emulsion and electrolyte can be used. As for the other substances, those for similarly creating the manganese-dioxide paste are applicable.

Subsequently, the manganese-dioxide pastes for coating the carbon pattern 704 and the carbon electrode 705 are heated typically to 80 degrees Celcius for, say, 5 minutes in order to dry and harden them. Then, electrolyte liquid is supplied to the hardened manganese-dioxide layers or the surfaces of the manganese-dioxide layers are covered with paste and overlapped by craft paper with paste on top of them. The other manufacturing techniques are the same as those adopted by the embodiment.

As an alternative for creating the zinc plates 707a and 707b described above, powder zinc can be used. To be more specific, a well kneaded mixture of negative-pole agent and the paste described above or hardened agent with a weight ratio of the former to the latter of 60 to 40 can be used to replace the zinc plates 707a and 707b. The negative-pole agent is a mixture of the powder zinc and acetylene black with a ratio of the former to the latter of 200 to 1.

Subsequently, the zinc pastes for coating the carbon pattern 704 and the carbon electrode 705 are heated typically to 80 degrees Celcius for, say, 5 minutes in order to dry and harden them. Then, electrolyte liquid is supplied to the hardened manganese-dioxide layers or the surfaces of the manganese-dioxide layers are covered with paste. The other manufacturing techniques are the same as those adopted by the embodiment.

In the second embodiment described above, a PET board is used. As a substitute for the PET board, paper, paper laminated with the PET sheet, paper containing silicon or a PET sheet or paper laminated with aluminum or a stainless metal can be used as long as it meets a drying condition, that is, it endures a heating process to 150 degrees Celcius for 30 minutes. In this case, it can be only the battery portion that is laminated with a metal. Instead of laminating, a technique of sticking a metal foil externally can be adopted. In addition, the responding circuit including the antenna can be affixed not only to the lower surface of the slip but also to the inside or the upper surface thereof. As an alternative, the responding circuit can also be directly created on the lower side of the slip as well.

As a substitute for the adhesive agent for sealing purposes, a double-side tape or hot-melt adhesive agent can be used. As for the carbon pattern, conductive resin containing carbon or rubber can be used to replace the paint containing carbon. In addition, the IC can be mounted on the board with a different-direction conductive layer using a TAB mounting technique or mounted on the board directly with a different-direction conductive layer instead of using the conductive adhesive agent.

In addition, the configurational ratios among substances in the batteries manufactured by the embodiments are typical values. Therefore, the configurational ratios and the substances are not limited to the cited typical examples. For instance, the paste does not have to be of the powder type. The paste can also be made of methylcellulose or polyvinyl alcohol as well. As for the separators, cellophane can be used as a substitute for the craft paper.

Furthermore, even though a zinc-carbon dry battery is cited in the above description of the embodiments, thin batteries other than the lithium battery such as a solid electrolytic silver battery, a solid electrolytic copper battery and the like can also be used as well. Much like the embodiments described above, by connecting two or more single cells in series, a desired voltage can be obtained.

What is claim is:

1. An information storage medium comprising:
   at least one removable information foil having areas allowing at least one visually comprehensible information code to be entered, said information foil formed of a bendable material; and an electronic foil including a responder for storing data representing said information code and transmitting said stored data in response to received electromagnetic waves, said electronic foil formed in a reinforcing member which is not bendable, wherein said information foil and said electronic foil are in a single body formed having a bendable and a non-bendable portion and said body accommodates a plurality of said information foils.

2. An information storage medium according to claim 1, wherein said information foil and said electronic foil include a bundling member at an end thereof.

3. An information storage medium comprising:
an information foil having areas allowing at least one visually comprehensible information code to be entered, said information foil formed of a bendable material;

an electronic foil including a responder for storing data representing said information code and transmitting said stored data in response to received electromagnetic waves, wherein said information foil and said electronic foil are in a single body;

a bundling member attached to an end of said information foil and said electronic foil to secure the foils together; and wherein at least one of said foils include a code forming portion for producing delivery information, said code forming portion including an element which changes a conductive state of a predetermined signal line.

4. An information storage medium according to claim 3, wherein said element includes a cut-off portion, corresponding to said signal line, and provided on at least one of said foils for producing said delivery information, and said delivery information is produced by cutting off electrical conduction between said cut-off portion and said signal line.

5. An information storage medium according to claim 1, wherein said information foil and said electronic foil are formed into a single body including a piece of foil on each.

6. An information storage medium according to claim 1, wherein said information foil has a flat portion with at least said areas for filling in said information code, said flat portion is created on said antenna.

7. An information storage medium according to claim 6, wherein said flat portion is formed so that said flat portion is surrounded by said modulator, demodulator and signal processing unit of said responder.

8. An information storage medium according to claim 6, wherein said modulator, demodulator and signal processing unit are formed outside said flat portion.

9. An information storage medium comprising:
an information foil area, having areas allowing at least one visually comprehensible information code to be entered, said information foil area formed of a bendable material;

an electronic foil including a responder for storing data representing said information code and transmitting said stored data in response to received electromagnetic waves, wherein said information foil and said electronic foil are in a single body;

wherein at least one of said foils is provided with a code forming portion for producing delivery information including an element which changes a conductive state of a predetermined signal line.

10. An information storage medium according to claim 5, wherein said information foil is flexible.

11. An information storage medium according to claim 1, wherein said information code comprises fixed data including ID information and a variable code including management information and at least said fixed data is printed on at least one of said information foil and said electronic foil.

12. An information storage medium according to claim 1, wherein a portion on said foil for forming said modulator, demodulator and signal processing unit forming said responder includes a supporting portion which reinforces against bending stress.

13. An information storage medium according to claim 1, wherein a portion on said foil for forming said modulator, demodulator and signal processing unit forming said responder includes an elastic material covering said responder.

14. An information storage medium according to claim 1, wherein said information foil is flexible.

15. An information storage medium comprising:
an information foil for bearing a visually comprehensible information code; and an electronic foil, including a responder, for electrically storing stored data related to said information code and transmitting said stored data in response to received electromagnetic waves, wherein said information foil and said electronic foil are bundled to each other only at one end thereof.

16. An information storage medium according to claim 15, further comprising:
a signal line formed in at least one of said information foil and said electronic foil, and electrically changed in accordance with a physical operation from outside of said information storage medium, wherein said responder stores said data in accordance with change of said signal line.

17. An information storage medium according to claim 15, wherein said signal line is formed in said electronic foil, and including a cut-off portion located corresponding to said signal line for allowing a portion of said signal line to be cut-off, said data being determined by cutting off said portion of said signal line as well as said cut-off portion.

18. An information storage medium according to claim 17, wherein said information foil has a flat portion with at least said areas for filling in and said information code.

19. An information storage medium according to claim 18, wherein said flat portion is formed so that said flat portion is surrounded by said modulator, demodulator and signal processing unit of said responder.

20. An information storage medium according to claim 18, wherein said modulator, demodulator and signal processing unit are formed outside said flat portion.

21. An information storage medium according to claim 15, wherein said information code comprises fixed data including ID information and a variable code including management information and at least said fixed data is printed on at least one of said information foil and said electronic foil.

22. An information storage medium according to claim 15, wherein a portion on said foil for forming said modulator, demodulator and signal processing unit forming said responder includes a supporting portion which reinforces against bending stress.

23. An information storage medium according to claim 15, wherein a portion on said foil for forming said modulator, demodulator and signal processing unit forming said responder includes an elastic material covering said responder.

24. An information storage medium according to claim 15, wherein said information foil is flexible.

25. An information storage medium according to claim 1, wherein said information foil area includes a plurality of removable sections, each of which include said visually comprehensible information code.

26. A medium as in claim 25 wherein said multiple sections include a seam which allow said section to be removed from other seams.

27. An information storage medium as in claim 1 further comprising an antenna used by said responder, said antenna formed on said bendable information storage area.

28. An information storage medium as in claim 4 wherein said cutoff portion includes an element on said foil which is physically removable.

29. An information storage medium comprising:

an information foil having areas allowing at least one visually comprehensible information code to be entered;

an electronic foil including a responder for electronically storing data related to said information code and transmitting said stored data in response to received electromagnetic waves; and a signal line formed in at least one of said foils having cut-out areas which are cut out to form holes, changing in electrical characteristics of said signal line, wherein said responder stores said data in accordance with said changing of said signal line.

30. An information storage medium according to claim 29, wherein said signal line is formed in said electronic foil, and includes a cut-off portion located corresponding to said signal line to allow a portion of said signal line to be cut-off, said data being selected by cutting off said portion of said signal line as well as said cut-off portion.

31. An information storage medium according to claim 15 wherein said information storage medium is an electronic tag.

* * * * *